(12) United States Patent
Yuan et al.

(10) Patent No.: US 11,840,776 B2
(45) Date of Patent: Dec. 12, 2023

(54) LIGNIN FRACTIONATION AND FABRICATION FOR QUALITY CARBON FIBER

(71) Applicant: The Texas A&M University System, College Station, TX (US)

(72) Inventors: Joshua Shuhua Yuan, College Station, TX (US); Qiang Li, College Station, TX (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 0 days.

(21) Appl. No.: 16/975,667

(22) PCT Filed: Feb. 26, 2019

(86) PCT No.: PCT/US2019/019620
§ 371 (c)(1),
(2) Date: Aug. 25, 2020

(87) PCT Pub. No.: WO2019/165443
PCT Pub. Date: Aug. 29, 2019

(65) Prior Publication Data
US 2020/0407884 A1    Dec. 31, 2020

Related U.S. Application Data

(60) Provisional application No. 62/635,469, filed on Feb. 26, 2018.

(51) Int. Cl.
*D01F 9/17*    (2006.01)
*C07G 1/00*    (2011.01)
*D01D 5/00*    (2006.01)

(52) U.S. Cl.
CPC ................. *D01F 9/17* (2013.01); *C07G 1/00* (2013.01); *D01D 5/003* (2013.01)

(58) Field of Classification Search
CPC ....................................................... D01F 9/17
See application file for complete search history.

(56) References Cited

U.S. PATENT DOCUMENTS 5,344,921 A  *  9/1994  Sudo ........................ C08H 6/00
                                                            530/500
9,190,222 B1 * 11/2015 Zhang .................... H01G 11/36
(Continued)

OTHER PUBLICATIONS

Compere et al. (Evaluation of Lignin from Alakaline-pulped Hardwood Black Liquor, Oak Ridge National Laboratory, 2005) (Year: 2005).*

(Continued)

*Primary Examiner* — Liam J Heincer
(74) *Attorney, Agent, or Firm* — CONLEY ROSE, P.C.

(57) ABSTRACT

A method of producing carbon fibers includes (a) treating lignin to produce a precursor lignin having an increased uniformity. The increased uniformity is defined by (i) an increased linear structure as evidenced by an increased percentage of linkages selected from uncondensed β-O-4' interunitery linkages or condensed β-5' linkages, (ii) a reduced polydispersity index (PDI), or (iii) an increased amount of multiple intermolecular hydrogen bonding relative to the lignin prior to treating. In addition, the method includes (b) forming precursor fibers from the precursor lignin. Further, the method includes (c) subjecting the precursor fibers to thermostabilization or carbonization to produce the carbon fibers.

19 Claims, 62 Drawing Sheets

(56) References Cited

U.S. PATENT DOCUMENTS

| | | | | |
|---|---|---|---|---|
| 2008/0047674 | A1* | 2/2008 | Ohman | D21C 11/0007 |
| | | | | 162/16 |
| 2008/0214796 | A1* | 9/2008 | Tomani | D21C 11/0007 |
| | | | | 530/500 |
| 2011/0297340 | A1* | 12/2011 | Kouisni | D21C 11/0007 |
| | | | | 162/16 |
| 2012/0003471 | A1* | 1/2012 | Bissett | D01F 9/225 |
| | | | | 428/367 |
| 2013/0217869 | A1* | 8/2013 | Ters | C08H 6/00 |
| | | | | 530/507 |
| 2014/0271443 | A1 | 9/2014 | Baker et al. | |
| 2014/0353861 | A1* | 12/2014 | Sjoholm | D01D 5/08 |
| | | | | 264/29.2 |
| 2015/0183813 | A1* | 7/2015 | Eskelinen | C08H 6/00 |
| | | | | 530/507 |
| 2016/0017541 | A1* | 1/2016 | Lake | D21C 11/0007 |
| | | | | 162/16 |
| 2016/0200754 | A1* | 7/2016 | Wittmann | D21C 11/0007 |
| | | | | 530/500 |
| 2016/0298295 | A1* | 10/2016 | Dybov | C07G 1/00 |
| 2017/0247255 | A1* | 8/2017 | Wittmann | C08L 97/005 |
| 2018/0282535 | A1* | 10/2018 | Alves | C08L 97/00 |
| 2019/0241595 | A1* | 8/2019 | Dahlstrand | C10G 3/42 |
| 2020/0109157 | A1* | 4/2020 | Tomani | C08H 6/00 |
| 2020/0377539 | A1* | 12/2020 | Wallmo | C08H 6/00 |
| 2020/0407388 | A1* | 12/2020 | Mano | D01F 9/17 |
| 2021/0261742 | A1* | 8/2021 | Harasek | C08H 6/00 |
| 2021/0284675 | A1* | 9/2021 | Tudman | C08L 97/005 |

OTHER PUBLICATIONS

Nordberg (Carbon Fibers from Kraft Lignin, Doctoral Thesis, 2012) (Year: 2012).*

Li, Qiang et al., "Quality Carbon Fibers from Fractionated Lignin," Green Chemistry, 2017, vol. 19, pp. 1628-1634 (8 p.).

Li, Qiang et al.,. "Molecular Weight and Uniformity Define the Mechanical Performance of Lignin-Based Carbon Fiber," Journal of Materials Chemistry A, 2017, vol. 5, pp. 12740-12746 (7 p.).

PCT/US2019/019620 International Search Report and Written Opinion dated May 24, 2019 (10 p.).

Li et al, "Quality Carbon Fibers from Fractionated Lignin," Green Chemistry, 2017, vol. 19, pp. 1628-1634 (2238-10401) (32 p.).

Lindstrom, T., "The Colloidal Behavior of Kraft Lignin," Colloid and Polymer Science, 1979, vol. 257, pp. 277-285 (9 p.).

Beisl, Stefan et al., "Lignin from Micro-to-Nanosize: Production Methods," International Journal of Molecular Sciences, 2017, vol. 18, pp. 1-31 (31 p.).

* cited by examiner

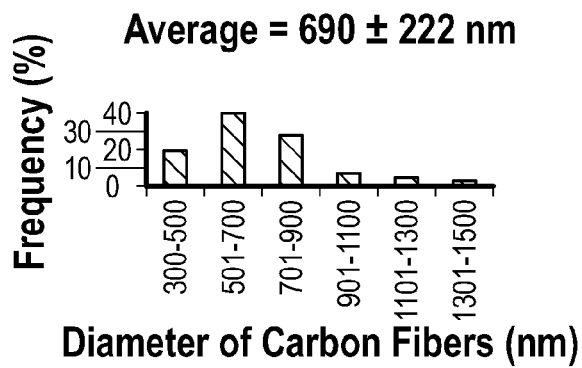
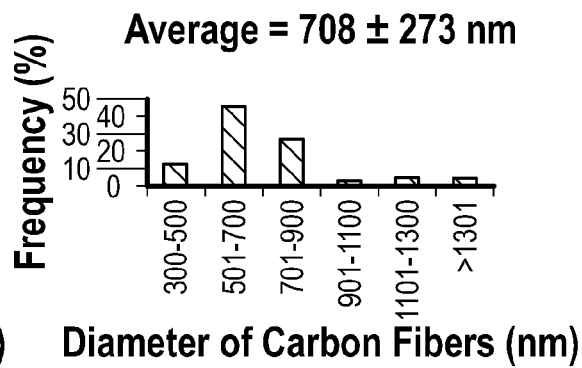
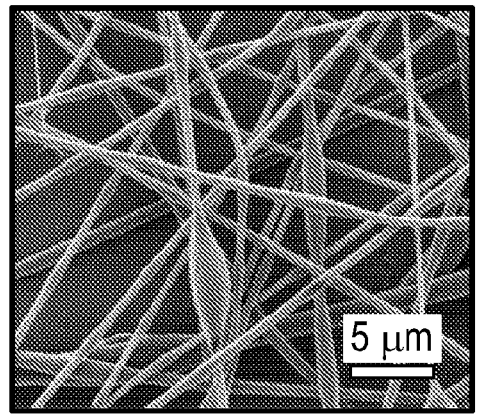
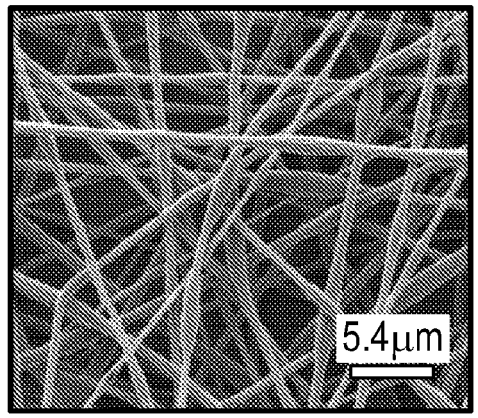
FIG. 16A   FIG. 16B
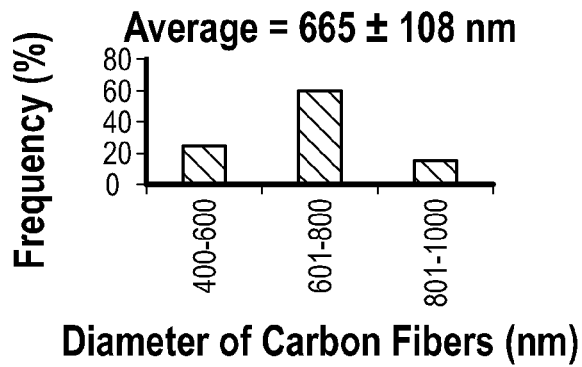
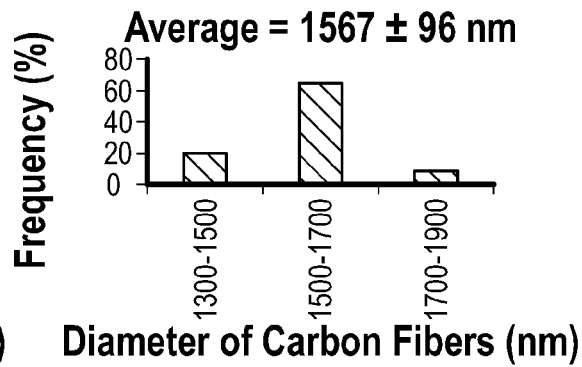
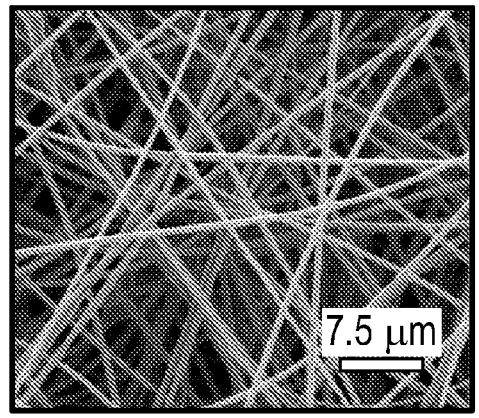
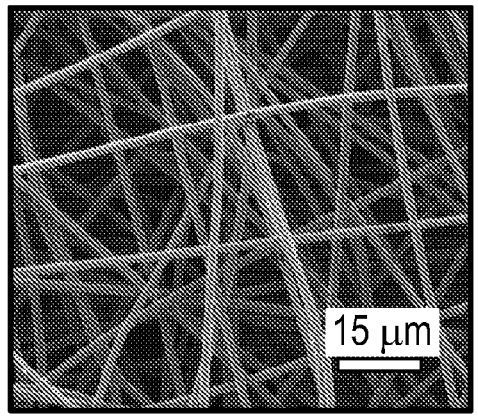
FIG. 16C   FIG. 16D (a)
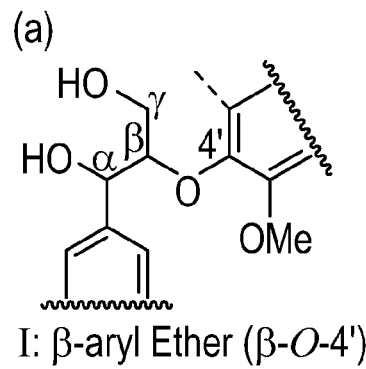
I: β-aryl Ether (β-O-4')
(b)
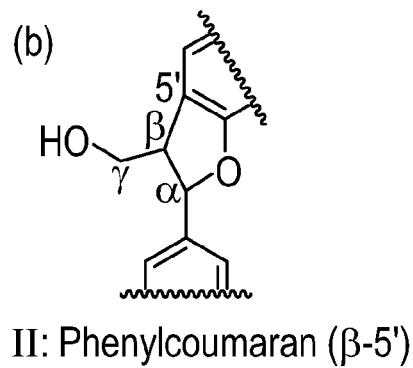
II: Phenylcoumaran (β-5')
(c)
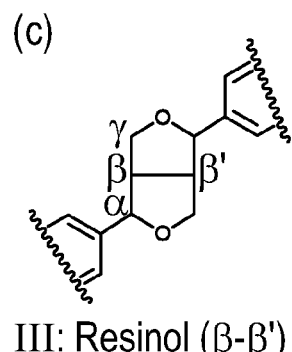
III: Resinol (β-β')
(d)
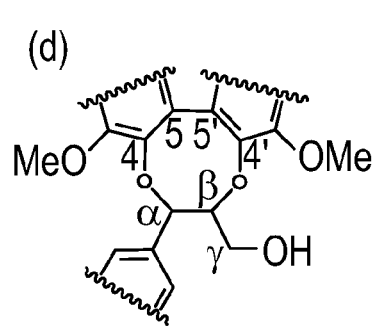
IV: Dibenzodioxocin
(DBDQ 5-5/β-O-4'/α-O-4)
FIG. 39C

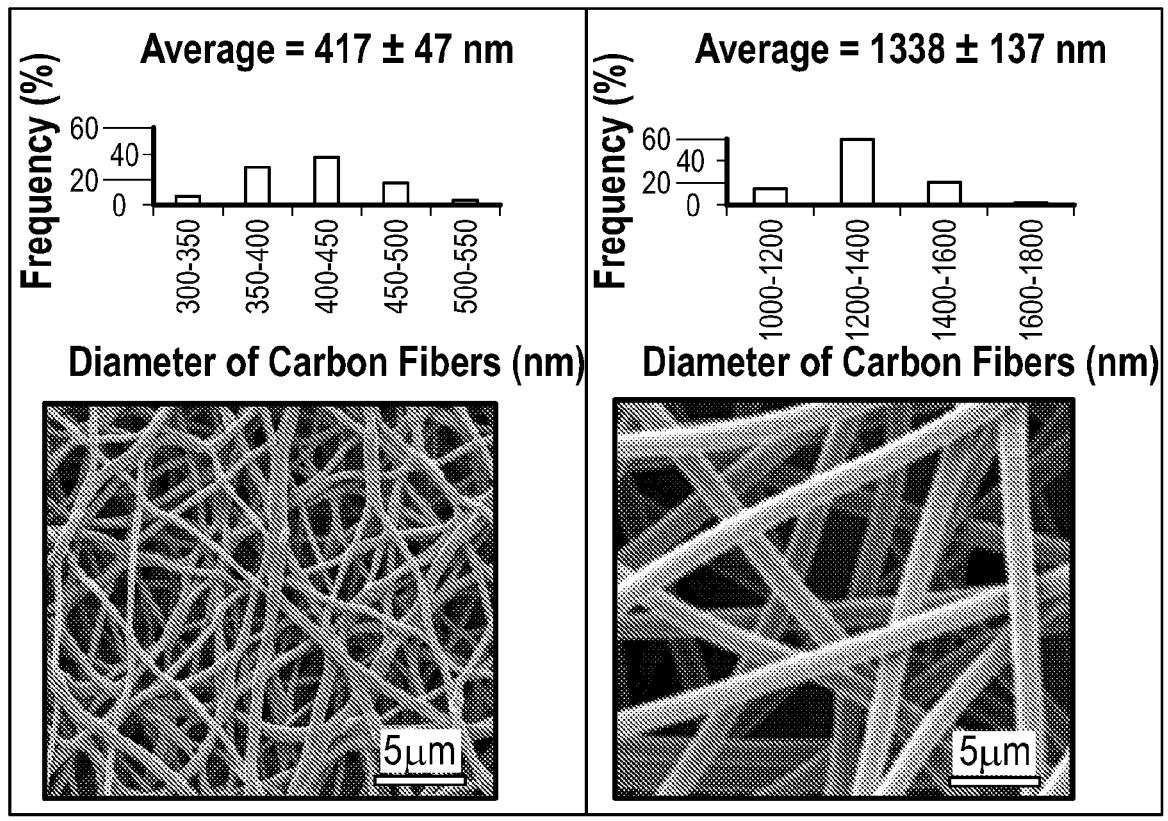
FIG. 40E  FIG. 40F
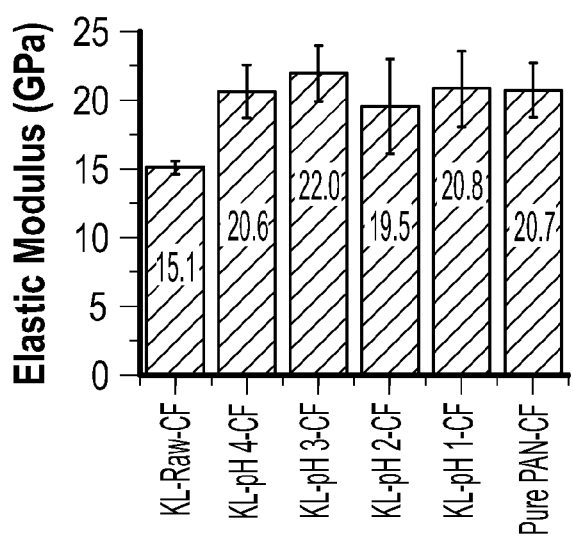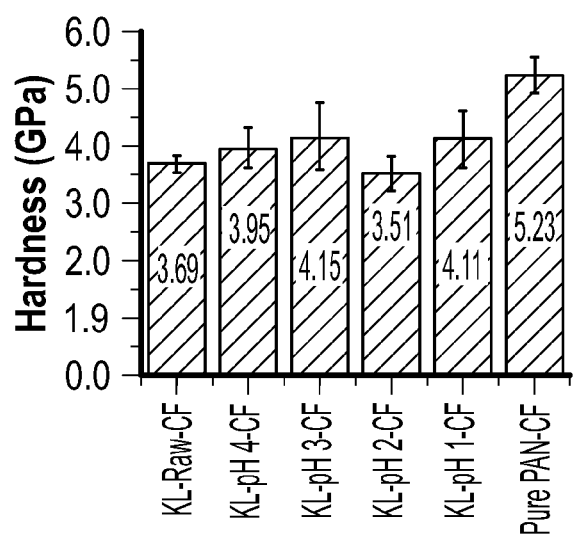
FIG. 41A  FIG. 41B

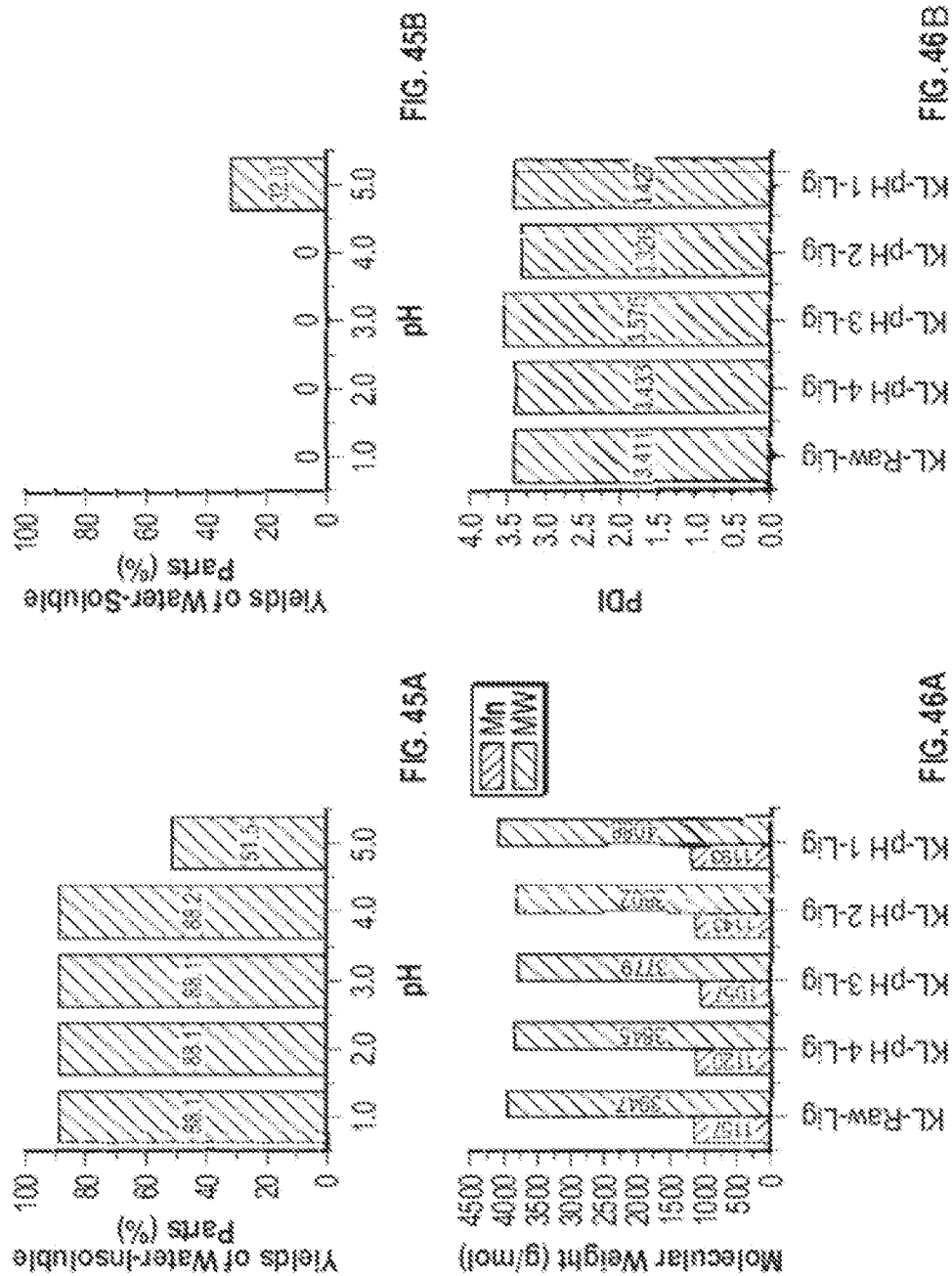

LIGNIN FRACTIONATION AND FABRICATION FOR QUALITY CARBON FIBER

CROSS-REFERENCE TO RELATED APPLICATIONS

This application is a 35 U.S.C. § 371 national stage application of PCT/US2019/019620 filed Feb. 26, 2019, and entitled "Lignin Fractionation and Fabrication for Quality Carbon Fiber," which claims benefit of U.S. provisional patent application Ser. No. 62/635,469 filed Feb. 26, 2018, and entitled "Lignin Fractionation and Fabrication for Quality Carbon Fiber," each of which is hereby incorporated herein by reference in its entirety for all purposes.

STATEMENT REGARDING FEDERALLY SPONSORED RESEARCH OR DEVELOPMENT

Not applicable.

TECHNICAL FIELD

The present disclosure relates to the production of carbon fibers; more specifically, this disclosure relates to the production of lignin based carbon fibers; still more specifically, this disclosure relates to the production of lignin based carbon fibers via treating lignin to prepare a precursor lignin having increased uniformity relative to the lignin prior to treating, and forming carbon fibers from the precursor lignin.

BACKGROUND

Lignin is an abundant biopolymer on earth. Currently, the pulp and paper industry produces about 50 million tons of lignin annually, and only approximately 2% of this lignin is used commercially. With the implementation of billion-ton initiative for lignocellulosic biofuels, 150 to 300 million tons of lignin-containing biorefinery waste will be generated each year, representing a significant challenge for modern biorefinery. Nevertheless, lignin is a unique biopolymer with high carbon content (up to 60%) and aromatic monomers. This chemical characteristic makes it possible to use lignin to produce carbon fibers. Carbon fibers are lightweight material with excellent mechanical properties and broad applications in sporting goods, automotive, aerospace, wind turbine blades, and other industries. Traditionally, commercial carbon fibers are mostly made of polyacrylonitrile (PAN)

SUMMARY

Herein disclosed is a method of producing carbon fibers, the method comprising: (a) treating lignin to produce a precursor lignin having an increased uniformity defined by (i) an increased linear structure as evidenced by an increased percentage of linkages selected from uncondensed β-O-4' interunitery linkages and/or condensed β-5' linkages, (iii) a reduced polydispersity index (PDI), and/or (iii) an increased amount of multiple intermolecular hydrogen bonding relative to the lignin prior to treating; (b) forming precursor fibers from the precursor lignin; and (c) subjecting the precursor fibers to thermostabilization and/or carbonization to produce the carbon fibers.

Also disclosed herein are lignin based carbon fibers having: an average diameter of less than or equal to about 1300, 1200, 1100, 1000, 900, 800, 700, 600, 500, or 400 nm; an increased content of pre-graphitic turbostratic structure relative to carbon fibers made in the same manner but without treating the lignin and/or absent the lignin, as evidenced by a distance between interfacial crystallite layers, as measured by $d_{hkl}$ determined by XRD, that is less than or equal to about 0.390, 0.380, 0.370, 0.360, or 0.350 nm; a crystallite size, $L_{hkl}$, as measured by XRD, that is at least 20, 30, 40, 50, or 60% greater than a crystallite size of carbon fibers made in the same manner but without treating the lignin and/or absent the lignin; an increased crystallite content, as evidenced by an integration ratio of G and D bands (G/D ratio), as measured by Raman spectroscopy, that is at least 20, 30, 40, or 45% greater than a G/D ratio of carbon fibers made in the same manner but without treating the lignin and/or absent the lignin; and/or a reduced elastic modulus, as measured by nanoindentation, that is at least 30, 40, or 45% greater than a reduced elastic modulus of carbon fibers made in the same manner but without treating the lignin and/or absent the lignin.

BRIEF DESCRIPTION OF THE DRAWINGS

For a detailed description of the preferred embodiments of the disclosed processes, reference will now be made to the accompanying drawings in which:

FIG. 16 shows SEM images of as-spun fibers made of lignin and PAN in Example 1;

FIG. 39C shows the chemical structures of lignin interunitary linkages;

FIG. 41A shows elastic modulus of carbon fibers of Example 3 measured by nanoindentation;

FIG. 41B shows hardness of carbon fibers of Example 3 measured by nanoindentation;

FIG. 45A shows yields of water insoluble parts of Kraft lignin after precipitation into hydrochloric acid with different pH values;

FIG. 45B shows yields of water soluble parts of Kraft lignin after precipitation into hydrochloric acid with different pH values;

FIG. 46A shows the molecular weight of each lignin of Example 3;

FIG. 46B shows the polydispersity index (PDI) of each lignin of Example 3;

panel (c) KL-Insol-0.50% SWCNT; panel (d) KL-Insol-0.75% SWCNT; panel (e) KL-Insol-1.00% SWCNT; and panel (f) G/D ratio for the various CNT reinforced carbon fibers.

DETAILED DESCRIPTION

Overview

As previously described, lignin is a unique biopolymer with high carbon content (up to 60%), which makes it possible to use lignin to produce carbon fibers. This presents a real opportunity to increase carbon efficiency and cost effectiveness of biorefinery with a market-size compatible strategy. It should also be appreciated that conventionally commercial carbon fibers are mostly made of polyacrylonitrile (PAN). However, PAN has a relatively high cost of about $15/lb. As a bio-renewable, abundant, and low-cost waste, lignin thus has a real opportunity to displace PAN as a carbon fiber precursor to reduce the cost, and promote the broader utilization of carbon fiber in renewable energy generation, auto industry, and the like. Despite the significant potential, the mechanical performance of conventional lignin based carbon fiber remains too low in comparison with petroleum-based carbon fiber, which remains the utilization of lignin for renewable carbon fiber unrealistic. Unlike the homogenous PAN polymer, lignin is an aromatic polymer composed of molecules with different molecular weight (MW), various functional groups, and diverse interunitery chemical linkages. These intrinsic heterogeneities of lignin could account for the poor mechanical performance of lignin based carbon fiber. Several strategies have been developed to address the challenge including: (a) blending lignin with other polymers as plasticizers or carbon nanotube and cellulose nanocrystal functionalized as reinforcement core; (b) chemical modifications by the esterification of lignin phenolic —OH groups (Ar—OH); and (c) identification of new types of natural lignin (e.g., C-lignin in seed coats) with less heterogeneity. However, most of these strategies offer limited enhancement of graphitization and crystallization of carbon fiber, and thus marginal increase of mechanical properties of lignin based carbon fiber. Accordingly, embodiments described herein offer the potential for the biorenewable carbon fiber fabrication from lignin, which represents a major waste stream of bio-ethanol production, as a potential alternative to traditional polyacrylonitrile (PAN)-based fabrication of carbon fiber.

Figure 4:
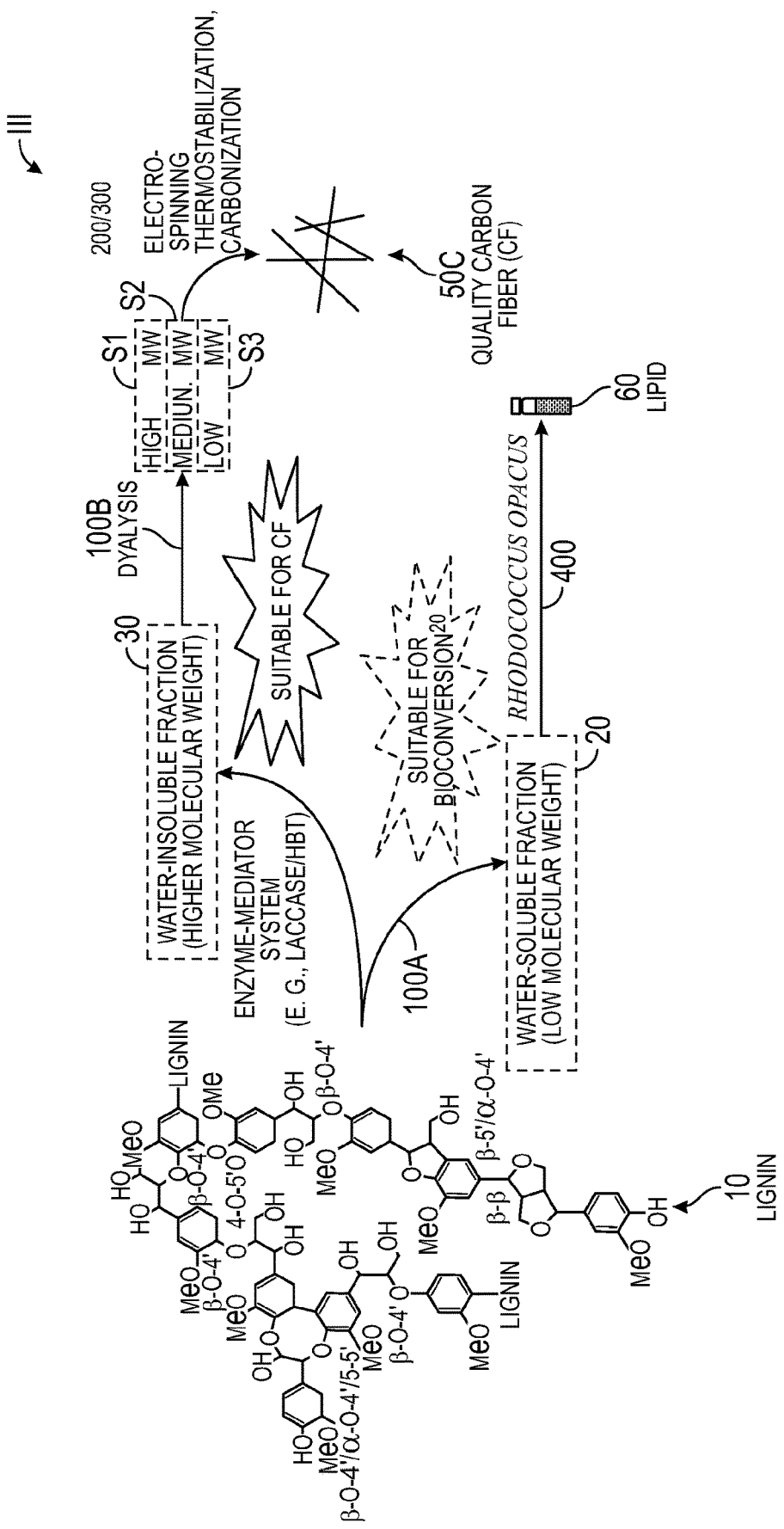
FIG. 4 is a schematic of a method III of producing lignin based carbon fibers according to this disclosure that comprises fractionating into a water soluble fraction and a water insoluble fraction via enzyme-mediator processing at 100A, and utilizing size exclusion at 100B to produce portions having different average molecular weights.

The poor mechanical properties of lignin carbon fiber could be attributed to the high heterogeneity of lignin polymer, and such heterogeneity is inherent with the lignin functionality and the biomass processing. Lignin has diverse chemical linkages, various functional groups, different monomer units, and variations in molecular weights after biomass processing. Each of these factors could impact the mechanical performance of lignin based carbon fibers. In particular, lignin plays essential roles for water transport and mechanical strength of land plants. The formation of lignin involves dehydrogenative polymerization via random radical coupling of monolignols, namely p-hydroxycinnamyl alcohols, which results in various functional groups and several interunitary linkages (FIG. 4). These linkages and functional groups show different reactivity to reactants during biomass deconstruction like pulping and pretreatment, making lignin from industrial waste stream a mixture of molecules with highly diverse molecular weights and chemical structures. Previous researches of lignin based carbon fiber were mainly focused on blending lignin with synthetic plasticizer and crystal material like cellulose and carbon nanotube, and modifications of lignin functional groups. According to this disclosure, lignin is treated to produce lignin precursor having more uniformity (e.g., chemical structures and/or molecular weights) and thus impact the quality (e.g., mechanical performance) of lignin based carbon fiber produced from the precursor lignin.

Figure 1:
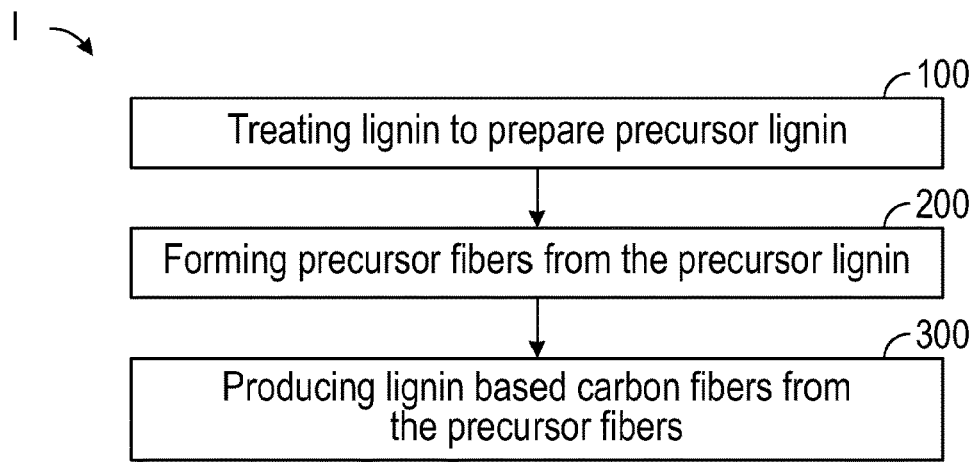
FIG. 1 is a schematic of a method I of producing lignin based carbon fibers according to this disclosure.
Figure 2:
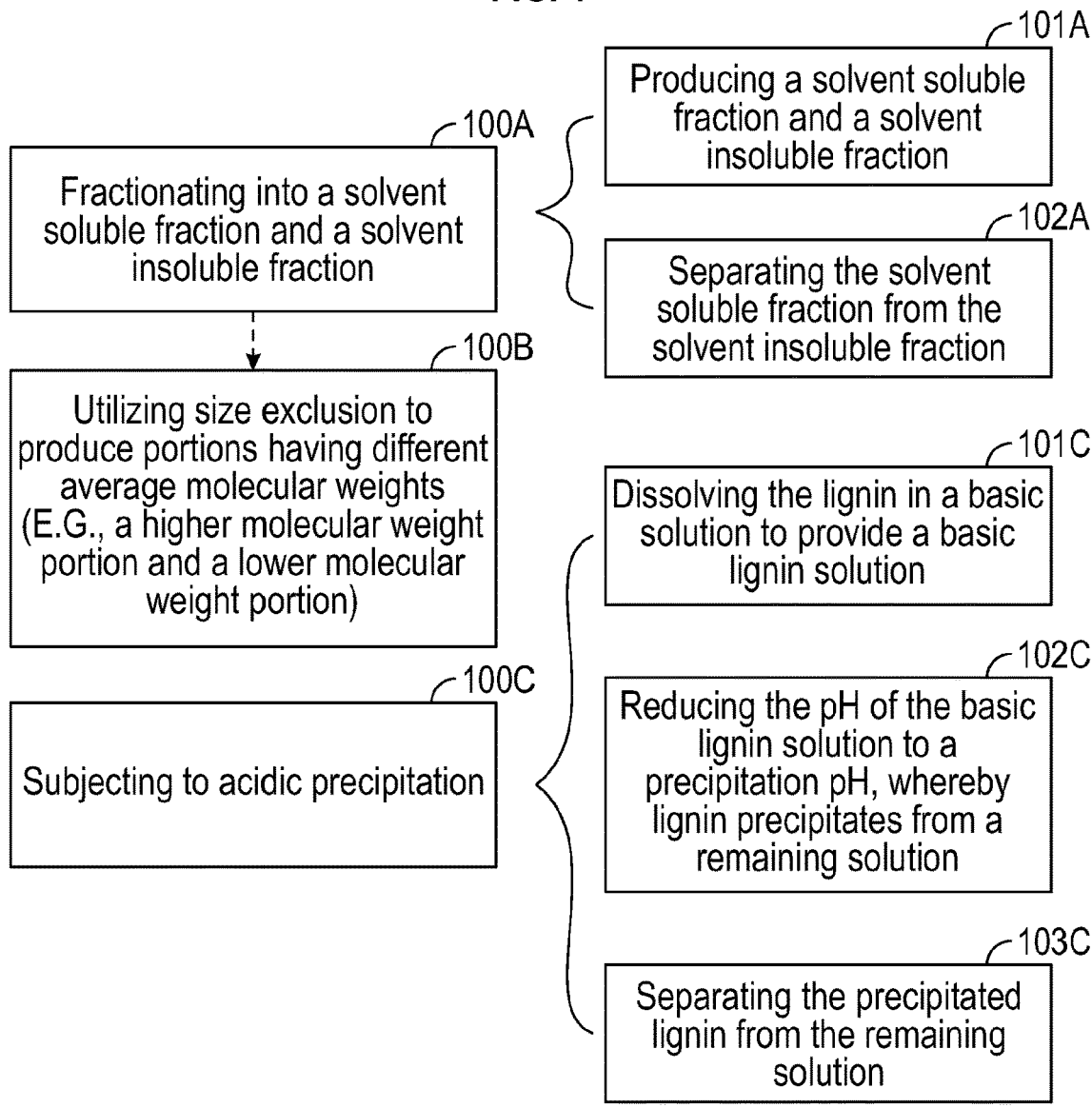
FIG. 2 is a schematic of various methods of treating lignin 100 to produce precursor lignin according to his disclosure.

Disclosed herein is a method of producing lignin based carbon fibers. As depicted in the FIG. 1, which is a schematic of a method I of producing lignin based carbon fibers according to this disclosure, the method comprising treating lignin (e.g., raw or 'untreated' lignin) to prepare a precursor lignin 100; forming precursor fibers from the precursor lignin 200; and producing lignin based carbon fibers from the precursor fibers 300. As depicted in FIG. 2, which is a schematic of various methods of treating lignin 100 to produce precursor lignin according to his disclosure, treating lignin 100 can comprise fractionating to provide a solvent soluble fraction and a solvent insoluble fraction 100A; utilizing size exclusion to produce a higher molecular weight fraction and a lower molecular weight fraction, wherein the higher molecular weight fraction has a higher average molecular weight than the lower molecular weight fraction 100B; and/or subjecting to acidic precipitation 100C. Steps 100A, 100B, and 100C can be performed singly or in combination and in any order. For example, in embodiments, in a process of this disclosure, treating lignin 100 can comprise fractionating (e.g., raw/untreated) lignin to provide a solvent soluble fraction and a solvent insoluble fraction 100A, and utilizing at least a portion of the solvent soluble fraction or at least a portion of the solvent insoluble fraction as the precursor lignin at 200. In alternative embodiments, in a process of this disclosure, treating lignin 100 can comprise fractionating (e.g., raw/untreated) lignin to provide a solvent soluble fraction and a solvent insoluble fraction 100A; utilizing size exclusion to produce, from the (e.g., raw/untreated) lignin, from the solvent soluble fraction, or from the solvent insoluble fraction, a higher molecular weight portion and a lower molecular weight portion, wherein the higher molecular weight portion has a higher average molecular weight than the lower molecular weight portion 100B, and utilizing at least a portion of the higher molecular weight portion or at least a portion of the lower molecular weight portion as the precursor lignin at 200. In yet alternative embodiments, in a process of this disclosure, treating lignin 100 can comprise subjecting the (e.g., raw/untreated) lignin to acidic precipitation 100C, and utilizing at least a portion of a resulting precipitated lignin as the precursor lignin at 200.

Generally, the precursor lignin produced as described herein has an increased molecular uniformity relative to the lignin prior to treatment. Such uniformity can be evidenced, in embodiments, by an increased linear structure (e.g., as evidenced by an increased percentage of linkages selected from uncondensed β-O-4' interunitery linkages and/or condensed β-5' linkages), a reduced polydispersity index (PDI), defined as the ratio of the mass average molecular weight and the number average molecular weight ($M_w/M_n$), and/or an increased amount of multiple intermolecular hydrogen bonding relative to the lignin prior to treating.

The method of this disclosure can be utilized to fractionate and modify lignin to produce quality carbon fibers. Treating the lignin can comprise fractionation into fractions having different molecular weights, functional groups, and/or or interunitery linkages. Forming carbon fibers from the precursor lignin as produced herein in general improves the miscibility and spinnability of lignin, as discussed further in Examples 1-3 hereinbelow. In particular embodiments, the precursor lignin (e.g., a water insoluble fraction obtained via enzyme-mediator system) can be utilized to produce carbon fiber with significantly improved turbostratic carbon structure as revealed by XRD and Raman spectroscopy, as further described in Examples 1-3 hereinbelow. In embodiments, the improvement of carbon structure leads to a significantly improved elastic modulus of the carbon fibers produced from a precursor lignin according to this disclosure. In embodiments, treating the lignin at 100 to provide a precursor lignin having a higher molecular weight, less —OH groups, and/or a more linear structure may contribute to the improved crystallization and mechanical performance of lignin carbon fiber produced via embodiments of the method disclosed herein. Via the herein disclosed process, lignin based carbon fiber with similar elastic modulus to commercial carbon fiber can be produced, paving the path for replacing PAN with lignin in the production of quality carbon fibers.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed herein. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The endpoints of all ranges directed to the same component or property are inclusive of the endpoint and independently combinable. The term "from more than 0 to an amount" means that the named component is present in some amount more than 0, and up to and including the higher named amount.

The terms "a," "an," and "the" do not denote a limitation of quantity, but rather denote the presence of at least one of the referenced item. As used herein the singular forms "a," "an," and "the" include plural referents.

As used herein, "combinations thereof" is inclusive of one or more of the recited elements, optionally together with a like element not recited, e.g., inclusive of a combination of one or more of the named components, optionally with one or more other components not specifically named that have essentially the same function. As used herein, the term "combination" is inclusive of blends, mixtures, alloys, reaction products, and the like.

Reference throughout the specification to "embodiments," "another embodiment," "other embodiments," "some embodiments," and so forth, means that a particular element (e.g., feature, structure, property, and/or characteristic) described in connection with the embodiment is included in at least embodiments described herein, and may or may not be present in other embodiments. In addition, it is to be understood that the described element(s) can be combined in any suitable manner in the various embodiments. As used herein, the terms "inhibiting" or "reducing" or "preventing" or "avoiding" or any variation of these terms, include any measurable decrease or complete inhibition to achieve a desired result. As used herein, the term "effective," means adequate to accomplish a desired, expected, or intended result. As used herein, the terms "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains") are inclusive or open-ended and do not exclude additional, unrecited elements or method steps. Unless defined otherwise, technical and scientific terms used herein have the same meaning as is commonly understood by one of skill in the art.

Forming Precursor Lignin 100

Formation of Precursor Lignin Via Enzyme-Mediator Fractionation of Lignin

Several chemical characteristics may impact lignin miscibility with guest polymer (e.g., polyacrylonitrile (PAN)), and thus impact the spinnability, uniformity, and carbonization of the carbon fiber products. First, lignin is an aromatic polymer with heavily modified side chains, and a lower phenolic —OH content may promote the better miscibility of lignin with guest polymer (e.g., PAN) and the solvent. Second, lignin has a highly branchy structure, and more uniformity and linear linkages can promote a better mixture with the guest polymer (PAN). Third, commercial residues like lignin (e.g., Kraft lignin) from pulping processes contain molecules with broad molecular weights (MWs). It has been unexpectedly discovered that precursor lignin with more uniform MW may reduce the heterogeneity and thus improve the carbon fiber spinnability and performance. Laccase treatment can reduce the —OH functional group on lignin side chains, and release low MW lignin for bioconversion. It has been discovered that different lignin fractions resulting from enzyme processing as described herein can improve miscibility and carbonization, when mixed with guest polymer (e.g., PAN) for the production of carbon fiber. However, classic laccase treatment leads to limited fractionation of lignin, due to the inadequate electron transfer and penetration of enzyme into the complex lignin structure. Electron mediators can be utilized for delignification in the pulp and paper-making industry. In embodiments according to this disclosure, an enzyme-mediator (e.g., a laccase-mediator) system is utilized for chemical linkage cleavage and fractionation of lignin. The electron mediator enhances the catalysis rate and allows enhanced penetration for the redox potential into the complex lignin structure, both of which result in improved fractionation of lignin.

As noted above, treating lignin to produce precursor lignin at 100 can comprise fractionating the lignin (e.g., raw/untreated lignin) to produce a solvent soluble fraction and a solvent insoluble fraction 100A, as depicted in the embodiment of FIG. 2. For example, as depicted in FIG. 2, fractionating into a solvent soluble fraction and a solvent insoluble fraction 100A can comprise producing a solvent soluble fraction and a solvent insoluble fraction 101A and separating the solvent soluble fraction from the solvent insoluble fraction at 102A. In embodiments, fractionating at 100A comprises subjecting the lignin to an enzyme-mediator system to produce the solvent soluble fraction and the solvent insoluble fraction at 101A. The solvent can comprise water or an organic solvent, for example, a solvent selected from the group consisting of enzymatic-mediator system, aqueous acetone, water at different pH and combinations thereof. In embodiments, the solvent comprises water.

Figure 3:
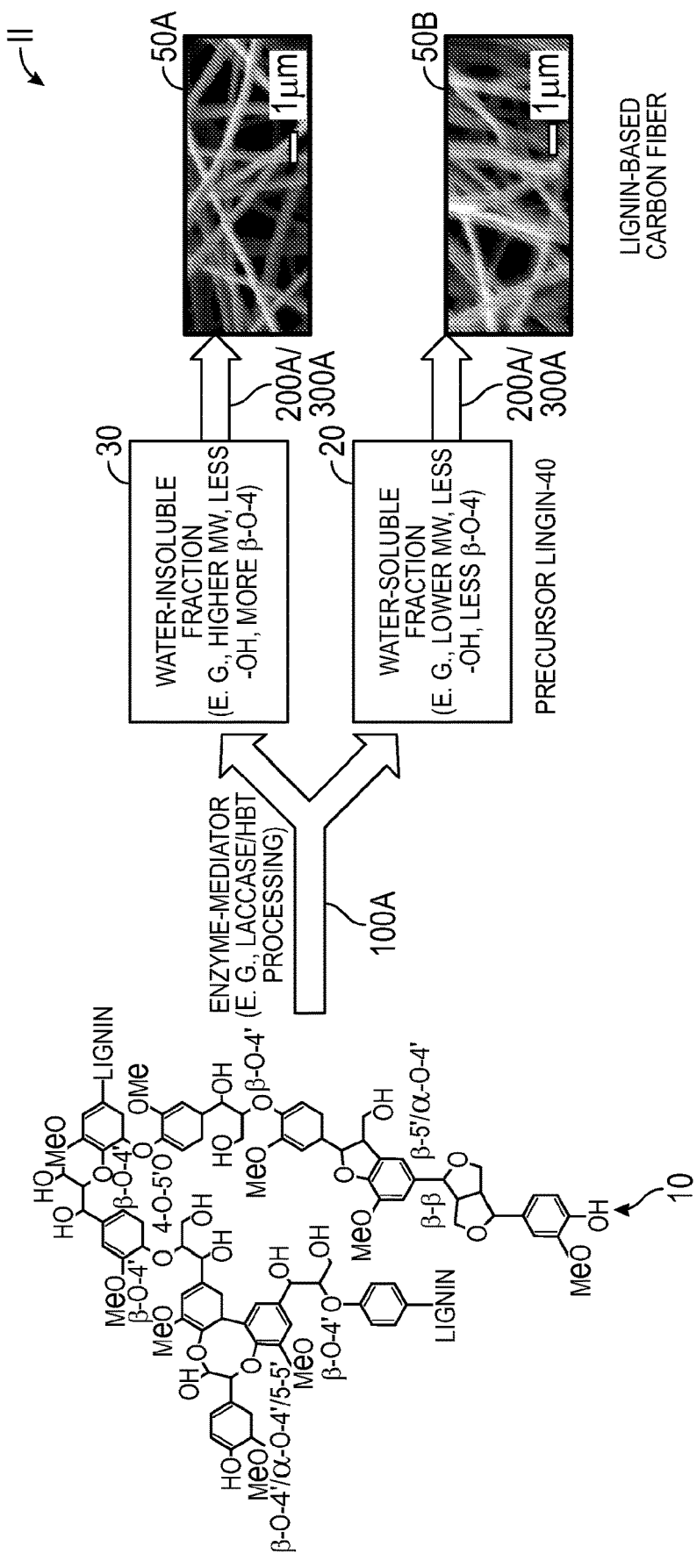
FIG. 3 is a schematic of a method II of producing lignin based carbon fibers that comprises fractionating into a water soluble fraction and a water insoluble fraction, according to embodiments of this disclosure.

Thus, in embodiments, as depicted, for example in FIG. 3, which is a schematic of a method II of making a lignin based carbon based fiber via fractionating (e.g., at 100A) lignin (e.g., raw/untreated lignin) 10 into a water soluble fraction 20 and a water insoluble fraction 30 according to embodiments of this disclosure, enzyme-mediator processing at 101A of lignin 10 can be utilized to produce a water soluble fraction 20 and a water insoluble fraction 30. Lignin 10 of FIG. 3 is a schematic of a representative lignin chemical structure, which is comprised of different interunitery linkages and functional groups of Ar—OH and Alk-OH. At least a portion of the water soluble fraction 20 or at least a portion of the water insoluble fraction 30 can be utilized as precursor lignin 40 to produce, at 200A/300A, lignin based carbon fibers 50A or 50B, respectively. Thus, in embodiments, quality carbon fibers can be produced from industrial waste lignin via utilization of an enzyme-mediator system to efficiently fractionate lignin into soluble and insoluble fractions, and utilizing the insoluble fraction (or a portion thereof) as a superior carbon fiber precursor lignin. Via utilization of such an enzyme-mediator precursor lignin having a higher molecular weight, a reduced amount of hydroxy groups, and more β-O-4 linkages, carbon fibers having improved spinnability, crystallization, and mechanical performance can be produced.

In embodiments, the enzyme-mediator system comprises laccase enzyme and a mediator selected from the group consisting of 1-hydroxy benzotriazolehydrate (HBT), 2,2'-azino-bis(3-ethylbenzothiazoline-6-sulfonic acid) (ABTS), acetosyringone, phenol, and combinations thereof. In specific embodiments, the enzyme-mediator system comprises a laccase-HBT system. Treating lignin to prepare precursor lignin 100 by utilizing a laccase-HBT enzyme-mediator system is described in more detail in Example 1 and FIGS. 3 and 12-25 hereinbelow.

Subjecting the lignin to the enzyme-mediator system can comprise producing a buffered solution of the lignin, adding the enzyme and the mediator to the buffered solution of the lignin, stirring for a time period to produce the solvent soluble fraction and the solvent insoluble fraction at 101A, and separating the solvent insoluble fraction from the stirred solution at 102A. The method can further comprise at 102A, precipitating the solvent soluble fraction of the lignin from the stirred solution after separating the solvent insoluble fraction therefrom. The solvent soluble fraction of the lignin or the solvent insoluble fraction of the lignin can be utilized as the precursor lignin at 200, in embodiments.

Formation of Precursor Lignin Via Size Exclusion Fractionation of Lignin

As noted hereinabove, fractionation can comprise size exclusion and treating lignin to prepare precursor lignin 100 according to this disclosure can comprise utilizing size exclusion to produce a higher molecular weight portion and a lower molecular weight portion at 100B. In embodiments, the lignin subjected to size exclusion at 100B is a raw/untreated lignin. In alternative embodiments, the lignin comprises at least a portion of the solvent soluble fraction or at least a portion of the solvent insoluble fraction of the lignin obtained at 100A.

Size exclusion can comprise any method known to those of skill in the art and with the help of this disclosure to separate a higher molecular weight portion from a lower molecular weight portion. For example, in embodiments, size exclusion comprises at least one selected from dialysis, enzyme-mediator system, water precipitation, and combinations thereof. For example, as described in Example 2 and FIGS. 4 and 26-36, size exclusion can comprise dialysis.

In embodiments, quality lignin based carbon fiber can be produced utilizing an enzyme-mediator-based method, as depicted in FIG. 3, together with a dialysis method to derive lignin fractions with increased MW and decreased PDI. Lignin carbon fiber with high mechanical performance can be been produced from the fractionated lignin. In embodiments, the elastic modulus of lignin based carbon fiber correlates with the PDI. As depicted in the embodiment of FIG. 4, which is a schematic of a method III of producing lignin based carbon fibers according to this disclosure, producing lignin based carbon fibers can comprise fractionating lignin 10 into a water soluble fraction 20 and a water insoluble fraction 30 via enzyme-mediator processing at 100A, and utilizing size exclusion at 100B to produce portions (e.g., S1, S2, S3) having different average molecular weights (MWs). The portions having different average molecular weights can comprise a higher molecular weight portion and a lower molecular weight portion, wherein the higher molecular weight portion has a higher average molecular weight than the lower molecular weight portion. In embodiments, any number (e.g., 2, 3, 4, 5, 6, 7, or more) of portions S can be produced, each portion having a different average molecular weight. For example, in the embodiment of FIG. 4, a first portion S1 having a first average molecular weight $MW_1$, a second portion S2 having a second average molecular weight $MW_2$, and a third portion S3 having a third average molecular weight $MW_3$ are produced. $MW_1$, $MW_2$ and $MW_3$ can be different, for example, in embodiments, $MW_1 > MW_2 > MW_3$. One or more of the portions S can be utilized as precursor lignin, from which precursor fibers are formed at 200 which are utilized to produce carbon fibers 50C at 300. In embodiments, utilizing size exclusion at 100B comprises dialyzing a solution of the lignin (e.g., raw/untreated lignin, solvent soluble lignin, solvent insoluble lignin) with one or more dialysis apparatus (e.g., dialysis tubes) having a molecular weight cutoff of greater or equal to about 3, 4, 5, 6, 7, 8, 9, 10, 11, or 12 K g/mol. In embodiments, a higher molecular weight portion is utilized as the precursor lignin at 200. Such higher molecular weight portion can have an average molecular weight of greater than or equal to about 3,000, 10,000, 12,000, or 20,000 g/mol, in embodiments.

In embodiments, a high molecular weight portion (60-70%) is utilized as precursor lignin for carbon fiber production. In embodiments, the high molecular weight portion comprises from about 60 to about 70, from about 50 to about 80, from about 55 to about 75, or greater than or equal to about 40, 50, 60, 70, 80, or 90 weight percent (wt %) of the (e.g., raw/untreated) lignin, and the low molecular weight portion comprises the remaining from about 30 to about 40, from about 20 to about 50, from about 25 to about 45, or less than or equal to about 10, 20, 30, 40, 50, or 60 weight percent (wt %) of the lignin.

In embodiments, the water soluble fraction 20 is utilized for bioconversion at 400 to produce lipids 60. Any suitable bioconversion known to those of skill in the art and with the help of this disclosure can be utilized at 400.

Formation of Precursor Lignin Via Acidic Precipitation Fractionation of Lignin

In embodiments, a method of producing carbon fibers can comprise processing lignin via tuning of the hydroxyl groups of lignin with acids, for example, via acidic precipitation. Via such embodiments, interactions between lignin molecules are enhanced and more orientated (e.g., uniform) molecules are formed, which can help lignin align with guest polymer (e.g., PAN) and thereby enhance crystallization and mechanical properties of the resulting carbon fibers. Thus, in embodiments, treating lignin to produce the precursor lignin at 100 comprises subjecting the lignin (e.g., raw/untreated lignin, solvent soluble fraction of the lignin, solvent insoluble fraction of the lignin, higher molecular weight portion, lower molecular weight portion, etc.) to acidic precipitation. Via the acidic precipitation, precursor lignin can be precipitated from a basic solution of the lignin via contact of the basic solution of the lignin with acid, separating the precipitated lignin from the solution to provide a separated precipitated precursor lignin.

As depicted in FIG. 2 subjecting lignin to acidic precipitation at 100C can comprise dissolving the lignin in a basic solution to provide a basic lignin solution 101C, reducing the pH of the basic lignin solution to a precipitation pH, whereby lignin precipitates from a remaining solution 102C, and separating the precipitated lignin from the remaining solution 103C. In such embodiments, at least a portion of the precipitated lignin can be utilized as precursor lignin at 200.

In embodiments, subjecting to acidic precipitation can optionally comprising stirring for a time period after 101C and/or prior to 102C. Reducing the pH of the basic lignin solution to a precipitation pH 102C can comprise contacting the aqueous basic solution in which the lignin is dissolved with an acidic solution having an acidic pH to provide a resulting solution, and adjusting the pH of the resulting solution to the precipitation pH. In embodiments, the precipitation pH is less than or equal to about 6, 5, 4, 3, 2, or 1. Separating the precipitated lignin from the remaining solution at 103C can comprise, for example, centrifugation.

Figure 5:
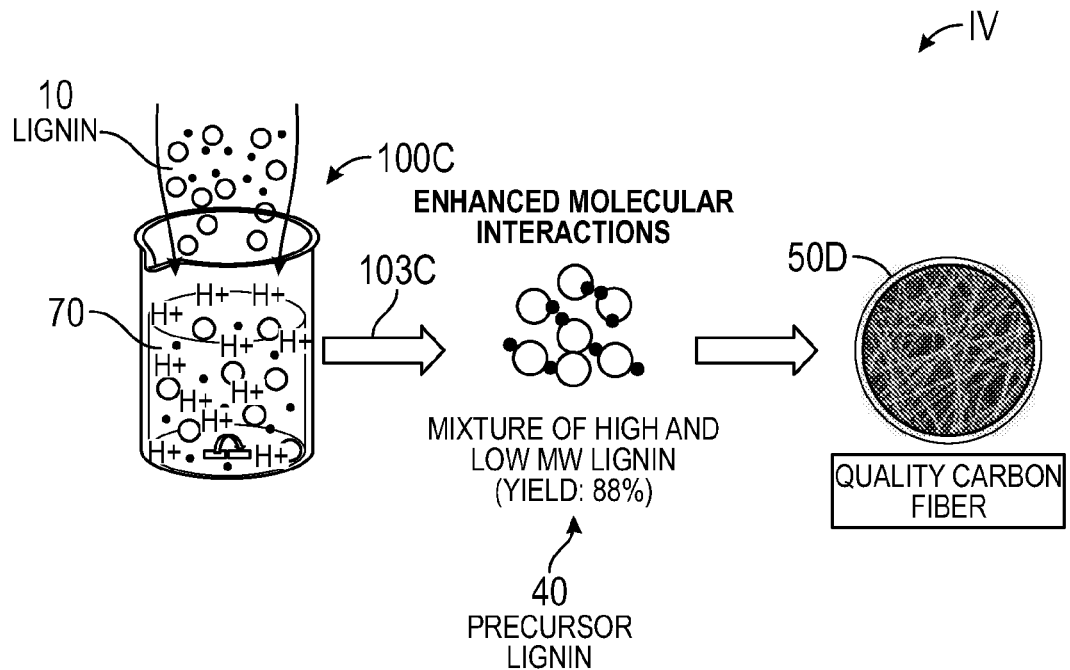
FIG. 5 is a schematic of a method IV of producing lignin based carbon fibers according to this disclosure.

As depicted in FIG. 5, which is a schematic of a method IV of producing lignin based carbon fibers according to this disclosure, a solution of lignin 10 is contacted with an acidic solution 70 at 100C, to obtain precursor lignin 40, from which lignin based carbon fibers 50D are formed at 200/300.

As detailed further in Example 3 and with reference to FIGS. 5 and 37-55, acidic precipitation of lignin at 100C can be utilized to fine tune the hydroxyl groups in the precursor lignin. Such fine tuning of the hydroxyl groups in the precursor lignin can be utilized to enhance interactions between lignin molecules and form more uniform/oriented lignin molecules, which can help align the precursor lignin with guest polymer (e.g., PAN) during forming of the precursor fibers at 200 and thus enhance crystallization and mechanical properties of the carbon fibers produced from the precursor fibers at 300.

Precursor Lignin

In embodiments, a method of producing precursor lignin is provided, wherein the precursor lignin is produced as descried hereinabove.

In embodiments, the precursor lignin 40 of this disclosure has: a weight average molecular weight in a range of from about 3,000 to about 20,000, from about 1,000, to about 3,000, or greater than, less than, or equal to about 3,000, 10,000, or 20,000 K g/mol. In embodiments, the precursor lignin 40 of this disclosure has a polydispersity index (PDI), defined as the weight average molecular weight divided by the number average molecular weight (MW/Mn), of less than or equal to 5, 4, 3, 2, or 1. In embodiments, the precursor lignin 40 of this disclosure has a percentage of interunitery linkages selected from uncondensed β-O-4' interunitery linkages and condensed β-5' interunitery linkages that is greater than or equal to about 10%, 20%, 30%, 40%, 50%, or 55%.

In embodiments, treating the lignin to prepare the precursor lignin at 100 results in an amount of the precursor lignin that is at least 30, 40, 50, 60, 70, 80, or 85% of the amount of lignin subjected to treating at 100.

Forming Precursor Fibers 200

Figure 6:
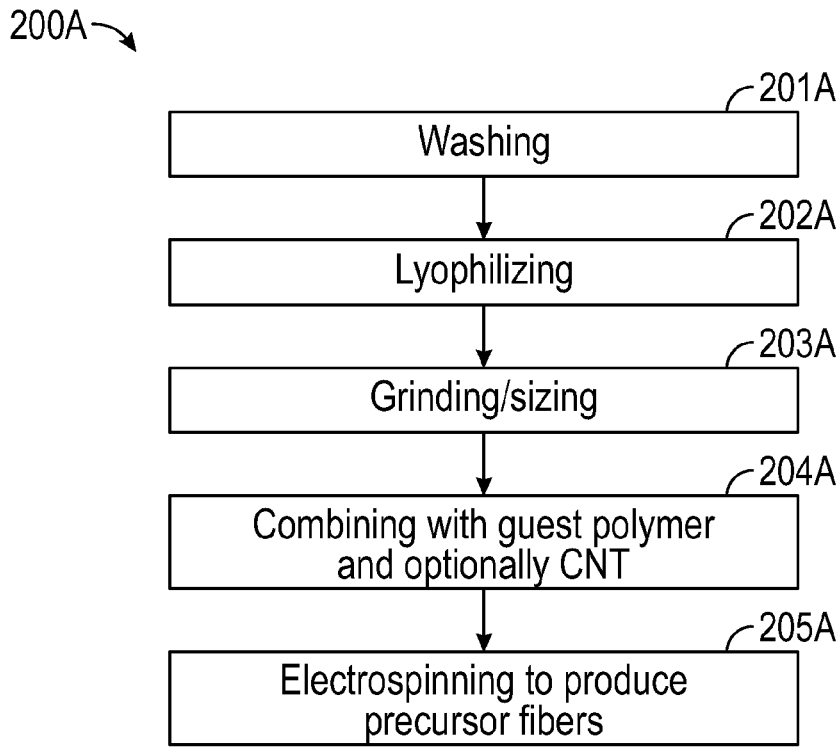
FIG. 6 is a schematic of a method 200A of forming precursor fibers from precursor lignin.

A method of forming lignin based carbon fibers according to this disclosure comprises forming precursor fibers from the precursor lignin 200. As depicted in FIG. 6, which is a schematic of a method 200A of forming the precursor fibers from the precursor lignin, forming the precursor fibers from the precursor lignin can comprise combining the precursor lignin with a guest polymer and optionally carbon nanotubes (CNT) (e.g., singe wall carbon nanotubes (SWCNT)) at 204A; and electrospinning to produce the precursor fibers 205A. In embodiments, the guest polymer comprises polyacrylonitrile (PAN). In embodiments, less than or equal to about 0, 0.1, 0.2, 0.25, 0.3, 0.4, 0.5, 0.6, 0.7, 0.75, 0.8, 0.9, or 1.0 wt % single wall carbon nanotubes (SWCNT) are combined with the guest polymer (e.g., PAN) and precursor lignin at 204A, as discussed in more detail in Example 4 and FIGS. 56-58 hereinbelow.

In embodiments, forming the precursor fibers from the precursor lignin 200 further comprises washing 201A, lyophilizing 202A and/or grinding and/or sizing 202A the precursor lignin prior to and/or subsequent to combining the precursor lignin with the guest polymer at 204A. Washing can comprise washing with water at pH 1, 2, 3, 4, 4.5, 5, 6, or 7.

Figure 7:
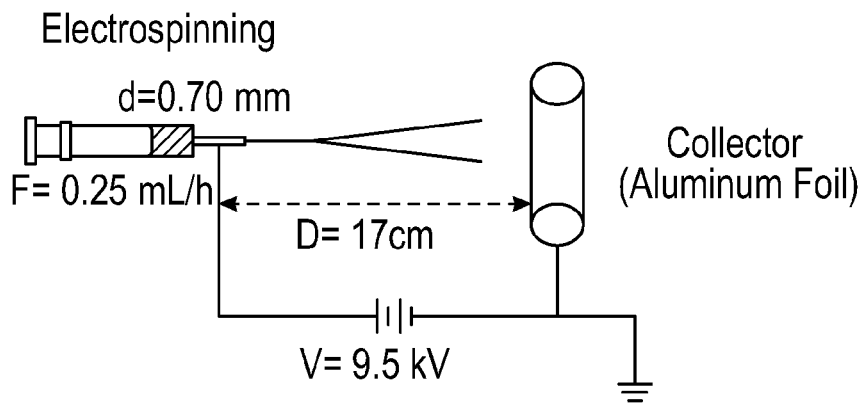
FIG. 7 is a schematic illustration of electrospinning.

Forming the precursor fibers from the precursor lignin at 200 comprises electrospinning 205A. By way of example, electrospinning at 205A can comprise an approximately 15% dopes concentration, about 0.25 mL/h feed rate, about 11.5 KV voltage, and a about 17 cm needle-collector distance. FIG. 7 is a schematic illustration of electrospinning. Electrospinning can be performed as known in the art and with the help of this disclosure, and exemplary electrospinning techniques are provided in the Examples hereinbelow.

In embodiments, the precursor lignin produced at 100 provides for enhanced spinnability relative to the spinnability of compositions formed in the same manner but without treating the lignin at 100 and/or absent the lignin (i.e., formed from guest polymer without any lignin), the improved spinnability, as evidenced by a narrower diameter distribution of the carbon fibers obtained at 300.

Producing Lignin Based Fibers from Precursor Fibers

Figure 8:
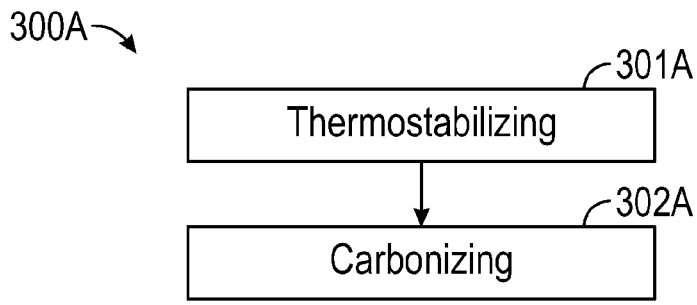
FIG. 8 is a schematic of a method 300A of producing lignin based carbon fibers from the precursor fibers.
Figure 9A:
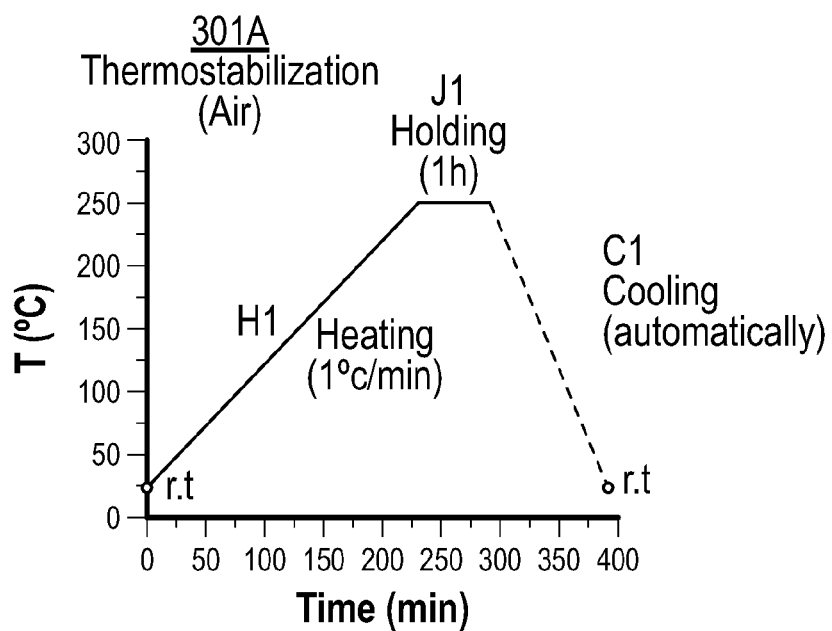
FIG. 9A is a schematic of a heating process for thermostabilization, according to embodiments of this disclosure.

A method of forming lignin based carbon fibers according to this disclosure comprises producing lignin based carbon fibers from the precursor fibers at 300. As depicted in FIG. 8, which is a schematic of a method 300A of producing lignin based carbon fibers from the precursor fibers, producing lignin based carbon fibers from the precursor fibers can comprise thermostabilizing 301A and carbonizing 302A. In embodiments, thermostabilizing 301A comprises thermostabilization in air, or oxygen. As depicted in FIG. 9A, which is a schematic of a heating process for thermostabilization, according to embodiments of this disclosure, carbonizing 302A, thermostabilizing 301A can comprise heating the precursor fibers H1 at a thermostabilization heating ramp rate and for a thermostabilization heating time from a first temperature to a thermostabilization temperature, holding J1 at the thermostabilization temperature for a thermostabilization holding time, and cooling C1 at a thermostabilization cooling ramp rate from the thermostabilization temperature to a second temperature. The first and/or the second temperatures can be room temperature or ambient temperature, in embodiments. The thermostabilization heating ramp rate can be in the range of from about 0.01 to about 2.0, from about 0.1 to about 2.0, from about 1.0 to about 2.0, or greater than, less than, or equal to about 0.5, 1, or 2° C./min, in embodiments. The thermostabilization cooling can be automatic (i.e., via heat exchange with the environment), in embodiments. The thermostabilization temperature can be from about 250 to about 300, from about 250 to about 350, from about 300 to about 350, or greater than, less than, or equal to about 250, 280, or 300° C., in embodiments. The thermostabilization heating time can be in the range of from about 250 to about 2500, from about 550 to about 2500, from about 1300 to about 2500, or less than or equal to about 250, 550, 1300, or 2500 min, in embodiments. The thermostabilization holding time can be in the range of from about 15 to about 30, from about 30 to about 120, from about 60 to about 120, or less than or equal to about 120, 90, 60 or 30 min, in embodiments.

Figure 9B:
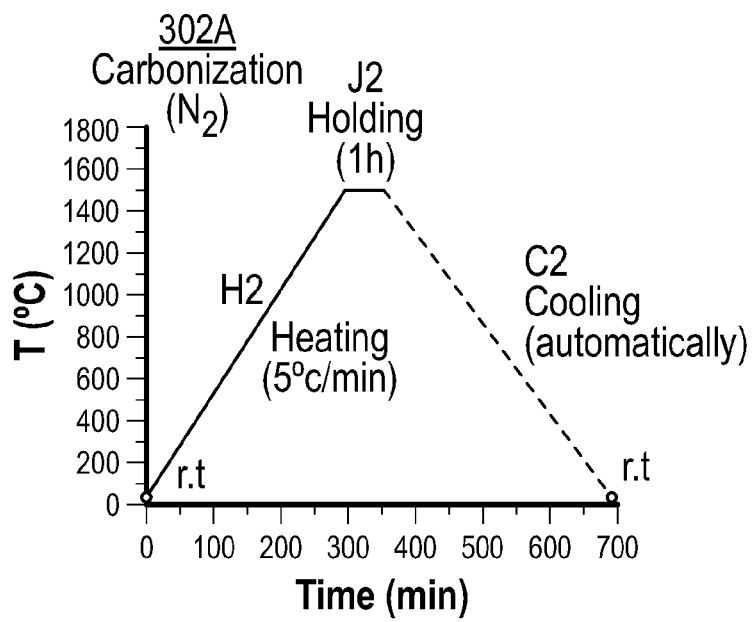
FIG. 9B is a schematic of a heating process for carbonization, according to embodiments of this disclosure.

In embodiments, thermostabilizing 301A comprises thermostabilization in air or oxygen. In embodiments, carbonizing 302A comprises carbonization in nitrogen, or helium. As depicted in FIG. 9B, which is a schematic of a heating process for carbonization, according to embodiments of this disclosure, carbonizing 302A can comprise heating the thermostabilized fibers H2 at a carbonization heating ramp rate and for a carbonization heating time from a first temperature to a carbonization temperature, holding J2 at the carbonization temperature for a carbonization holding time, and cooling C2 at a carbonization cooling ramp rate from the carbonization temperature to a second temperature. The first and/or the second temperatures can be room temperature or ambient temperature, in embodiments. The carbonization heating ramp rate can be in the range of from about 1 to about 10, from about 2 to about 10, from about 3 to about 5, or greater than, less than, or equal to about 3, 4, or 5° C./min, in embodiments. The carbonization cooling can be automatic (i.e., via heat exchange with the environment), in embodiments. The carbonization temperature can be from about 700 to about 2500, from about 800 to about 1500, from about 1500 to about 2500, or greater than or equal to about 800, 1000, or 1500° C., in embodiments. The carbonization heating time can be in the range of from about 100 to about 1000, from about 200 to about 1000, from about 500 to about 1000, or less than or equal to about 1000, 500, 300, or 200 min, in embodiments. The carbonization holding time can be in the range of from about 15 to about 120, from about 30 to about 120, from about 60 to about 120, or less than or equal to about 120, 90, or 60 min, in embodiments.

Carbon Fibers

Also disclosed herein are lignin based carbon fibers produced via the method provided herein. In embodiments, the carbon fibers have: an average diameter of less than or equal to about 1300, 1200, 1100, 1000, 900, 800, 700, 600, 500, or 400 nm. In embodiments, the carbon fibers are characterized by an increased content of pre-graphitic turbostratic structure relative to carbon fibers made in the same manner but without treating the lignin and/or absent the lignin, as evidenced by a distance between interfacial crystallite layers, as measured by $d_{hkl}$ determined by X-ray diffraction (XRD), that is less than or equal to about 0.390, 0.380, 0.370, 0.360, 0.350, nm, or 0.340 nm. In embodiments, the carbon fibers are characterized by a crystallite size, $L_k i$, as measured by XRD, that is at least 40, 50, or 60% greater than a crystallite size of carbon fibers made in the same manner but without treating the lignin and/or absent the lignin. In embodiments, the carbon fibers are characterized by an increased crystallite content, as evidenced by an integration ratio of G and D bands (G/D ratio), as measured by Raman spectroscopy, that is at least 30, 40, or 45% greater than a G/D ratio of carbon fibers made in the same manner but without treating the lignin and/or absent the lignin. In embodiments, the carbon fibers are characterized by a reduced elastic modulus, as measured by nanoindentation, that is at least 30, 40, or 45% greater than a reduced elastic modulus of carbon fibers made in the same manner but without treating the lignin and/or absent the lignin.

EXAMPLES

The subject matter having been generally described, the following examples are given as particular embodiments of the disclosure and to demonstrate the practice and advantages thereof. It is understood that the examples are given by way of illustration and are not intended to limit the specification of the claims to follow in any manner.

Example 1: Carbon Fiber Made from Enzyme-Mediator Fractionated Lignin

Overview/Discussion

Figure 10A:
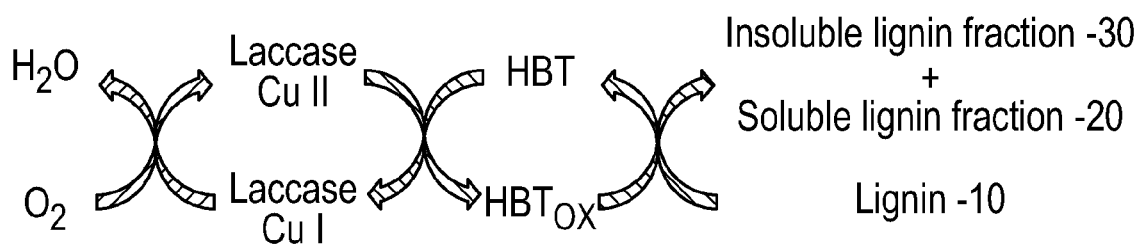
FIG. 10A is a schematic of lignin fractionation into a water soluble fraction and a water insoluble fraction via an enzyme-mediator system, according to embodiments of this disclosure.
Figure 10B:
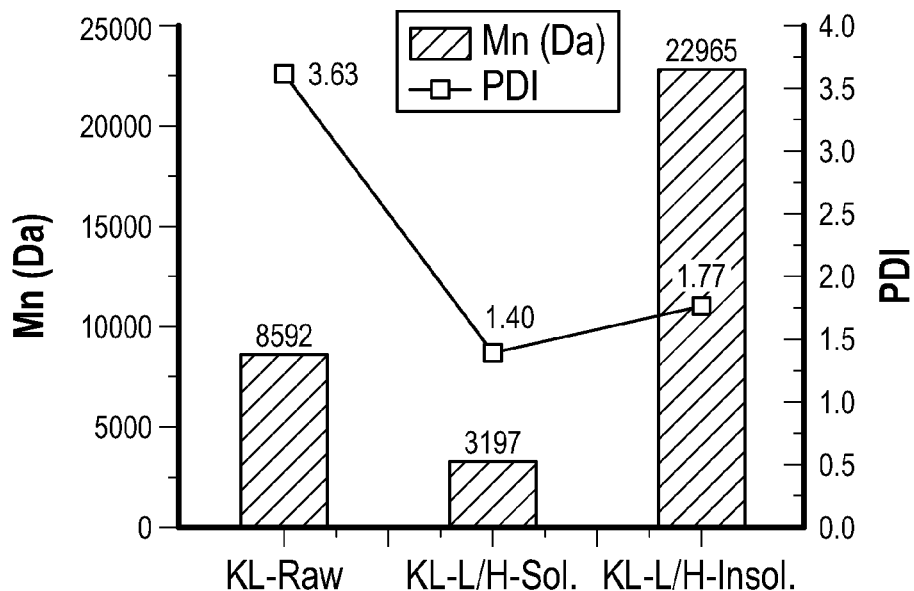
FIG. 10B is a plot of the number average molecular weight (Mn) in Daltons (Da) for the raw/untreated lignin (KL-Raw), the insoluble fraction (KL-L/H-Insol.) and the soluble fraction (KL-L/H-Sol.), as determined by GPC in Example 1.
Figure 10C:
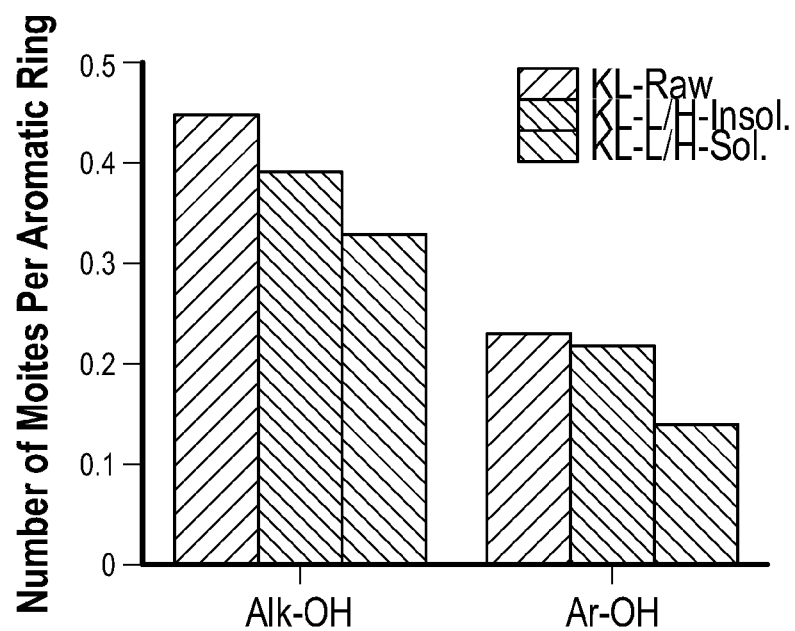
FIG. 10C is a plot of the contents of the lignin functional groups, aliphatic hydroxyl group (Alk-OH) and aromatic hydroxyl group (Ar—OH), as semi-quantified using $^{13}C$ NMR in Example 1.
Figures 1, 10D:
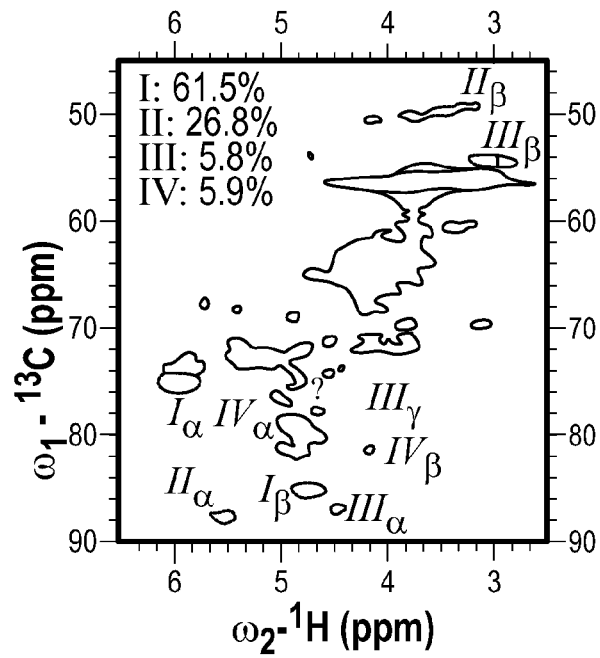
FIG. 10D shows the interunitery linkages of the KL-Raw (panel (1)), KL-L/H-Sol. (panel (2)), KL-L/H-Insol. (panel (3)), and the chemical structures of different interunitery linkages in lignin (panel (4)), respectively.
Figures 2, 10D:
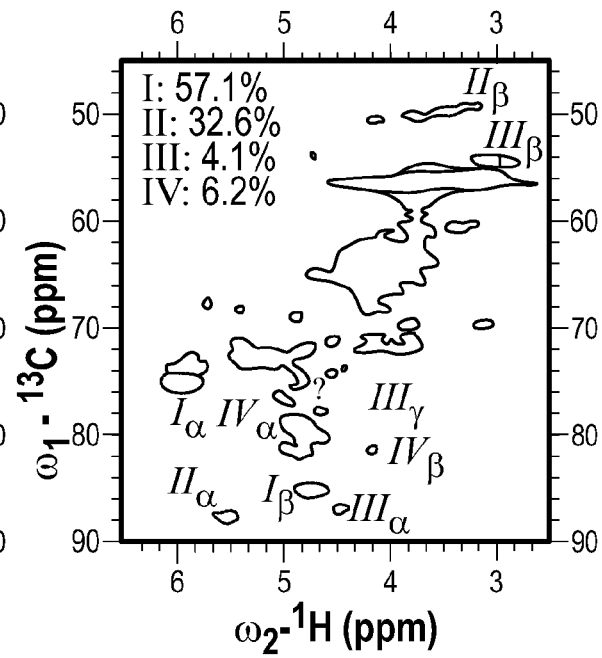
Figures 3, 10D:
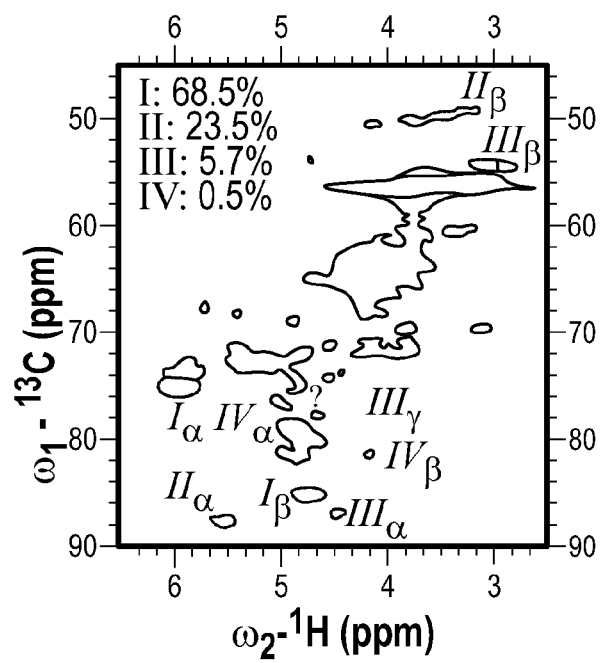
Figures 4, 10D:
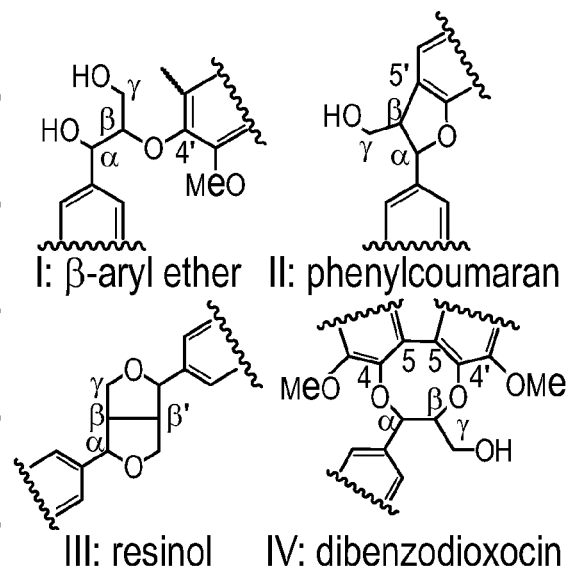
Figure 11A:
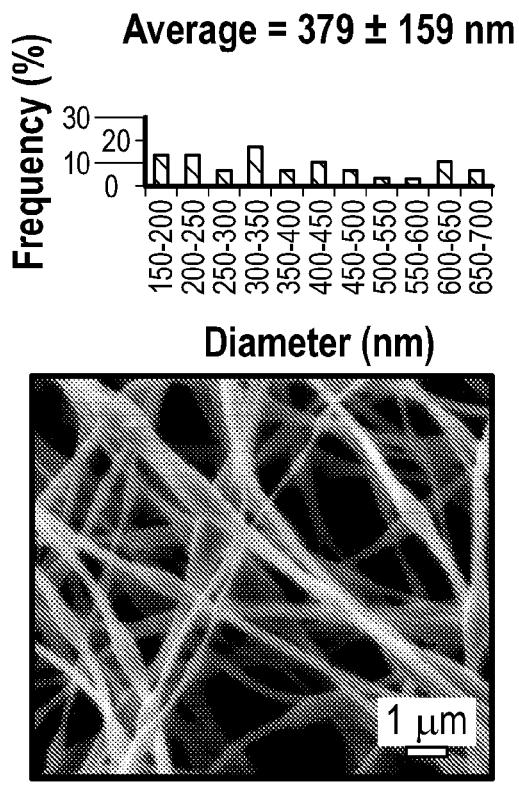
FIG. 11 shows SEM imaging of the morphology of carbon fibers produced from different lignin factions and PAN in Example 1: panel (a) KL-Raw; panel (b) KL-L/H-Sol.; panel (c) KL-L/H-Insol.; and panel (d) pure PAN.
Figure 11B:
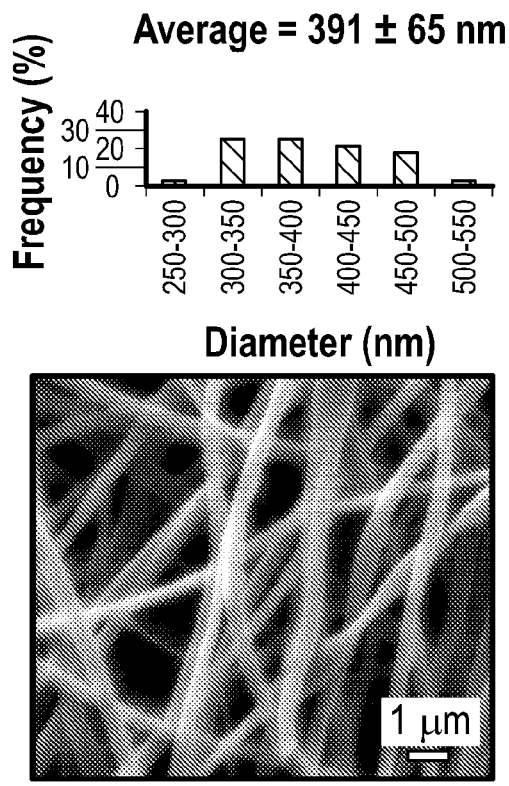
Figure 11C:
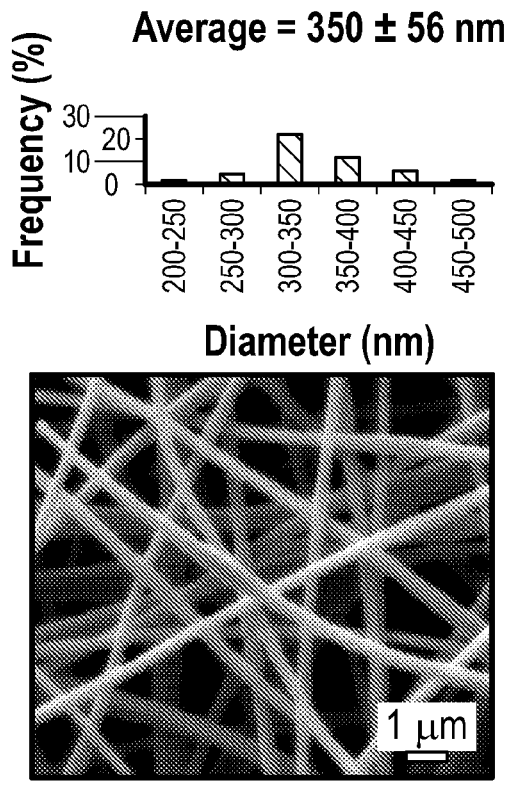
Figure 11D:
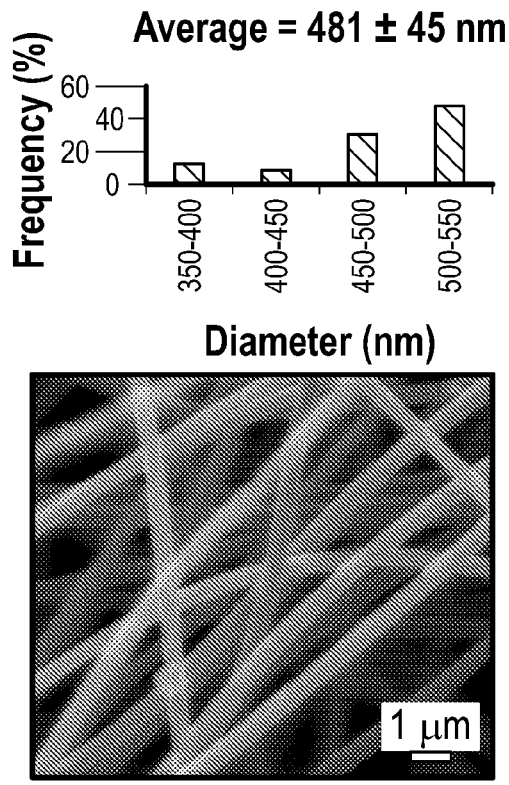

In order to reduce the heterogeneity of lignin and improve the crystallization of carbon fiber, an enzyme-mediator process of this disclosure was utilized to fractionate and derive more uniform lignin for carbon fiber production. As depicted in FIG. 10A, which is a schematic of lignin fractionation via an enzyme-mediator system according to embodiments of this disclosure, lignin was fractionated into both water-insoluble and water-soluble fractions by biological processing of lignin with laccase-HBT system. The molecular weight (MW) and the polydispersity (PDI) of the lignin fractions were measured by GPC, and the contents of lignin functional groups, aliphatic hydroxyl group (Alk-OH) and aromatic hydroxyl group (Ar—OH), were semi-quantified using $^{13}C$ NMR. FIG. 10B is a plot of the number average molecular weight (Mn) in Daltons (Da) for the raw/untreated lignin (KL-Raw), the insoluble fraction (KL-L/H-Insol.) and the soluble fraction (KL-LH-Sol.), as determined by the GPC. FIG. 10C is a plot of the contents of the lignin functional groups, aliphatic hydroxyl group (Alk-OH) and aromatic hydroxyl group (Ar—OH), as semi-quantified using $^{13}C$ NMR. The frequency of interunitery linkages in lignin was measured by HSQC 2D NMR. Panels (1) to (4) of FIG. 10D represent the interunitery linkages of the KL-Raw (panel (1)), KL-L/H-Sol. (panel (2)), KL-L/H-Insol. (panel (3)), and the chemical structures of different interunitery linkages in lignin (panel (4)), respectively. In FIGS. 10B-10D, KL-Raw is raw lignin without laccase-HBT treatment; KL-L/H-Insol. is the water-insoluble fraction obtained from laccase-HBT (L/H) treatment of lignin; KL-L/H-Sol. is the water-soluble fraction obtained from laccase-HBT (L/H) treatment of the lignin.

The electron mediator both enhanced the catalysis rate and allowed better penetration for the redox potential into the complex lignin structure, both of which resulted in improved fractionation of lignin relative to non-mediated fractionation. A common laccase mediator, HBT (1-hydroxy benzotriazolehydrate), was chosen to build the laccase-mediator system, via fractionation of the raw/untreated lignin into both water-soluble (30.2 wt %) and water-insoluble fractions (69.8 wt %), abbreviating as the soluble fraction and the insoluble fraction subsequently, respectively. The chemical characteristics of each faction were analyzed and the fractions were used to make lignin based carbon fibers.

Chemical analysis with GPC and NMR revealed that laccase-HBT treatment led to fractions with different MW, reduced —OH groups, and changes in chemical linkage frequencies. First, as shown in FIG. 10B, the laccase-HBT treatment produced two fractions of lignin, the insoluble fraction with MW at 22965 Da and the soluble fraction with MW at 3197 Da. In comparison with the untreated/raw lignin, the insoluble faction led to a more than 2.6 fold increase in MW, whilst the soluble fraction had a 60% decrement in MW. The polydispersity (PDI) of both insoluble and soluble fractions reduced to less than half of the raw lignin, displaying the improved heterogeneity of lignin molecules (FIG. 10B). Second, both the soluble and insoluble fractions had a decreased aliphatic —OH (Alk-OH) and phenolic —OH groups (Ar—OH) as shown by $^{13}$C NMR (FIG. 10D and FIG. 13, described further hereinbelow). Third, a detailed structure analysis by HSQC (Heteronuclear single quantum coherence spectroscopy) revealed broad-based changes in the content and composition of chemical linkages. In particular, the insoluble fraction had an increased content of β-aryl ether (β-O-4) linkage at 68.5%, whilst the soluble fraction had a slightly decreased content of β-O-4 linkage at 57.1% (FIG. 10D). The content of phenylcoumaran (β-5) linkage in the soluble fraction increased from 26.8% to 32.6%, whilst decreased marginally in the insoluble fraction. Pinoresinol (β-β) linkage decreased in soluble lignin from 5.8% to 4.1%, but remained unchanged in insoluble lignin. The content of dibenzodioxocin (5-5/β-O-4/α-O-4) linkage had marginal changes in the soluble fraction, whilst reduced significantly from 5.9% to 0.5% in the insoluble fraction (FIG. 10D). Considering that β-O-4, β-5, and β-1 linkages confer the linear structures and 5-5/β-O-4/α-O-4 is considered to generate branchy structure (FIG. 14, described further hereinbelow), the results indicate that the insoluble fraction of laccase-HBT processed lignin might have more linear structure and less non-linear branches. Overall, the broad-based changes of lignin structures in —OH content, MW, and linkage frequency indicated that the fractionated products can serve as better precursors for the production of lignin based carbon fibers.

Carbon fiber morphology analysis confirmed that lignin fractionation by laccase-HBT system significantly improved the spinnability of lignin based carbon fiber. Lignin based carbon fibers were fabricated from the aforementioned lignin fractions via electrospinning after mixing them with PAN at a weight ratio of 1:1. FIG. 11 shows SEM imaging of the morphology of carbon fibers produced from different lignin factions and PAN: panel (a) KL-Raw; panel (b) KL-L/H-Sol.; panel (c) KL-L/H-Insol.; and panel (d) pure PAN. The upper histograms on each SEM image of FIG. 11 were the distributions of carbon fiber diameters, measured with IMAGEJ® software for at least 40 different fibers.

As shown in FIG. 11, the scanning electron microscopy (SEM) analysis showed much more "beads" defects in carbon fiber made directly from Kraft lignin, indicating the limited spinnability of Kraft lignin for carbon fiber production (panel (a)). The distribution of diameters improved for carbon fibers made from the soluble lignin fraction, and the frequency of "beads" defects decreased (panel (b)). Importantly, the carbon fiber made from the insoluble lignin fraction showed essentially the same uniformity in diameter distribution to that of the carbon fiber made of PAN alone (panels (c) and (d)). Moreover, the carbon fiber made of the insoluble lignin had a smaller average diameter (350 nm) than those of the PAN-based carbon fiber, which further suggested the significant improvement in lignin spinnability. The improvement in fiber morphology could also be observed in as-spun lignin fibers (FIG. 16, described further hereinbelow), where insoluble lignin-derived carbon fiber had no beads defects and displayed more uniform diameters. The results highlighted that laccase-HBT treatment generated the insoluble fraction of lignin that significantly improved spinnability to render carbon fiber with similar morphology to that of PAN.

Figure 12A:
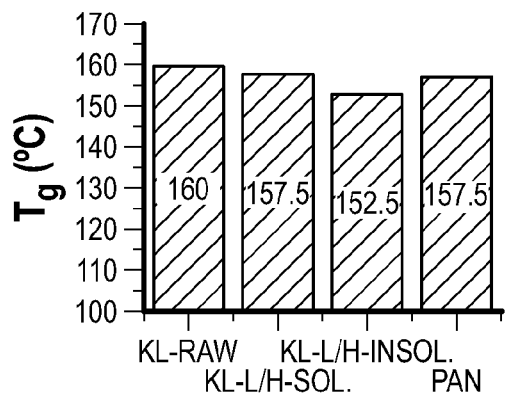
FIG. 12A is a plot of the glass transition temperature ($T_g$) of lignin precursor fibers of Example 1.
Figure 12B:
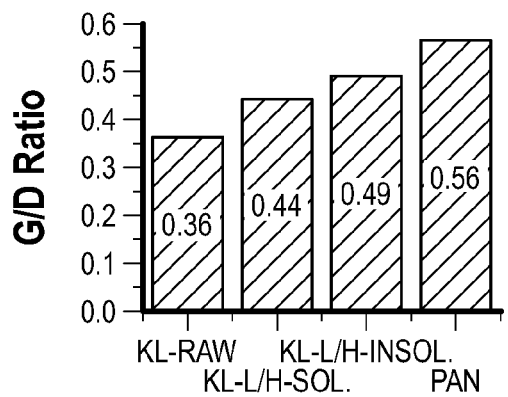
FIG. 12B is a plot of G/D ratio calculated from Raman spectra in Example 1.
Figure 12C:
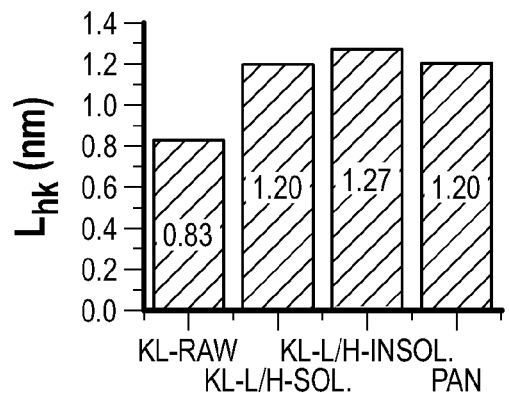
FIG. 12C is a plot of the crystallite size ($L_{hkl}$) calculated from XRD using the Scherrer Equation 1 in Example 1.
Figure 12D:
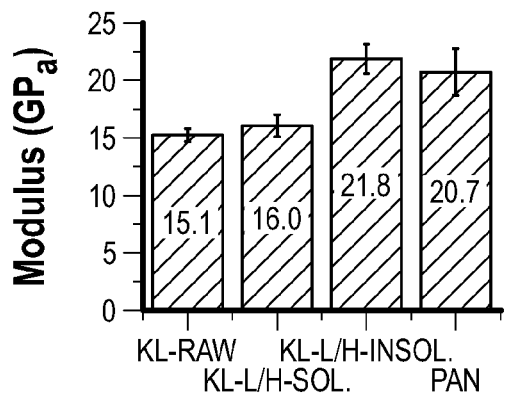
FIG. 12D is a plot of the reduced elastic modules of carbon fibers of Example 1 measured with nanoindentation.
Figure 12E:
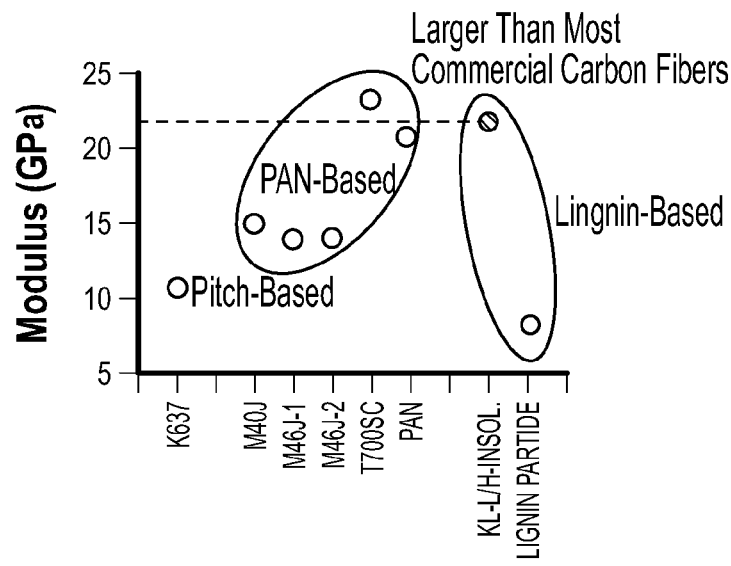
FIG. 12E is a plot of the comparison of the reduced elastic modulus of carbon fibers of Example 1 with the published elastic modulus of commericial carbon fibers as measured by nanoindentation.

The improvement of lignin spinnability may have resulted from the enhanced miscibility for the fractionated lignin with PAN. FIG. 12A is a plot of the glass transition temperature ($T_g$) of lignin precursor fibers; FIG. 12B is a plot of G/D ratio calculated from Raman spectra; FIG. 12C is a plot of the crystallite size ($L_{hkl}$) calculated from XRD using Scherrer equation; FIG. 12D is a plot of the reduced elastic modules of carbon fibers measured with nanoindentation; and FIG. 12E is a plot of the comparison of the reduced elastic modulus of carbon fibers in this example with the published elastic modulus of commericial carbon fibers as measured by nanoindentation. In FIG. 12E, K637 was pitch-based carbon fiber from Mitsubishi®; M40J and M46J-1, M46J-2, and T700SC were PAN-based carbon fiber from Toray®. Data for K637, M40J, and M46J-1 were reported by Maurin et al (2008). M46J-2 and T700SC were measured by Fan et al (2015) and Huson et al (2014), respectively. Modulus of lignin particle was from Gindl-Altmutter et al (2015). PAN and KL-LH-insol. represented the two types of carbon fibers made from pure PAN and the insoluble lignin fraction in this Example 1, respectively. Data errors of modulus in FIG. 12D can be found in Table 5 hereinbelow.

As shown in FIG. 12A, the insoluble fraction of laccase-HBT lignin rendered the lowest glass transition temperature ($T_g$) at 152.5° C., whilst the soluble fraction had $T_g$ at 157.5° C. The untreated Kraft lignin had a higher T at 160° C. The result highlighted that the laccase-HBT treatment generated two fractions of lignin with improved miscibility with PAN. In particular, the insoluble fraction had the best miscibility among the different factions. The improved miscibility could lead to not just enhanced spinnability, but also improved the crystallite carbon structure in carbon fibers. Considering the potential structural changes, the improved miscibility can positively impact the mechanic performance of carbon fibers.

Figure 19A:
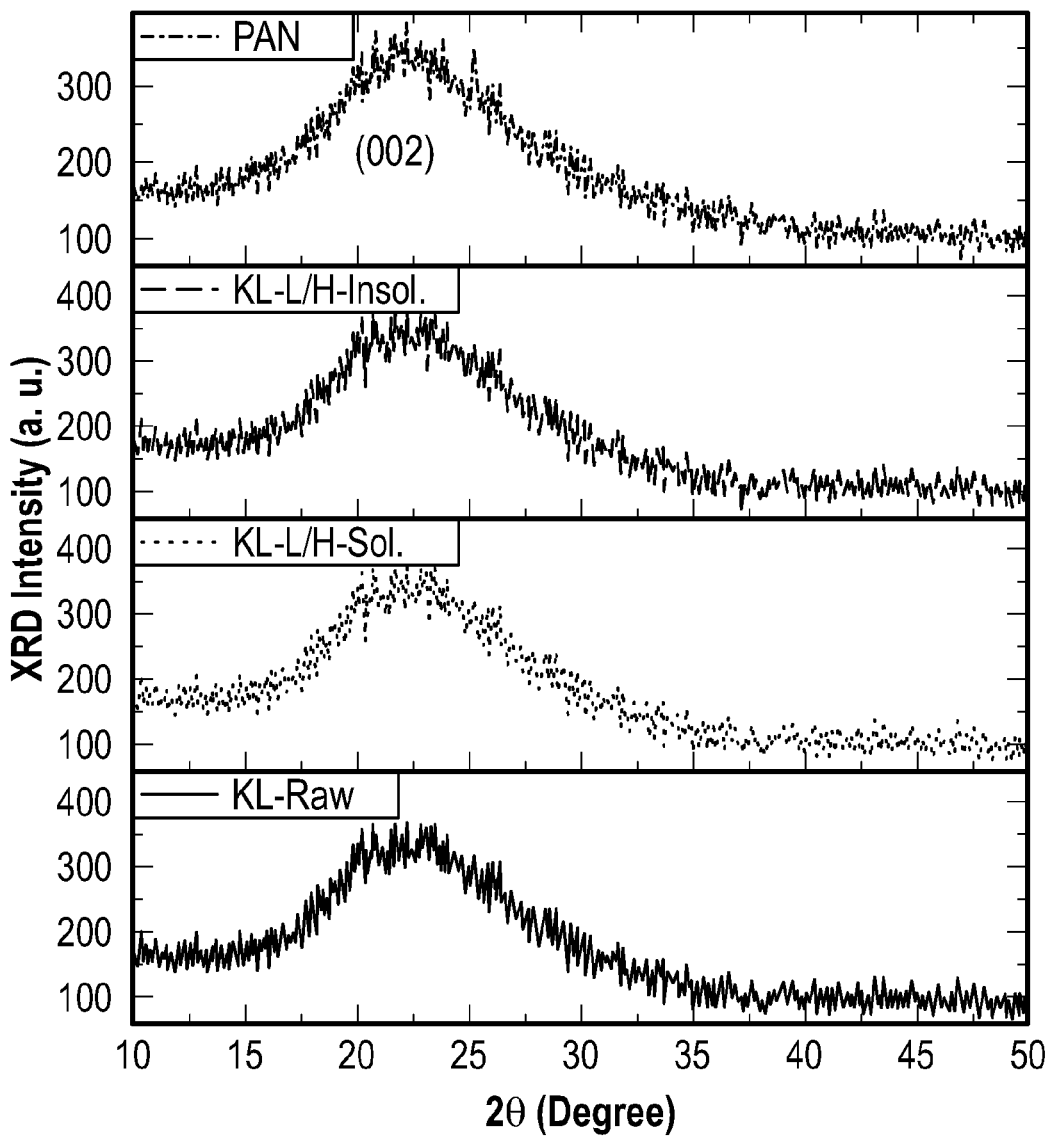
FIG. 19A shows the XRD spectra of lignin and PAN in Example 1.
Figure 19B:
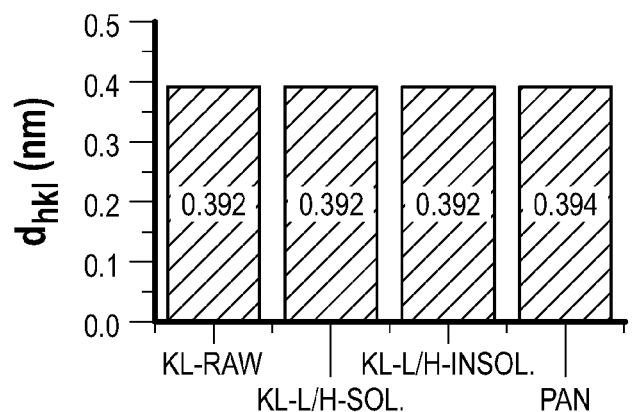
FIG. 19B shows the distance between two atomic layers in crystal structures as calculated with Bragg's law.

The crystallite carbon structure in carbon fibers was analyzed using both X-ray diffraction (XRD) and Raman spectroscopy. The distances between interfacial crystallite layers ($d_{hkl}$) calculated from XRD using Bragg's Law were larger than 0.390 nm for all carbon fibers in this Example 1 (FIG. 19B, hereinbelow). These data were higher than the $d_{hkl}$ of idea graphite (0.335 nm), indicating the existence of the pre-graphitic turbostratic carbon structure, which was comprised of more- or less-bent crystallite layers with $sp^2$-hybridized carbon atoms in carbon fiber. Moreover, the $d_ki$ (0.334 nm) for commercial graphite powder (FIG. 20, described further hereinbelow) was consistent with the $d_{hkl}$ of idea graphite in the measurement, highlighting the relevance and reliability of the data.

Raman spectroscopy analysis further revealed that laccase-HBT treatment led to the increased pre-graphitic turbostratic carbon in the lignin based carbon fiber. As shown in FIG. 21, described further hereinbelow, the D band was at 1346 cm- and G band was at 1589 $cm^{-1}$. The integrated G/D ratio was as shown in FIG. 12B. The G/D ratio for carbon fiber made of pure PAN was 0.56, whilst the G/D ratio for carbon fiber made from the raw Kraft lignin and PAN was 0.36. The results indicated the mixture of the untreated Kraft lignin with PAN significantly reduced the turbostratic carbon in carbon fibers, which is consistent the miscibility data. Laccase-HBT treatment significantly improved the content of turbostratic carbon, as the G/D ratio for carbon fiber made of the soluble lignin and PAN is 0.44. The G/D ratio was further improved to 0.49 when carbon fiber was made of the insoluble lignin and PAN. The increased content of pre-graphitic turbostratic carbon structure corresponded to the improved miscibility of enzyme-mediator processed lignin.

XRD analysis further confirmed the improved crystallite size ($L_ki$) in the carbon fibers made of fractionated lignin. The crystal structure for different types of carbon fibers was clearly identified with XRD using Scherrer's Equation 1 (FIG. 12C). The crystallite size for carbon fiber made of the raw Kraft lignin and PAN composite was 0.83 nm, whilst the crystallites in carbon fiber made of the insoluble lignin fraction and PAN was increased to 1.27 nm. Overall, the structure analysis indicated the improved turbostratic carbon structure, when the insoluble fraction of lignin was used to make carbon fiber.

The improved crystallite microstructure features in carbon fiber led to the enhanced modulus and hardness of the carbon fibers made of laccase-HBT processed lignin, in particular, the insoluble lignin fraction. Both reduced elastic modulus and hardness in transverse direction (FIG. 23, described further hereinbelow) were increased in the carbon fiber made of enzyme-mediator processed lignin (FIG. 12D and FIG. 25, described further hereinbelow). In particular, the transverse modulus of carbon fiber made from the insoluble lignin fraction was increased by more than 40% as compared to those of the raw Kraft lignin. More importantly, the carbon fiber made from the insoluble lignin fraction had comparable modulus with pure PAN-based carbon fiber (FIG. 12D). Moreover, the modulus of PAN-based carbon fiber in this Example 1 was consistent with those of the commercial PAN- and pitch-based carbon fibers in previous studies (FIG. 12E), highlighting the relevance and reliability of the data. In other words, the modulus for the carbon fiber made of laccase-HBT processed insoluble lignin fraction was comparable to that of commercial PAN-based carbon fiber (FIG. 12E), indicating the potential of this insoluble lignin based carbon fiber to replace the traditional petroleum-based carbon fiber in macroscopic applications in sports equipment, auto industry, wind turbine blades and others. In addition, the fractionated lignin produced finer carbon fibers at nano-scale (FIG. 11), enabling potential new usage as supercapacitor electrode and such. The improved mechanical performance of the carbon fiber made from insoluble lignin could be attributed to the increased pre-graphitic turbostratic carbon in carbon fiber as revealed by XRD and Raman spectroscopy. In other words, the increase in the crystallite microstructure of turbostratic carbon could account for the high mechanical performance of insoluble lignin based carbon fiber.

Materials

Alkali Kraft lignin with low sulfonate content (370959), laccase (from *Trametes versicolor*, 0.5 U/mg, 38429), 1-hydroxy benzotriazolehydrate (HBT), N,N-dimethylformamide (DMF, 99.8%), and graphite (99% carbon basis) were purchased from Sigma-Aldrich, USA. Polyacrylonitrile (PAN, Mw=150,000 g/mol) was purchased from Pfaltz & Bauer, USA.

Enzymatic Treatment of Lignin

Kraft lignin (70 g) was added into a phosphate buffer (P-buffer, 0.2M, pH 7.0) to achieve a lignin concentration of 10 wt %. Laccase was then added into P-buffer with the loading of 15 mg/g lignin, and the HBT was used as mediator at 25 mg/g lignin. The treatment was carried out in a BIOSTAT® A reactor (Sartorius, Bohemia, NY), with the oxygen flow rate at 5 cubic centimeters per minute (ccm), temperature at 50° C., and the stirring speed at 200 rpm. After 48-hour of treatment, the mixture was separated by centrifugation at 25 000 g into water-insoluble and water-soluble fractions. Water-insoluble lignin fraction was then washed with 200 mL of deionized water for three times. Water-soluble lignin fraction was further precipitated into 500 mL of 2 M sulfuric acid and centrifuged again to render the solid phase. After centrifugation and lyophilization, the two fractions of lignin, namely insoluble lignin and soluble lignin, were obtained in powder form.

$^{13}$C NMR Spectroscopy

All lignin samples were acetylated for $^{13}$C NMR characterization. NMR spectra were acquired on an Avance III 500 with a HCN cryoprobe. The acetylated lignin (150 mg) was dissolved in 1 mL of DMSO-d6 and placed in a 5-mm Wilmad NMR tube. Chromium (III) acetylacetone (0.01 M) was added into lignin solution as a relaxant. The methyl peak (39.5 ppm) of DMSO-d6 was used as an internal reference. A 90° C. pulse width, a 1.2 s acquisition time, and a 1.0 s relaxation time were used. Data were collected with a total of 15000 scans.

Figure 13:
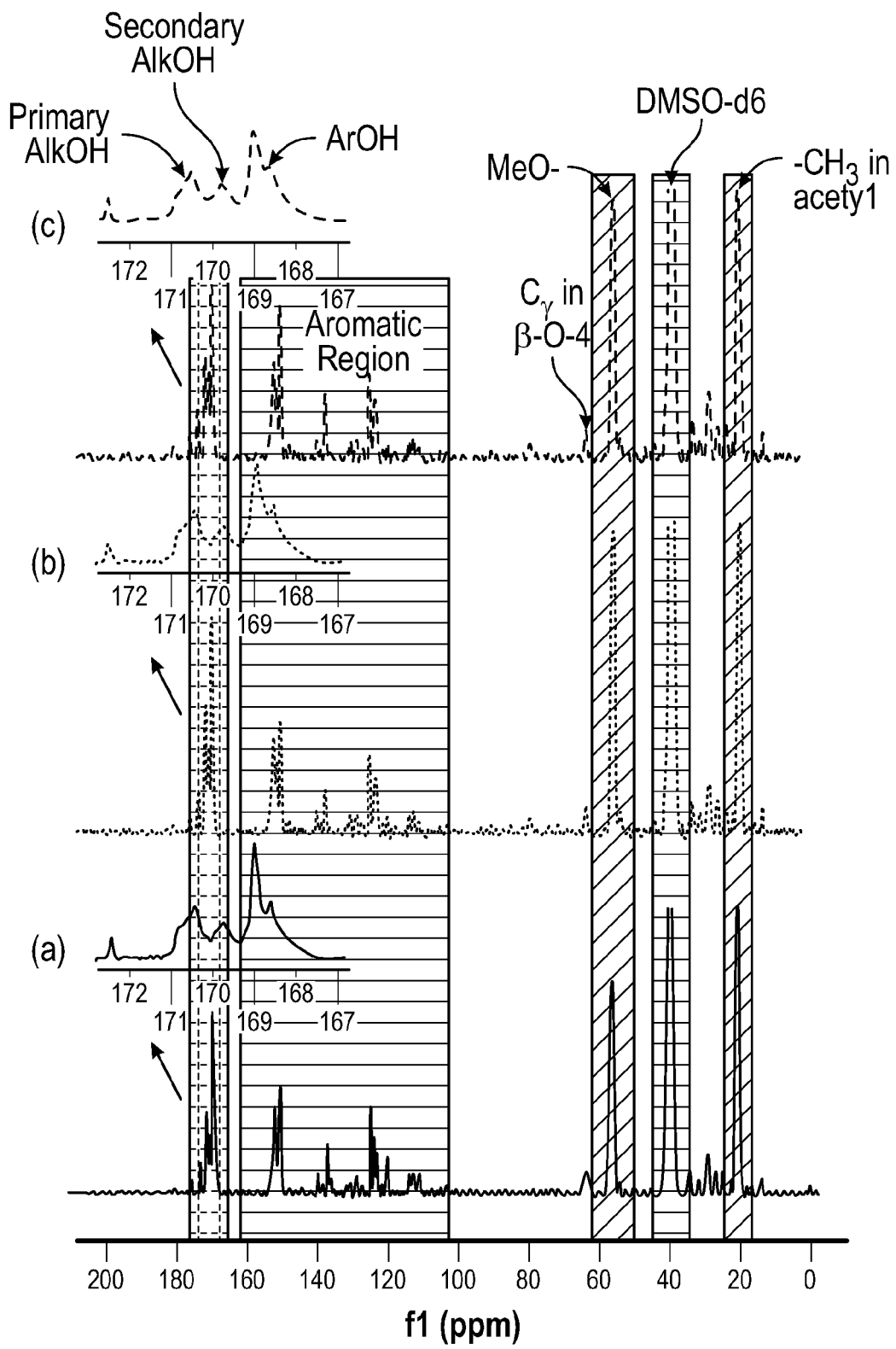
FIG. 13 shows the $^{13}C$ NMR spectra of lignin in Example 1: panel (a) KL-Raw; panel (b) KL-L/H-Insol.; panel (c) KL-L/H-Sol, wherein KL-Raw is raw Kraft lignin without laccase-HBT treatment; KL-L/H-Insol.
Figure 14A:
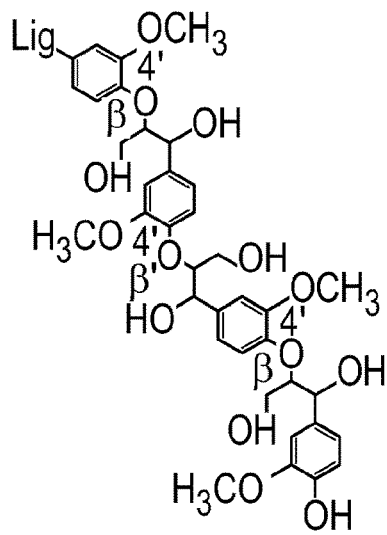
FIG. 14 shows representative interunitery linkages in lignin structure, with β-aryl ether (β-O-4) (A), phenylcoumaran (β-5) linked with β-O-4 moieties (B), and pinoresinol (β-β) linked with β-O-4 moieties (C) displaying linear structures, and non-phenolic dibenzodioxocin (5-5/β-O-4/α-O-4) linked with β-O-4 moieties (D) showing branchy structure.
Figure 14B:
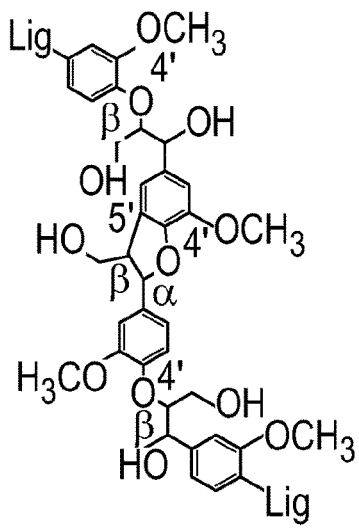
Figure 14C:
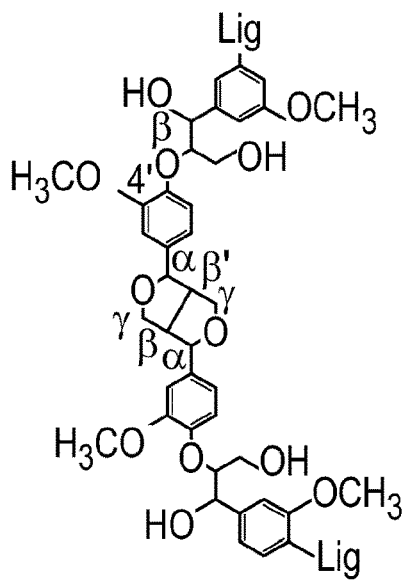
Figure 14D:
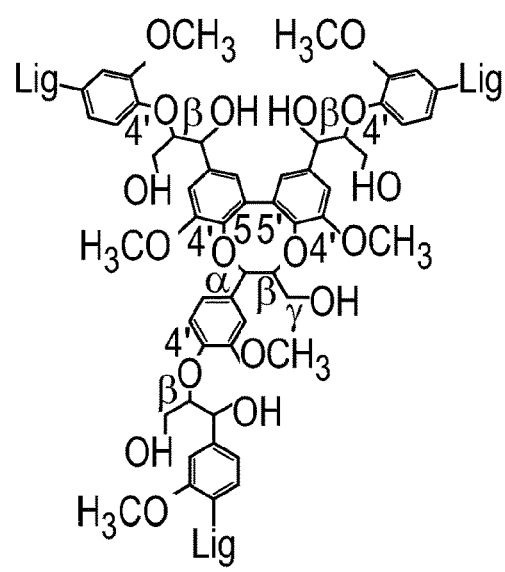

FIG. 13 shows the $^{13}$C NMR spectra of lignin: panel (a) KL-Raw; panel (b) KL-L/H-Insol.; panel (c) KL-L/H-Sol, wherein KL-Raw is raw Kraft lignin without laccase-HBT treatment; KL-L/H-Insol. is the water-insoluble fraction obtained from laccase-HBT (LH) treatment of Kraft lignin; and KL-L/H-Sol. is the water-soluble fraction obtained from laccase-HBT (L/H) treatment of Kraft lignin. The assignments of lignin functional groups are listed in Table 1. The integration of aromatic region (162-102 ppm) was set as 1, and the frequency of hydroxyl groups was integrated based on the aromatic region and presented as the number per aromatic ring.

TABLE 1

Assignment and Integration of $^{13}$C NMR for Lignin

| Chemical shift | | Number of moieties per aromatic ring | | |
|---|---|---|---|---|
| (PPm) | Assignment | a | b | c |
| 172-169.6 | Primary aliphatic OH | 0.27 | 0.19 | 0.17 |
| 169.6-168.6 | Secondary aliphatic OH | 0.18 | 0.20 | 0.16 |
| 168.6-166 | Phenolic OH | 0.23 | 0.22 | 0.14 |
| 162-102 | Aromatic region | 1 | 1 | 1 |
| 57-54 | Methoxyl group | 0.65 | 0.93 | 0.81 |

2D NMR Spectroscopy

Lignin linkages were analyzed with heteronuclear single quantum coherence spectroscopy (HSQC). The acetylated lignin (150 mg) was dissolved in 1 mL of DMSO-d6 and placed in the aforementioned NMR tube. Adiabatic 2D $^1$H-$^{13}$C HSQC spectra were acquired on a Bruker AVANCE 500 MHz spectrometer, and the resultant data were processed with the software of Topspin version 3.2 (Bruker Biospin) with the following parameters: Gaussian apodization in F2 (LB=−0.5, GB=0.001), and squared cosine-bell and forward linear prediction with 32 coefficients in F1.3 The obtained HSQC spectra were then analyzed using software Sparky, and the assignments of lignin linkages (I, II, III, and IV as shown in FIG. 10D, panels 1-4) are shown in Table 2.

TABLE 2

Chemical Shifts of Lignin Interunitery Linkages

| Linkages* | F2 (Ppm) | F1 (Ppm) |
|---|---|---|
| Iβ | 6.0 | 74.5 |
| IIα | 5.5 | 87.7 |
| IIIα | 4.5 | 87.0 |
| IVβ | 4.2 | 81.5 |

*Lignin linkages of Iβ, IIα, IIIα, and IVβ are shown in FIG. 10D.

These linkages were also presented in lignin oligomers (FIG. 14), among which I (β-O-4), 11 (β-5) and III (β-β) represented linear structures, and IV (5-5/β-O-4/α-O-4) had a branch structure. The chemical shifts of Iβ (β position in β-O-4), IIα (α position in β-5) and IIα (α position in β-β) were evaluated according to Tobimatsu et al (2013), while chemical shift of IVβ (β position in dibenzodioxocin) was evaluated according to Sette et al (2011) and Crestini et al (2011). For quantification of these interunitery linkages in lignin, the well-resolved contours of Iβ, IIα, IIIα, and IVβ (FIG. 10D) were integrated using the software MestReNova. The frequency of each linkage (% in FIG. 10D, panels 1-3) was calculated using the following equation:

$$\text{Frequency (\%)} = \frac{I_x}{I_{I\beta} + I_{II\alpha} + I_{III\alpha} + I_{IV\beta}} \times 100\%$$

where $I_x$ is the integration of the linkage to be calculated, and $I_{I\beta}$, $I_{II\alpha}$, $I_{III\alpha}$, $I_{IV\beta}$ are the integrations of Iβ, IIα, IIIα, and IVβ, respectively. The above equation indicated that the quantified frequencies represented the relative changes in lignin linkages.

FIG. 14 shows representative interunitery linkages in lignin structure, with β-aryl ether (β-O-4) (A), phenylcoumaran (β-5) linked with β-O-4 moieties (B), and pinoresinol (β-β) linked with β-O-4 moieties (C) displaying linear structures, and non-phenolic dibenzodioxocin (5-5/β-O-4/α-O-4) linked with β-O-4 moieties (D) showing branchy structure. β-O-4, β-5, β-β, and dibenzodioxocin are assigned at δH/δC 6.0/74.5 ppm, δH/δC 5.5/87.7 ppm, δH/δC 4.5/87.0 ppm, δH/δC 6.0/74.5 ppm4.2/81.5 ppm, respectively. Lig-in the structures stands for lignin moieties.

Gel Permeation Chromatography (GPC)

GPC analysis was performed on an OMNISEC system (Malvern Instrument Ltd., Houston, TX). Two Styrenedivinyl benzene (SDVB) columns were used. Column temperature was set at 45° C. DMF/0.02M Ammonium Acetate was used as the eluent at a flow rate of 1.0 mL/min. A viscometer and refractive index detector in the OMNISEC REVEAL system was used to measure the molecular weight. The acetylated lignin was dissolved in DMF at a concentration of 1 mg/mL, and 100 μL of the sample was injected into the GPC system after filtration with 0.45 μm membrane filter (VWR, Houston, TX). Universal calibration with poly (methyl methacrylate) standards were used. The data were processed with OmniSEC 5.12 software.

Electrospinning

Both lignin and PAN were grounded to fine powders and passed through 120-mesh screen. The lignin and PAN powders were then mixed at a weight ratio of 1:1 and dissolved in DMF to generate a 15 wt % solution, which was further loaded to a 10 mL syringe with a 22 gauge (inside diameter (i.d.) 0.70 mm, length 38 mm) stainless steel blunt needle (Terumo, Yokohama, Japan). Lignin-PAN precursor fiber was produced using a nanofiber electrospinning unit (Kato Tech Co., Ltd., Kyoto, Japan), similar to that depicted in FIG. 7. The syringe was placed in the syringe pump system in the unit, and the solution feed rate was set at 0.25 mL/h. The fiber was collected on aluminum foil. An electronic voltage of 11.5 kV for a uniform Taylor's cone was applied between the syringe needle and the aluminum disc. The distance between the syringe needle and the aluminum disc was kept at 17 cm to give a wagging stream and allow the solvent to be completely evaporated. The formed fibers were picked from the aluminum foil and kept in desiccator.

Viscosity

Figure 15:
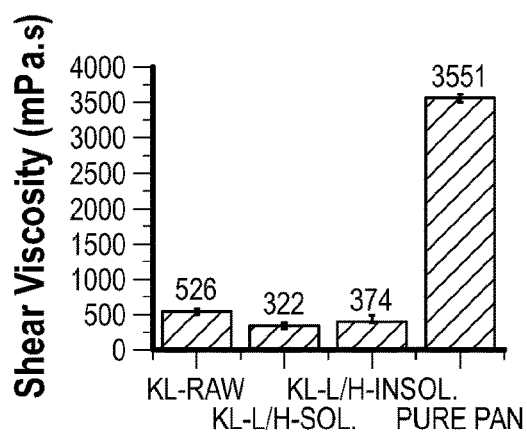
FIG. 15 is a plot of the viscosity of lignin/PAN dopes at 0.1 $s^{-1}$ shear rate.

The dynamic viscosity of the electrospinning dopes was measured using Malvern Kinexus Pro+ rotational rheometer (Malvern Instruments, Houston, TX) with a 50 mm diameter parallel plate geometry. Sample thickness was 0.5 mm, and the tests were conducted at a constant temperature of 25° C. with the shear rate from 600 $s^{-1}$ to 0.1 $s^{-1}$. Five data points were recorded per each decade of shear rate, and three measurements were replicated for each sample. The shear viscosity at 0.1 $s^{-1}$ shear rate was reported as the results. FIG. 15 is a plot of the viscosity of lignin/PAN dopes at 0.1 $s^{-1}$ shear rate. As shown in FIG. 15, pure PAN has much higher viscosity than all lignin/PAN blends.

Thermostabilization and Carbonization of Lignin Precursor Fibers

Both thermostabilization and carbonization of lignin fibers were performed in a split tube furnace with vacuum system (GSL 1600X, MTI Corporation, Richmond, CA). The conditions for thermostabilization were: heating at atmosphere from room temperature to 250° C. at a heating rate of 1° C./min. After holding for 1 h at 250° C., the furnace was automatically cooled down to room temperature. For carbonization, the thermostabilized fibers were put in the tube furnace, and the tube was then completely sealed. Before heating, the tube was purged with nitrogen gas for three times with vacuum pump purging until $1\times10^{-2}$ torr. The step was to ensure that no residual oxygen was left in the tube. The flow rate of nitrogen was kept at 240 ccm ($cm^3$/min) during heating. The temperature was increased from room temperature to 1,000° C. with a heating rate of 5° C./min. The holding time at 1,000° C. was 1 h. The yields of carbon fibers are shown in Table 3. The final yield of the insoluble lignin based carbon fiber was slightly improved as compared to that of the raw lignin based carbon fiber, whilst the soluble lignin based carbon fiber had slightly decreased yield when compared with untreated lignin based carbon fiber.

TABLE 3

| Yields (%) of Carbon Fibers | | | |
| --- | --- | --- | --- |
| KL-Raw | KL-L/H-Sol. | KL-L/H-Insol. | Pure PAN |
| 42.8 | 38.3 | 45.0 | 42.4 |

%, based on the weight of as-spun fibers

Field Emission Scanning Electron Microscope (FE-SEM)

The morphologies of carbon fibers were imaged using a FEI Quanta 600F FE-SEM (FEI Company, Hillsboro, OR). The samples were firstly coated with gold-palladium (10 nm thickness) using a Cressington 208 HR sputter coater (TED PELLA INC., Redding, CA). The working distance was 10 mm, and the accelerating voltage applied was 5 kV. The diameters of fibers were calculated using ImageJ software, by calculating at least 40 different carbon fibers.

SEM images of as-spun fibers made of lignin and PAN are shown in FIG. 16: panel (A), KL-Raw; panel (B) KL-L/H-Sol.; panel (C) KL-L/H-Insol.; panel (D) pure PAN. The upper histograms on each image of FIG. 16 are the distributions of carbon fiber diameters, measured with ImageJ® software for at least 40 different fibers. In comparison with the fiber made of pure PAN (1567 nm, FIG. 16, panel (d)), all fibers derived from lignin/PAN blends (FIG. 16, panels (a)-(c)) were much finer. The decrease in diameter of as-spun lignin based fibers could be attributed to the decreased viscosity when blending relatively low MW lignin (as shown in FIG. 10B) with high MW PAN (MW=150,000 g/mol). In fact, the viscosity of pure PAN in DMF (15 wt %) was 3551 mPa·s, which was deceased to 526 mPa·s when the PAN was blended with 50% raw lignin (FIG. 15). In particular, when comparing insoluble lignin based fiber (FIG. 16, panel (c)) with soluble lignin based fiber (FIG. 16, panel (b)), the former had bead-free morphology and much more uniform diameters (60.4% of fiber diameter distributed within 601-800 nm). This could be due to three reasons: (a) the better miscibility of insoluble lignin with PAN (FIG. 12A), (b) higher MW of insoluble lignin than soluble lignin to render higher viscosity of insoluble lignin/PAN dope (FIG. 15), (c) more linear molecule structure of insoluble lignin (FIG. 14, structure A) to improve the interactions between lignin molecules and PAN chains.

Differential Scanning Calorimetry (DSC)

DSC was performed on the thermostabilized precursor fibers using DSC Q2000 system (TA Instruments, New Castle, DE) with three heating cycles. Three milligram of sample was placed in an aluminum pan. Under a nitrogen atmosphere, the samples were heated from room temperature to 350° C. at the heating rate of 20° C./min. After cooling down to 0° C. with a rate of 20° C./min, the second cycle and the subsequently third cycle were repeated at the same heating/cooling condition.

Figure 17A:
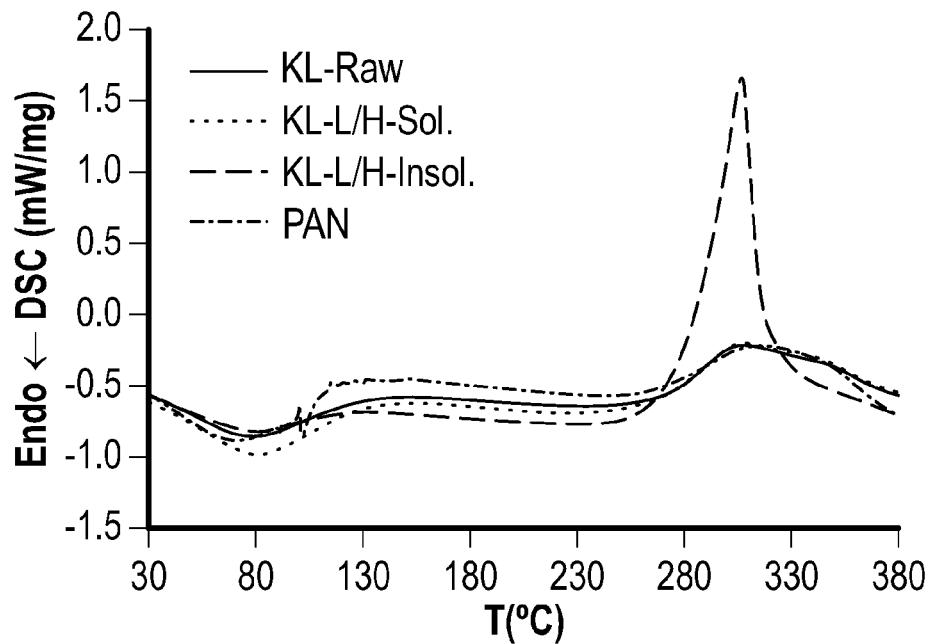
FIG. 17A shows a first heating cycle of DSC analysis of thermostabilized precursor fiber in Example 1.
Figure 17B:
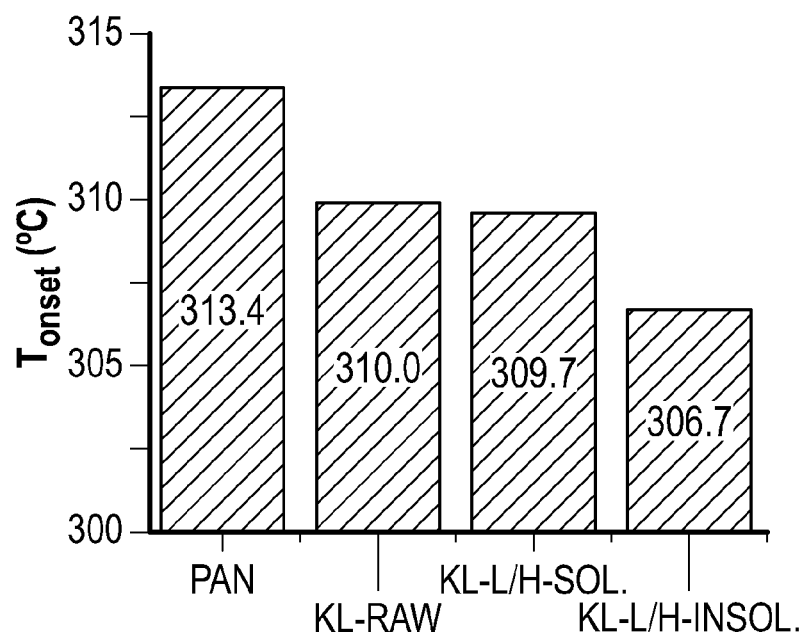
FIG. 17B shows the onset temperature ($T_{onset}$) derived from DSC in Example 1.
Figure 18A:
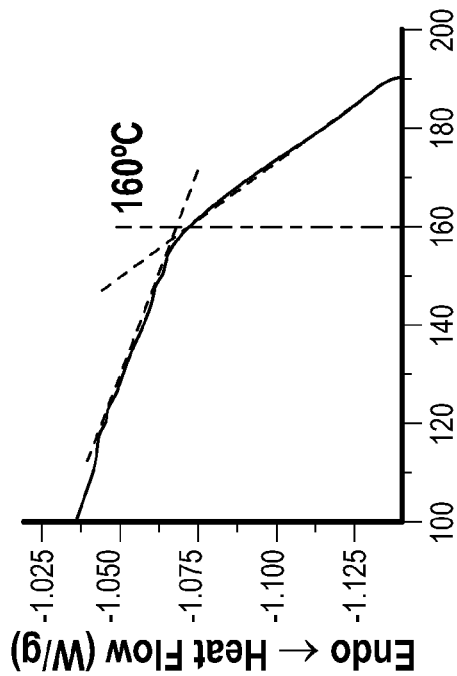
FIG. 18 shows heating flow curves derived from the second heating cycle of DSC analysis: panel (a) PAN; panel (b) KL-Raw; panel (c) KL-L/H-sol.; and panel (d) KL-L/H-insol.
Figure 18B:
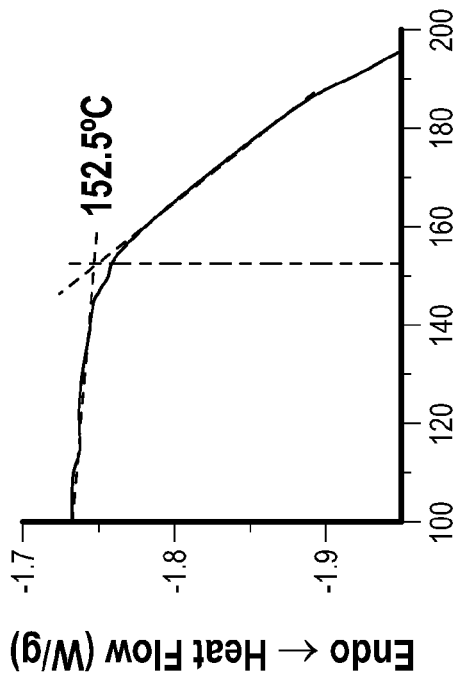
Figure 18C:
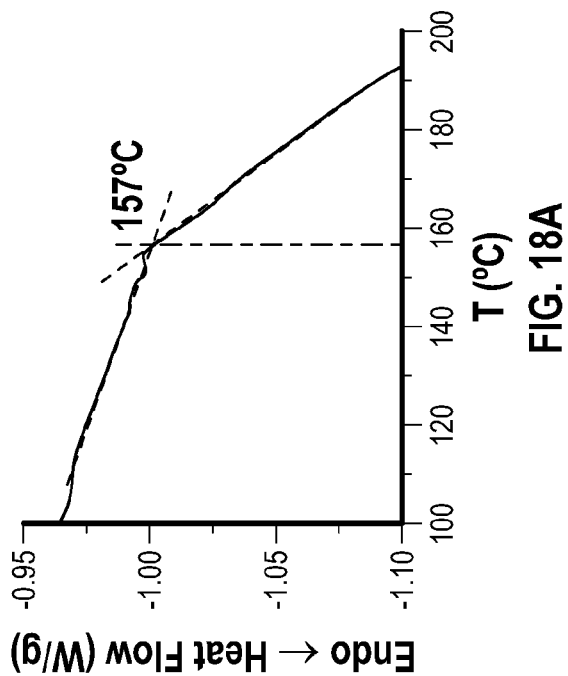
Figure 18D:
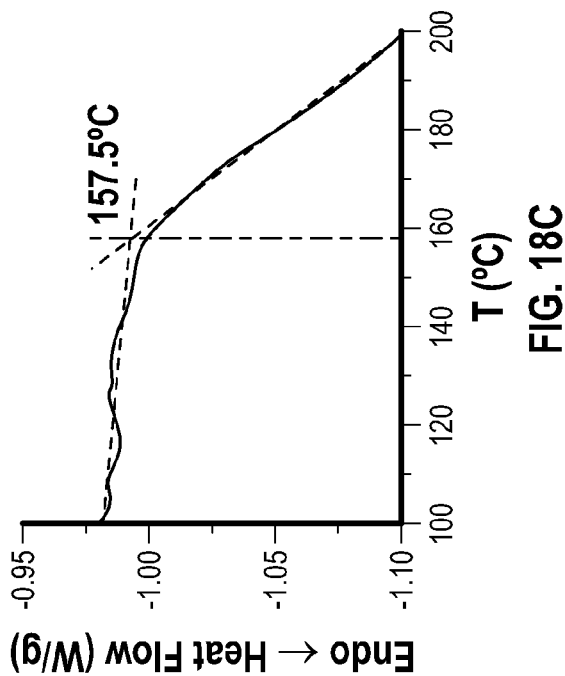

FIG. 17A shows a first heating cycle of DSC analysis of thermostabilized precursor fiber; and FIG. 17B shows the onset temperature ($T_{onset}$) derived from DSC. As shown in FIG. 17A, moisture and bonded water were started to be removed from the first cycle at about 80° C. as indicated of intensive endothermic peaks. The decomposition temperature, as indicated by the onset of exothermic peaks (around 300° C. in FIG. 17A), suggested the onset of weight loss due to thermal decomposition of polymers in precursor fibers. This decomposition temperature was expressed as $T_{onset}$ and shown in FIG. 17B. The PAN precursor had a $T_{onset}$ at approximately 310° C., at which (without wishing to be limited by theory) the cyclization of PAN and the cleavage of labile oxygen-containing groups including the ether-linkages in lignin probably happened.

The glass transition temperature ($T_g$) of thermostabilized precursor fibers made of lignin/PAN and pure PAN, represented in FIG. 12A, was estimated from the second cycle as shown in FIG. 18, which shows heating flow curves derived from the second heating cycle of DSC analysis: panel (a) PAN; panel (b) KL-Raw; panel (c) KL-L/H-sol.; and panel (d) KL-L/H-insol.

X-Ray Diffraction (XRD)

The graphitic structure in carbon fibers was analyzed using Bruker D8 Discovery X-ray diffraction (Bruker, Madison, WI). X-ray resource was generated at 40 mA current and 40 kV voltage with Cu Ka wavelength (λ) of 1.542 Å. Diffractograms (FIG. S7a) were recorded in the 2θ range of 10°-50°. Scanning step size was set at 0.05°, and the scanning rate was 1.5°/min. The crystalline size ($L_{hkl}$) was calculated using Scherrer equation:

$$L = \frac{K\lambda}{\beta \cos\theta} \quad \text{Equation (1)}$$

where L is the crystalline size, nm; K is shape factor, set as 0.94 in this calculation; λ is the X-ray wavelength (1.542 Å); β is the full width at half maximum (FWHM) in radian; e is the Bragg angle in degree.

Figure 20:
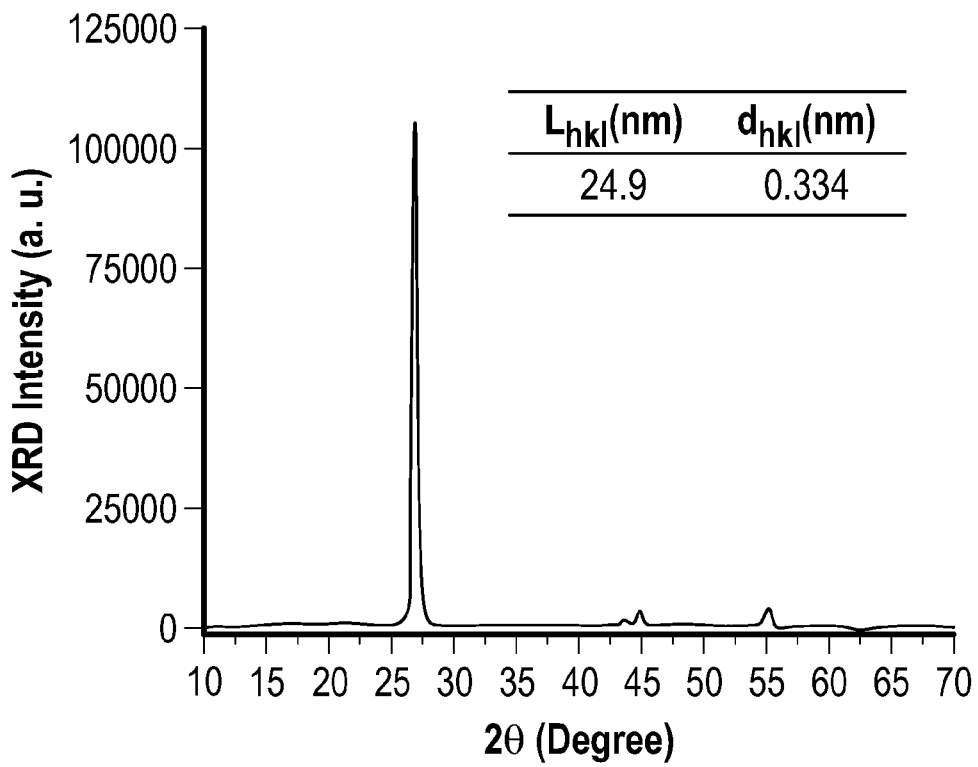
FIG. 20 shows the XRD spectrum of commercial graphite powder; the inserted table in FIG. 20 shows the crystallite size ($L_{hkl}$) and the distance between crystallite interlayers ($d_{hkl}$)

The distance between two crystalline lattices ($d_{hkl}$) was estimated using Bragg's law:

$$2d \sin\theta = n\lambda \quad \text{Equation (2)}$$

where d is distance in nm; θ is the Bragg angle in degree; n is set as 1. The results are shown in FIGS. 19A and 19B. FIG. 19A shows the XRD spectra of lignin and PAN, and FIG. 19B shows the distance between two atomic layers in crystal structures as calculated with Bragg law. Diffractogram of commercial graphite and the calculated $L_k i$ and $d_{hkl}$ are shown in FIG. 20, which shows the XRD spectrum of commercial graphite powder; the inserted table in FIG. 20 shows the crystallite size ($L_k i$) and the distance between crystallite interlayers ($d_{hkl}$).

Raman Spectroscopy

Figure 21A:
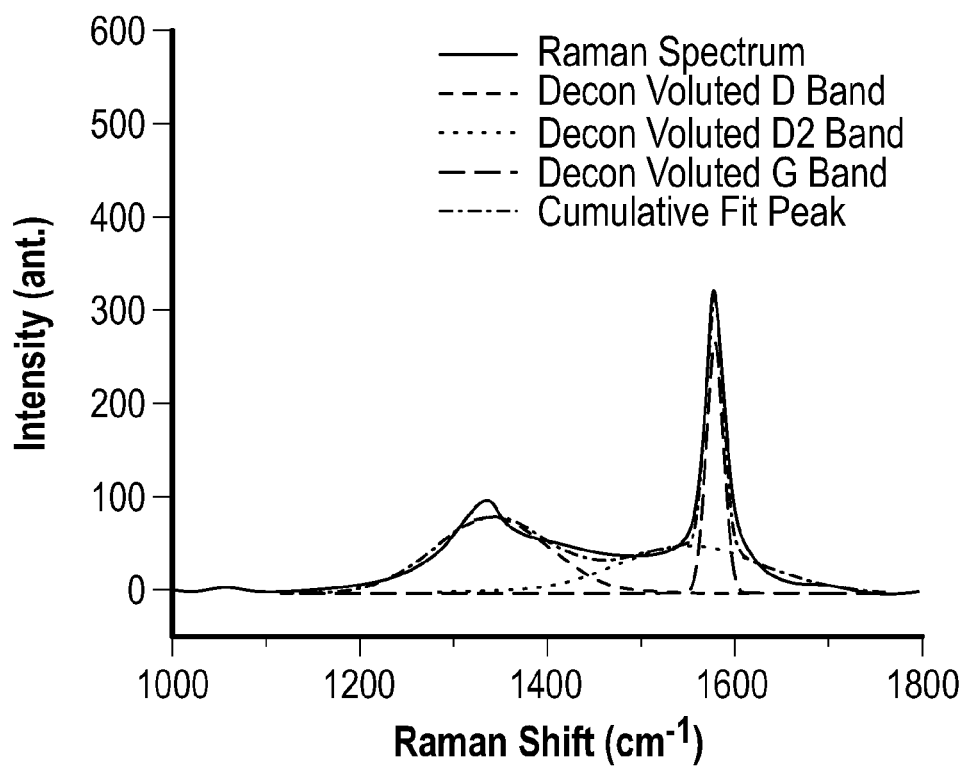
FIG. 21A shows the Raman spectra of commercial graphite powder.
Figure 21B:
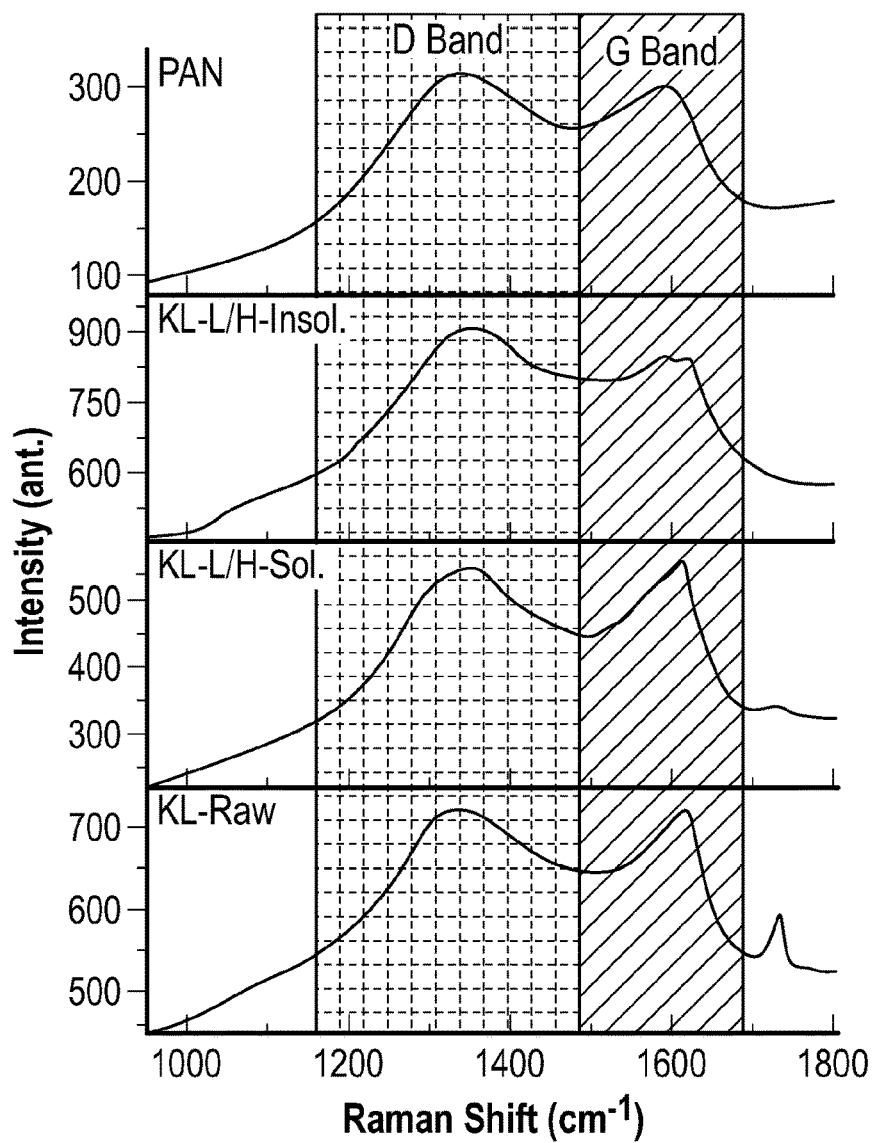
FIG. 21B shows the measured Raman spectra of carbon fibers of Example 1 made from lignin and PAN.

For Raman spectroscopy, carbon fibers were briefly ground and then mounted on a double adhesive tape fixed on a glass slide. Raman spectra were taken using a Horiba Jobin-Yvon LabRam Raman Confocal Microscope system with 633 nm laser, 10× magnification of objective lens, D0.3 filter, 200 μm confocal pinhole, 10 s exposure time, and 3 accumulations. Guassian curve fitting was used with Origin 9 software to analyze the obtained Raman spectra. FIG. 21A shows the Raman spectra of commercial graphite powder, and FIG. 21B shows the measured Raman spectra of carbon fibers of this disclosure made from lignin and PAN. The Raman shift of D band and G band was confirmed by the commercial graphite, which shows D band at 1348 $cm^{-1}$, and G band at 1581 $cm^{-1}$ (FIG. 21A).

Thermogravimetric Analysis (TGA)

Figure 22:
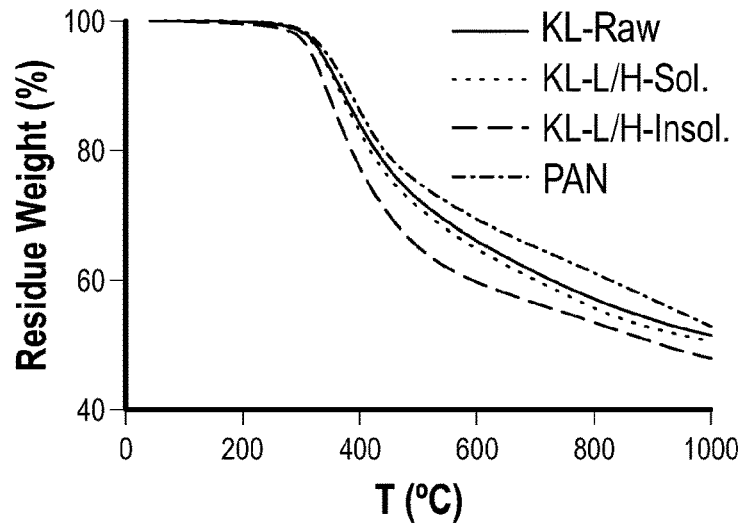
FIG. 22 shows TGA of thermostabilized carbon fiber precursors, wherein KL-Raw is raw Kraft lignin without laccase-HBT treatment; KL-L/H-Insol. is the water-insoluble fraction obtained from laccase-HBT (L/H) treatment of Kraft lignin; and KL-L/H-Sol. is the water-soluble fraction obtained from laccase-HBT (L/H) treatment of Kraft lignin.
Figure 23A:
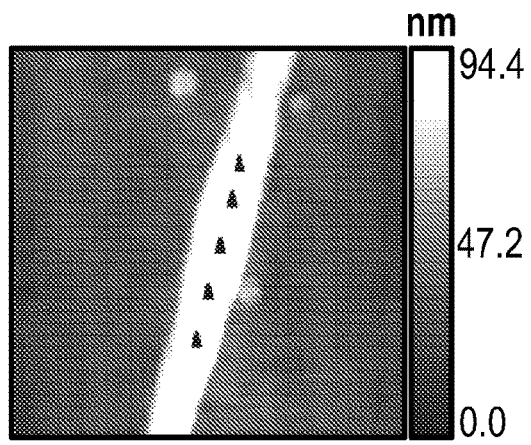
FIG. 23 shows the topography of scanning probe microscopy (SPM) under nanoindentation for KL-Raw in panel (a); KL-L/H-soluble in panel (b); KL-L/H-insoluble in panel (c); and PAN in panel (d)
Figure 23B:
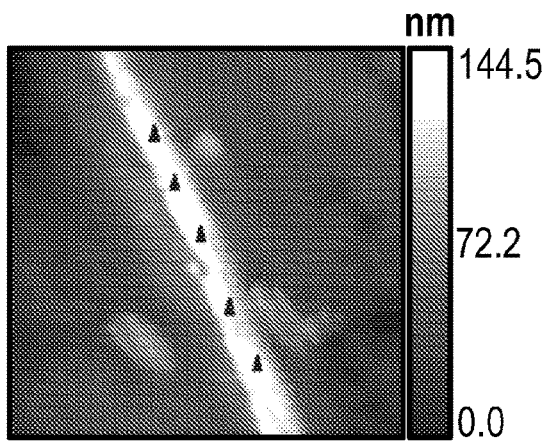
Figure 23C:
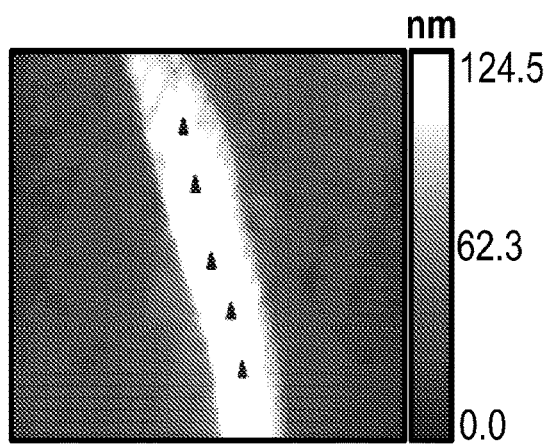
Figure 23D:
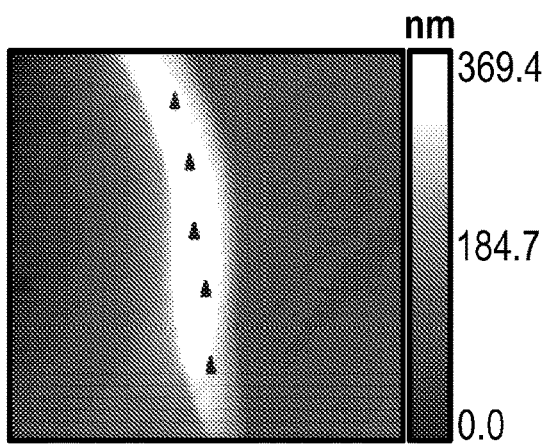

TGA measurement was carried out using a TA Instruments Q600-SDT system in a nitrogen gas environment (100 mL/min). Thermostabilized precursor fibers were placed in 90 μL alumina crucibles, and heated from room temperature to 1,000° C. with the heating rate of 10° C./min. FIG. 22 shows TGA of thermostabilized carbon fiber precursors, wherein KL-Raw is raw Kraft lignin without laccase-HBT treatment; KL-L/H-Insol. is the water-insoluble fraction obtained from laccase-HBT (L/H) treatment of Kraft lignin; and KL-L/H-Sol. is the water-soluble fraction obtained from laccase-HBT (LH) treatment of Kraft lignin. As shown in FIG. 22 and Table 4, the yield of carbon fiber made of water-insoluble lignin fraction and PAN at 1,000° C. degree was the slightly lower than the other three types of carbon fiber. The lower yield was consistent with higher β-O-4 linkages in lignin (FIG. 10D), which began to decompose at around 306° C. as shown in DSC spectra (FIG. 17A), and (without wishing to be limited by theory) may have induced the significant weight loss before 450° C. as shown in Table 4.

TABLE 4

Residue weight (%) of Carbon Fiber during Carbonization derived from TGA Curves

|  | 150° C. | 300° C. | 450° C. | 600° C. | 950° C. |
| --- | --- | --- | --- | --- | --- |
| PAN | 99.7 | 98.4 | 78.3 | 68.9 | 54.5 |
| KL-Raw | 99.8 | 98.2 | 76.7 | 65.8 | 52.5 |
| KL-L/H-Sol. | 100 | 98.1 | 75.3 | 64.4 | 51.3 |
| KL-L/H-Insol. | 99.5 | 97.1 | 69.6 | 59.3 | 48.9 |

Nanoindentation

Mechanical properties of resultant fibers were measured using Hysitron TI 950 Triboindenter (Minneapolis, MN). Before the measurement, carbon fibers were embedded in an epoxy resin (EPOFIX™ embedding resin kit, Electron Microscopy Science, Hatfield, PA). The resin was polymerized in room temperature overnight. To get a smooth surface for nanoindentation, the resin was firstly polished by a RMC Boeckeler MTX microtome (Boeckeler Instruments Inc., Tucson, AZ) with diamond knife, and continued to polish with a EcoMet 3 grinder/polisher (Buehler, Lake Bluff, IL) using 0.3 µm Alfa alumina powder (Type DX, Electron Microscopy Science, Fort Washington, PA) until fibers can be clearly found on the epoxy resin surface under light microscope.

FIG. 23 shows the topography of scanning probe microscopy (SPM) under nanoindentation for KL-Raw in panel (a); KL-L/H-soluble in panel (b); KL-L/H-insoluble in panel (c); and PAN in panel (d). Since the tip indents (15 nm depth) are too small to be visualized under the SPM, the positions for nanoindentations along the carbon fiber were indicated as manually inserted solid triangles on the fibers. Nanoindentation was carried out on transverse section of fiber (FIG. 23) using a Cube Corner (90°) tip with 40 nm radius. The calibration of the tip for the area function was made prior the test by indenting a fused quartz standard sample. The indentation depth of the fibers was set at 15-20 nm to avoid the effects of substrate on the measurement. For each sample, fifteen different indentations were conducted on three different carbon fibers. The reduced elastic modulus ($E_r$) was given as transverse modulus, which was obtained from the slope of initial unloading curve in loading-displacement (P-h) curve (FIG. 24) using the following equations:

$$E_r = \frac{\sqrt{\pi}}{2\sqrt{A}} \times S \qquad \text{Equation (3)}$$

where $E_r$ is the reduced elastic modulus, A is the contact area, and S is the stiffness.

Figure 24:
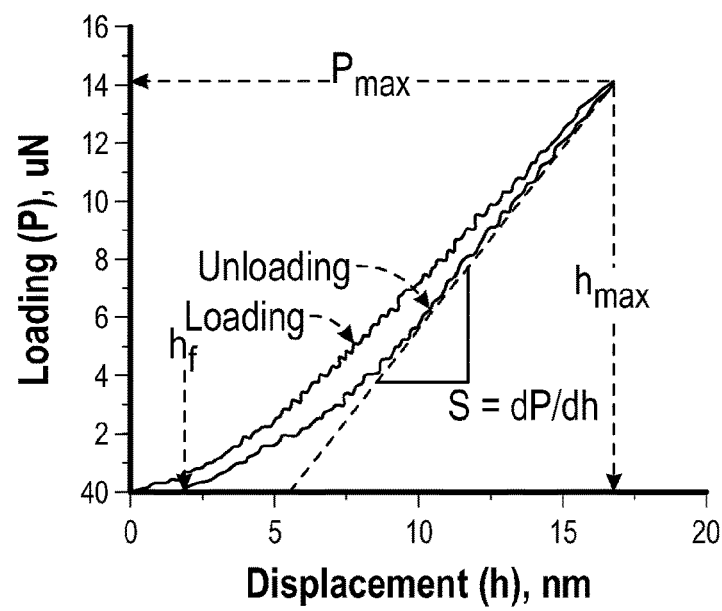
FIG. 24 shows an example of a loading-displacement curve (KL-LH-Insol.) from nanoindentation in Example 1.

FIG. 24 shows an example of a loading-displacement curve (KL-LH-Insol.) from nanoindentation. $P_{max}$ is the maximum loading, $h_{max}$ is the maximum displacement, $h_f$ is the final displacement, S is the stiffness. The stiffness (S) in Equation (3) is given by S=dP/dh as shown in FIG. 24, which P and h are loading and displacement, respectively. The relationship between the reduced elastic modulus (Er) and Young's modulus is shown in the Equation (4).

$$\frac{1}{E_r} = \frac{(1\, v_i^2)}{E_i} + \frac{(1\, v_s^2)}{E_s} \qquad \text{Equation (4)}$$

where $E_i$ and $E_s$ are the Young's modulus of indenter (1140 GPa) and sample respectively, $v_i$ and $v_s$ are the Poisson's ratio of indenter (0.07) and sample respectively.

An improved reduced elastic modulus thus indicated a potential higher Young's modulus in macroscopic applications.

The hardness (H) was calculated as in equation (5):

$$H = \frac{P_{max}}{A} \qquad \text{Equation (5)}$$

where H is given as hardness, Pmax is the maximum force as shown in FIG. 24.

Figure 25:
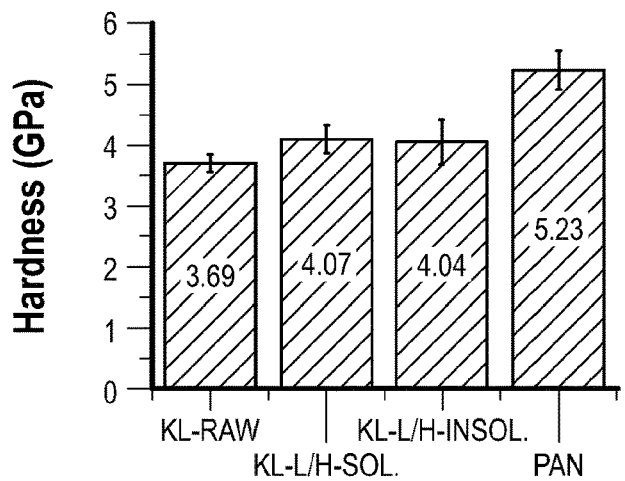
FIG. 25 depicts the calculated hardness of carbon fibers measured by nanoindentation in Example 1.

FIG. 25 depicts the calculated hardness of carbon fibers measured by nanoindentation. Carbon fiber made of laccase-HBT treated lignin and PAN had increased hardness than carbon fiber made of untreated Kraft lignin, suggested their greater resistances to plastic deformation under indentation. However, pure PAN-based carbon fiber had the highest hardness, which could be attributed to its highest pre-graphitic carbon structure as revealed by Raman spectroscopy (FIG. 12B).

TABLE 5

Comparison of Reduced Elastic Modulus of Carbon Fiber in Example 1 with Published Elastic Modulus of Commericial Carbon Fibers as Measured by Nanoindentation

| Carbon fiber | Vendor | Fiber precursor | Reduced modulus (GPa)* |
|---|---|---|---|
| K637 | Mitsubishi | Pitch | 10.7 ± 3.1 |
| M40J | Toray | PAN | 15.0 ± 4.9 |
| M46J | Toray | PAN | 14.0 ± 4.7 |
| M46J | Toray | PAN | ~14 GPa |
| T700SC | Toray | PAN | 23.17 ± 1.27 |
| Lignin micro-particles | Herein | Kraft lignin | 8.2 ± 3.04 |
| Inventive Lignin Based Carbon Nanofiber | Herein: Example 1 | Kraft lignin/PAN (Laccase-HBT) | 21.8 ± 1.3 |
| Inventive Lignin Based Carbon Nanofiber | Herein: Example 2 (below) | Kraft lignin/PAN (Laccase-HBT/dialysis) | 21.7 ± 2.0 |
| Inventive Lignin Based Carbon Nanofiber | Herein: Example 3 (below) | Kraft Precipitated Lignin | 22.0 ± 2.2 |

*all reduced elastic modulus in this table were measured by nanoindentation at the transverse direction of carbon fibers Discussion In this Example 1, lignin was produced with an efficient enzyme-mediator system to derive fractions that are suitable for producing quality carbon fibers. The electron mediators, such as HBT, can enhance the laccase-based redox reaction to release the small MW lignin and provide a high MW fraction (FIG. 10B). The fractionalization improved spinnability of precursor fibers made from lignin and PAN, and the carbon structure and mechanic performance of carbon fiber derived from the precursor fibers. The enzyme-mediator processing as described in this Example 1 provides a new avenue for using lignin as a renewable feedstock for the production of quality carbon fiber. In particular, structural changes in lignin provided by the enzyme-mediator treatment provide precursor lignin that can be utilized to improve the performance of carbon fiber produced via the enzyme-mediator method.

First, and without wishing to be limited by theory, the decreased content of —OH group in the fractionated lignin could improve the miscibility of lignin with non-polar solvent and plasticizing polymer, which in turn can enhance the interfacial bonds between polymers. Laccase-HBT treatment resulted in the oxidation of —OH group or ring opening to reduce the phenolic —OH group. The reduced —OH content could enable the better alignment of lignin along the PAN fiber to improve both miscibility and the pre-graphitic turbostratic structure. In addition, —OH can form —C=N— linkage with —C≡N group in PAN to disturb the cyclization reaction of PAN molecules during carbonization process. The decrease in lignin —OH group thus could benefit carbon fiber in multiple ways to enhance miscibility (FIG. 12A) and mechanic performance (FIG. 12D).

Second, and without wishing to be limited by theory, lignin fractions with different MW could improve the alignment and/or orientation of polymer structure. Low MW lignin often induces non-uniform defects in carbon fiber, as shown in the 'beads' structures in FIG. 11 panels (a) and (d).

The carbon fiber made from low MW polymer may contain more amorphous regions and defects like chain ends and entanglements, which can decrease the fiber mechanical performance. For the insoluble lignin fraction, the removal of low MW lignin could result in a fraction that mainly contains high MW lignin (FIG. 10B), which can be better integrated with PAN for carbon fiber formation. The better aligned structure in turn could reduce the fiber defects and improve the content of turbostratic structures, as well as the mechanic performance.

Third, without wishing to be limited by theory, the changes of chemical linkages in lignin might also have an impact on the interaction of lignin with PAN molecules. Theoretically, less branchy and more linear precursor polymers could reduce the entanglement and the voids in fibers, which in turn could benefit the carbon fiber mechanical performance. Dibenzodioxocin (5-5/β-O-4/α-O-4) linkage decreased remarkably when comparing insoluble lignin with both raw lignin and soluble lignin. The β-O-4 bond in dibenzodioxocin (FIG. 14 structure D) is different from other linear β-O-4 linkage in β-aryl ether (FIG. 14 structure A), and it is formed from β-O-4 coupling following the 5-5 coupling to initiate the branchy point of lignin structure. With significantly decreased dibenzodioxocin linkage, the insoluble lignin fraction could have less branchy structures. β-O-4, β-5 and β-1 interunitery linkages are all considered as linear structures (FIG. 14). In particular, the β-O-4 as the main linkage in lignin was significantly increased in insoluble lignin after fractionation, which accompanied by the significant decrease in 5-5/β-O-4/α-O-4 linkage. The changes suggested that insoluble lignin was a more linear and less branched polymer, particularly suitable for use as precursor lignin for carbon fiber manufacture. The improvement of lignin structure in insoluble lignin fraction could improve the formation of interconnection and interfacial bonding with PAN molecules, which in turn could facilitate molecular alignment during spinning and thus improve the spinnability of lignin polymer (FIG. 11), increase the content and size of turbostratic structure in carbon (FIG. 12B and FIG. 12C), and finally improve the mechanic performance of carbon fiber.

Overall, the real scientific challenge for lignin based carbon fiber lies in that the voids between polymers would lead to the drastic deterioration of mechanic strength. In contrast to the uniform structure of PAN, lignin is an aromatic polymer with branchy structure and diverse chemical functional groups and linkages. The mixture of PAN and lignin may lead to voids between two polymer molecules to diminish mechanic properties. The aforementioned lignin modification provided by enzyme-mediator fractionation f lignin to provide precursor lignin for carbon fiber manufacture may enhance the interfacial bonding and orientation between lignin and PAN in multiple ways to reduce such voids, thus further increasing the strength of the resulting carbon fiber.

Conclusion

Quality lignin based carbon fibers were fabricated in this Example 1 by utilizing an enzyme-mediator system to fractionate and modify raw lignin. The laccase-HBT treatment not only improved the structure of carbon fiber, but also delivered carbon fibers with similar mechanic performance to PAN-based carbon fiber. The water-insoluble lignin fraction derived from the enzymatic processing had larger molecular weight, less functional groups and more β-O-4 interunitery linkages, and served as a better carbon fiber precursor, although the water-soluble fraction can be utilized as lignin precursor, in embodiments. Mechanical testing showed that the insoluble lignin-derived carbon fiber had similar elastic modulus to commercial carbon fiber. XRD and Raman spectroscopy indicated that the improvement resulted from the enhanced crystallite microstructure in carbon. The mechanistic study demonstrated that fractionation and modification of lignin on its molecular weight, functional groups and structures were pivotal for making quality carbon fibers. The enzyme-mediator method described herein and exemplified in this Example 1 can be utilized to produce lignin based carbon fibers with similar elastic modulus to various commercial products, and thus opened new avenues for replacing the costly petroleum-based carbon fiber precursors with a broadly existing industrial waste. The lignin based carbon fiber can both provide sustainable value-added by-products for biorefinery, pulp and paper industries, and offer renewable and cost-effective alternatives for the broadly used carbon materials.

Example 2: Carbon Fiber Made From Enzyme-Mediator Fractionated Lignin and Dialysis Overview/Discussion Experiments were performed to determine if the lower optimal mechanical performance of conventional lignin based carbon fibers is caused by the inherent heterogeneity of lignin and to study how the molecular weights (MW) and uniformity of lignin will impact the performance of lignin based carbon fiber. In this Example 2, lignin was fractionated into fractions with different MW and polydispersity index (PDI). An enzyme-mediator-based method and a dialysis method were developed to derive lignin fractions with increased MW and decreased PDI. Lignin fractions were electro-spun into fibers after blending with polyacrylonitrile (PAN) at 1:1 (w/w) ratio. The fractionation in general improved the spinnability of lignin to allow us to obtain finer lignin based carbon fibers. The elastic modulus of lignin carbon fibers, as measured by nanoindentation, was increased as the lignin MW increased and as PDI decreased. The scatter plot and linear regression revealed very good correlation between the elastic modulus and PDI, as well as certain correlation between the elastic modulus and MW. XRD and Raman spectroscopy revealed that the crystallite size and the content of the pre-graphitic turbostratic carbon were increased with higher lignin MW and lower PDI, revealing the mechanism of the improvement in carbon fiber mechanical performance.

In this Example 2, lignin was fractionated into fractions with different molecular weights and uniformity to see how molecular weight and polydispersity index (PDI) of lignin could impact the mechanical performance of lignin based carbon fiber. In this Example 2, lignin fractions with different MW and PDI were produced by combining enzyme-mediator treatment (e.g., as described hereinabove and with regard to Example 1) and dialysis. Specifically, with reference to FIG. 4 and FIG. 10A, an enzyme-mediator system with laccase and 1-hydroxybenzotriazole hydrate (HBT) was used to fractionate (at 100A) industrial Kraft lignin (KL) 10 into a water-soluble fraction 20 and water-insoluble fraction 30, abbreviated as KL-L/H-Sol. and KL-L/H-Insol., respectively. The water-soluble lignin fraction had much decreased MW and demonstrated to be amenable to efficient bioconversion into lipid by bacteria. However, the water insoluble fraction is not suitable for such bioconversion; the utilization of this insoluble fraction will enable more complete usage for waste lignin for multiple product streams. Considering the increased MW and decreased PDI, it was hypothesized that the water insoluble fraction of lignin could be used to produce carbon fiber with improved mechanical performance, as the larger and more uniform lignin molecules may interact better with PAN to form more crystalline structures. In addition, it was hypothesized that molecular weight and uniformity had an impact on the mechanical performance of lignin based carbon fiber. In order to evaluate the hypothesis, the insoluble lignin fraction derived from laccase/HBT treatment was dialyzed with dialysis tubes of different molecular weight cutoff to derive lignin fraction with various MW and PDI for carbon fiber production (FIG. 4).

Figure 26A:
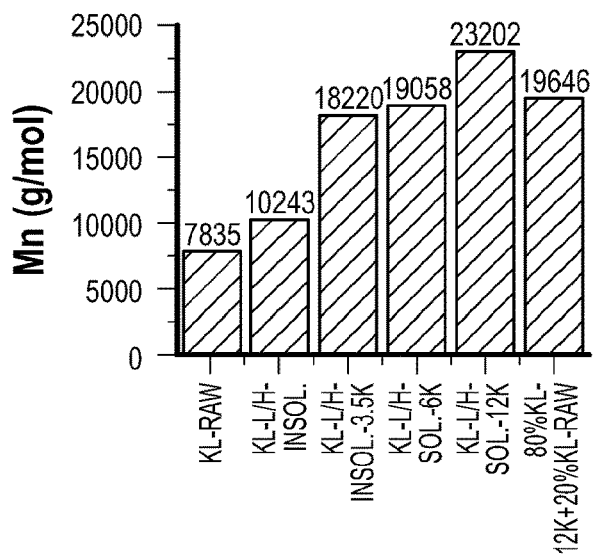
FIG. 26A is a plot of the molecular weight of fractionated Kraft lignin (KL) measured by GPC in Example 2.
Figure 26B:
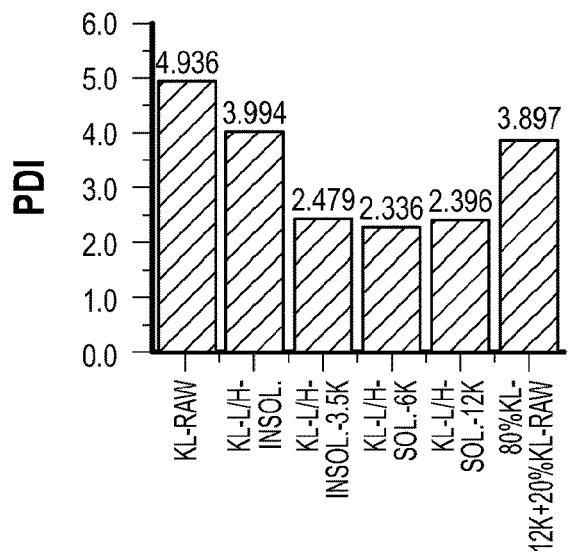
FIG. 26B is a plot of the polydispersity index (PDI) of fractionated Kraft lignin (KL) measured by GPC in Example 2.
Figure 27A:
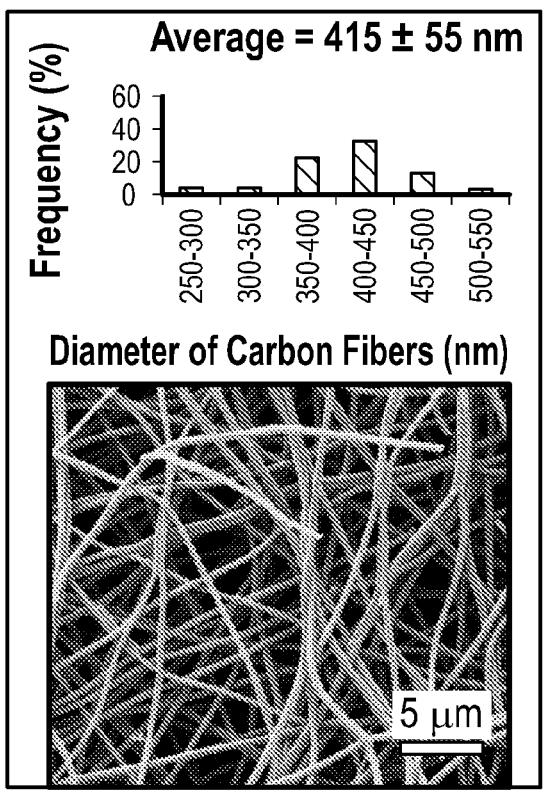
FIG. 27 shows SEM images of carbon fibers from electrospun lignin and PAN; panel (a) shows results for KL-Raw; panel (b) shows results for KL-LH-Insol.; panel (c) shows results for KL-L/H-Insol.-3.5K; panel (d) shows results for KL-L/H-Insol.-6K; panel (e) shows results for KL-L/H-Insol.-12K; panel (f) shows results for 80% KL-12K+20% KL-Raw; and panel (g) shows results for Pure PAN.
Figure 27B:
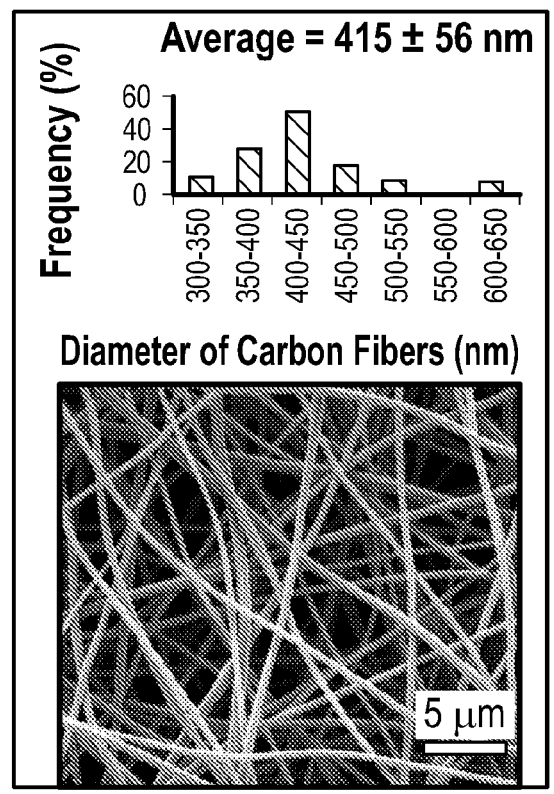
Figure 27C:
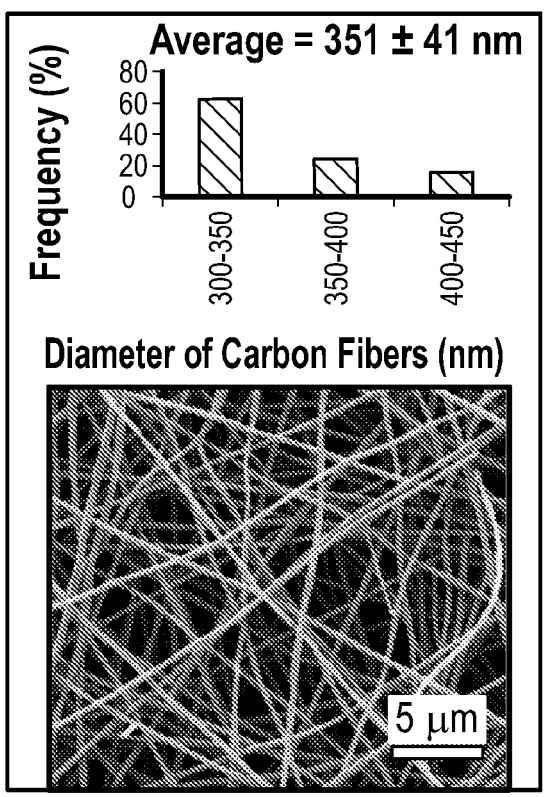
Figure 27D:
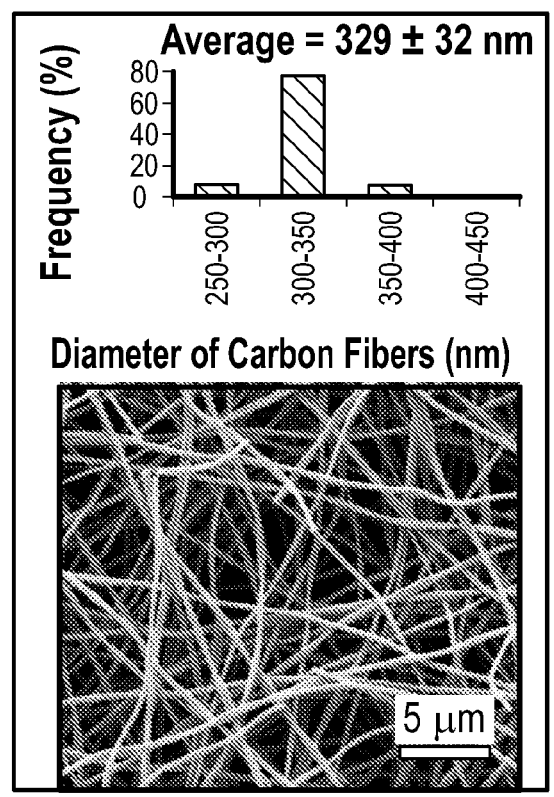
Figure 27E:
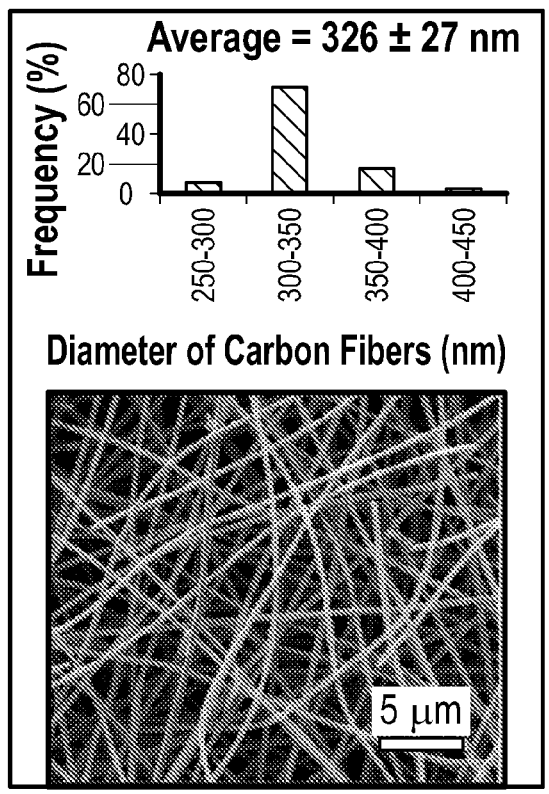
Figure 27F:
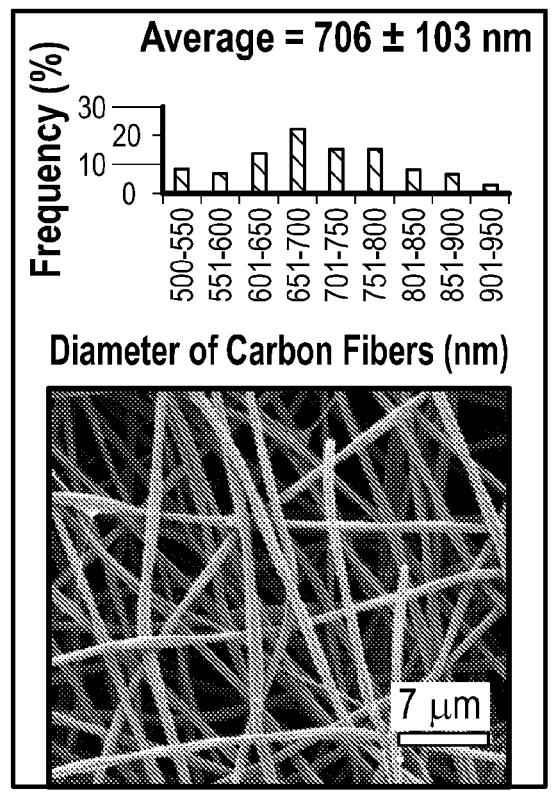
Figure 27G:
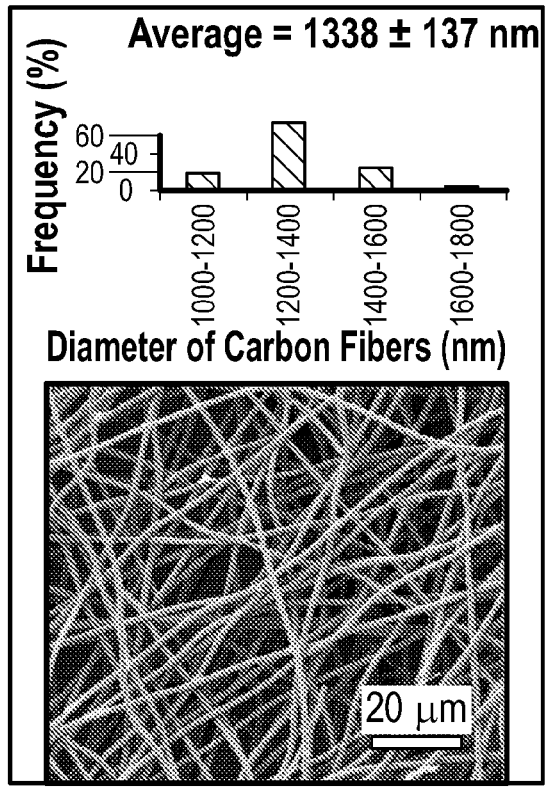

The molecular weight (B) and polydispersity index (PDI in C) of fractionated Kraft lignin (KL) were measured by GPC, and plotted in FIG. 26A and FIG. 26B, respectively. In the Figures, KL-Raw is raw Kraft lignin without any treatment and fractionation; KL-LH-Insol. is the water-insoluble lignin fraction from laccase/mediator processing; KL-L/H-Insol.-3.5K is the KL-L/H-Insol. after dialysis with 3.5K cutoff dialysis membrane; KL-L/H-Insol.-6K is the KL-L/H-Insol. after dialysis with 6-8K cutoff dialysis membrane; KL-L/H-Insol.-12K is the KL-L/H-Insol. after dialysis with 12-14K cutoff dialysis membrane; 80% KL-12K+20% KL-Raw comprises 80 w % of KL-L/H-Insol.-12K mixed with 20 w % of KL-Raw.

As shown in FIG. 26A, the insoluble fraction of laccase-HBT treated Kraft lignin displayed a 1.3-fold increment in molecular weight as compared to raw Kraft lignin according to GPC analysis. After dialyzing the insoluble lignin fraction with 3.5K cutoff dialysis tube (KL-L/H-Insol.-3.5K), molecular weight for the remaining insoluble lignin fraction increased nearly 1.8-fold as compared to raw Kraft lignin. These results suggested that the insoluble lignin fraction from laccase-HBT treatment still contains certain amount of small molecules, which can pass through the 3.5K cutoff dialysis tube. The molecular weight was further increased when dialyzing the insoluble fraction with 6-8K cutoff dialysis tube (KL-L/H-Insol.-6K). The PDI of the aforementioned lignin fractions were decreased in response to the increased molecular weights (FIG. 26A), especially when lignin was dialyzed with 3.5K cutoff tube. When the insoluble lignin was dialyzed with 12-14K cutoff dialysis tube, the resultant lignin fraction (KL-L/H-Insol.-12K) reached highest molecular weight (23202 g/mol) (FIG. 26A), yet remained the same PDI as that of KL-L/H-Insol.-6K (FIG. 26B). The unique feature of constant PDI and increased MW for KL-L/H-Insol.-12K as compared to KL-L/H-Insol.-6K allows us to distinguish the impacts of MW and uniformity on mechanical performance. Overall, the dialysis technology along with enzyme-mediator treatment enabled us to derive several lignin fractions with increased MW. These lignin fractions were more uniform and homogeneous than the raw and unfractionated industrial Kraft lignin. The aforementioned fractions along with the controls were used to make lignin fibers via electrospinning after blending with PAN at 1:1 (w/w) ratio (FIG. 7), and to go through thermostabilization at 250° C. (FIG. 9A) and carbonization at 1500° C. (FIG. 9B) to produce carbon fibers.

Morphological analysis of the resultant carbon fibers suggested significantly improved spinnability for the lignin fractions derived from dialysis. Scanning electron microscopy (SEM) analysis was carried out to measure the carbon fiber morphology. FIG. 27 shows SEM images of carbon fibers from electrospun lignin and PAN; panel (a) shows results for KL-Raw; panel (b) shows results for KL-L/H-Insol.; panel (c) shows results for KL-L/H-Insol.-3.5K; panel (d) shows results for KL-L/H-Insol.-6K; panel (e) shows results for KL-L/H-Insol.-12K; panel (f) shows results for 80% KL-12K+20% KL-Raw; and panel (g) shows results for Pure PAN. The diameter of the carbon fiber made of insoluble lignin after laccase-HBT processing (KL-L/H-Insol.) was 415 nm (FIG. 27, panel (b)), and the diameter decreased to 351 nm (panel (c)), 329 nm (panel (d)), and 326 nm (panel (e)) for the lignin fractions derived from dialysis with 3.5 K (KL-L/H-Insol.-3.5K), 6-8 K (KL-L/H-Insol.-6K), and 12-14K (KL-L/H-Insol.-12K) cutoff dialysis tubes, respectively. Moreover, the carbon fibers from dialyzed lignin were more uniform. The distributions of carbon fiber diameters were as shown in the histograms in FIG. 27. For the carbon fibers derived from dialyzed lignin fractions (panels (c)-(e)), most of the carbon fibers were between 300-350 nm. The frequencies of 300-350 nm fibers were 62.5%, 77.5%, and 72.5% for KL-L/H-Insol.-3.5K, KL-LH-Insol.-6K, and KL-L/H-Insol.-12K, respectively. The percentages for the most frequent 50 nm diameter range were much higher than that for both KL-Raw at 45% (panel (a)) and KL-L/H-Insol. at 52.5% (panel (b)). The results highlighted that the carbon fibers made of dialyzed lignin fraction are more uniform. Interestingly, 60% of PAN carbon fibers were in 1200-1400 nm range. Without wishing to be limited by theory, high viscosity resulting from the very high MW of PAN (150,000 g/mol) could attribute to the large diameter of PAN-based carbon fiber. Overall, the results highlighted that the lignin fractions with higher and more uniform molecular weights could significantly improve the spinnability of lignin and the morphology of resultant carbon fiber.

Figure 28A:
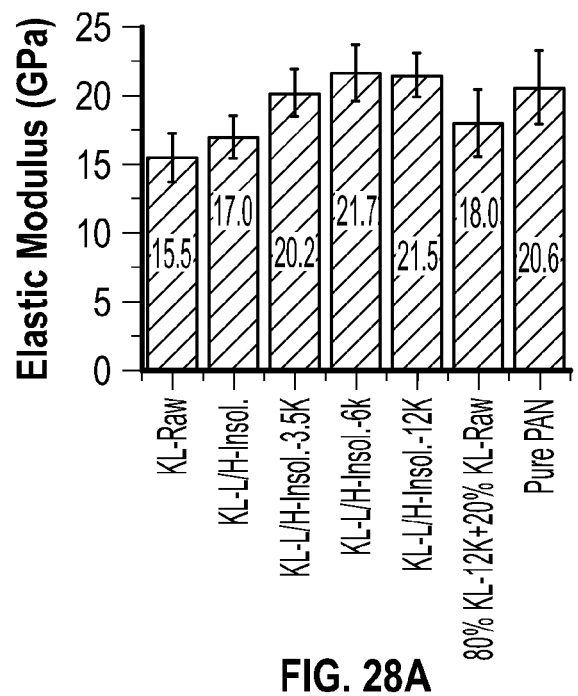
FIG. 28A shows the elastic modulus of lignin based carbon fibers of Example 2.
Figure 28B:
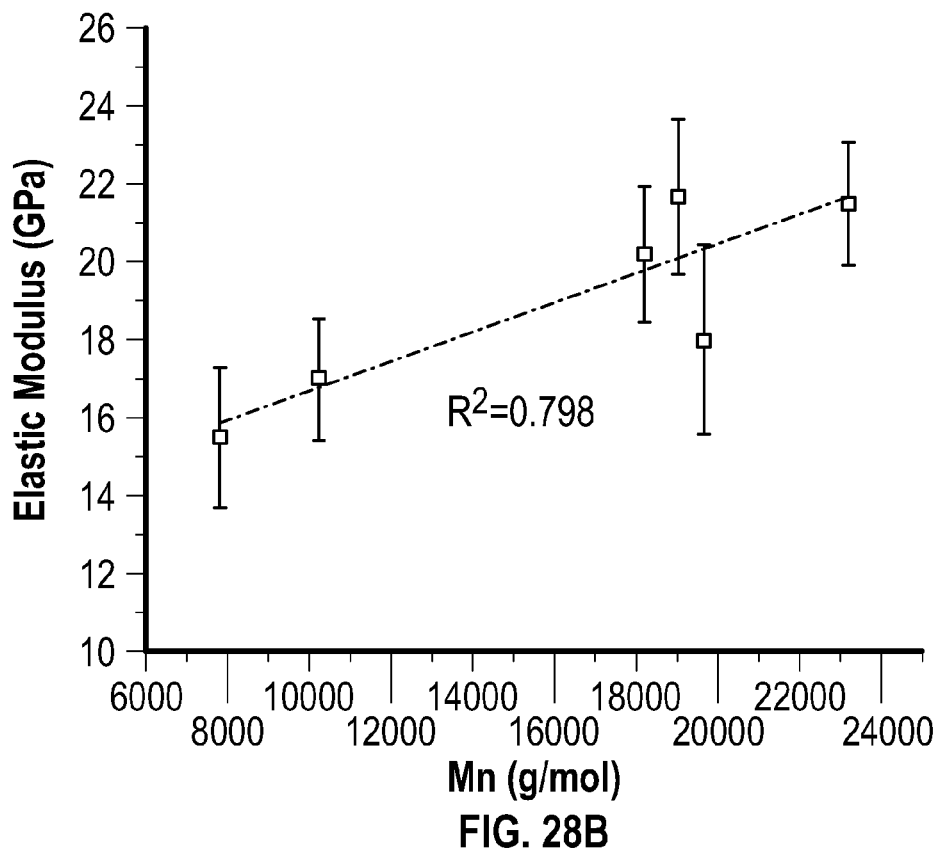
FIG. 28B shows the correlation of the elastic modulus with lignin molecular weights.
Figure 28C:
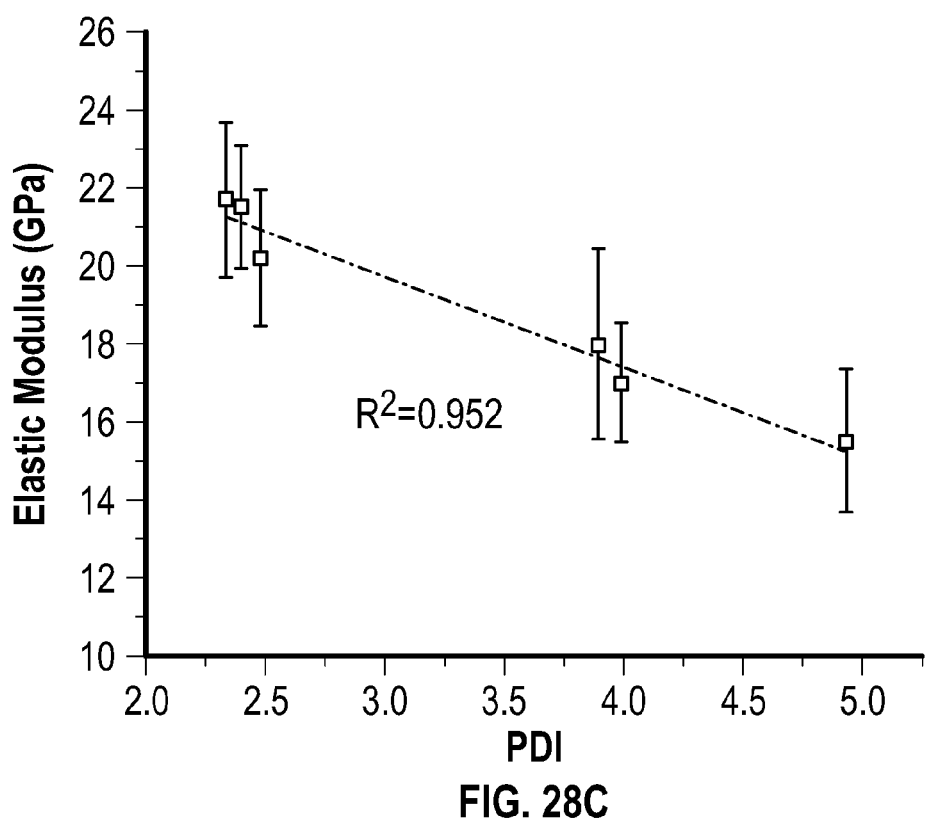
FIG. 28C shows the correlation of the elastic modulus with PDI.

The improved carbon fiber morphology correlated with enhanced mechanical performances as measured by nanoindentation. FIG. 28A shows the elastic modulus of lignin based carbon fibers; FIG. 28B shows the correlation of the elastic modulus with lignin molecular weights; and FIG. 28C shows the correlation of the elastic modulus with PDI. As shown in FIG. 28A, elastic modulus of carbon fiber made of laccase/HBT treated lignin (KL-L/H-Insol.) was increased from 17.0 GPa as compared to 15.5 GPa for raw lignin (KL-Raw). The elastic modulus further increased to 20.2 GPa and 21.7 GPa when using the lignin fractions dialyzed through 3.5K (KL-L/H-Insol.-3.5K) and 6-8K (KL-L/H-Insol.-6K) cutoff dialysis tube, respectively. In particular, carbon fiber made of lignin fraction with the highest molecular weight (KL-L/H-Insol.-6K) has the highest elastic modulus at 21.7 GPa, which represented a 40% increase as compared to that of raw/untreated Kraft lignin (15.5 GPa for KL-Raw). Moreover, the carbon fiber derived from the KL-L/H-Insol.-6K fraction has elastic modulus even higher than that of carbon fiber made of pure PAN (20.6 GPa) and was comparable to the modulus of commercial petroleum-based carbon fiber (Table 5). The results highlighted that the further fractionation of lignin and the removal of low molecular weight lignin fraction could significantly improve the mechanical performance of lignin based carbon fiber.

Besides molecular weight, PDI is another important consideration for lignin characteristics, indicating the level of uniformity or homogeneity of the lignin molecules. As shown in FIG. 28C, both laccase-HBT treatment and dialysis fractionation can decrease PDI. In other words, the fractionation by the two methods can both improve the uniformity or homogeneity of lignin. In general, the mechanical performance for lignin based carbon fiber increases with PDI decreases (FIG. 28C). In other words, the more uniform the lignin fraction is, the better is the mechanical performance. The mechanical performance for KL-L/H-

Insol.-6K and KL-L/H-Insol.-12K helped to elucidate the impact of MW vs. PDI on lignin based carbon fiber performance, considering that KL-L/H-Insol.-12K had increased molecular weight but similar molecular uniformity as compared to KL-L/H-Insol.-6K (FIG. 26A and FIG. 26B). Interestingly, the elastic modulus of carbon fiber made of KL-L/H-Insol.-12K (21.5 GPa) was similar with that of KL-L/H-Insol.-6K (21.7 GPa, FIG. 28A), indicating enhanced relevance of elastic modulus to PDI. Based on this result, and without wishing to be limited by theory, it appears that PDI can impact the elastic modulus of lignin based carbon fibers more significantly than MW.

Figure 30:
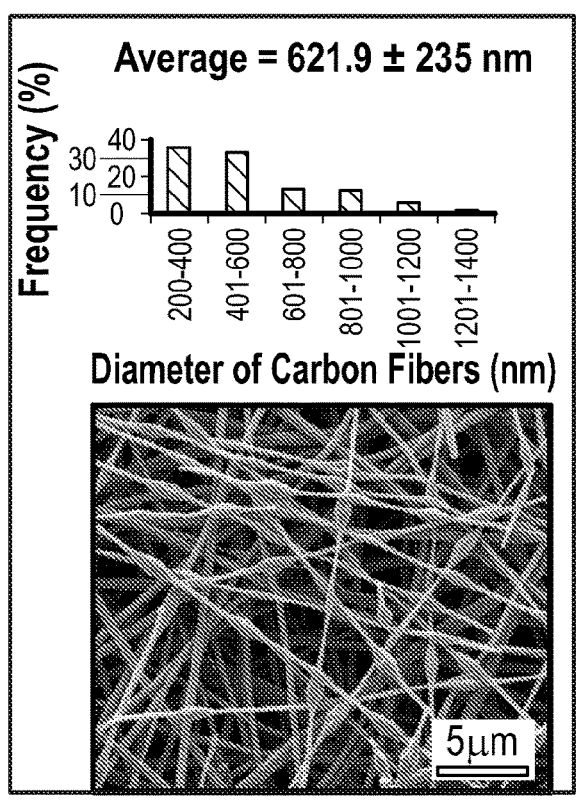
FIG. 30 is a SEM image of the carbon fiber of Example 2 made from the mixed lignin fraction (50 w % of KL-L/H-Insol.-12K mixed with 50 w % of KL-Raw)

To further evaluate the impact of MW and PDI, two more lignin fractions were prepared with similar PDI but different molecular weights. First, 80 w % of KL-L/H-Insol.-12K (lignin with the highest molecular weight) was mixed with 20 w % of KL-Raw (lignin with the lowest molecular weight). The resultant lignin fraction, abbreviated as 80% KL-12K+20% KL-Raw, had similar molecular weight (19,646 g/mol) with KL-L/H-Insol.-6K (FIG. 26A), but much higher PDI (3.897) than KL-L/H-Insol.-6K (FIG. 26B). The carbon fiber derived from this lignin fraction (80% KL-12K+20% KL-Raw) had elastic modulus of 18.0 GPa (FIG. 28A), which is significantly lower than that of KL-L/H-Insol.-6K (21.7 GPa). The result further suggested the correlation between lignin molecular uniformity and mechanical performance. On the other side, the PDI for 80% KL-12K+20% KL-Raw and KL-LH-Insol. are similar, yet the MW for 80% KL-12K+20% KL-Raw is much higher (FIG. 26A and FIG. 26B). The elastic modulus for 80% KL-12K+20% KL-Raw (18.0 GPa) is slightly higher than that of KL-L/H-Insol. (17.0 GPa), suggesting that MW also has an impact on mechanical performance. Second, 50 w % of KL-L/H-Insol.-12K was mixed with 50 w % of KL-Raw to derive 50% KL-12K+50% KL-Raw fraction. Although the resultant lignin fraction (50% KL-12K+50% KL-Raw) had larger molecular weight (15955 g/mol) than KL-Raw (7835 g/mol, FIG. 26A), the elastic modulus (15.8 GPa) of the carbon fiber made from 50% KL-12K+50% KL-Raw is similar with that of KL-Raw (FIG. 28A). Moreover, carbon fiber made of 50% KL-12K+50% KL-Raw had many 'beads' defects and a wide diameter distribution (FIG. 30, described further hereinbelow). Again, the poor fiber morphology and mechanical performance could be attributed to the poor molecular uniformity of this lignin fraction (50% KL-12K+50% KL-Raw), of which the PDI (4.964) is even higher than that of KL-Raw (FIG. 26B). The poor molecular uniformity rendered the poor spinnability, and thus led to 'beads' defects and wide diameter distribution. Overall, these data further suggested that molecular uniformity has a significant impact on the morphology and mechanical performance of lignin based carbon fiber.

In order to further quantify the impact of molecular weight and uniformity on mechanical performance of lignin based carbon fiber, a scatter plot of elastic modulus vs. MW (FIG. 28B) or PDI (FIG. 28C) was prepared for all lignin fractions, and the data further fitted into linear regression. In fact, the linear regression of elastic modulus vs. molecular weight resulted in the correlation determination ($R^2$) at 0.789 (FIG. 28B), whilst the linear regression of elastic modulus vs. molecular weight showed a much more significant correlation between PDI and elastic modulus with $R^2$ equals to 0.952 (FIG. 28C). The results highlighted that even though the removal of low molecular weight lignin improves the elastic modulus of the lignin based carbon fiber, molecular uniformity of lignin plays a more important role in impacting the mechanical performance. In other words, although both higher molecular weight and more uniformity can contribute to improving mechanical performance of lignin based carbon fiber, lignin uniformity can have a more significant impact on carbon fiber spinnability, morphology, and/or mechanical performance across different molecular weights.

Materials

The industrial Kraft lignin (with low sulfonate content, catalog number: 370959) was purchased from Sigma-Aldrich (USA). Polyacrylonitrile (PAN) with molecular weight of 150,000 was obtained from Pfaltz & Bauer, USA. The enzyme (laccase from *Trametes versicolor*, 0.5 U/mg, catalog number: 38429) and other chemicals and reagents used in this research are the products of Sigma-Aldrich (USA).

Enzymatic Processing of Kraft Lignin

The enzymatic processing of Kraft lignin was carried out substantially as described in Example 1 above. Briefly, Kraft lignin was treated with laccase (15 mg/g lignin) and 1-hydroxy benzotriazolehydrate (HBT, 25 mg/g lignin) at a 10 wt % concentration for 48 h in a BIOSTAT® A reactor (Sartorius, Bohemia, NY). The oxygen was supplied to lignin solution with a flow rate at 5 ccm. The temperature and the stirring speed were controlled at 50° C. and 200 rpm, respectively. After the treatment, the lignin sample was centrifuged to render water-insoluble and water-soluble fractions. The water-insoluble fraction was washed with 200 mL of iced deionized water for three times before centrifugation and lyophilization for dry lignin powders.

As shown in FIG. 10A, HBT served as the electron mediator in the system and, without wishing to be limited by theory, could improve the fractionation of lignin by accelerating the electron transfer and facilitate the redox reaction penetration into macromolecule during the oxidation by laccase. The water-soluble fraction was depolymerized lignin with approximately 30 w % of raw Kraft lignin, whilst water-insoluble fraction yielded about 70 w %.

Fractionation of Lignin with Dialysis

Five grams of the water-insoluble lignin fraction from the laccase/HBT processing was dissolved in 100 mL of 0.03 N aqueous NaOH solution. The lignin solution was then transferred into regenerated cellulose dialysis tubes (Fisher Scientific, USA) with 3 500 (3.5K), 6 000-8 000 (6K), and 12000-14000 (12K) nominal molecule weight cutoff, respectively. Lignin was dialyzed against 2 L of MilliQ water for one week with the exchange of fresh MilliQ water every day. The dialyzed was precipitated by adjusting its pH into 2 with 1 M hydrochloric acid solution. After 1 h stirring for completely precipitation, dialyzed lignin sample can be obtained by centrifugation (25 000 g) and lyophilization. The yields of lignin fractions processed by dialysis are 82.0%, 73.0%, and 64.6% for 3.5K, 6K, and 12K cutoff dialysis tubes, respectively.

Gel Permeation Chromatography (GPC)

Before GPC characterization, all lignin samples were acetylated to obtain acetylated lignin. GPC analysis was performed using an OMNISEC system (Malvern Instrument Ltd., Houston, TX). Two D6000 and one T2000 Viscotek D-Columns (Malvern, Houston, TX) were connected in series. Column temperature was set at 45° C. Tetrahydrofuran (THF) was used as the eluent at a flow rate of 1.0 mL/min. RI detector, UV detector (280 nm), and a viscometer installed in the OMNISEC REVEAL system was used for monitoring fractions. The acetylated lignin was dissolved in THF with the concentration of 1 mg/mL, and 100 µL of the samples was injected into the GPC system after filtration with 0.45 μm membrane filter (VWR, Houston, TX). Universal calibration curve was established with polystyrenes as standards.

We observed a significant batch-to-batch difference of molecular weight for the lignin samples. Commercial lignin as a byproduct of pulping mills has unpredictable specifications since numerous process variations like cooking conditions could affect the final production of lignin. Nevertheless, the increment in lignin molecular weight after laccase/HBT treatment was consistent for the same batch of lignin, suggesting the liability of the GPC measurement. The molecular weight (Mn) and PDI of water-insoluble and dialyzed lignin fractions are shown in FIG. 26A and FIG. 26B, respectively. The water-soluble lignin fraction in this research had the Mn of 3375 g/mol and PDI of 2.642, which were remarkably decreased as compared to the raw Kraft lignin.

TABLE 6

MW (g/mol) of Lignin Fractions

| KL-Raw | KL-L/H-Insol. | KL-L/H-Insol.-3.5K | KL-L/H-Insol.-6K | KL-L/H-Insol.-12K | 80% KL-12K + 20% KL-Raw |
|---|---|---|---|---|---|
| 38674 | 40911 | 45167 | 44519 | 55592 | 76560 |

Abbreviations of lignin fractions are in the text.

Electrospinning

Lignin precursor fibers were produced via electrospinning (FIG. 7). Briefly, the grounded lignin and PAN powders were mixed at a ratio of 1:1 (w/w) and then dissolved in DMF to render a 15 w % solution. Lignin/PAN mixture was then loaded in a 10 mL syringe with a 22 gauge (i.d. 0.70 mm, length 38 mm) stainless steel blunt needle (Terumo, Yokohama, Japan). Electrospinning was carried out in a nanofiber electrospinning unit (Kato Tech Co., Ltd., Kyoto, Japan) at the followed conditions: Solution feed rate, 0.25 mL/h; applied voltage, 9.5 kV; the distance between the syringe needle and the aluminum disc, 17 cm. The formed fiber mat was picked off from the aluminum foil and then kept in desiccator.

Thermostabilization and Carbonization

Both thermostabilization and carbonization of lignin precursor fibers were conducted in a split tube furnace with vacuum system (GSL 1600X, MTI Corporation, Richmond, CA). The heating processes for thermostabilization and carbonization are shown in FIG. 9A and FIG. 9B, respectively. Thermostabilization was carried out in air environment, whilst the carbonization was performed under $N_2$ atmosphere (240 $cm^3$/min) after exchanging the air in the tube furnace with nitrogen gas three times by purging with vacuum pump to 10-2 torr.

Field Emission Scanning Electron Microscope (FE-SEM)

Images for the morphologies of carbon fibers were taken with a FEI Quanta 600F FE-SEM (FEI Company, Hillsboro, OR). The fibers were coated with Au/Pd (10 nm thickness) with a Cressington 208 HR sputter coater (TED PELLA INC., Redding, CA). The working distance was 10 mm, and the accelerating voltage was 5 kV. The diameters of carbon fibers were measured using ImageJ software. The reported diameters were the average data of at least 40 different carbon fibers. The morphologies of carbon fibers are displayed in both FIG. 27 and FIG. 30, which is a SEM image of the carbon fiber made from the mixed lignin fraction (50 w % of KL-L/H-Insol.-12K mixed with 50 w % of KL-Raw).

Nanoindentation

Elastic modulus and harness of carbon fibers were measured with Hysitron TI 950 Triboindenter (Minneapolis, MN). Before the measurement, fibers were embedded in EPOFIX™ epoxy resins (Electron Microscopy Science, Hatfield, PA), and then polished with a RMC Boeckeler MTX microtome (Boeckeler Instruments Inc., Tucson, AZ) and a EcoMet 3 grinder/polisher (Buehler, Lake Bluff, IL). As described in Example 1, the transverse sections of fibers were indented using a Cube Corner (90°) tip with 40 nm radius. The calibration of the tip was performed on a fused quartz standard. The indentation depth was set at 15-20 nm to avoid the effects of substrate (resin) on the measurement. Twenty-five indents were conducted on five different carbon fibers for each sample selected under SPM imaging. The reduced elastic modulus ($E_r$) and the hardness (H) were obtained as described in Example 1 hereinabove. The reduced elastic modulus of this Example 2 is included in Table 5 of Example 1 hereinabove.

FIGS. 23 and 24 show an example (KL-L/H-Insol.) of topography of scanning probe microscopy (SPM) under nanoindentation (FIG. 23) and the loading-displacement curve (FIG. 24). $P_{max}$ is the maximum loading, $h_{max}$ is the maximum displacement, $h_f$ is the final displacement, S is the stiffness.

Figure 31:
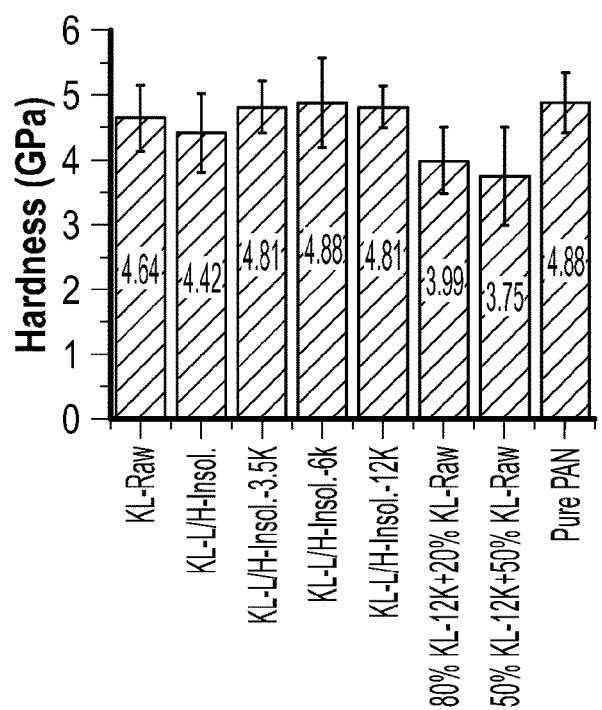
FIG. 31 is a plot of the hardness of the carbon fibers of Example 2.

FIG. 31 is a plot of the hardness of the carbon fibers of this Example 2. The hardness for all carbon fibers made from fractionated lignin did not show significant differences (FIG. 31). However, hardness was decreased when KL-Raw was added into KL-LH-Insol.-12K (both 80% KL-12K+20% KL-Raw and 50% KL-12K+50% KL-Raw in FIG. 31). Small molecules may render the decreases in the hardness. The relationship between the reduced elastic modulus ($E_r$) and Young's modulus is shown in the equation (4) above. However, the Poisson's ratio of the carbon fiber ($v_s$) is unknown in this Example 2, which makes the Young's modulus of the carbon fiber unknown.

Tensile Strength of Fiber Mat

The tensile strengths of carbon fiber mats were measured using a load cell configured on a stretching system. For the measurement, fiber mats were cut into pieces with about 3 mm in width and 12 mm in length, and then mounted on paper sheets with slots. The test was performed with the strain rate of 0.06/s and the acquisition rate of 100 Hz. Both force and displacement were recorded. To get a stress-strain curve, the area of fiber mat cross section was calculated as follows:

$$A_s = V_s/L_s, V_s = \rho_s/m_s \tag{Equation 6}$$

where $A_s$ is the area of sample cross section; $V_s$, $L_s$, $\rho_s$ and $m_s$ are the volume, length, density and weight of the sample, respectively. All measurements were repeated three times.

Figure 32:
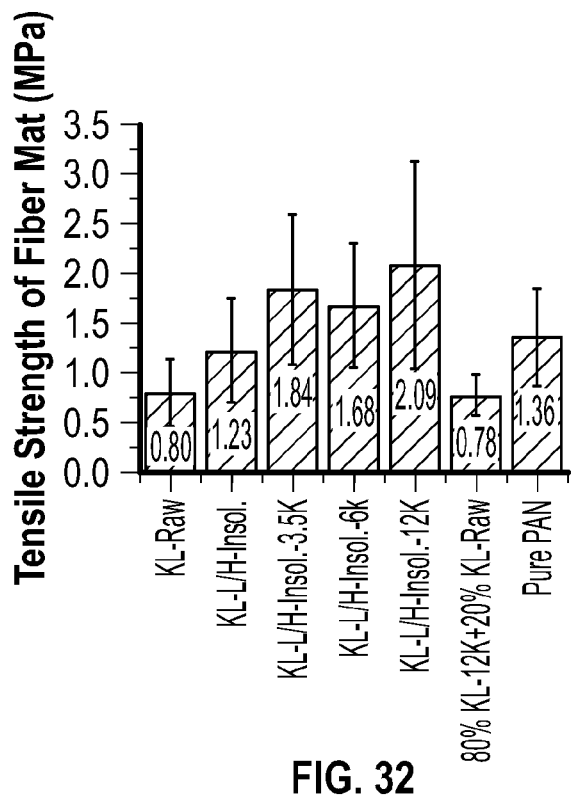
FIG. 32 is a plot of the tensile strength of the carbon fiber mats of Example 2.

FIG. 32 is a plot of the tensile strength of the carbon fiber mats of this Example 2. As shown in FIG. 32, tensile strengths of carbon fiber mats made from dialyzed lignin fractions (KL-L/H-Insol.-3.5K, KL-L/H-Insol.-6K, and KL-L/H-Insol.-12K) were higher than that of KL-Raw, suggesting that the removal of small lignin molecules could improve the tensile strength of fiber mats. Moreover, fiber mat made of more uniform lignin fractions (KL-L/H-Insol.-3.5K, KL-L/H-Insol.-6K, and KL-L/H-Insol.-12K) had higher tensile strength as compared to the less uniform fractions (KL-Raw, KL-LH-Insol., and 80% KL-12K+20% KL-Raw). The results from tensile strength of fiber mats well corroborate the data from nanoindentation to indicate that lignin uniformity could improve the mechanical performance of lignin based carbon fiber.

Thermogravimetric Analysis (TGA) and Differential Scanning Calorimetry (DSC)

Both TGA and DSC were performed on thermostabilized lignin precursor fibers. TGA measurement was conducted using TA Instruments Q600-SDT system (New Castle, DE) under $N_2$ atmosphere (100 mL/min) with the heating rate of 10° C./min from room temperature to 1450° C. DSC analysis was performed using TA Instrument DSC-Q2000 system with two heating cycles under a nitrogen atmosphere. Fibers were heated from room temperature to 350° C. at the heating rate of 20° C./min and then cooled down to 0° C. with a rate of 20° C./min. The second cycle was repeated at the same heating/cooling condition.

Figure 33A:
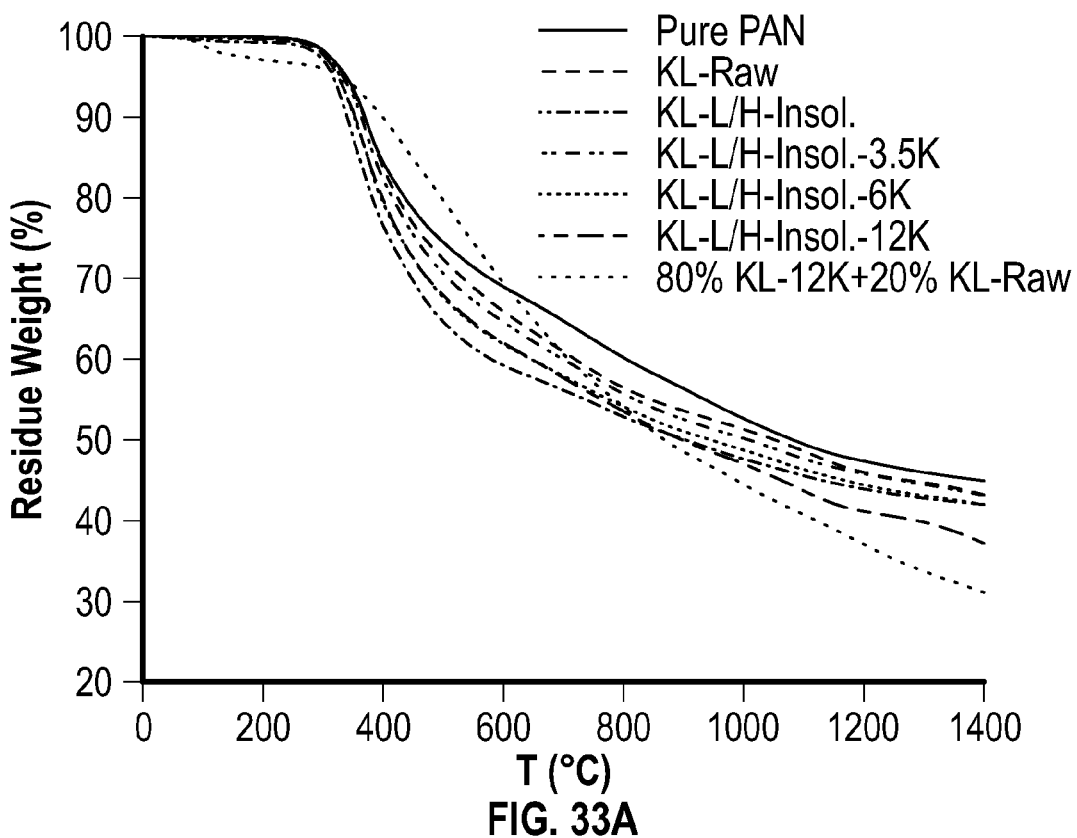
FIG. 33A is a plot of TGA of thermostabilized carbon fiber precursors of Example 2.
Figure 33B:
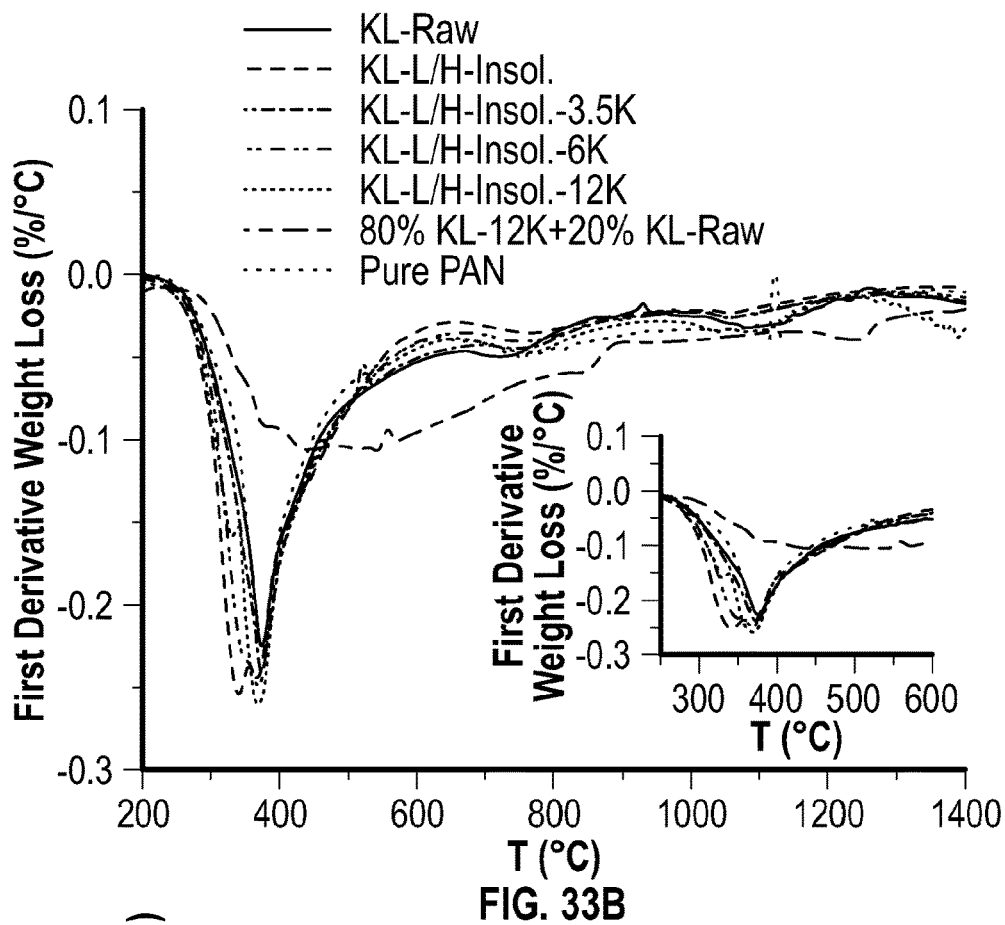
FIG. 33B is a plot of DTG of the thermostabilized carbon fiber precursors of Example 2; the inserted figure in FIG. 33B is the magnified DTG curve at 200-600° C.
Figure 34A:
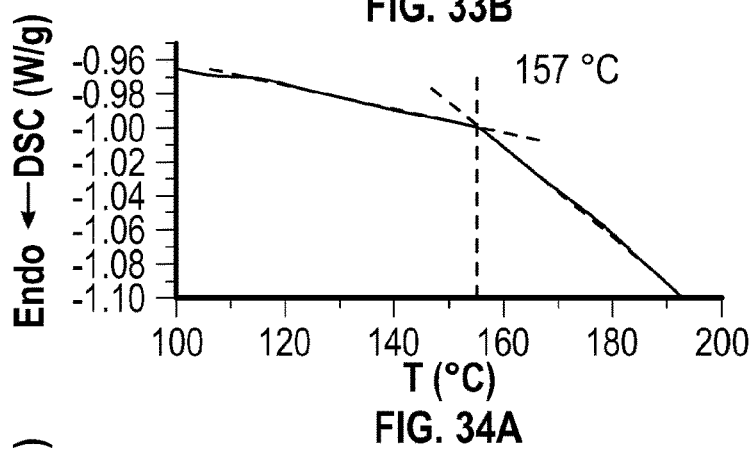
FIG. 34 shows heating flow curves derived from the second heating cycle of DSC analysis: panel (a) PAN; panel (b) KL-Raw; panel (c) KL-L/H-sol.; panel (d) KL-L/H-Insol.-3.5K; panel (e) KL-L/H-Insol.-6K; panel (f) KL-L/H-Insol.-12K; panel (g) 80% KL-12K+20% KL-Raw.
Figure 34B:
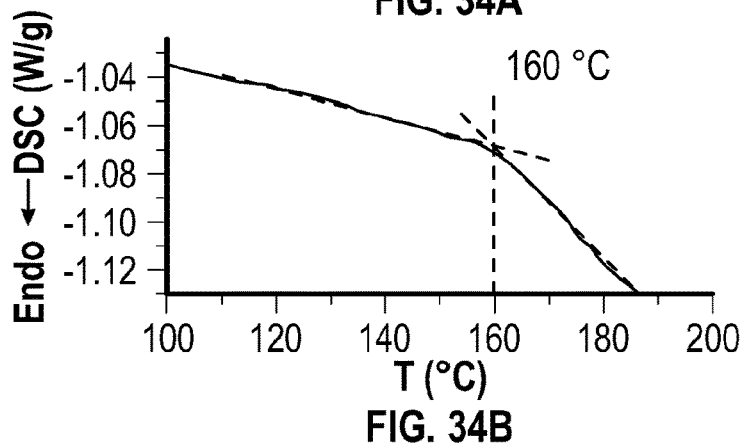
Figure 34C:
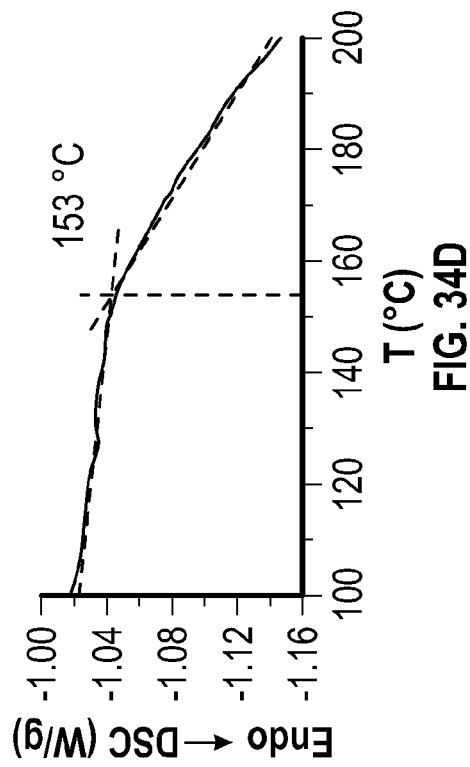
Figure 34D:
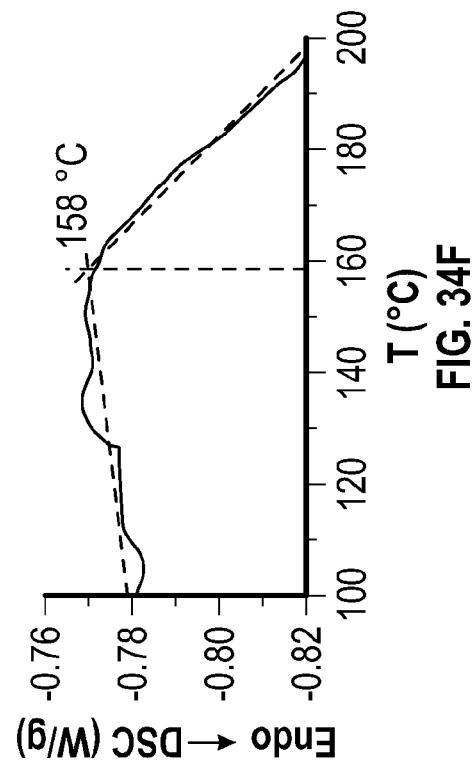
Figure 34E:
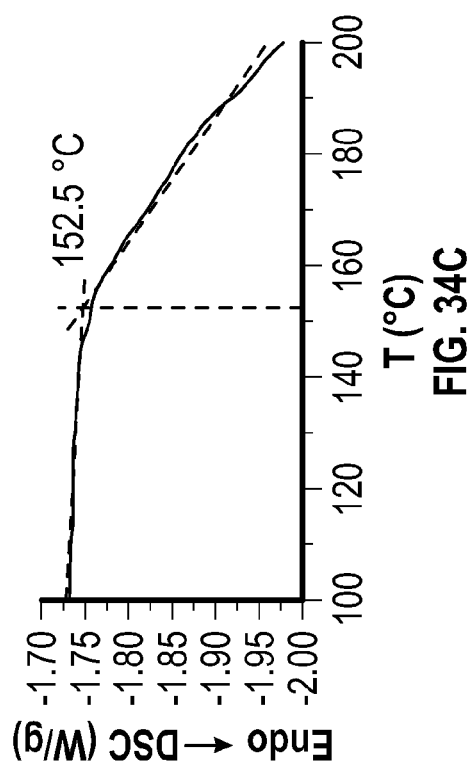
Figure 34F:
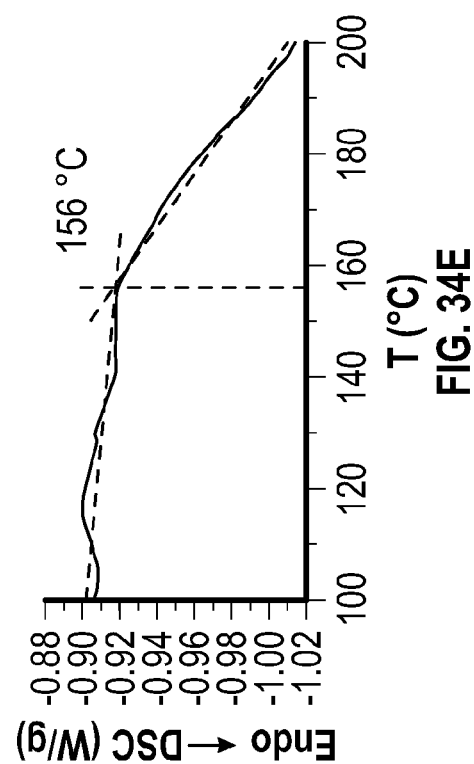
Figure 35A:
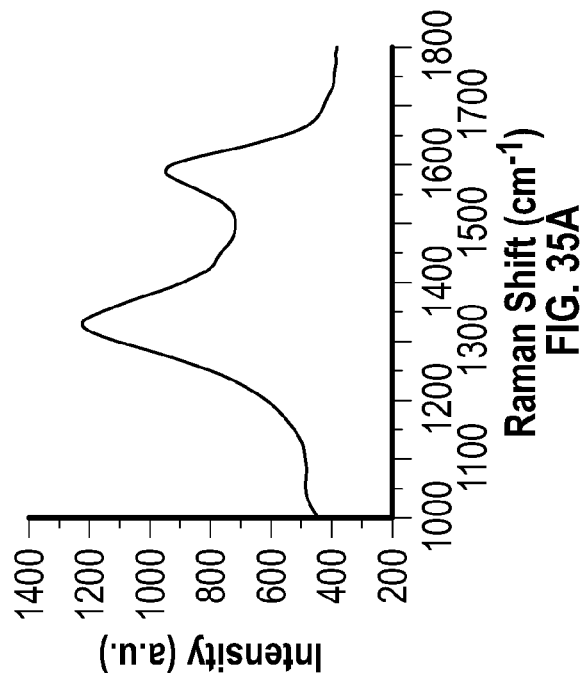
FIG. 35 shows Raman spectra of carbon fibers of Example 2: panel (a) KL-Raw; panel (b) KL-L/H-Insol.; panel (c) KL-L/H-Insol.-3.5K; panel (d) KL-L/H-Insol.-6K; panel (e) KL-L/H-Insol.-12K; panel (f) 80% KL-12K+20% KL-Raw; panel (g) pure PAN.
Figure 35C:
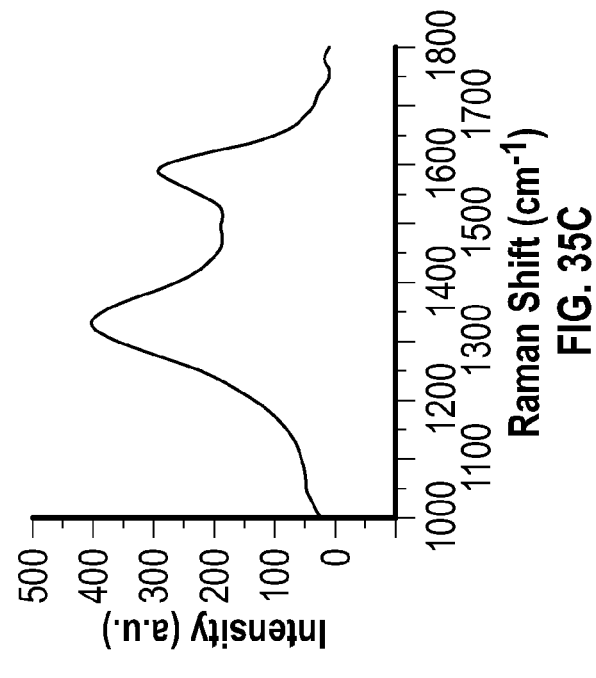
Figure 34G:
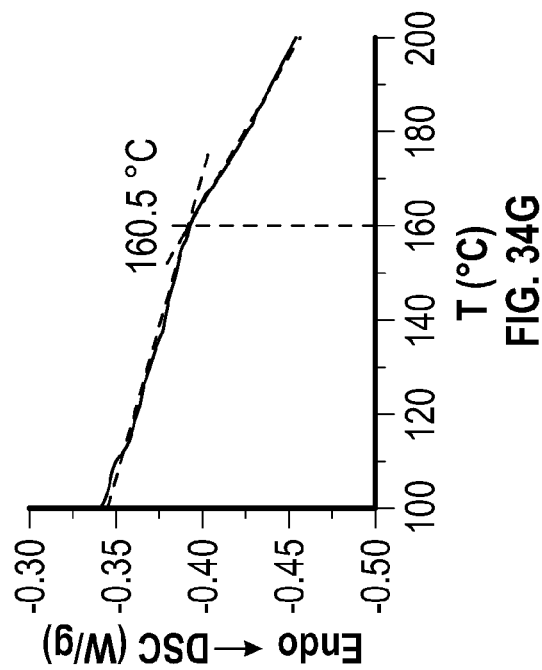
Figure 35B:
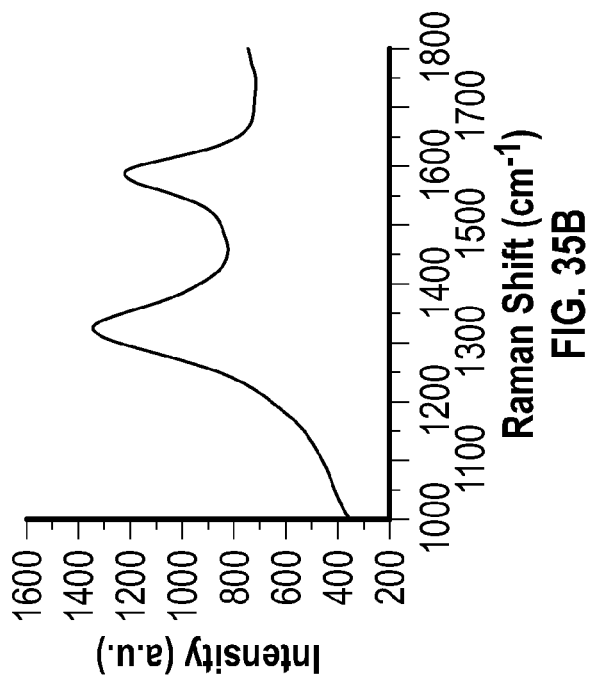
Figure 35D:
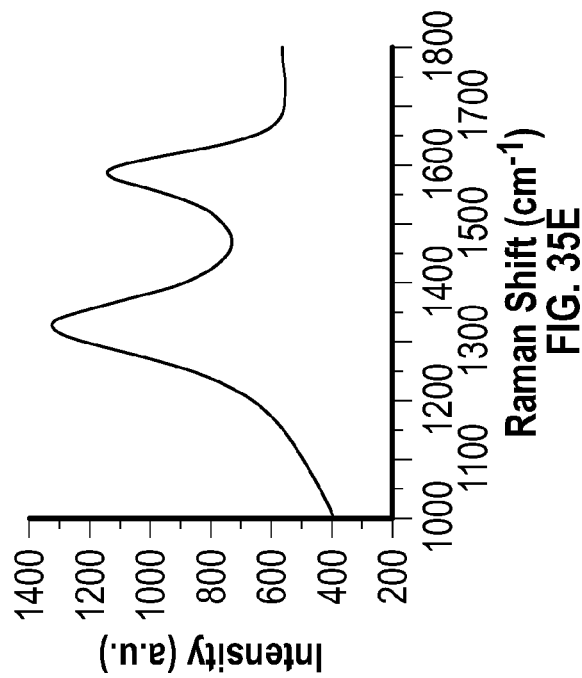
Figure 35E:
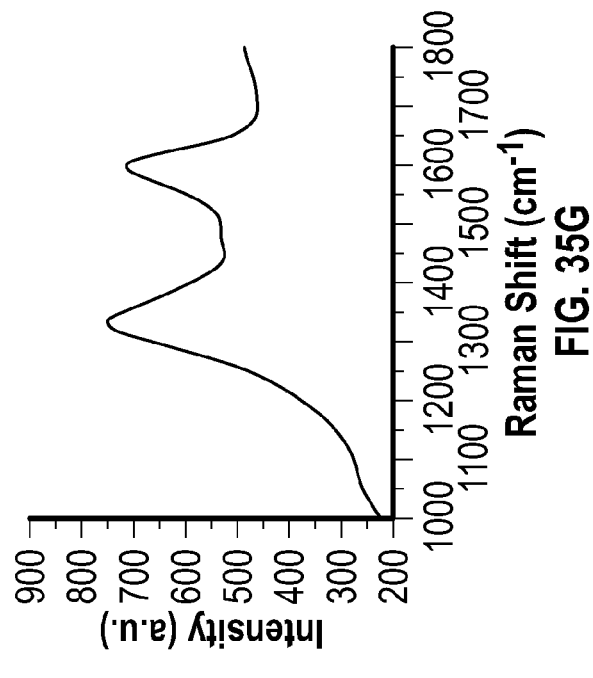
Figure 35F:
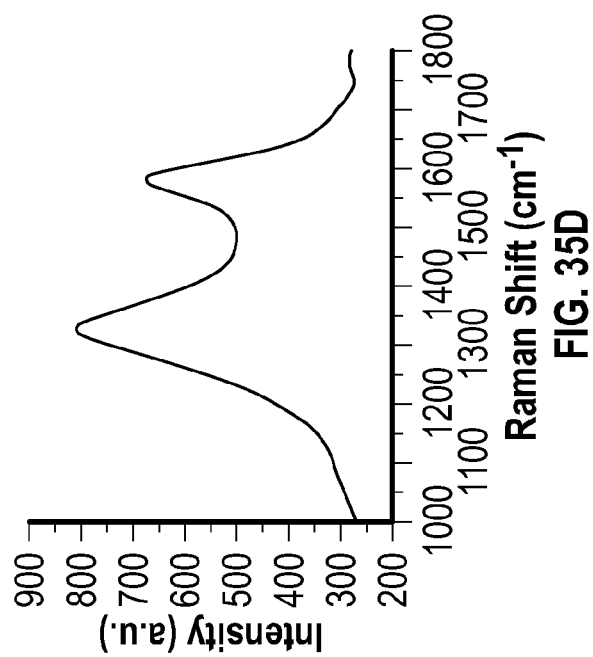
Figure 35G:
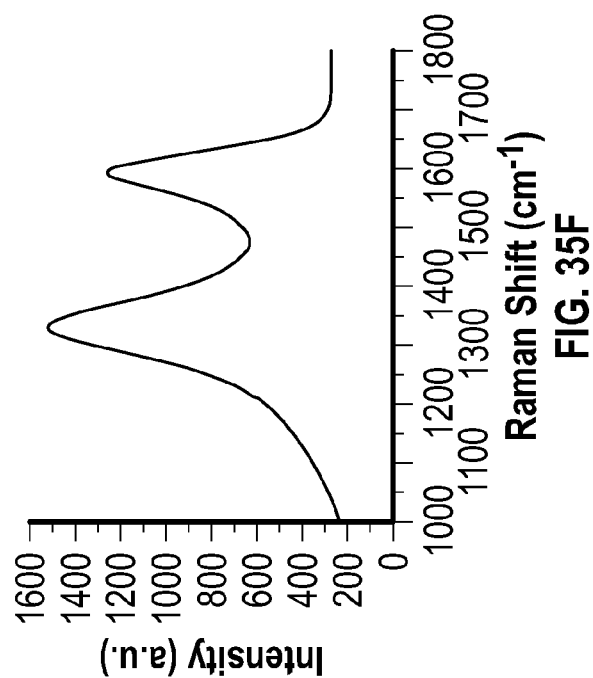

FIG. 33A is a plot of TGA of thermostabilized carbon fiber precursors and FIG. 33B is a plot of DTG of the thermostabilized carbon fiber precursors. The inserted figure in FIG. 33B is the magnified DTG curve at 200-600° C. The residue weights of fibers derived from the TGA curve are shown in Table 7. The rapid weight losses for most fibers were found between 350-400° C. (FIG. 33A and FIG. 33B), which (without wishing to be limited by theory) might be due to the reaction of the liable oxygen containing group. The rapid weight losses for the fibers made of the mixed lignin (80% KL-12K+20% KL-Raw) was between 400-600° C. The final yields of lignin based carbon fibers made of both KL-L/H-12K and the mixed fraction (80% KL-12K+20% KL-Raw) at 1440° C. were lower than other carbon fibers (Table 7). This might be induced by the high content of the oxygen containing group in the lignin fractions.

The glass transition temperature ($T_g$) of thermostabilized precursor fibers made of lignin/PAN composite and pure PAN was estimated from the second cycle as shown in FIG. 34, which shows heating flow curves derived from the second heating cycle of DSC analysis: panel (a) PAN; panel (b) KL-Raw; panel (c) KL-L/H-sol.; panel (d) KL-L/H-Insol.-3.5K; panel (e) KL-L/H-Insol.-6K; panel (f) KL-L/H-Insol.-12K; panel (g) 80% KL-12K+20% KL-Raw. $T_g$ indicates the miscibility of polymers in the blend. As shown in FIG. 34, both laccase/HBT treated lignin and dialyzed lignin had lower T than raw Kraft lignin, suggesting the fractionated lignin had better miscibility with the PAN polymer in lignin-PAN precursor fibers. The improved miscibility of the fractionated lignin could also benefit the spinnability for the fine precursor fibers.

TABLE 7

Residue Weight (%) of Precursor Fibers During Carbonization Derived from TGA Curves

|  | 200° C. | 350° C. | 500° C. | 650° C. | 800° C. | 1200° C. | 1440° C. |
| --- | --- | --- | --- | --- | --- | --- | --- |
| Pure PAN | 99.7 | 94.4 | 74.3 | 66.9 | 60.3 | 47.4 | 44.5 |
| KL-Raw | 99.8 | 93.2 | 72.2 | 63.4 | 56.5 | 46.0 | 42.2 |
| KL-L/H-Insol. | 99.4 | 87.3 | 64.6 | 57.8 | 53.0 | 43.9 | 41.7 |
| KL-L/H-Insol.-3.5K | 99.9 | 92.8 | 70.6 | 62.2 | 55.7 | 45.9 | 42.4 |
| KL-L/H-Insol.-6K | 100 | 90.4 | 67.5 | 59.8 | 54.2 | 44.5 | 41.4 |
| KL-L/H-Insol.-12K | 100 | 90.7 | 67.7 | 59.9 | 53.4 | 41.2 | 35.0 |
| 80% KL-12K + 20% KL-Raw | 98.9 | 94.1 | 79.5 | 64.7 | 53.9 | 37.1 | 30.1 |

Raman Spectroscopy

G/D ratio of carbon fiber was analyzed with Raman spectroscopy. A piece of carbon fiber mat was cut and then fixed on a glass slide using double adhesive tapes.

Raman spectra of carbon fibers were recorded with a Horiba Jobin-Yvon LabRam Raman Cofocal Microscope system using 633 nm laser, 10× magnification of objective lens, D0.3 filter, 200 μm confocal pinhole, 10 s exposure time, and 10 accumulations. The obtained Raman spectra were re-plotted and analyzed with Origin 9 software using Guassian curve fitting. FIG. 35 shows Raman spectra of carbon fibers: panel (a) KL-Raw; panel (b) KL-L/H-Insol.; panel (c) KL-L/H-Insol.-3.5K; panel (d) KL-L/H-Insol.-6K; panel (e) KL-L/H-Insol.-12K; panel (f) 80% KL-12K+20% KL-Raw; panel (g) pure PAN. As shown in FIG. 35, Raman shift of D band and G band are near 1348 $cm^{-1}$ and 1581 $cm^{-1}$, respectively. Such Raman shifts of D and G bands were also confirmed with the commercial graphite (FIG. 21A).

X-Ray Diffraction (XRD)

Figure 36A:
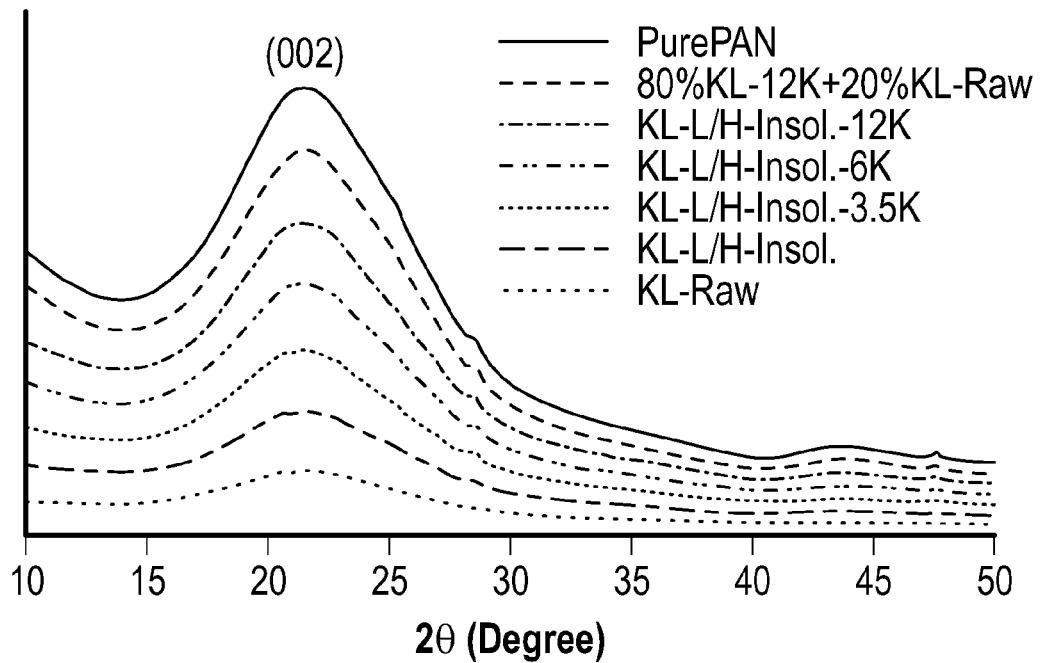
FIG. 36A shows XRD diffractograms of carbon fibers of Example 2.
Figure 36B:
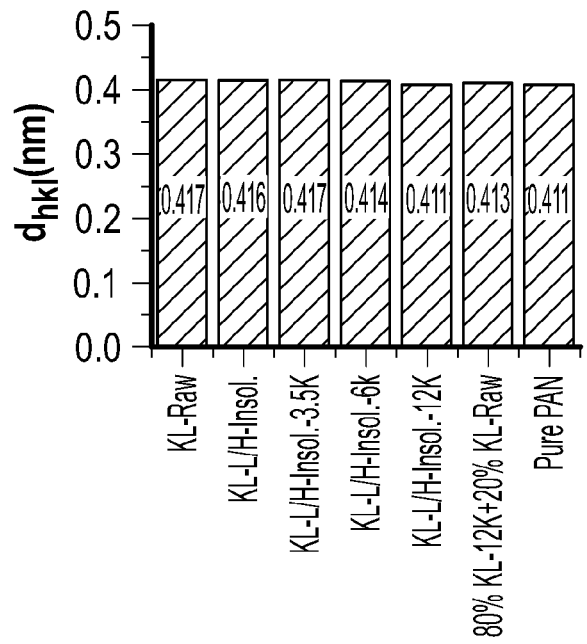
FIG. 36B shows the distance between two atomic layers in (002) crystalline lattices as calculated with Bragg's law in Example 2.

A Bruker D8 Discovery X-ray diffraction system (Bruker, Madison, WI) was used to analyze the graphitic structure in carbon fibers. X-ray resource was generated at 40 mA current and 40 kV voltage with Cu Kα wavelength (A) of 1.542 Å. Diffractograms were taken in the 2θ range from 10° to 80°. Scanning step size was 0.05°, and the scanning rate was set at 1.5/min. The crystalline size ($L_{hkl}$) was calculated from Scherrer Equation (1). The distance between two atomic layers in crystal structure ($d_{hkl}$, FIG. 36B) was calculated from the Bragg's law Equation (2). FIG. 36A shows XRD diffractograms of carbon fibers and FIG. 36B shows the distance between two atomic layers in (002) crystalline lattices as calculated with Bragg law. As shown in FIG. 36A, a crystal peak near 2θ of 21.5° was observed for all carbon fibers. This peak was assigned to (002) in a pre-graphitic turbostratic carbon.

Discussion

Without wishing to be limited by theory, the mechanism of the improved elastic modulus in high molecular weight and more uniform lignin fractions seen in this Example 2 could result from better lignin spinnability and different carbon structure in carbon fiber. First, the removal of small lignin molecules renders the lignin fractions with increased molecular weight, and improves the spinnability of the electrospinning towards finer fibers (histograms in FIG. 27). It has been proven that the smaller diameter of the electrospun fiber, the better mechanical properties the carbon fibers can derive. The thinner nano-scale carbon fiber would have less intrinsic defects like voids, molecule chain ends, and entanglements, all of which could weaken carbon fiber mechanical performance. The principle could also explain why the mechanical performance of best-performing lignin carbon fiber of this Example 2 is better than that of PAN-based carbon fiber. The carbon fiber made of pure PAN (FIG. 27, panel (g)) (molecular weight of 150,000 g/mol) has a much larger diameter (1338 nm) than that of lignin based carbon fibers, and it's elastic modulus is lower than that of the carbon fiber made from lignin fraction dialyzed through both 6-8K and 12-14K cutoff dialysis tube (KL-LH-Insol.-6K and KL-L/H-Insol.-12K) (FIG. 28A). Considering that lignin could improve the spinnability of PAN polymer by reducing the viscosity of the PAN solution, the mixture of PAN and high molecular weight lignin renders the carbon fiber with smallest diameter (panels (d) and (e) of FIG. 27) and the highest elastic modulus (FIG. 28A).

Figure 29A:
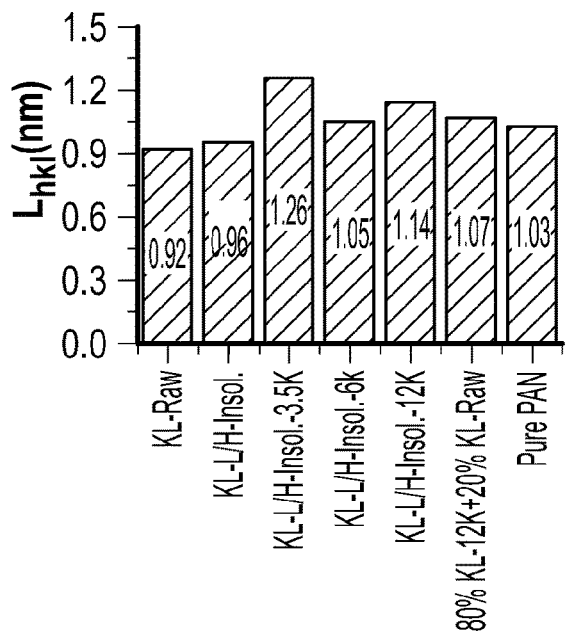
FIG. 29A shows the crystallite size of lignin based carbon fibers of Example 2 calculated from XRD using the Scherrer equation.
Figure 29B:
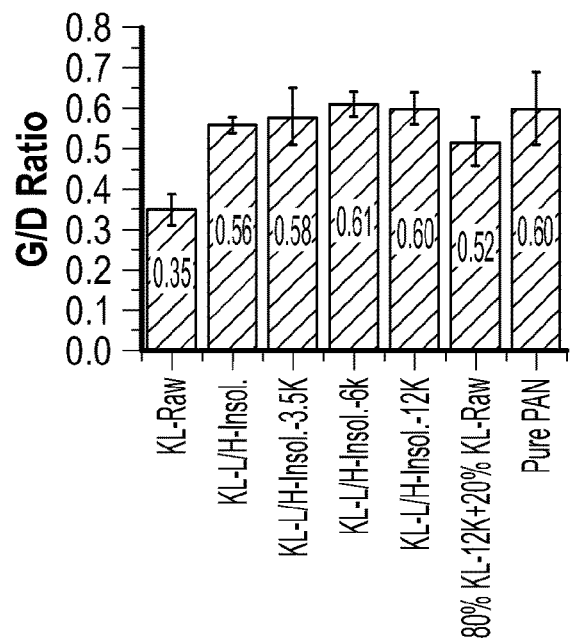
FIG. 29B shows the G/D ratio of lignin based carbon fibers of Example 2 measured with Raman spectroscopy.

Second, the removal of low MW lignin and more uniform lignin molecules could accelerate the formation of crystallite structure in carbon fiber, and thus improve the mechanical performances. X-ray diffraction (XRD) and Raman spectroscopy were carried out to analyze the crystallite carbon structure in carbon fibers. As shown in FIG. 36B, described further hereinbelow, the distances between interfacial crystallite layers ($d_{hkl}$) calculated from XRD using Bragg's Law were larger than 0.410 nm for all carbon fibers in this Example 2. These data were higher than the $d_{hkl}$ of idea graphite (0.335 nm), indicating the existence of the pre-graphitic turbostratic carbon structure. FIG. 29A shows the crystallite size of lignin based carbon fibers calculated from XRD using Scherrer equation and FIG. 29B shows the G/D ratio measured with Raman spectroscopy. The crystallite size ($L_{hkl}$) of the turbostratic carbon was calculated with XRD using Scherrer's equation and is shown in FIG. 29A. Carbon fibers made of dialyzed lignin fractions (both KL-L/H-Insol.-3.5K, KL-L/H-Insol.-6K, and KL-L/H-Insol.-12K) contained larger turbostratic carbon structure than the carbon fibers made of lignin without dialysis fractionation (KL-Raw and KL-L/H-Insol.). The increased size for turbostratic carbon structure could be directly relevant to the higher mechanical performance (FIG. 28A). Raman spectroscopic analysis further revealed that dialysis has led to the increased pre-graphitic turbostratic carbon in the lignin based carbon fiber. As shown in FIG. 29B, the integrated G/D ratio was 0.35 for carbon fiber made of raw Kraft lignin (KL-Raw), whilst the G/D ratios for carbon fibers made from the dialyzed lignin were 0.58 (KL-L/H-Insol.-3.5K), 0.61 (KL-L/H-Insol.-6K), and 0.60 (KL-L/H-Insol.-12K), respectively. The increased G/D ratios were correlated with larger molecular weight and reduced PDI of the lignin. More importantly, for lignin fractions with similar MW and different PDI (KL-L/H-Insol.-3.5K, KL-L/H-Insol.-6K, and 80% KL-12K+20% KL-Raw), a well correlation was found between PDI and G/D ratio, where the lower the PDI is, the higher the G/D ratio is. The correlation between pre-graphitic turbostratic carbon and molecular uniformity well corroborated the correlation between PDI and elastic modulus, providing the underlying mechanisms for increased mechanical performance in more uniform lignin. Overall, these data indicated that the removal of small molecules and more uniform lignin polymer could improve the size and the content of the crystallite turbostratic structure and thus enhance the carbon fiber mechanic performances.

Conclusion

In summary, in this Example 2, raw Kraft lignin was fractionated using enzyme-mediator and dialysis into fractions with different molecular weight and PDI to evaluate the impacts of MW and PDI on mechanical performance of lignin based carbon fibers. Removal of small lignin molecules appears to improve the elastic modulus of lignin based carbon fibers. More importantly, the elastic modulus of lignin based carbon fibers correlates well with the PDI. Without wishing to be limited by theory, the mechanistic understanding revealed that higher molecular weight and lower PDI of lignin could lead to the enhanced spinnability of lignin, the increased crystallite size, and the increased content of turbostratic carbon structure in carbon fiber. All of the aforementioned improvements helped to boost the mechanical performance of the carbon fibers. The research highlighted that while higher MW in general enhance the performance of lignin based carbon fiber, molecular uniformity can contribute more to the improved mechanical performance, in embodiments.

Example 3: Carbon Fiber Made from Acidic Precipitated Lignin

Overview/Discussion

Lignin chemical features impact its interactions with guest molecules and crystallite formation in carbonization, and thus carbon fiber mechanical performance. In this Example, experiments were performed utilizing a simple one-pot lignin processing technology that simply precipitate lignin into aqueous acid. This approach is based on manipulating lignin hydroxyl groups, which improves multiple hydrogen bonding and linear chemical linkages to enhance molecular interactions and thereby carbon fiber crystallite structures. Carbon fiber produced via this acidic precipitation technique had elastic modulus comparable with that derived from more costly enzymatic and dialysis fractionation methods, and even traditional PAN-based carbon fibers. Acidic precipitation offers a route to make quality lignin based biorenewable carbon fiber by regulating fiber precursor lignin at the molecular level, which has a broad application in upgrading industrial lignin waste from the paper-making industry and lignocellulosic biorefinery.

Figure 44A:
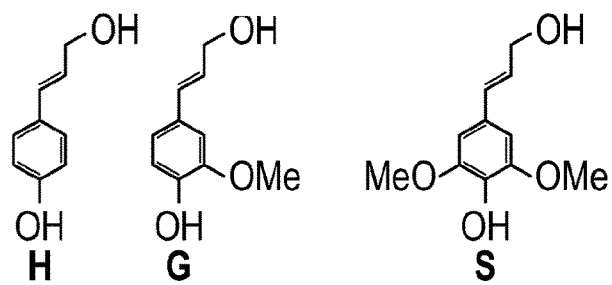
FIG. 44 shows the formation of lignin during plant cell wall thickening: A, three monolignols which represented typical lignin precursors (H, ρ-coumaryl alcohol; G, coniferyl alcohol; S, sinapyl alcohol); B, formation of phenoxy radicals from G by enzymatic dehydrogenation with peroxidase and/or laccase; and C, a typical lignin structure formed from radical coupling.
Figure 44B:
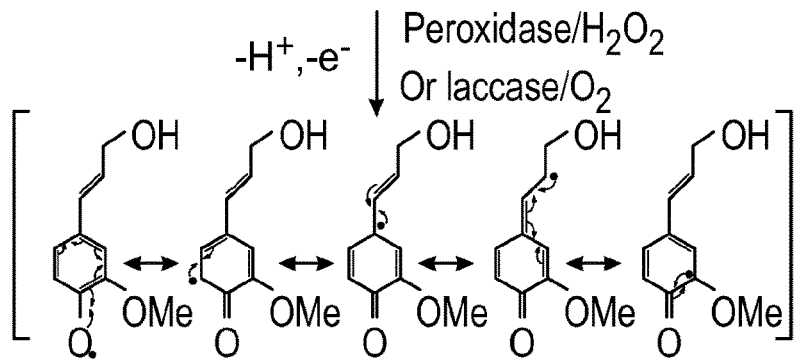
Figure 44C:
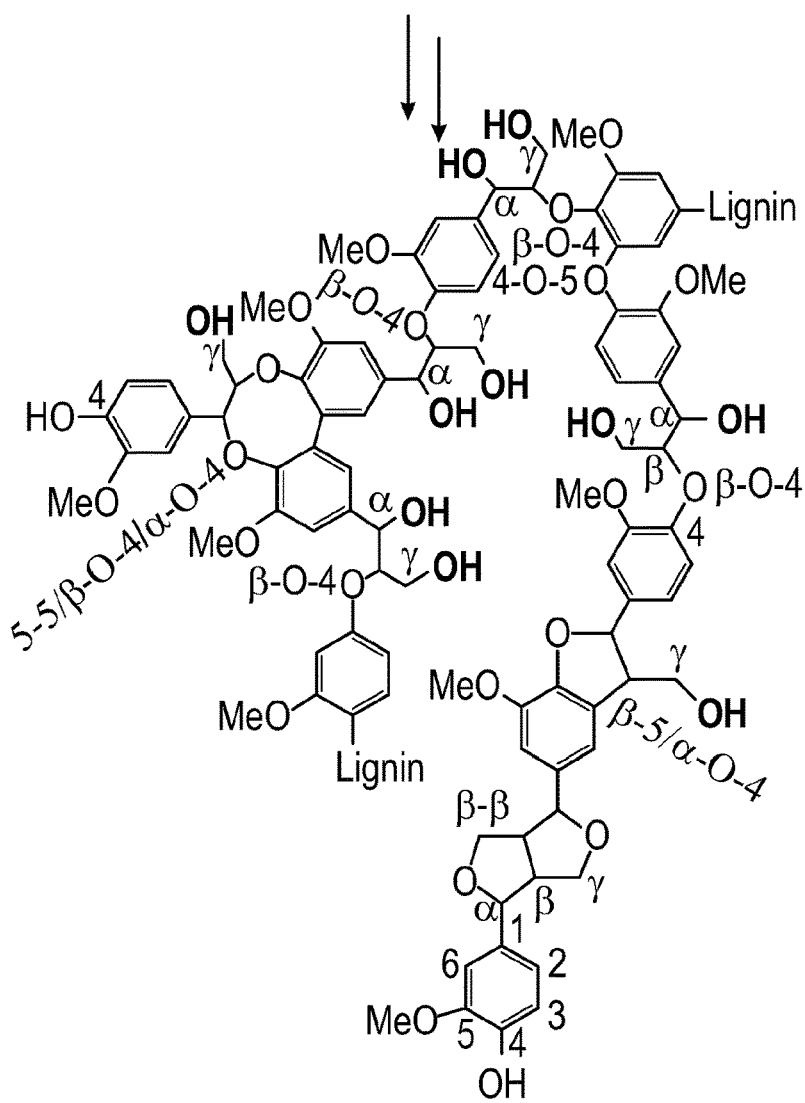

Lignin is a polyphenypropanoid polymer with abundant aromatic moieties and C3 side chains, which are formed by dehydrogenative polymerization from three monolignols (FIG. 44). FIG. 44 shows the formation of lignin 10 during plant cell wall thickening: A, three monolignols which represented typical lignin precursors (H, ρ-coumaryl alcohol; G, coniferyl alcohol; S, sinapyl alcohol); B, formation of phenoxy radicals from G by enzymatic dehydrogenation with peroxidase and/or laccase; and C, a typical lignin structure formed from radical coupling. Ar—OH is on C4 position of aromatic rings, while Alk-OH is on $C_\alpha$ and/or $C_\gamma$ positions of lignin side chains.

With the poly-aromatic structures, lignin has a carbon content as high as 60%. Moreover, aromatic structures in lignin could help cyclization during the carbonization process. Considering the chemical structure, lignin has significant potential to replace traditional PAN as a cost-effective and sustainable carbon fiber precursor.

As noted above, despite the significant potential, the poor mechanical performance of lignin based carbon fiber as compared to that of PAN-based carbon fiber prevented the commercial application. Examples 1 and 2 demonstrate that chemical characteristics of lignin polymer could account for the low mechanical performance of lignin based carbon fiber. The chemical characteristics include the various inter-unit chemical linkages (FIG. 44, C), functional groups, and molecular weights (MW). In Example 1, enzymatic fractionation method is utilized to increase the linear structure of lignin with more β-O-4' linkages. In Example 2, a dialysis method is utilized to derive lignin with more uniform molecular weight. From the results of Examples 1 and 2, it appears that more linear and uniform lignin could increase the content and size of crystallite in carbon fiber, resulting in improved mechanical performance. However, fractionation methods of Examples 1 and 2 have potential disadvantages. First, the laccase enzyme and dialysis tube used in Example 2 are costly, which render the scale-up of the technologies for commercial manufacturing challenging. Second, fractionation methods like enzyme fractionation of Example 1 and dialysis of Examples 1 and 2 may result in the loss of a significant portion of lignin in a water-soluble fraction (e.g., about 30% to 60% of total lignin treated). Given these limitations, a simplified and low-cost method with higher lignin recovery rate was sought to modify lignin chemistry for enhancing mechanical performance of resultant carbon fiber by altering the lignin chemical characteristics (in a precursor lignin) to impact the interaction of lignin with guest polymer (e.g., PAN) and thus the mechanical properties of the resulting lignin based carbon fiber.

In this Example 3, experiments were performed to study how functional groups of lignin could impact carbon fiber performance. Considering that the content and type of hydroxyl groups could impact the interaction between lignin and PAN, experiments were performed to study how various types of hydroxyl groups could impact the mechanical properties of lignin based carbon fibers. Lignin contains two kinds of hydroxyl groups, viz phenolic hydroxyl groups (Ar—OH) on $C_4$ position of the aromatic rings, and aliphatic hydroxyl groups (Alk-OH) on $C_\alpha$ and/or $C_\gamma$ positions of lignin side chains (FIG. 44, C).

As per Examples 1 and 2, enzymatic fractionation can produce more uniform lignin fractions with reduced hydroxyl groups, and the resultant lignin based carbon fiber has increased mechanical performances. However, the results were complicated by more uniform molecular weight and more linear structures in these lignin fractions, both of which could account for the improved mechanical performance of lignin based carbon fiber. To understand how the changes in hydroxyl groups could impact the mechanical properties of lignin based carbon fiber, the further experiments of this Example 3 were performed. Conventionally, attempts to improve carbon fiber performance have been aimed at reducing the content of hydroxyl group through substitution of Ar—OH with other groups via chemical reactions including butyration, acetylation, methylation, propargylation, and other esterification and etherification. Although the miscibility and spinnability of lignin can be improved by these substitutions, the mechanical performances of the resultant carbon fibers had only marginal improvements and are still far from being comparable with PAN-based carbon fiber. The reason could be attributed to the newly formed 'branchy' structures by the substitution of Ar—OH. These new branches could hinder lignin alignment with guest plasticizers and thus decrease the crystallization of carbon fiber. Overall, substituting hydroxyl groups with other chemical groups did not significantly enhance the mechanical strength of lignin carbon fiber. This Example 3 provides an approach whereby the profile of hydroxyl groups can be altered for studying the impact of functional groups on carbon fiber performance. In this Example 3, both the challenges in fundamental mechanistic study and the needs for affordable and scalable lignin processing to improve carbon fiber performance have been addressed by developing an acidic precipitation technology. Instead of substituting hydroxyl groups, the acidic precipitation strategy of this Example 3 can be utilized to fine-tune the content and composition of hydroxyl groups to decipher the impact of hydroxyl groups on guest polymer interaction and mechanical properties of the resultant carbon fiber (FIG. 5). The acidic precipitation method of this Example 3 enables a cost-effective and scalable method to modify lignin chemistry and recover most of the lignin for quality carbon fiber manufacturing.

Experimental

Materials

Alkali Kraft lignin with low sulfonate content (370959) and N,N-dimethylformamide (DMF, 99.8%) were purchased from Sigma-Aldrich, USA. Polyacrylonitrile (PAN, MW=150,000 g/mol) was purchased from Pfaltz & Bauer, USA. All DMF used in this research was dried over 3 Å activated molecular sieves before use.

Lignin Treatment

Kraft lignin (KL, 2 g) was dissolved in 25 mL of NaOH aqueous solution (1M). pH of lignin solution was adjusted to 12 using the NaOH solution and then kept stirring for 0.5 h at room temperature. Five types of HCL aqueous solutions (150 mL) with pH of 1, 2, 3, 4, and 5 were prepared. Lignin solution was dropwise added into the HCL solution, and then pH values were adjusted again to keep at 1, 2, 3, 4, and 5, respectively. Lignin was precipitated once added into HCL solution. The suspension was then placed in an ice-bath and kept stirring for one more hour, and followed by stirring at room temperature for two more hours. After centrifugation (25 000 g), the samples were washed twice with the acidic water at the same pH and then washed once using the de-ionized water. Lignin powder can be obtained after centrifugation again and lyophilization.

Lignin Characterizations

Gel Permeation Chromatography (GPC)

Molecular weight of lignin was measured by GPC using an OMNISEC system (Malvern Instrument Ltd., Houston, TX). All lignin samples were acetylated as reported before the measurement. The conditions for GPC were: column, two D6000 and one T2000 Viscotek D-Columns (Malvern, Houston, TX) connected in series; column temperature, 35° C.; eluent, tetrahydrofuran (THF); flow rate, 1.0 mL/min; detector, RI, UV (280 nm) and a viscometer installed in the OMNISEC REVEAL system; injection volume, 100 µL; sample concentration, 1 mg/mL. Universal calibration curve was established with polystyrenes as standards.

$^{31}$P Nuclear Magnetic Resonance (NMR)

Hydroxyl groups in lignin were analyzed using $^{31}$P NMR. Samples were prepared as reported. Briefly, lignin (40 mg) was firstly dissolved in a pyridine/CDCl$_3$ solution (400 µL, 1.6:1, V/V). After complete dissolution, relaxation reagent (chromium(III) acetylactonate, 50 µL, 11.4 mg/mL in pyridine/CDCl$_3$) was added into lignin solution, and followed by the addition of an internal standard (cyclohexanol, 100 µL, 10.85 mg/mL in pyridine/CDCl$_3$). Finally, 100 µL of phosphitylation reagent (2-chloro-4,4,5,5-tetramethyl-1,3,2-dioxaphospholane, TMDP) was added. The mixture was kept at room temperature for 30 min to complete phosphitylation reaction before transferring into a NMR tube (5 mm O.D.) for acquisition. Quantitative $^{31}$P NMR spectra were recorded under a Varian NMRS-500RM. A 90° pulse with 25-s pulse delay and 256 acquisitions were used to acquire a spectrum.

Fourier-Transform Infrared Spectroscopy (FTIR)

Hydrogen bonding in lignin was analyzed using a Nicolet 380 FTIR spectrometer (Thermo Electron Corporation, Madison, WI). All lignin and PAN powders were dried two days in a vacuum-drier before measurement. FTIR spectra of all powders were collected using an attenuated total reflection (ATR) stage. Samples were loaded in ATR crystal. All samples were scanned 256 times and acquired at a spectral resolution of 4 cm$^{-1}$. Peak deconvolution was carried out using Origin 9 software with Guassian curve fitting method.

2D Heteronuclear Single Quantum Coherence (HSQC) NMR

Lignin interunitary linkages were characterized with HSQC. Acetylated lignin (150 mg) was dissolved in 0.6 mL of DMSO-d6 and placed in a NMR tube. Adiabatic 2D $^1$H-$^{13}$C HSQC spectra were acquired on a Bruker AVANCE 500 MHz spectrometer equipped with a Cryo-probe. The resultant data were processed with the software of Topspin version 3.2 (Bruker Biospin) with the parameters described as before. The obtained HSQC spectra were then analyzed using software MestReNova. The assignments and quantification of linkages are shown in Table 9.

Viscosity

The dynamic viscosity of lignin/PAN dopes was measured using a Malvern Kinexus Pro+ rotational rheometer (Malvern Instruments, Houston, TX) with a 50 mm diameter parallel plate geometry. DMF was the solvent for all the dopes. The tests were performed with the shear rate from 600 s$^{-1}$ to 5 s$^{-1}$ at a constant temperature (25° C.). Sample thickness was 0.5 mm. For each sample, three data points were recorded per each decade of shear rate, and three measurements were replicated to get an average viscosity.

Preparation of Lignin Based Precursor Fiber

Lignin was spun into fiber using an electrospinning unit as described hereinabove. Briefly, both lignin and PAN were ground by a mortar and pestle to get fine powders, which can pass a 60 mesh screen. Lignin powder was then blended with PAN powder at a weight ratio of 1:1, and DMF as solvent was subsequently added into this lignin/PAN blend to prepare a spinning dope. The concentration of this polymer blend (lignin and PAN) in DMF was at 15%. Lignin/PAN dopes were loaded in a 10 mL syringe with a 22 gauge (i.d. 0.70 mm, length 38 mm) stainless steel needle. Electrospinning (FIG. 7) conditions were: voltage, 11.5 kV; distance between the needle and aluminum disc, 17 cm; solution feed rate, 0.25 mL/h. A stable Taylor's cone was formed during the electrospinning.

Preparation of Lignin Based Carbon Fiber

As-spun lignin fibers were thermostabilized and carbonized into carbon fibers in a split tube furnace with vacuum system (GSL 1600X, MTI Corporation, Richmond, CA). The thermostabilization (FIG. 9A) was carried out at atmosphere with heating from room temperature to 250° C. at a heating rate of 1° C./min and holding at 250° C. for 1 h. The thermostabilized fibers were then carbonized (FIG. 9B) under nitrogen atmosphere (240 cm³/min). The temperature was increased from room temperature to 1,000° C. with a heating rate of 5° C./min. The holding time at 1,000° C. was 1 h.

Fiber Characterizations

Nanoindentation

Reduced elastic modulus ($E_r$) and hardness (H) of carbon fibers were measured using Hysitron TI 950 Triboindenter (Minneapolis, MN). First, carbon fibers were embedded in an EPOFIX™ epoxy resin. The surface of the resin was then polished with a RMC Boeckeler MTX microtome and an EcoMet 3 grinder/polisher (Buehler, Lake Bluff, IL). Second, nanoindentation was carried out, as described in Examples 1 and 2 hereinabove, on transverse sections of fibers (FIG. 51) using a Cube Corner (90°) tip with 40 nm radius. Indentation depth was 15-30 nm. $E_r$ was calculated using Equation (3), where A is the contact area, and S is the stiffness given by S=dP/dh from loading-displacement (P-h) curve (FIG. 24). H was calculated using Equation (5) where $P_m$ax is the maximum force. All reported $E_r$ and H represented the average of at least 25 indents conducted on five different carbon fibers.

Differential Scanning Calorimetry (DSC)

DSC was performed using DSC Q2000 system (TA Instruments, New Castle, DE) with two heating cycles under a nitrogen atmosphere. Thermostabilized fibers (3 mg) were heated from −90° C. to 400° C. Both heating and cooling rates were 20° C./min.

Field Emission Scanning Electron Microscope (FE-SEM)

The morphologies of carbon fibers were observed under a FEI Quanta 600F FE-SEM (FEI Company, Hillsboro, OR). The working distance was 10 mm, and the accelerating voltage applied was 5 kV. Before the observation, samples were coated with gold-palladium (10 nm thickness). The diameters of fibers were calculated from at least 50 different carbon fibers with the help of ImageJ® software.

Raman Spectroscopy

Carbon fiber mat was mounted on a glass slide, and Raman spectra were taken under a Horiba Jobin-Yvon LabRam Raman Confocal Microscope with 633 nm laser, 10× magnification of objective lens, D0.3 filter, 200 µm confocal pinhole, 10 s exposure time, and 10 accumulations. Guassian curve fitting was used with Origin 9 software to deconvolute D band (1348 cm$^{-1}$) and G band (1581 cm$^{-1}$).

X-Ray Diffraction (XRD)

Crystallite structure in lignin based carbon fibers was analyzed using a Bruker D8 Discovery XRD (Bruker, Madison, WI). X-ray resource was generated at 40 kV voltage and 40 mA current with Cu Kα wavelength (λ) of 1.542 Å. Scanning range (2θ) was 10°-50°, scanning step size was 0.05°, and scanning rate was 1.5/min. As described in Examples 1 and 2 above, the crystalline size ($L_{hkl}$) was calculated using Scherrer Equation (1). The distance between two crystalline lattices ($d_{hkl}$) was estimated using Bragg's law Equation (2).

Results and Discussion

Develop a New Method to Tune Lignin Hydroxyl Groups by Acidic Lignin Precipitation In order to derive lignin with different hydroxyl groups, a novel method was developed to tune the content and composition of functional groups via lignin precipitation in acidic water. Hydroxyl groups impact on two chemical features of lignin: 1) the formation of intramolecular and intermolecular hydrogen bonds; 2) the initiation of chemical reactions for polymerization and depolymerization. The content and composition of hydroxyl groups in lignin thus impact the intermolecular interactions in lignin, the interfacial bonds with guest polymers, and the lignin structure formation and degradation. It has been proposed that intermolecular hydrogen bonds formed between lignin and guest plasticizers could hinder the miscibility of lignin/plasticizer dopes and decrease their spinnability. As aforementioned, strategies have been developed to substitute hydroxyl group to improve mechanical performances of lignin based carbon fiber, yet have led to limited increase of elastic modulus and tensile strength. In order to define the role of hydroxyl groups on the mechanical performance of lignin based carbon fiber, a new acidic precipitation method was utilized in this Example 3 to fine-tune the content and composition of hydroxyl group with a pH-dependent method. The strategy allowed verification of a two-fold hypothesis. On one side, hydroxyl groups may be tuned as described herein to alter the hydrogen bonding network in lignin, changing the intermolecular and intramolecular interaction within lignin and between lignin and guest polymer (e.g., PAN) molecules. The changes of these interactions will enhance the crystallite structure and mechanical properties of lignin based carbon fiber. On the other side, the profile of hydroxyl groups may alter the chemical reactions initiated, change the types of chemical linkages, and regulate lignin interunitary structures accordingly. The changes of chemical linkages, in particular, the condensed lignin structure, can alter the mechanical properties of lignin based carbon fiber. In addition to the fundamental scientific understanding, the acidic precipitation of lignin also represents an economical and straightforward technology that is amenable to scale-up manufacturing of quality carbon fiber.

In order to perform the experiments, all lignin samples were firstly dissolved in same aqueous sodium hydroxide solution (pH=12), and then lignin was precipitated into water at different pH values. Lignin was precipitated with constant yield at approximately 88%, when the pH values of water were 4 and less (pH=4, 3, 2, and 1). Such yield was higher than those from enzymatic fractionation and dialysis methods of Examples 1 and 2, representing a unique advantage of higher lignin recovery for the acidic precipitation method of this Example 3. FIG. 45A shows yields of water insoluble parts of Kraft lignin after precipitation into hydrochloric acid with different pH values, while FIG. 45B shows yields of water soluble parts of Kraft lignin after precipitation into hydrochloric acid with different pH values. As can be seen from FIG. 45A and FIG. 45B, when pH value of water reached 5, lignin was fractionated into water-soluble and water-insoluble fractions, similar to the enzymatic fractionation of Example 1 and Example 2. The phenomena suggested that lignin was completely precipitated without fractionation at pH ranged from 4 to 1.

FIG. 46A shows the molecular weight and FIG. 46B shows the polydispersity index (PDI), respectively, of each lignin. In FIG. 46A and FIG. 46B, Mn is the number average molecular weight; Mw is the weight average molecular weight. In FIG. 46B, PDI equals Mw/Mn, which indicates the uniformity of the molecular weight. In FIG. 46A and FIG. 46B, KL-Raw-Lig, KL-pH 4-Lig, KL-pH 3-Lig, KL-pH 2-Lig and KL-pH 1-Lig represent lignin powder of raw Kraft lignin, Kraft lignin precipitated under pH 4, Kraft lignin precipitated under pH 3, Kraft lignin precipitated under pH 2 and Kraft lignin precipitated under pH 1, respectively. As seen in FIG. 46A and FIG. 46B, the molecular weight (MW) and molecular uniformity (PDI) of lignin precipitated in pH 4 to 1 were not significantly changed, further indicating that the lignin was not fractionated. Considering that lignin fractionation and molecular uniformity can significantly impact the lignin carbon fiber performances, lignin samples precipitated against pH 4-1 water provided an ideal system with similar molecular weight and uniformity to study the impact of hydroxyl groups on mechanical properties of lignin based carbon fiber.

Figure 37A:
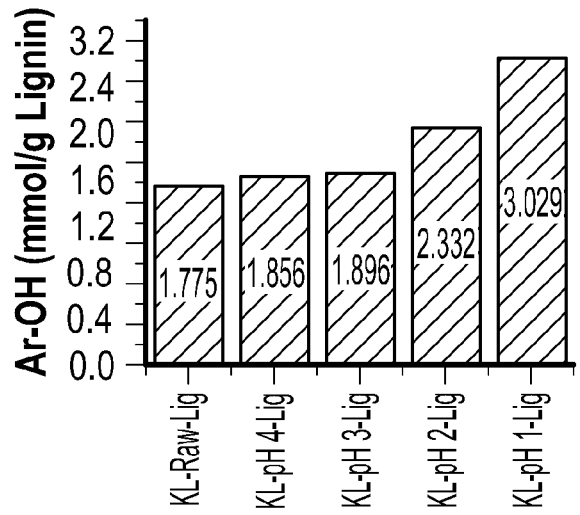
FIG. 37A shows the content of Ar—OH characterized by $^{31}P$ NMR in Example 3.
Figure 37B:
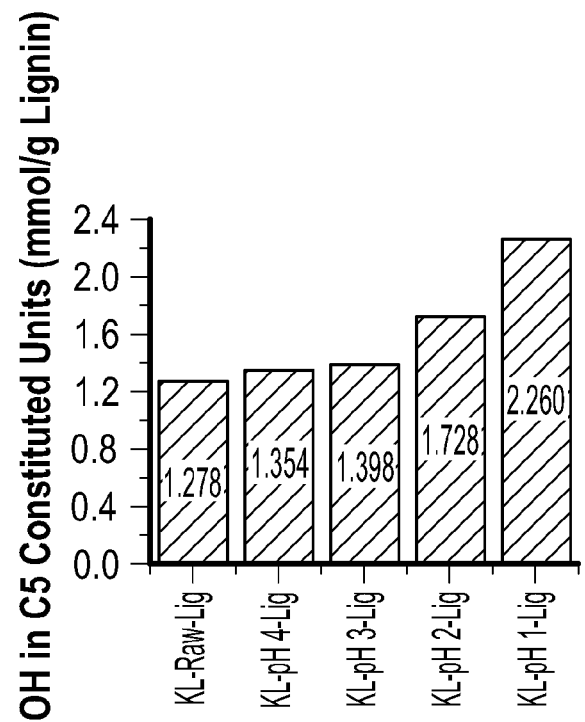
FIG. 37B shows the content of Ar—OH in total C5 substituted lignin units (β-5', 4-O-5', and 5-5') characterized by $^{31}P$ NMR in Example 3.
Figure 37C:
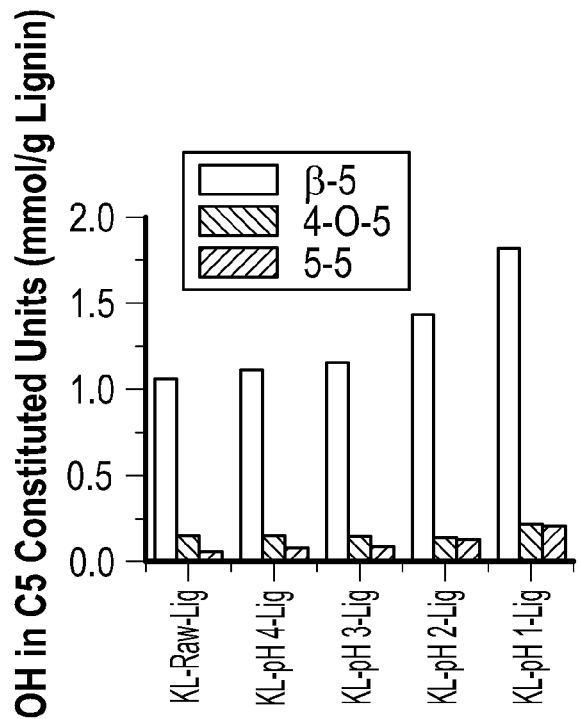
FIG. 37C shows the content of Ar—OH in each C5 substituted lignin units characterized by $^{31}P$ NMR in Example 3.
Figure 37D:
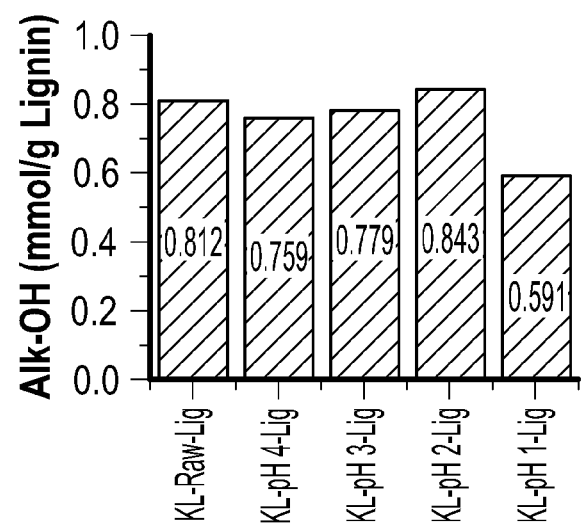
FIG. 37D shows the content of Alk-OH characterized by $^{31}P$ NMR in Example 3.
Figure 37E:
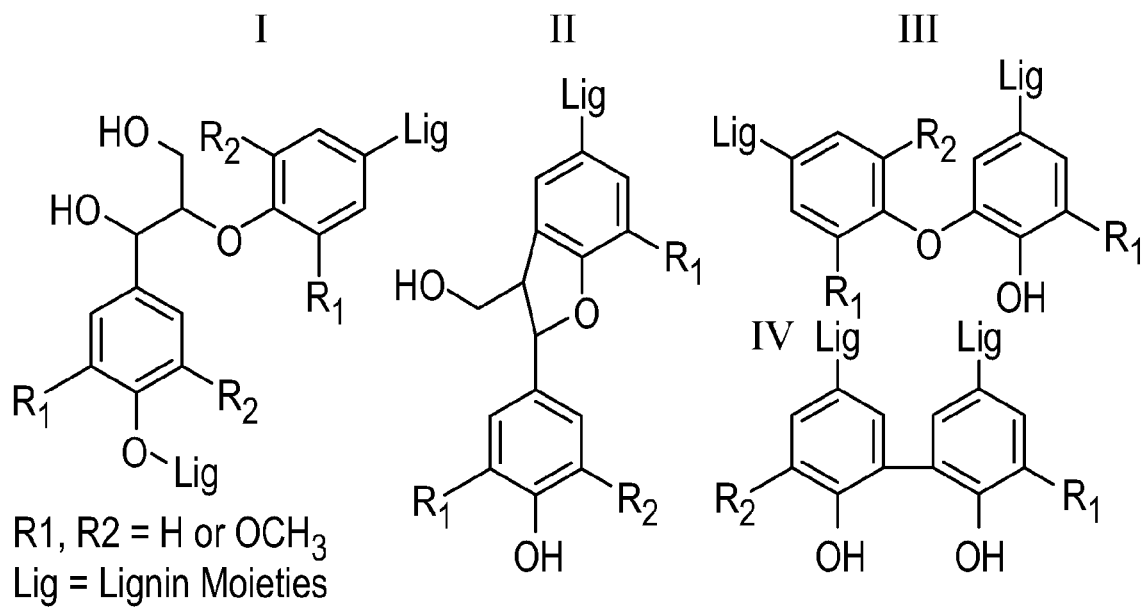
FIG. 37E shows the chemical structures of represented lignin interunitary linkages and their hydroxyl groups. I, β-O-4' (β-aryl ether); II, β-5' (phenylcoumaran); III, 4-O-5' (diaryl ether); IV, 5-5' (biphenyl) characterized by $^{31}$P NMR in Example 3.

The changes in hydroxyl groups after precipitating lignin in water (pH 4-1) were investigated using $^{31}$P nuclear magnetic resonance (NMR). FIG. 37A-E show lignin hydroxyl groups characterized by $^{31}$P NMR. FIG. 37A shows the content of Ar—OH; FIG. 37B shows the content of Ar—OH in total C5 substituted lignin units (β-5', 4-O-5', and 5-5'); FIG. 37C shows the content of Ar—OH in each C5 substituted lignin units; FIG. 37D shows the content of Alk-OH; and FIG. 37E shows the chemical structures of represented lignin interunitary linkages and their hydroxyl groups. I, β-O-4' (β-aryl ether); II, β-5' (phenylcoumaran); III, 4-O-5' (diaryl ether); IV, 5-5' (biphenyl). Alk-OH, aliphatic hydroxyl groups, which are located on $C_\alpha$ and/or $C_\gamma$ positions in lignin side chains (I and II). Ar—OH, phenolic hydroxyl groups, which are located on $C_4$ position on lignin aromatic rings (II, III, and IV). KL-Raw-Lig, raw Kraft lignin; KL-pH 4-, 3-, 2-, and 1-Lig represented KL precipitated against water with pH values of 4, 3, 2, and 1, respectively. Note: when pH is less than 1, the acidity is normally expressed as concentration [$H^+$]. In order to increase the readability, pH 1 is used in this paper instead of [$H^+$]=0.1 mol/L.

Figure 47:
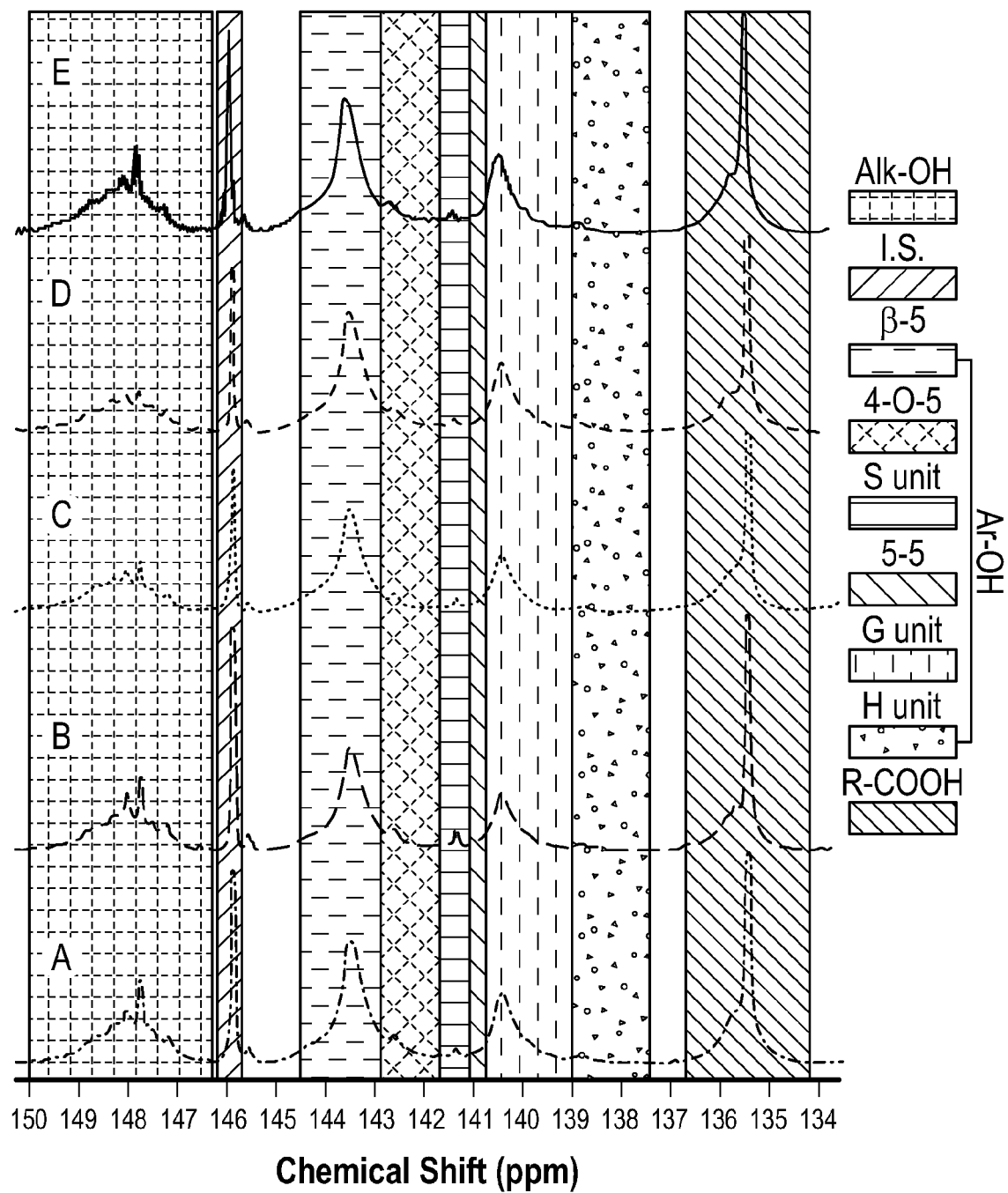
FIG. 47 shows 31P NMR spectra of lignin samples of Example 3: panel (a) depicts KL-Raw; panel (b) depicts KL-pH 4; panel (c) depicts KL-pH 3; panel (d) depicts KL-pH 2; and panel (e) depicts KL-pH 1.

As shown in FIG. 37A, in comparison with un-precipitated Kraft lignin (KL-Raw), phenolic hydroxyl groups (Ar—OH) of lignin were slightly increased after precipitation at pH 4 and 3, and were further increased when precipitated at pH 2 and 1. These changes in Ar—OH could be further elucidated by assigning the peaks of Ar—OH in each C5 substituted lignin units (FIG. 37B, FIG. 37C, and FIG. 47). The analysis indicated that Ar—OH in total C5 substituted lignin units were increased as the pH decreased, in particularly when lignin was precipitated in pH 2 and 1 water (FIG. 37B). This increment may be attributed to the significant increase of Ar—OH in β-5 units under pH 2 and 1, which are the most abundant in C5 substituted units (FIG. 37C). In other words, the increase in Ar—OH of β-5 linkage under relatively strong acid (pH 2 and 1) represented the main change of lignin Ar—OH after precipitation. Different from the increase in Ar—OH, significant decrease in aliphatic hydroxyl groups (Alk-OH) were found when lignin was precipitated in pH 1 water (KL-pH 1 in FIG. 37D). All of these changes in hydroxyl groups could lead to the changes in lignin hydrogen bonding and chemical structures from several aspects.

Figure 38:
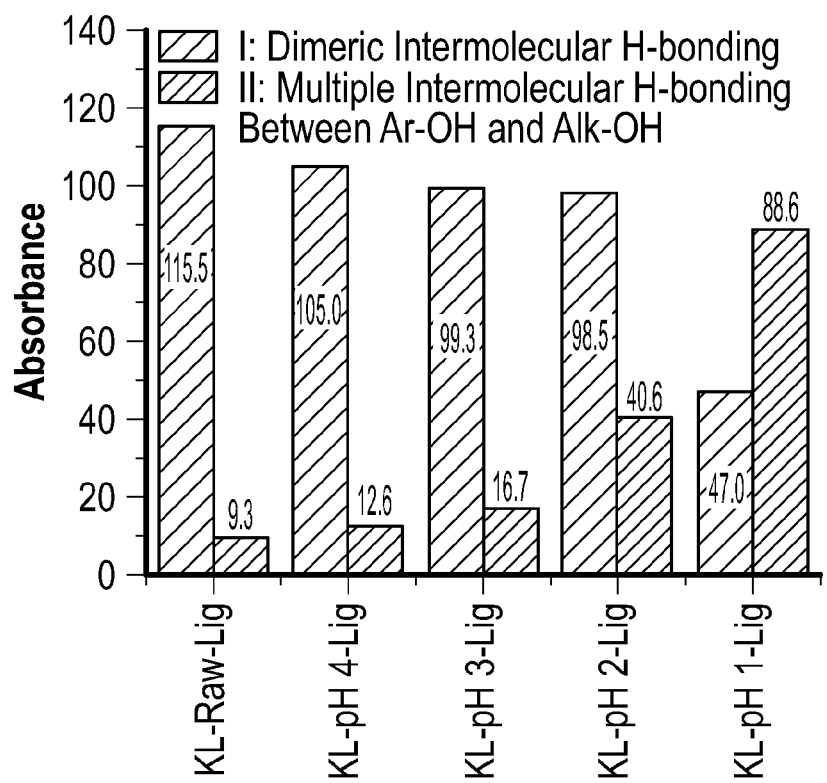
FIG. 38 shows absorbance of main hydrogen bonding in lignin.
Figure 49A:
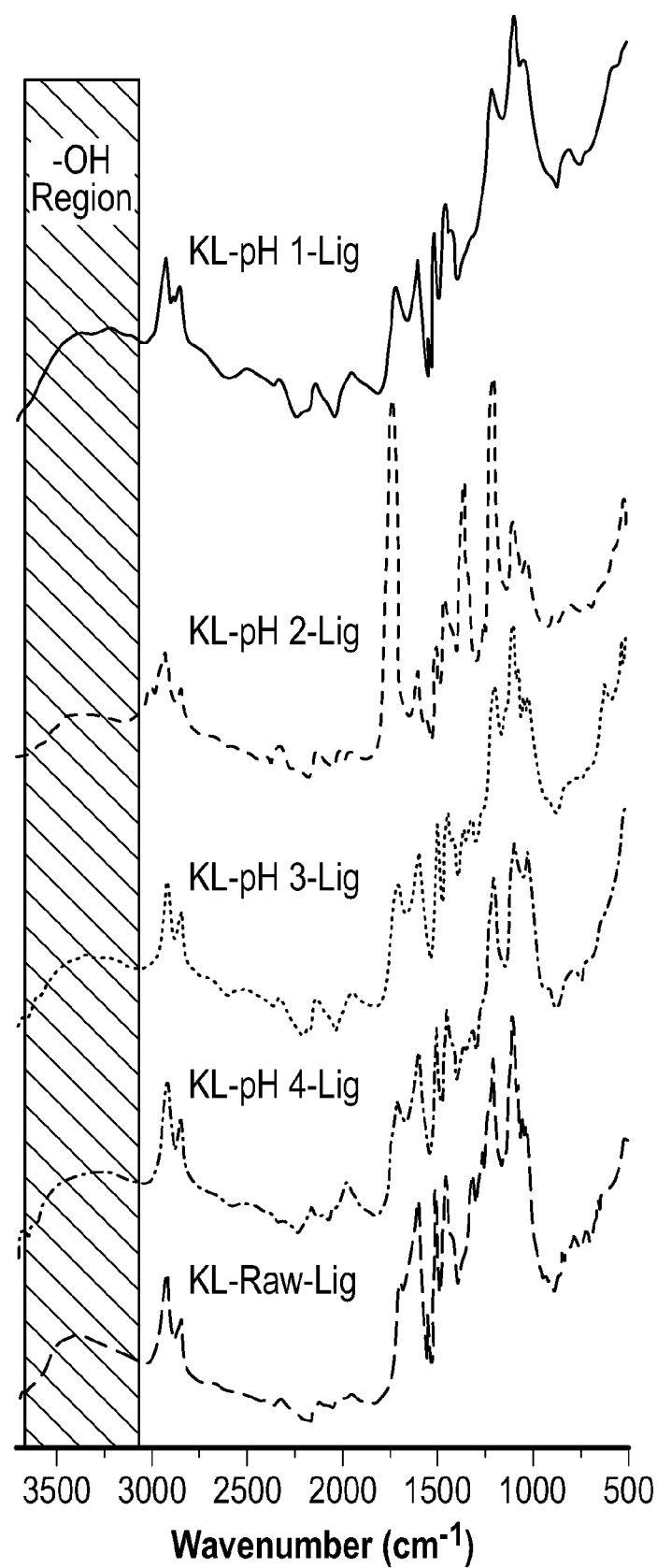
FIG. 49A shows FTIR spectra of lignin of Example 3 (3700-500 cm$^{-1}$)
Figure 49B:
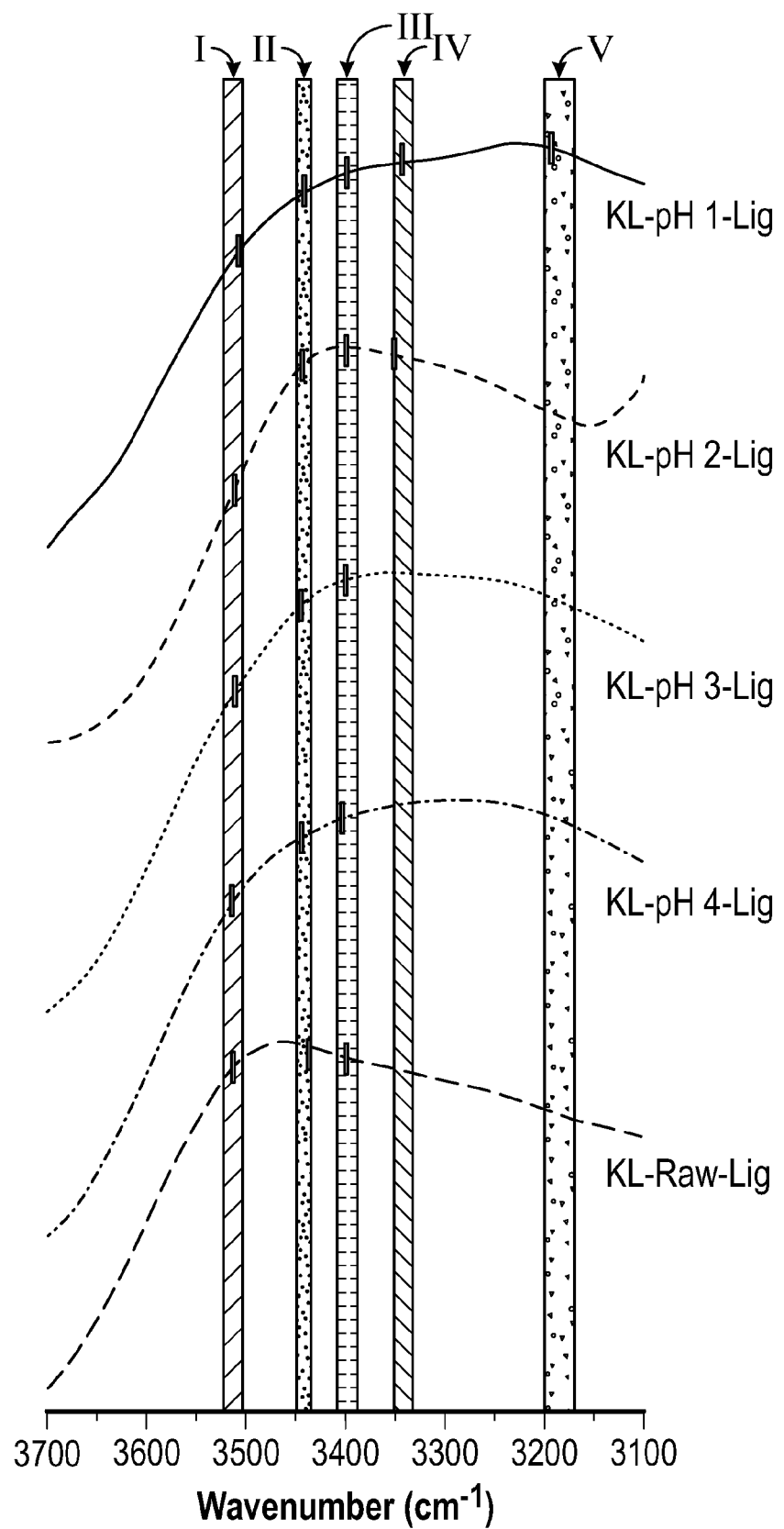
FIG. 49B shows FTIR bands of lignin of Example 3 in hydroxyl group region (3700-3100 cm$^{-1}$), where the centers of deconvoluted peaks of I, II, III, IV, and V are marked as vertical bars.
Figures 1, 49C:
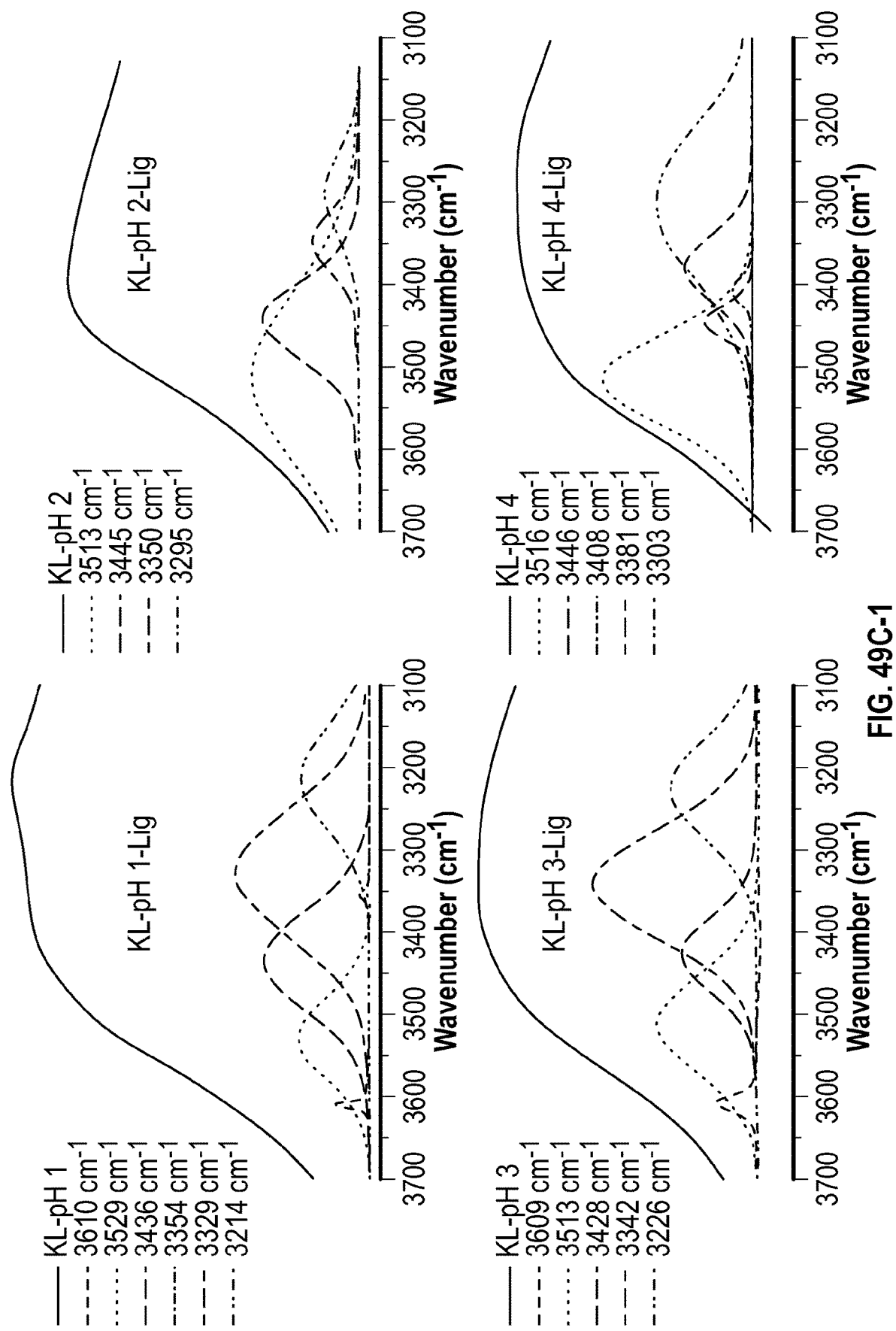
FIG. 49C shows deconvolutions of —OH regions of FTIR spectra Example 3.
Figures 2, 49C:
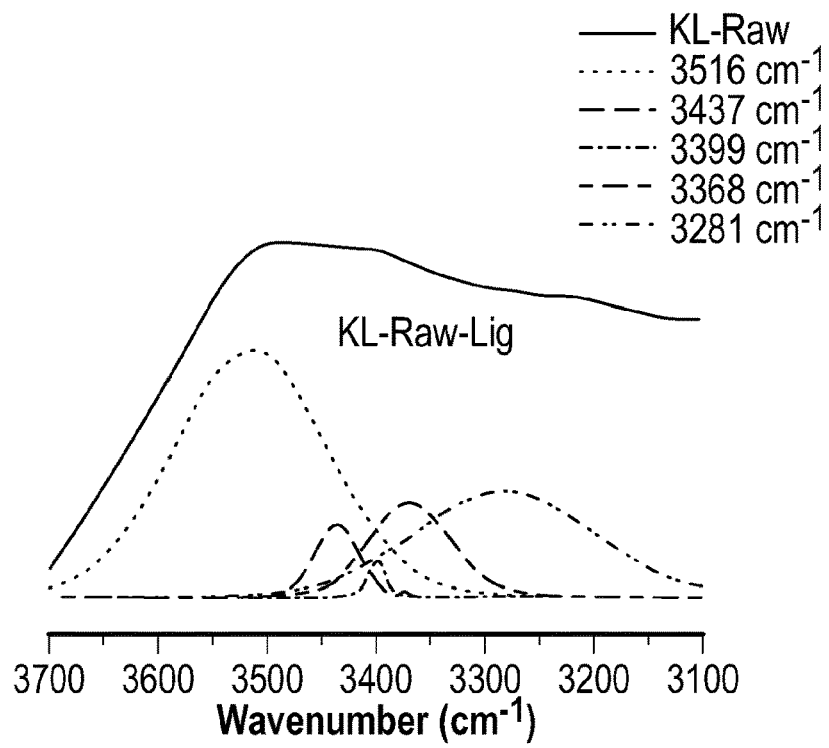

FIG. 38 shows absorbance of main hydrogen bonding in lignin, which was integrated from FTIR spectra as shown in FIG. 49, FIG. 49B, and FIG. 49C, which show FTIR spectra of lignin. Specifically, FIG. 49A shows FTIR spectra of lignin (3700-500 cm$^{-1}$); FIG. 49B shows FTIR bands of lignin in hydroxyl group region (3700-3100 cm$^{-1}$), where the centers of deconvoluted peaks of I, II, III, IV, and V are marked as vertical bars; and FIG. 49C shows deconvolutions of —OH regions. The assignments and absorbance of the peaks (I, II, III, IV, and V) of FIG. 49B are given in Table 9 and 10 hereinbelow, respectively.

First, multiple intermolecular hydrogen bonding between Ar—OH and Alk-OH increased, as the dimeric intermolecular hydrogen bonding decreased after lignin precipitated in acidic water (FIG. 38). Multiple intermolecular hydrogen bonding is a type of hydrogen bonding complex formed between multiple electron donors and acceptors in different molecules, for example, triple hydrogen bonding system of donor-acceptor-donor. Meanwhile, dimeric intermolecular hydrogen bonding is formed between a donor and an acceptor (donor-acceptor) on two different molecules. Fourier-transform infrared spectroscopy (FTIR) is a powerful tool to analyze the hydrogen bonding among lignin hydroxyl groups. FTIR spectra of lignin samples and their corresponding deconvolution spectra were as shown in FIG. 49A, FIG. 49B, and FIG. 49C. The assignments of each types of hydrogen bonding and their intensities were displayed in Table 9 and 10, respectively. Two main peaks were found at 3520-3505 cm$^{-1}$ and 3450-3440 cm$^{-1}$, assigning to the dimeric intermolecular hydrogen bonding (formed between Ar—OH and Ar—OH, Ar—OH and Alk-OH, or Alk-OH and Alk-OH) and multiple intermolecular hydrogen bonding between Ar—OH and Alk-OH, respectively (Table 9). As shown in FIG. 38, in raw Kraft lignin (KL-Raw), the absorbance of dimeric intermolecular hydrogen bonding was much more than that of multiple intermolecular hydrogen bonding between Ar—OH and Alk-OH, suggesting that dimeric intermolecular hydrogen bonding dominated the hydrogen bonding network in raw lignin. This result was consistent with previous findings of the main hydrogen bonding system in other woody lignin, highlighting the reliability and relevance of the measurement. When lignin was precipitated in acidic water, the absorbance of dimeric intermolecular hydrogen bonding was gradually decreased as pH value of water decreased from 4 to 1. Meanwhile, the multiple intermolecular hydrogen bonding between Ar—OH and Alk-OH was increased as pH of water decreased. In particular, the multiple intermolecular hydrogen bonding dominated the hydrogen bonding network in lignin after precipitation in pH 1 water. Overall, multiple intermolecular hydrogen bonding between Ar—OH and Alk-OH was formed as the dimeric intermolecular hydrogen bonding was decreased for the lignin samples precipitated in water under acidic conditions.

Figure 39A:
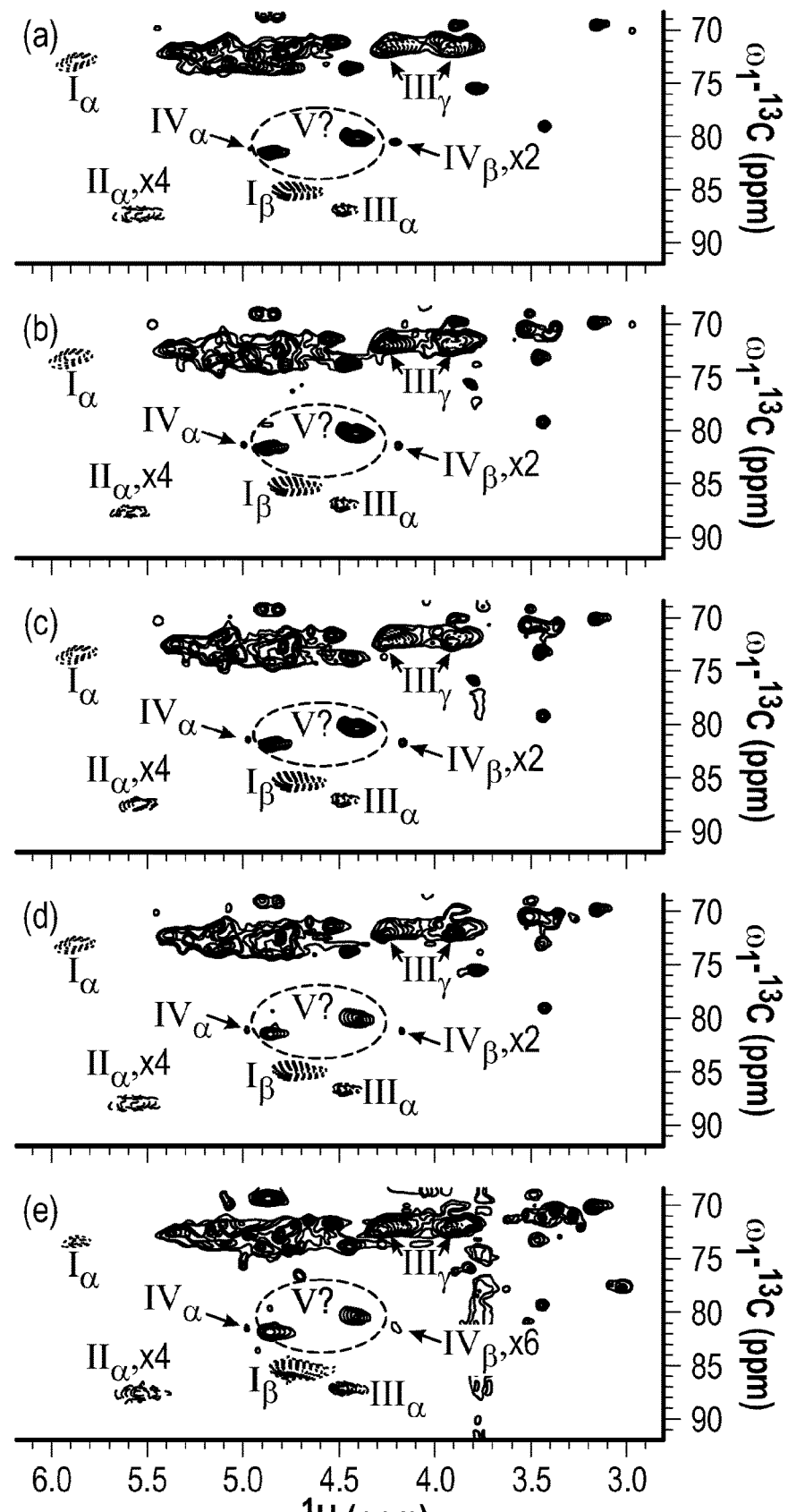
FIG. 39A shows HSQC spectra, where β-O-4' (I), β-5' (II), β-β'(III), and DBDO (IV) are assigned at δH/δC 6.0/74.5 ppm, δH/δC 5.5/87.7 ppm, δH/δC 4.5/87.0 ppm, δH/δC 6.0/74.5 ppm4.2/81.5 ppm, respectively; panels (a), (b), (c), (d), and (e) in FIG. 39A are KL-Raw-Lig, KL-pH 4-Lig, KL-pH 3-Lig, KL-pH2-Lig, and KL-pH 1-Lig, respectively.
Figure 39B:
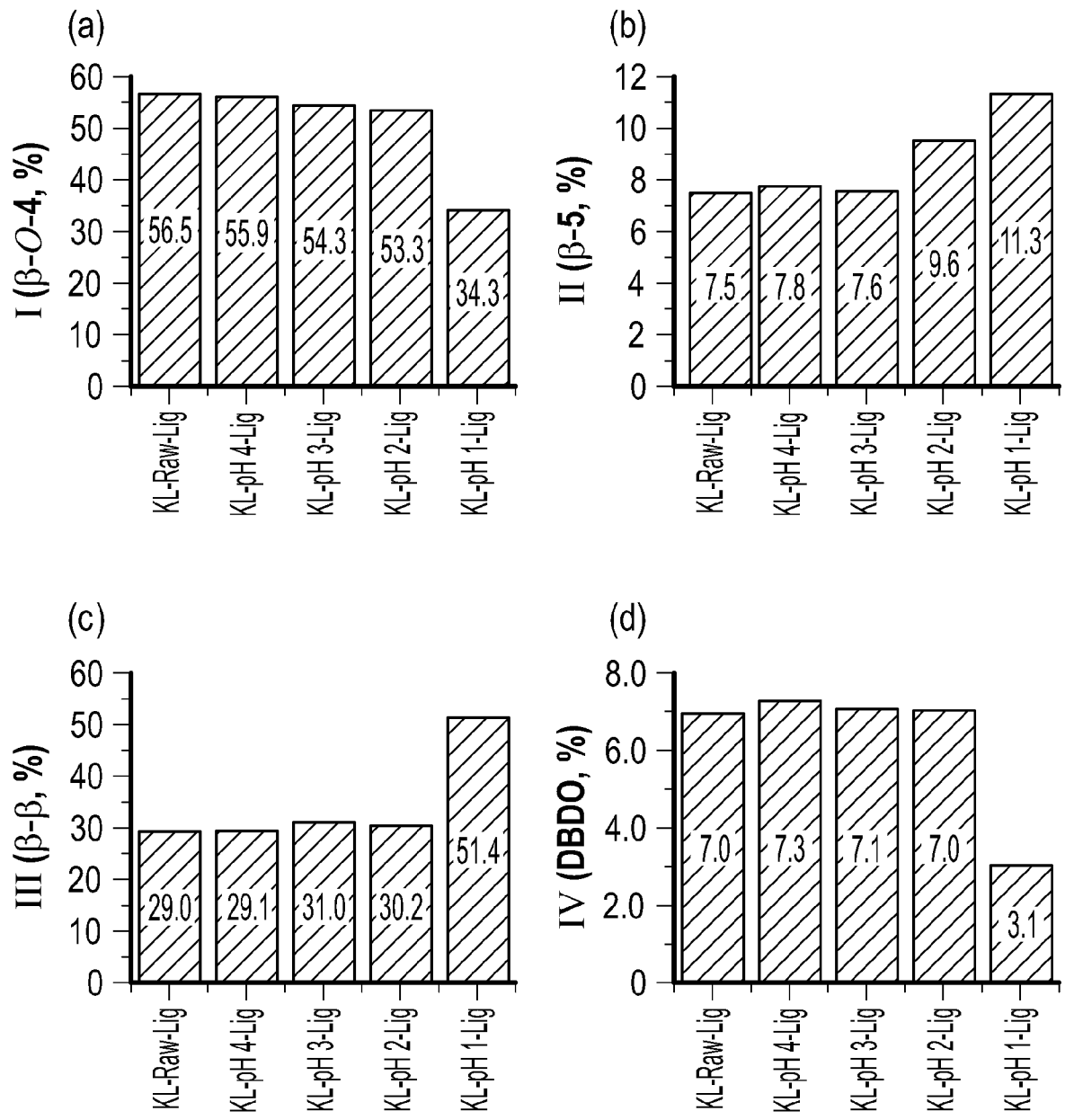
FIG. 39B shows the frequencies of lignin interunitary linkages integrated from HSQC spectra; panels (a), (b), (c), and (d) in FIG. 39B are frequencies of β-O-4', β-5', β-β', and DBDO, respectively.

Second, the changes in lignin interunitary linkages after precipitation in water at pH 4-1 were determined using 2D HSQC NMR. FIG. 39A shows 2D HSQC NMR spectra and the assignments of both lignin uncondensed linkages (β-O-4') and condensed linkages (β-5', β-β', and 5-5'). Specifically, FIG. 39A-FIG. 39C show lignin interunitary linkages characterized by 2D HSQC NMR. FIG. 39A shows HSQC spectra, with β-O-4' (I), β-5' (II), β-β' (III), and DBDO (IV); panels (a), (b), (c), (d), and (e) in FIG. 39A are KL-Raw-Lig, KL-pH 4-Lig, KL-pH 3-Lig, KL-pH2-Lig, and KL-pH 1-Lig, respectively. FIG. 39B shows the frequencies of lignin interunitary linkages integrated from HSQC spectra; panels (a), (b), (c), and (d) in FIG. 39B are frequencies of β-O-4', β-5', β-β', and DBDO, respectively. FIG. 39C shows the chemical structures of lignin interunitary linkages. As shown in FIG. 39B, the frequency of β-O-4' linkage (FIG. 39C, panel (a)) decreased slightly from 56.5% in KL-Raw to 50.9% in KL-pH 2 (Kraft Lignin at pH 2), and further decreased to 34.3% in KL-pH 1 (FIG. 39B, panel (a)), suggesting the degradation of this uncondensed lignin structure. Meanwhile, both condensed β-5' (FIG. 4C-b) and β-β' (FIG. 39C, panel (c)) linkages were significantly increased for KL-pH 1. β-5' in KL-Raw was 7.5% and increased to 11.3% in KL-pH 1 (FIG. 39B, panel (b)), while β-β' linkages in KL-Raw was 29.0% and increased to 51.4% in KL-pH 1 (FIG. 39B, panel (c)). These changes under relatively high acid concentration (pH 1) may be caused by lignin repolymerization through condensation, and will be discussed hereinbelow with reference to FIG. 43. Moreover, 5-5' involved dibenzodioxocin (DBDO, 5-5'/β-O-4'/α-O-4, in FIG. 39C, panel (d)) linkage was decreased from 7.0% in KL-Raw to 3.1% in KL-pH 1 (FIG. 39B, panel (d)), which may be resulted from the degradation of β-O-4' bonds in DBDO, as indicated by the weak signal of $C_\beta$-H in HSQC spectrum ($IV_\beta$ in FIG. 39A, panel (e)). Overall, condensed β-5' and β-β' linkages were increased as the uncondensed β-O-4' linkage were decreased, in particular under a relatively strong acid condition (pH 1).

Overall, with the precipitation of lignin into water under different acid conditions, lignin hydroxyl groups was tuned with multiple intermolecular hydrogen bonding and condensed interunitary linkages. The major changes in tuned lignin were three-fold. First, for all KL-pH 4, KL-pH 3, KL-pH 2, and KL-pH 1, the multiple intermolecular hydrogen bonds between lignin molecules were increased as the decrease in pH value. Second, for KL-pH 2, β-O-4' linkage had significant degradation. Third, for KL-pH 1, β-O-4' linkage had been further degraded, but β-5' linkage was re-polymerized through condensation. Carbon fibers were fabricated using these tuned lignin samples as precursor lignin to elucidate how the tuning of hydroxyl groups could improve lignin based carbon fiber performances.

Impacts of Tuned Hydroxyl Group on Lignin Based Carbon Fiber Performances

Figures 40A, 40B:
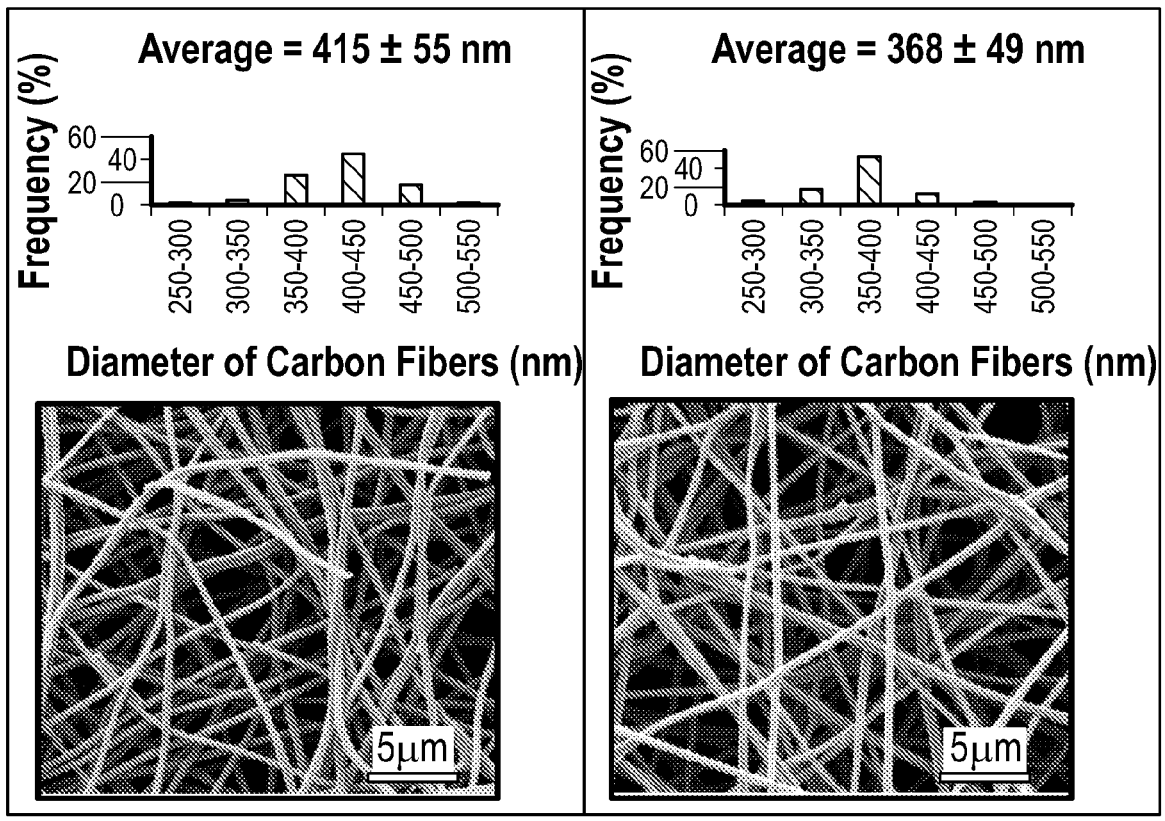
FIG. 40 shows SEM images of lignin based carbon fibers: panel (a) KL-Raw-CF; panel (b) KL-pH 4-CF; panel (c) KL-pH 3-CF; panel (d) KL-pH 2-CF; panel (e) KL-pH 1-CF; and panel (f) pure PAN-CF.
Figures 40C, 40D:
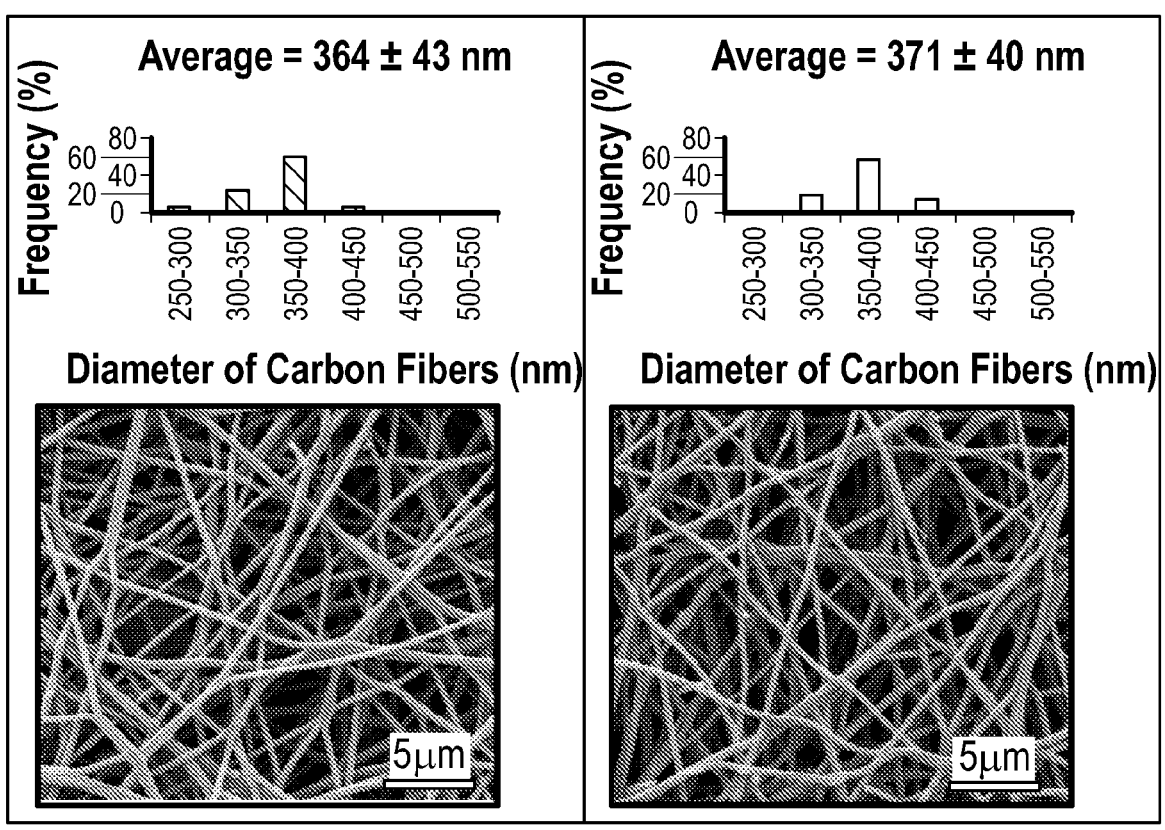

Precursor fibers were fabricated using electrospinning after mixing lignin with PAN at a 1:1 weight ratio for spinning dopes. The fibers were then thermostabilized and carbonized to obtain carbon fibers, as described hereinabove in Examples 1 and 2 and with reference to FIG. 7, FIG. 9A, and FIG. 9B. FIG. 40 shows SEM images of lignin based carbon fibers: panel (a) KL-Raw-CF; panel (b) KL-pH 4-CF; panel (c) KL-pH 3-CF; panel (d) KL-pH 2-CF; panel (e) KL-pH 1-CF; and panel (f) pure PAN-CF. The average diameter of each carbon fiber was calculated from more than 50 fibers with the help of IMAGEJ® software. The histogram in each panel (a)-(e) shows the diameter distribution. KL-Raw-CF, carbon fiber made from raw Kraft lignin; KL-pH 4-, 3-, 2-, and 1-CF represented carbon fiber made from KL precipitated against water with pH values of 4, 3, 2, and 1, respectively. Pure PAN-CF represented carbon fiber made from pure PAN. As shown in FIG. 40, morphology analysis of resultant carbon fibers by scanning electron microscopy (SEM) suggested a significant improvement in spinnability of lignin with tuned hydrogen bonding and interunitary linkages. The diameter of carbon fibers derived from raw Kraft lignin (KL-Raw) was 415 nm (FIG. 40, panel (a)), and the diameters of carbon fibers made of lignin precipitated against pH 4, 3, and 2 waters (KL-pH 4, 3, and 2, respectively) were decreased to 368 nm, 364 nm, and 371 nm, respectively (FIG. 40, panel (b) to panel (d)). Moreover, carbon fibers made of KL-pH 4, 3, and 2 were more uniform as indicated by the diameter distributions as shown in the histograms in FIG. 40, panels (a)-(f). The frequency of diameter distribution in the most frequent 50 nm range (400-450 nm) was 45% for KL-Raw (FIG. 40, panel (a)). Most frequent diameters for carbon fibers derived from KL-pH 4, 3 and 2 were in 350-400 nm, and the frequencies in the range were increased to 53.8%, 60.3%, and 61.0% for the carbon fiber made of KL-pH 4 (FIG. 5B), KL-pH 3 (FIG. 40, panel (c)), and KL-pH 2 (FIG. 40, panel (d)), respectively. The results highlighted that carbon fibers made of precipitated lignin with tuned hydroxyl groups had improved spinnability. Interestingly, spinnability of KL-pH 1 was not significantly improved. The diameter of KL-pH 1 carbon fiber was similar with that of KL-Raw (FIG. 40, panel (e)). Meanwhile, the percentage of those in most frequent diameter range (38.5% in 400-450 nm) was even lower than that of KL-Raw (FIG. 40, panel (e)). Higher content of condensed structure in KL-pH 1 than that of KL-Raw could attribute to its decline in spinnability. Additionally, pure PAN-based carbon fiber had much higher diameter than KL-Raw (FIG. 40, panel (f)), which was attributed to the high viscosity of pure PAN dope.

Figure 41C:
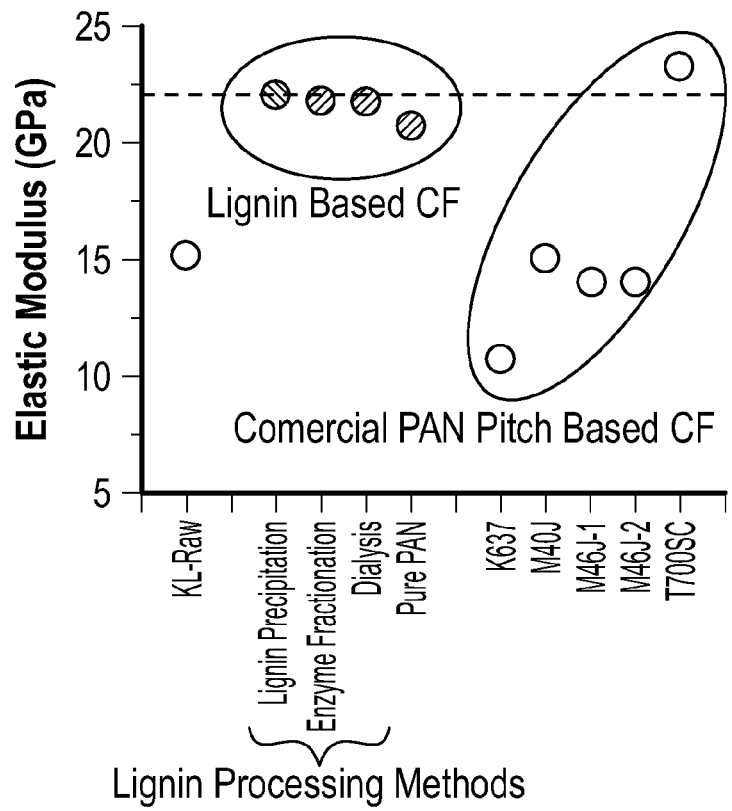
FIG. 41C shows the comparison of elastic modulus in Examples 1-3 with other published data of commercial carbon fibers as measured by nanoindentation; details of vendors and the references of commercial carbon fibers are listed in Table 5.
Figure 41D:
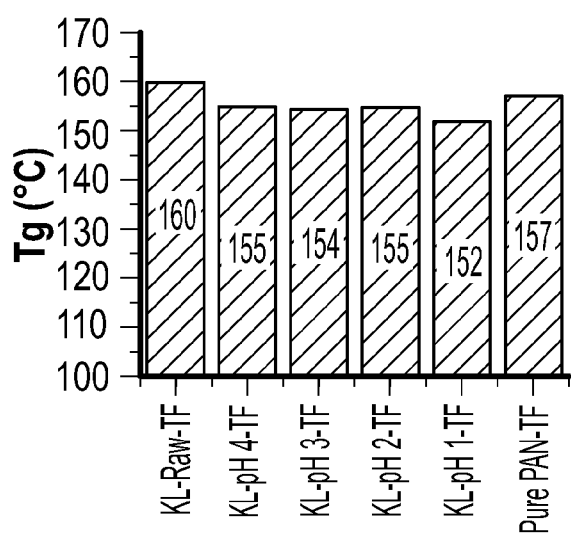
FIG. 41D shows the glass transition temperature ($T_g$) of thermostabilized fibers (TF) measured by DSC.
Figure 41E:
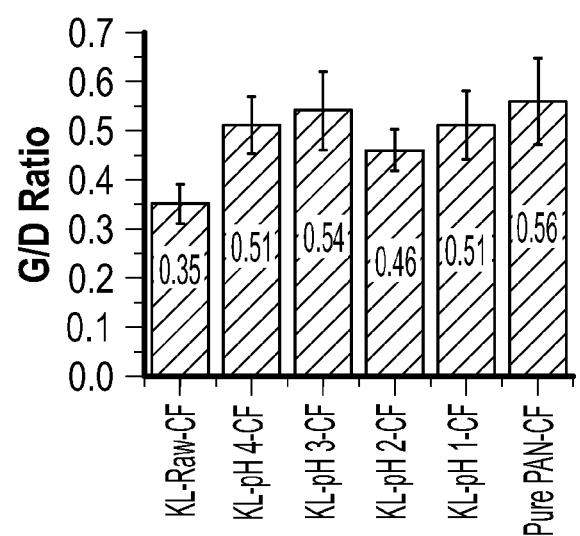
FIG. 41E shows the G/D ratio measured by Raman spectroscopy.
Figure 41F:
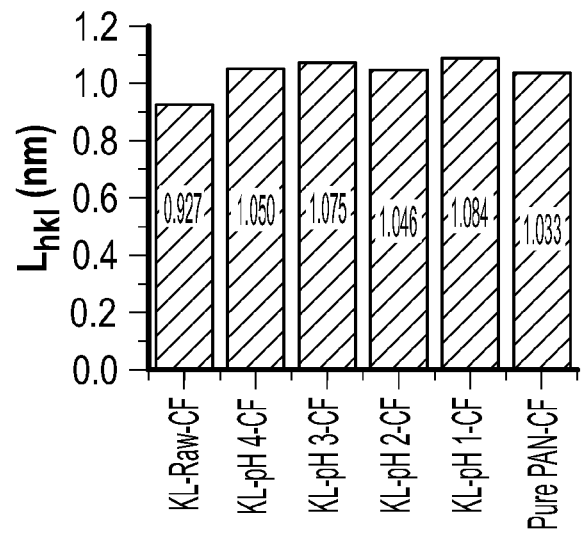
FIG. 41F shows crystallite size ($L_{hkl}$) in carbon fibers of Example 3 calculated from XRD diffractograms.
Figure 41G:
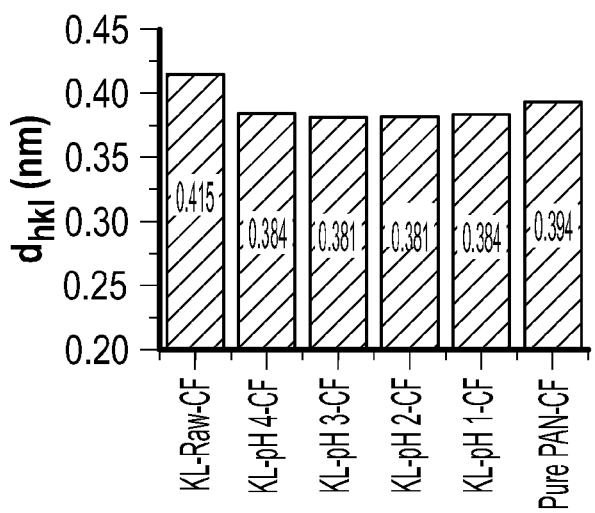
FIG. 41G shows the distance between crystallite layers ($d_{hkl}$) in carbon fibers of Example 3 calculated from XRD diffractograms.

FIGS. 41A-41G show the mechanical performances, miscibility, and crystallite carbon structure of lignin based carbon fibers. FIG. 41A and FIG. 41B show elastic modulus and hardness, respectively, of carbon fibers measured by nanoindentation. FIG. 41C shows the comparison of elastic modulus in Examples 1-3 with other published data of commercial carbon fibers as measured by nanoindentation. The details of vendors and the references of commercial carbon fibers are listed in Table 5 hereinabove. FIG. 41D shows the glass transition temperature ($T_g$) of thermostabilized fibers (TF) measured by DSC. FIG. 41E shows the G/D ratio measured by Raman spectroscopy; FIG. 41F and FIG. 41G show crystallite size ($L_{hkl}$) and the distance between crystallite layers ($d_{hkl}$), respectively, in carbon fibers calculated from XRD diffractograms. In FIGS. 41A-41G, KL-Raw-TF is thermostabilized fiber made from raw Kraft lignin; KL-pH 4-, 3-, 2-, and 1-TF represent thermostabilized fiber made from KL precipitated against water with pH values of 4, 3, 2, and 1, respectively; pure PAN-TF represents thermostabilized fiber made from pure PAN. Tuned hydroxyl groups in lignin correlated to the enhanced mechanic performances of lignin based carbon fibers, in particular the elastic modulus, as revealed by nanoindentation. First, as shown in FIG. 41A, reduced elastic modulus of carbon fiber made of KL-Raw was 15.1 GPa, which was increased to 20.6 GPa for carbon fiber made of KL-pH 4. In particular, the highest modulus was achieved at 22.0 GPa for carbon fiber made of KL-pH 3, which represented a 45.7% increment as compared to that of KL-Raw. More importantly, this modulus for KL-pH 3 was even higher than that of pure PAN (20.7 GPa), indicating the potential of this lignin as an alternative carbon fiber precursor to replace PAN. Meanwhile, the hardness of carbon fiber was slightly increased from 3.69 GPa for KL-Raw to 3.95 GPa for KL-pH 4, and further increased to 4.15 GPa for KL-pH 3, although it was still lower than the hardness of pure PAN-based carbon fiber (5.23 GPa) (FIG. 41B). These results suggested that multiple intermolecular hydrogen bonding could significantly enhance the mechanical performances of lignin based carbon fibers, in particular their elastic modulus. Second, for carbon fiber made of KL-pH 2, the elastic modulus (19.5 GPa) was higher than that of KL-Raw (FIG. 41A), further supported the enhancement of elastic modulus by improving multiple intermolecular hydrogen bonding in lignin. Nevertheless, the elastic modulus of KL-pH 2 carbon fiber was lower than that of carbon fibers from both KL-pH 4 and KL-pH-3 (FIG. 41A). This decline was in agreement with the decrement in β-O-4' linkage of KL-pH 2 (FIG. 39B, panel (a)), suggesting that the degradation of β-O-4' linkage could hinder the carbon fiber mechanical performance. Third, an interesting finding came from the comparison of carbon fiber made from KL-pH 1 with that of KL-pH 2. The mechanical performance of carbon fiber made from KL-pH 1 (20.8 GPa modulus and 4.11 GPa hardness) was higher than that of KL-pH 2 (19.5 GPa modulus and 3.51 GPa hardness, FIG. 41A and FIG. 41B), although the β-O-4' linkage in KL-pH 1 (34.3%) was much lower than that of KL-pH 2 (50.9%, FIG. 39B, panel (a)). Besides the dominated multiple hydrogen bonding in KL-pH 1 (FIG. 38), the increased condensed structure could have accounted for the enhanced mechanic performance. As shown in FIG. 39B, panel (b), condensed β-5' linkage in KL-pH 1 (11.3%) increased near 60% comparing with that in KL-pH 2 (7.1%), which could be attributed to the enhancement in mechanical performances of KL-pH 1 carbon fiber. Overall, tuning lignin hydroxyl groups by precipitating in acidic water could significantly enhance lignin based carbon fiber mechanical performances, in particular the elastic modulus. The enhancement could be resulted from the improvement in multiple intermolecular hydrogen bonding and repolymerization of condensed interunitary linkage.

Figure 42:
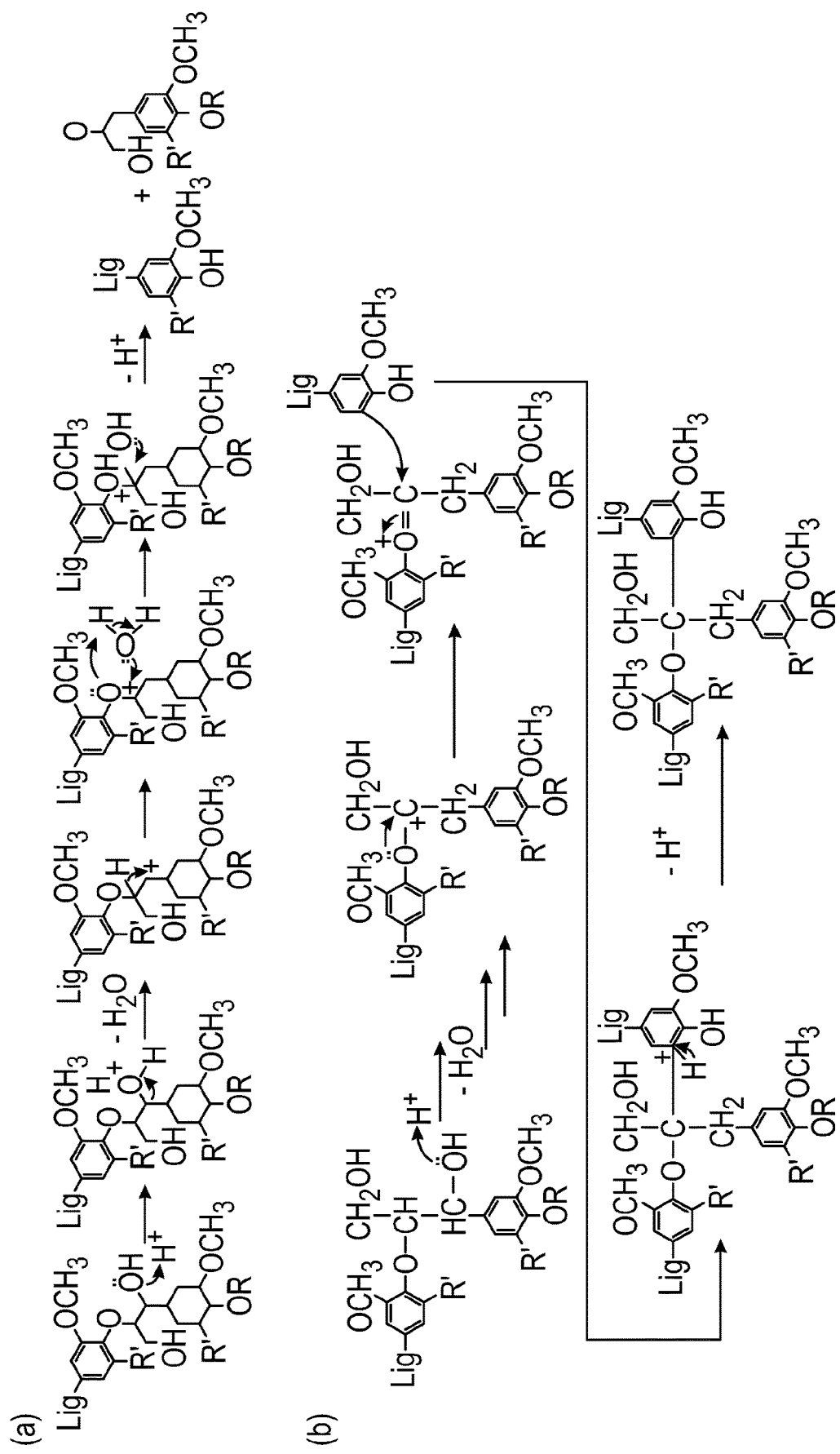
FIG. 42 shows a proposed mechanism of how tuning lignin hydroxyl groups may impact lignin chemical features and carbon fiber performances; with lignin degradation depicted in panel (a) and repolymerization through condensation depicted in panel (b)
Figure 43:
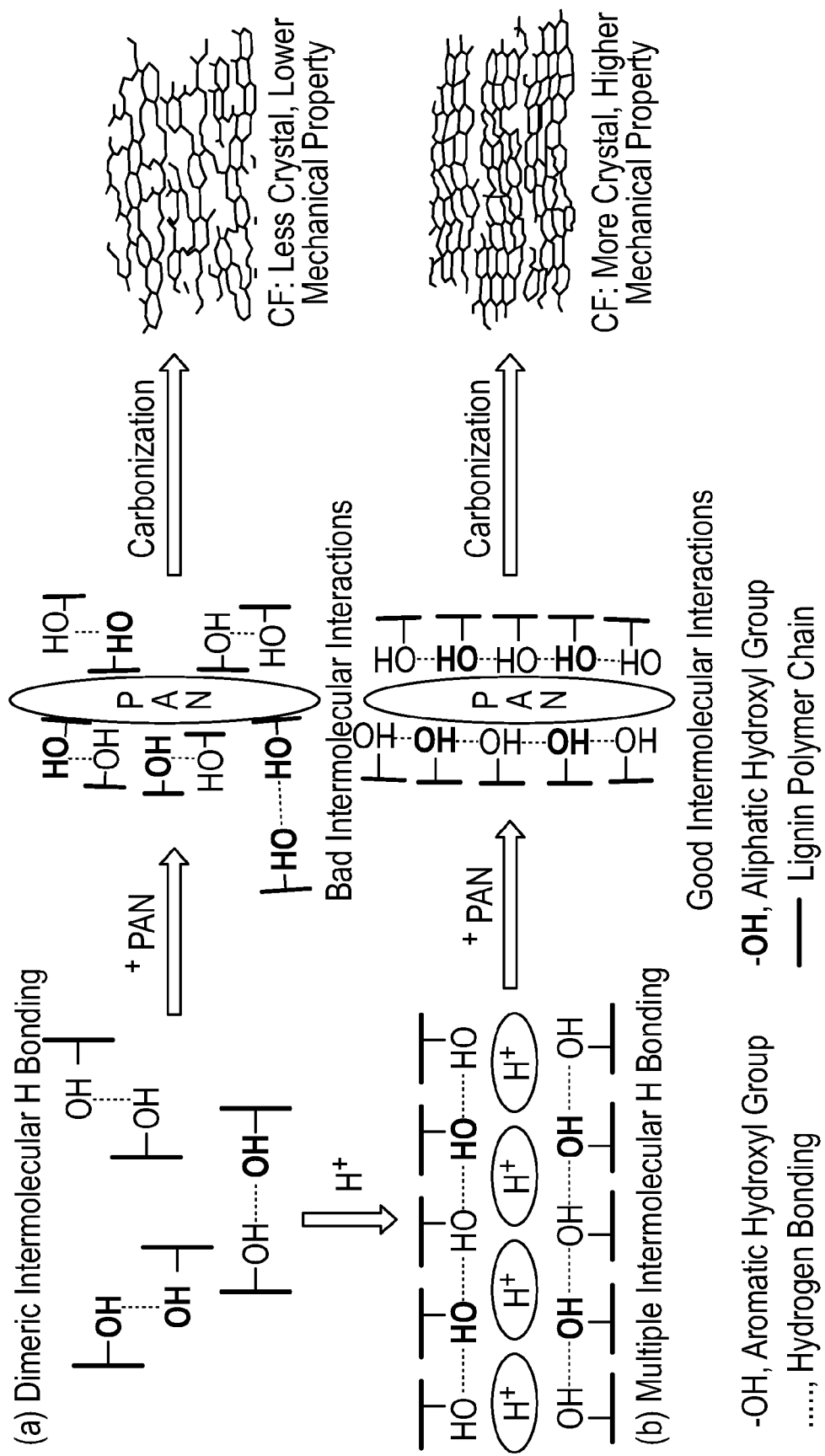
FIG. 43 shows a proposed mechanism of how tuning lignin hydroxyl groups impacts lignin chemical features and carbon fiber performances, whereby the formation of more multiple intermolecular hydrogen bonding within lignin hydroxyl groups could align lignin molecules and thus improve their intermolecular interactions with guest PAN molecules.
Figure 53:
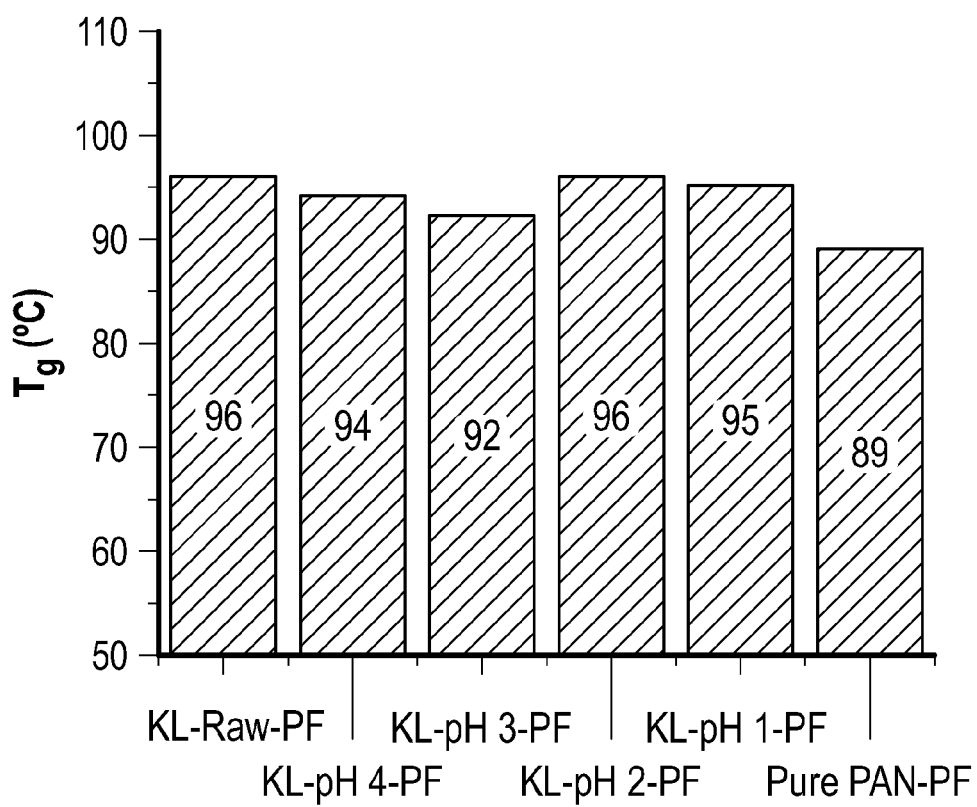
FIG. 53 shows the glass transition temperature ($T_g$) of precursor fibers (PF) made from lignin and pure PAN: KL-Raw-PF, KL-pH 4-PF, KL-pH 3-PF, KL-pH 2-PF and KL-pH 1-PF represented precursor fibers made from raw Kraft lignin, Kraft lignin precipitated under pH 4, Kraft lignin precipitated under pH 3, Kraft lignin precipitated under pH 2 and Kraft lignin precipitated under pH 1, respectively; Pure PAN-PF represented precursor fiber made from pure PAN.

Mechanistic Study of the Enhancement of Mechanical Properties for Lignin Based Carbon Fiber by Tuning Lignin Hydroxyl Groups Without wishing to be limited by theory, the enhanced mechanical performances in lignin based carbon fiber could result from the improved intermolecular interactions and carbon fiber crystallite structure. First, formation of multiple intermolecular hydrogen bonding could improve the intermolecular interactions between lignin and PAN molecules as indicated by miscibility analysis. Glass transition temperature ($T_g$) of thermostabilized precursor fiber has been widely used to reveal the miscibility of precursor molecules in fibers, where lower $T_g$ indicates better miscibility. As shown in FIG. 41D, $T_g$ of all precipitated lignin (KL-pH 4, 3, 2, and 1)/PAN thermostabilized fibers (TF) (at 1:1 weight ratio) were lower than that of raw lignin/PAN fiber (160° C.). In particular, the fiber made of KL-pH 1 and PAN had the lowest $T_g$ at 152° C. The declined T indicated the improved miscibility of precipitated lignin molecules with PAN chains. FIG. 53 shows the glass transition temperature ($T_g$) of precursor fibers (PF) made from lignin and pure PAN: KL-Raw-PF, KL-pH 4-PF, KL-pH 3-PF, KL-pH 2-PF and KL-pH 1-PF represented precursor fibers made from raw Kraft lignin, Kraft lignin precipitated under pH 4, Kraft lignin precipitated under pH 3, Kraft lignin precipitated under pH 2 and Kraft lignin precipitated under pH 1, respectively; Pure PAN-PF represented precursor fiber made from pure PAN. Besides the miscibility, the T of thermostabilized fibers was significantly increased in comparison with that of the lignin/PAN precursor fibers (FIG. 53), indicated the improved stability of the fibers preventing fusing by thermostabilization process. Formation of multiple intermolecular hydrogen bonding between Ar—OH and Alk-OH may align the lignin molecules toward a preferred orientation, and the aligned lignin molecules could thus have better interactions with PAN molecules (FIG. 43). Without wishing to be limited by theory, FIG. 42 shows a proposed mechanism of how tuning lignin hydroxyl groups may impact lignin chemical features and carbon fiber performances. Both lignin degradation (panel (a)) and repolymerization through condensation (panel (b)) could be initiated by Alk-OH on $C_a$ position. Degradation of β-O-4' linkage could generate new Ar—OH (FIG. 42, panel (a)), and condensation could form new β-5' linkage (FIG. 42A, panel (b)). FIG. 43 shows a proposed mechanism of how tuning lignin hydroxyl groups impacts lignin chemical features and carbon fiber performances, whereby the formation of more multiple intermolecular hydrogen bonding within lignin hydroxyl groups could align lignin molecules and thus improve their intermolecular interactions with guest PAN molecules. The improved lignin/PAN interactions could enhance crystallization of carbon fiber and thereby its mechanical properties. As a result, the interfacial bonds between lignin and PAN molecules could be enhanced. The improved interfacial bonds can diminish the intrinsic defects in carbon fibers like voids, entanglements, and chain ends, which could in turn enhance the carbon fiber mechanical strength.

Second, formation of multiple intermolecular hydrogen bonding and condensed lignin structure could improve the formation of crystallite structure in carbon fiber. The crystallite structure in carbon fiber was referred as pre-graphitic turbostractic carbon, which is directly related to the mechanic performances of carbon fibers. Raman spectroscopy analysis was carried out to measure the turbostractic carbon content. As shown in FIG. 53, D band and G band were at around 1330 cm$^{-1}$ and 1595 cm$^{-1}$, respectively. G/D ratio, represented as integration ratio of G and D bands, was 0.36 for carbon fiber made of KL-Raw (FIG. 41E), whilst G/D ratios of carbon fibers made of KL-pH 4 and 3 were increased to 0.51 and 0.54, respectively. The increased G/D ratios were correlated to the increased mechanical performances as shown in FIG. 41A and FIG. 41B, revealing that tuned lignin with higher content of multiple intermolecular hydrogen bonding could lead to more crystallite structure and thus increased mechanical performance. Moreover, carbon fiber made of KL-pH 2 had G/D ratio of 0.46. The decreased G/D ratio as compared with that of carbon fiber made of KL-pH 3 were correlated with its decreased β-O-4' linkage and mechanical performance. More importantly, carbon fiber made of KL-pH 1 with highly condensed β-5' linkage had more turbostractic carbon (G/D ratio was 0.51) than that of KL-pH 2, indicating repolymerization through condensation could increase the crystallite content in lignin based carbon fiber.

Figures 1, 54:
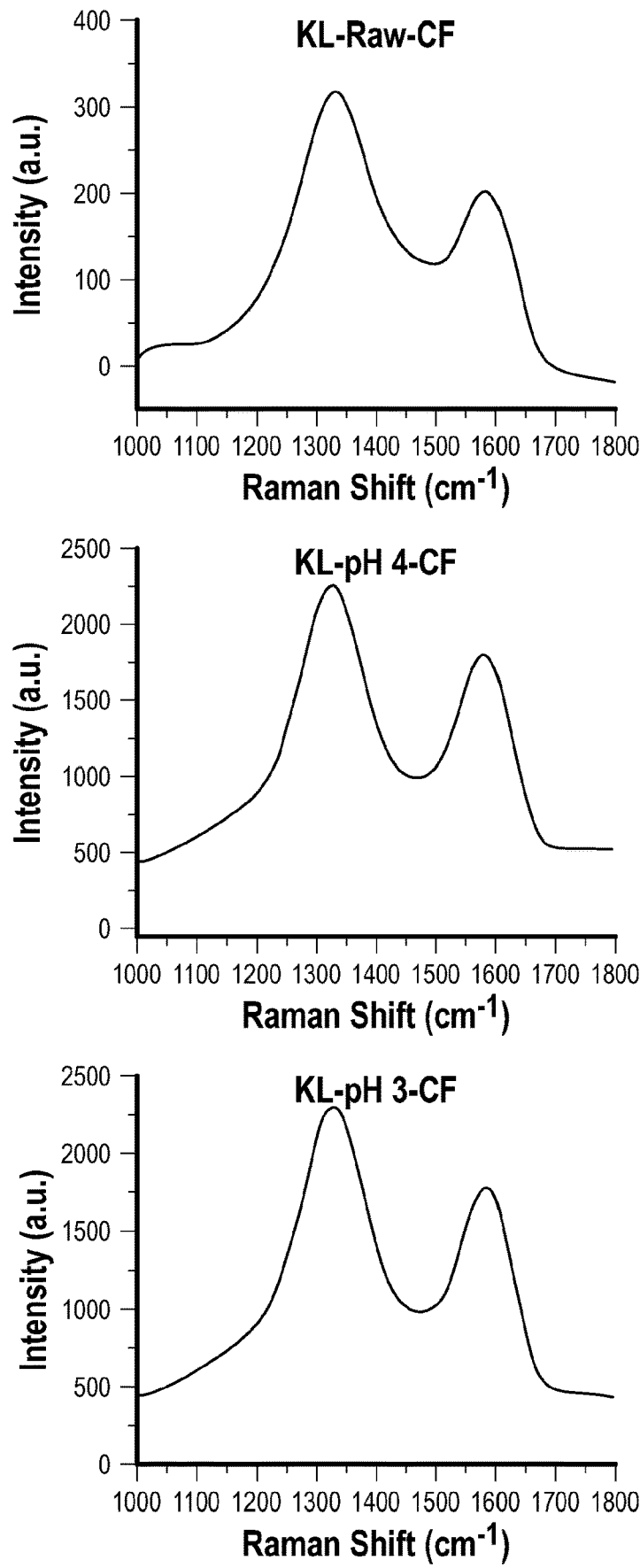
FIG. 54 shows the Raman microscopy spectra of carbon fibers (CF) made of lignin and pure PAN; the left peak (around 1330 cm$^{-1}$) in each panel is D band, and the right peak (around 1595 cm$^{-1}$) in each panel is G band.
Figures 2, 54:
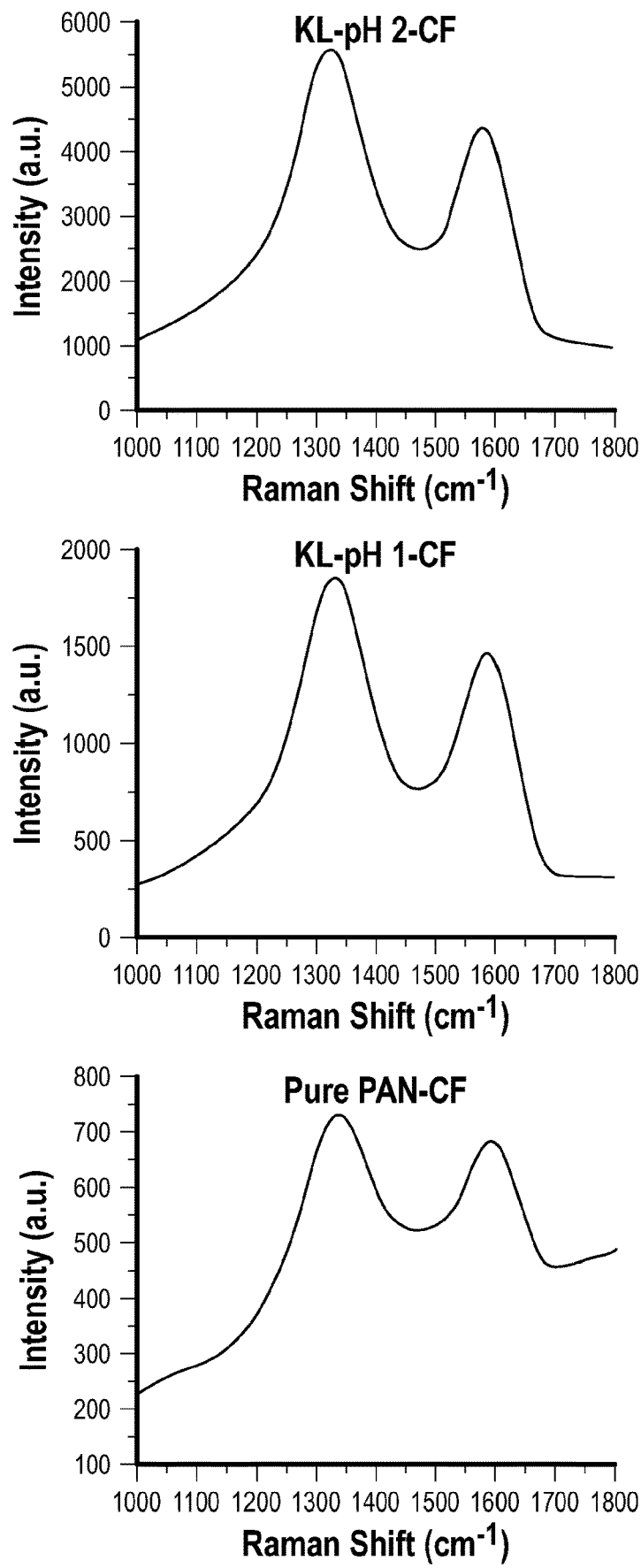

In addition to Raman spectroscopy, X-ray diffraction (XRD) was carried out to analyze crystallite size. FIG. 54 shows the Raman microscopy spectra of carbon fibers (CF) made of lignin and pure PAN. The left peak (around 1330 cm$^{-1}$) in each panel is D band, and the right peak (around 1595 cm$^{-1}$) in each panel is G band. From the XRD diffractograms (FIG. 54), crystallite size ($h_{hkl}$) and the distances between interfacial crystallite layers ($d_{hkl}$) were calculated from Scherrer's Equation (1) and Bragg's law Equation (2), respectively. As shown in FIG. 41F, as compared to raw Kraft lignin (KL-Raw), carbon fiber made of lignin with more multiple intermolecular hydrogen bonding (KL-pH 4 and KL-pH 3) had larger crystallite size. Meanwhile, when β-O-4' linkage of lignin decreased (KL-pH 2), the crystallite size of its carbon fiber was decreased as well. More importantly, when condensed linkage of lignin (KLpH 1) increased, the crystallite size of the derived carbon fiber increased. Besides these findings, the distances between interfacial crystallite layers ($d_{hkl}$) of carbon fibers made from all precipitated lignin (KL-pH 4 to 1) were decreased when compared to that of carbon fiber made of KL-Raw (FIG. 41G), further suggesting that tuning lignin hydroxyl groups with more multiple intermolecular hydrogen bonding and condensed linkages could significant improve the crystallite structure of carbon fiber. Overall, these crystallite analyses by Raman spectroscopy and XRD indicated that lignin hydroxyl groups could be tuned and thus improve both content and size of the pre-graphitic turbostratic crystallite structure in carbon fiber.

The improvement in carbon fibers crystal structures correlated to the enhancement in their mechanical performances, providing the underlying mechanism for how lignin functional hydroxyl groups could impact carbon fiber quality from two aspects. First, as discussed above, formation of more multiple intermolecular hydrogen bonding could align lignin molecules and improve interfacial interactions of lignin with PAN molecules (FIG. 43). Without wishing to be limited by theory, the changes in lignin hydrogen bonding network could be attributed into two reasons: (1) the increase in Ar—OH resulted from lignin β-O-4' linkage degradation could enhance the formation of multiple hydrogen bonding between Ar—OH and Alk-OH. The reaction mechanism of β-0-4' degradation under acidic conditions is as shown in FIG. 42, panel (a). Alk-OH on $C_\alpha$ position of lignin side chain was dehydroxylated after the electrophilic attack of hydrogen cation on $C_\alpha$, and one new Ar—OH was formed subsequently during the breakdown of the β-O-4' ether bond. Since Alk-OH on $C_\alpha$ position was primarily involved in intramolecular hydrogen bonding, it could be postulated that the multiple hydrogen bonding between Ar—OH and Alk-OH was mainly formed between Ar—OH and Alk-OH on $C_\gamma$ position of lignin side chain. In fact, Alk-OH on $C_\gamma$ position contributed to most of the multiple intermolecular hydrogen bonding in lignin. (2) The presence of hydrogen cations could facilitate the formation of multiple intermolecular hydrogen bonding. Lignin hydroxyl groups, in particular, Ar—OH group, and hydrogen cations may form ion-dipole interactions, which could reduce the distances between lignin molecules and facilitate the intermolecular interactions between them (FIG. 43). As a result, more multiple intermolecular hydrogen bonds could be formed.

Second, both β-O-4' and β-5' linkages were thought as linear lignin structures. The improvement in β-5' linkages after condensation (FIG. 39B, panel (b)) could facilitate the formation of intermolecular interactions between lignin and PAN molecules. The increment in lignin condensed structure could be rendered by lignin repolymerization through condensation. In this research, significant condensation was observed when lignin was precipitated into pH 1 water. A typical condensed structure, β-5', increased 1.5-fold in KL-pH 1 as compared with KL-Raw (FIG. 39B, panel (b)). This β-5' condensation was initiated by electrophilic attack of hydrogen cation on $C_\alpha$ and followed by $C_\alpha$ cation formation with the releasing of Alk-OH on $C_\alpha$, as discussed above. β-5' bond was formed thereafter when $C_5$ of an aromatic ring added onto $C_\beta$ through nucleophilic addition (FIG. 42, panel (b)). However, condensation would not go through the formation of a β-β' bond. The significant increase in β-β' linkage in KL-pH 1 (FIG. 39B, panel (c)) probably could be attributed to the decreased percentage in β-O-4' linkage, since β-β' is the second most abundant linkage next to β-O-4' in all lignin samples (FIG. 39B, panels (a) and (c)). Overall, the improved interfacial bonds between lignin and PAN molecular chains by changing the hydrogen bonding network and condensed linkages could increase both the size and content of turbostratic carbon structure in carbon fiber (FIG. 41E, FIG. 41F, FIG. 41G), and finally enhance the mechanical performances of lignin based carbon fibers (FIG. 41A and FIG. 41B).

A Cost-Effective Method for Modifying Lignin Chemistry to Improve Carbon Fiber Performance This Example 3 advances the fundamental understanding of how tuning hydrogen bonding may impact mechanical properties of lignin based carbon fiber, but also delivers an innovative method to modify lignin chemistry for improving carbon fiber performance. The new acidic precipitation technology provides several advantages over previous strategies to modify lignin structure for improving carbon fiber performance. First, the acidic precipitation method of this Example 3 significantly improves mechanical properties of lignin based carbon fiber, as compared to other methods to modify lignin functional groups. As aforementioned, various methods were developed to modify lignin functional groups, yet led to marginal increase of carbon fiber properties. The acidic precipitated precursor lignin significantly increased mechanical properties of the resulting carbon fiber. Moreover, the best elastic modulus from precipitated lignin was even higher than most commercial PAN and pitch-based carbon fiber as measured by nanoindentation (FIG. 41C). Second, as compared to the enzymatic and dialysis fractionations, the pH-based precipitation significantly lowered the cost of lignin structure modification. The highest elastic modulus of carbon fibers (KL-pH 3) in this Example 3 was slightly higher than that of carbon fiber from the lignin fractionated by enzyme and dialyzed as in Example 2 (FIG. 41C), yet the acidic precipitation of Example 3 avoided the costly laccase and dialysis set-up. Third and more importantly, the simplified lignin purification strategy is also more amenable to scale-up for commercial lignin carbon fiber manufacturing. As compared to dialysis and other methods, the solubilization of Kraft lignin at high pH (basic condition) and precipitation of lignin at low pH (acidic condition) can be more amenable to large-scale lignin separation and fiber manufacturing. Finally, the acid precipitation of Example 3 provided an 88% lignin recovery and avoided the loss of a significant portion of lignin during fractionation (FIG. 45). Even though soluble lignin from biorefinery or Kraft lignin can be used for different applications, such strategy of lignin separation complicates the technoeconomics of lignin utilization. In this Example 3, a method has been provided that enables recovery of most of the raw lignin, yet modified the chemical characteristics to allow quality carbon fiber manufacturing. The acidic precipitation method of this Example 3 represents a novel approach to modify lignin structure without losing substantial lignin, and thus could improve the overall carbon recovery for lignin carbon fiber.

Conclusion

Overall, Example 3 provides an economical, scalable, and high-recovery technology to modify lignin chemistry for improved carbon fiber properties, and advanced fundamental understanding of how functional groups can be tuned to enhance the interaction between lignin and guest plasticizer.

Chemical analyses showed that the tuned lignin had increased aromatic hydroxyl groups (Ar—OH), while lignin structure had more condensed linkages under a relatively high acid concentration (pH 1). Mechanical tests showed that carbon fibers derived from tuned lignin had much enhanced mechanical performances. DSC, XRD, and Raman spectroscopy indicated that the enhancement resulted from the improved intermolecular interactions between lignin and PAN molecules and crystallite turbostractic carbon structures in carbon fibers. The mechanistic study revealed that tuning lignin hydroxyl groups with increased multiple intermolecular hydrogen bonding between lignin Ar—OH and Alk-OH and condensed inter-unitary linkages enhanced the mechanical performances of lignin based carbon fibers. Understanding of such correlation between lignin chemical structures and carbon material chemistry, in particular tuning hydroxyl groups with carbon fiber crystallite structure, sheds new light on the foundations of lignin based carbon fiber mechanical performances and guides further chemical modifications and designs of lignin molecular structures toward high quality lignin based carbon fiber. In addition to the new method of lignin processing for carbon fiber, the experiments of this Example 3 also present a new concept that modification of lignin polymer at the molecular level can significantly enhance the derived lignin based carbon fiber performances.

Experimental

Lignin Treatment

The yields of lignin from precipitation, as shown in FIG. 45, were calculated from the weight ratio based on the initial weight of Kraft lignin before the precipitation. To measure the weight of water-soluble lignin, the pH of this fraction was adjusted into 2 and then kept stirring for 1 h with an ice bath. As shown in FIG. 37B, no lignin was precipitated from water-soluble fraction derived from KL-pH 4 to 1, whilst significant amount of lignin was precipitated from the water-soluble part of KL-pH 5. For all lignin samples, the total yield was less than 90%, which suggested weight loss during the precipitation and washing processes.

Lignin Characterizations

GPC

GPC results of this Example 3 are depicted in FIG. 46A and FIG. 46B.

$^{31}$P NMR

FIG. 47 shows 31P NMR spectra of lignin samples: panel (a) depicts KL-Raw; panel (b) depicts KL-pH 4; panel (c) depicts KL-pH 3; panel (d) depicts KL-pH 2; and panel (e) depicts KL-pH 1. The content of the carboxylic acid groups (FIG. S5) integrated from $^{31}$P NMR spectra did not show significant differences between lignin samples derived from different treatments under pH 4 to 1. Assignments of $^{31}$P NMR are provided in Table 8.

TABLE 8

Assignments of $^{31}$P NMR

| Assignments | AlK—OH | I.S. | β-5 | 4-O-5 | Ar—OH S | Ar—OH 5-5 | Ar—OH G | Ar—OH H | R—COOH |
|---|---|---|---|---|---|---|---|---|---|
| Chemical shift (ppm) | 150.0-146.3 | 146.2-145.7 | 144.6-142.9 | 142.9-141.6 | 141.6-141.2 | 141.2-140.6 | 140.6-138.9 | 138.9-137.3 | 136.6-134.0 |

I.S., internal standard

Figure 48:
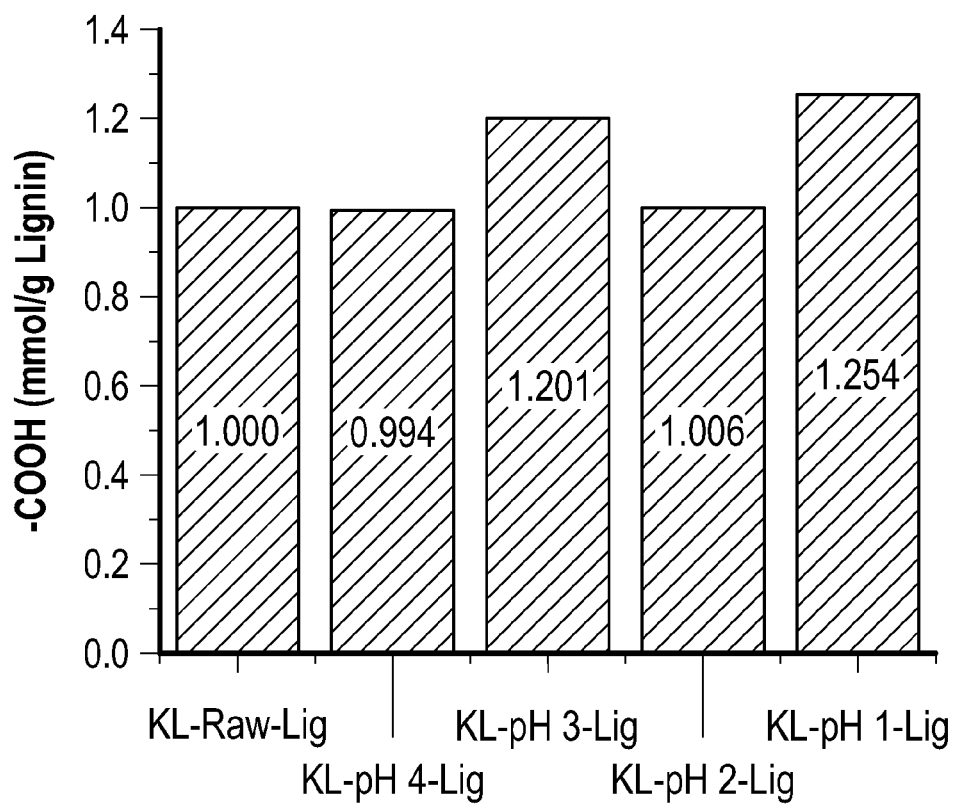
FIG. 48 shows the content of —COOH group in lignin derived from $^{31}$P NMR spectra in Example 3.

FIG. 48 shows the content of —COOH group in lignin derived from $^{31}$P NMR spectra.

FTIR

Two deconvoluted peaks assigned to dimeric intermolecular H-bonding (3520-3505 cm$^{-1}$, FIG. 49C) and multiple intermolecular H-bonding between Ar—OH and Alk-OH (3450-3440 cm$^{-1}$, FIG. 49C) were found to be changed significantly as the changes of pH values (Table 10). Besides these two peaks, other deconvoluted peaks, as shown in FIG. 49C and Table 10, were not observed to change significantly as the pH values. Moreover, deconvoluted peaks at 3215-3300 cm$^{-1}$ (FIG. 49C) were not assigned to any hydrogen bonding (Table 9) and still remain unrevealed.

TABLE 9

Assignments of FTIR Bands of Lignin —OH regions (3700-3100 cm$^{-1}$)

| Bands | Wavenumber (cm$^{-1}$) | Assignment |
|---|---|---|
| — | >3600 | Free —OH |
| I | 3520-3505 | Dimeric formation of intermolecular H-bonding |
| II | 3450-3440 | Multiple formation of intermolecular H-Bonding between Ar—OH and Alk—OH |
| III | 3410-3390 | Multiple formation of intermolecular H-Bonding between Alk—OH and Alk—OH |
| IV | 3350-3340 | Multiple formation of intermolecular H-Bonding between Ar—OH and Ar—OH |
| V | <3200 | Multiple formation of Intermolecular H-bonding of —OH in 5-5 with other Ar—OH |

The bands of I, II, III, IV, and V in —OH regions are shown in FIG. 49B.

TABLE 10

Absorbance of FTIR Bands of Lignin —OH Regions

| Bands | I | II | III | IV | V |
|---|---|---|---|---|---|
| KL-Raw-Lig | 115.5 | 9.3 | 1.86 | — | — |
| KL-pH 4-Lig | 105.0 | 12.6 | 4.14 | — | — |
| KL-pH 3-Lig | 99.3 | 16.7 | 0.64 | — | — |
| KL-pH 2-Lig | 98.5 | 40.6 | 3.61 | 14.9 | — |
| KL-pH 1-Lig | 47.0 | 88.6 | — | 2.1 | 19.4 |

The regions I, II, III, IV, and V are shown in FIG. 49B, and their assignments are given in Table 9.

2D HSQC NMR

The assignments and quantification of lignin linkages in 2D HSQC NMR are shown in Table 11.

TABLE 11

Assignments of Lignin Interunitery Linkages in 2D HSQC NMR

| Linkages* | F2 (Ppm) | F1 (Ppm) |
|---|---|---|
| Iβ (β position in β-O-4') | 6.0 | 74.5 |
| IIα (α position in β-5') | 5.5 | 87.7 |
| IIIα (α position in β-β') | 4.5 | 87.0 |
| IVβ (β position in DBDO) | 4.2 | 81.5 |

*Lignin interunitary linkages of I, II, III, and IV are shown in FIG. 39C.

Viscosity

Figure 50:
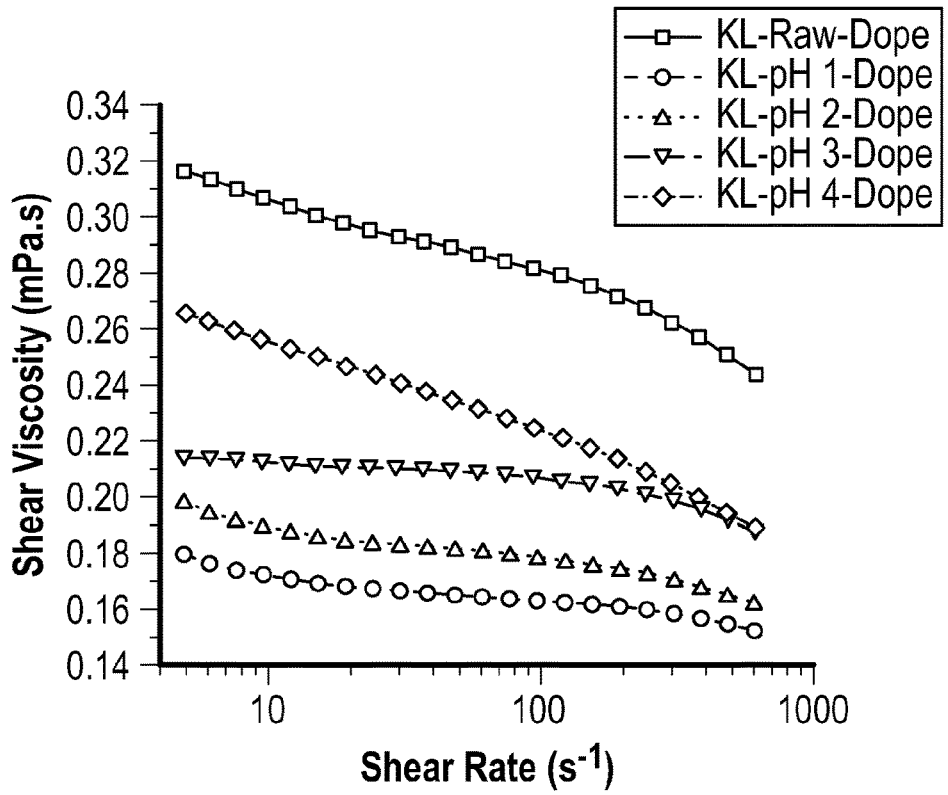
FIG. 50 shows the viscosity of lignin/PAN dopes of Example 3 in DMF solution, wherein KL-Raw-Dope, KL-pH 4-Dope, KL-pH 3-Dope, KL-pH 2-Dope and KL-pH 1-Dope represent spinning dopes prepared by mixing PAN with Kraft lignin, Kraft lignin precipitated under pH 4, Kraft lignin precipitated under pH 3, Kraft lignin precipitated under pH 2 and Kraft lignin precipitated under pH 1, respectively.
Figure 51A:
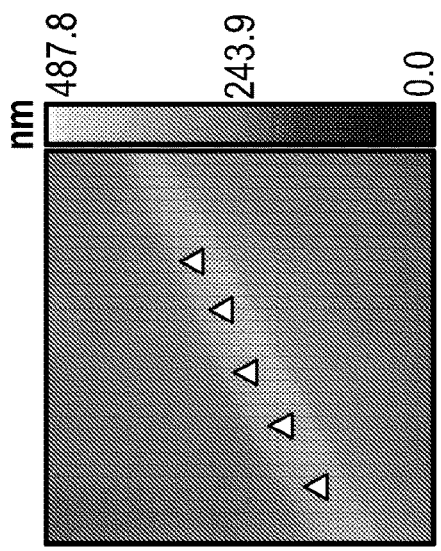
FIG. 51 shows the topography of scanning probe microscopy (SPM) images of single carbon fibers taken under nanoindentation: panel (a) KL-Raw-CF; panel (b) KL-pH 4-CF; panel (c) KL-pH 3-CF; panel (d) KL-pH 2-CF; panel (e) KL-pH 1-CF; and panel (f) pure PAN-CF.
Figure 51B:
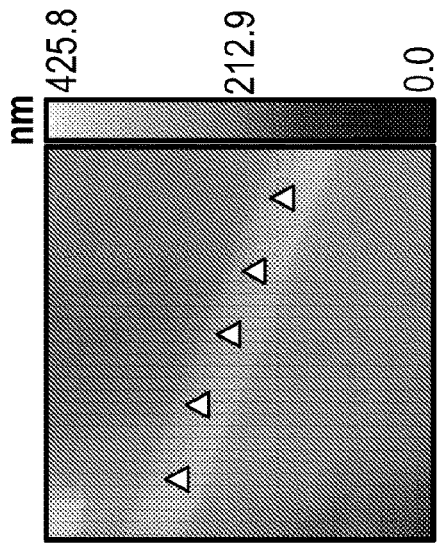
Figure 51C:
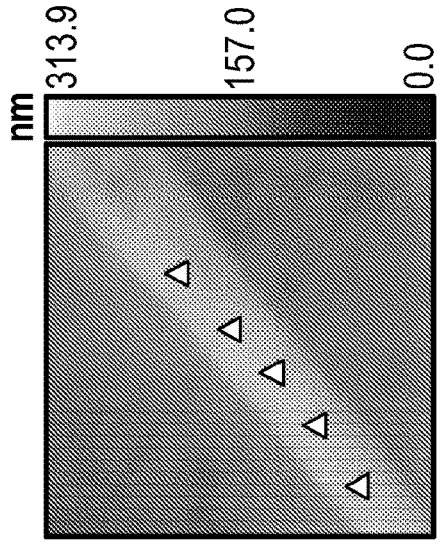
Figure 51D:
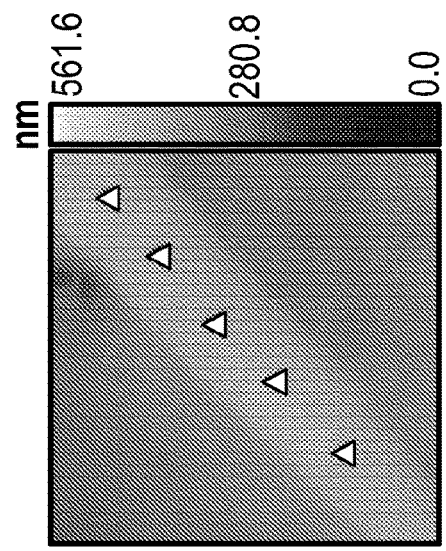
Figure 51E:
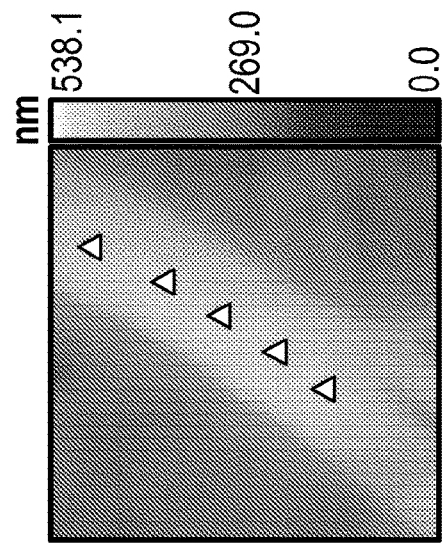
Figure 51F:
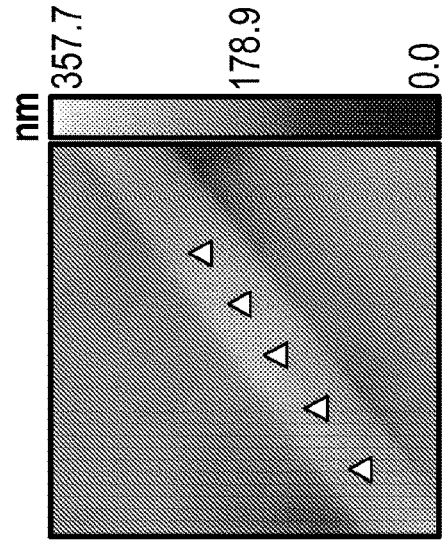

Viscosity of lignin/PAN dopes at the range of 600 s$^{-1}$ to 5 s$^{-1}$ is shown in FIG. 50, which shows the viscosity of lignin/PAN dopes in DMF solution, wherein KL-Raw-Dope, KL-pH 4-Dope, KL-pH 3-Dope, KL-pH 2-Dope and KL-pH 1-Dope represent spinning dopes prepared by mixing PAN with Kraft lignin, Kraft lignin precipitated under pH 4, Kraft lignin precipitated under pH 3, Kraft lignin precipitated under pH 2 and Kraft lignin precipitated under pH 1, respectively. In comparison with KL-Raw, all electrospinning dopes of precipitated lignin/PAN were decreased. In particular, viscosity decreased as pH values decreased. The results highlighted that lignin precipitated against lower pH value water could have weaker intermolecular attractions with the solvent of DMF. The decreased intermolecular interactions between lignin and the solvent could result from the enhanced intermolecular interactions between lignin-lignin and lignin-PAN molecules, as suggested by the FTIR analysis.

Fiber Characterizations

Nanoindentation

FIG. 51 shows the topography of scanning probe microscopy (SPM) images of single carbon fibers taken under nanoindentation: panel (a) KL-Raw-CF; panel (b) KL-pH 4-CF; panel (c) KL-pH 3-CF; panel (d) KL-pH 2-CF; panel (e) KL-pH 1-CF; and panel (f) pure PAN-CF. The inserted solid triangles on the fibers indicated the positions of indents along the carbon fibers. KL-Raw-CF, KL-pH 4-CF, KL-pH 3-CF, KL-pH 2-CF and KL-pH 1-CF represented carbon fiber made from raw Kraft lignin, Kraft lignin precipitated under pH 4, Kraft lignin precipitated under pH 3, Kraft lignin precipitated under pH 2 and Kraft lignin precipitated under pH 1, respectively. Pure PAN-CF represented carbon fiber made from pure PAN. Loading displacement curves such as that of FIG. 24 from nanoindentation measurement, where S is the stiffness, $P_{max}$ is the maximum loading, $h_{max}$ is the maximum displacement were utilized to calculate hardness (H) and reduced elastic modulus (Er) as described in Examples 1 and 2.

DSC

Figures 1, 52:
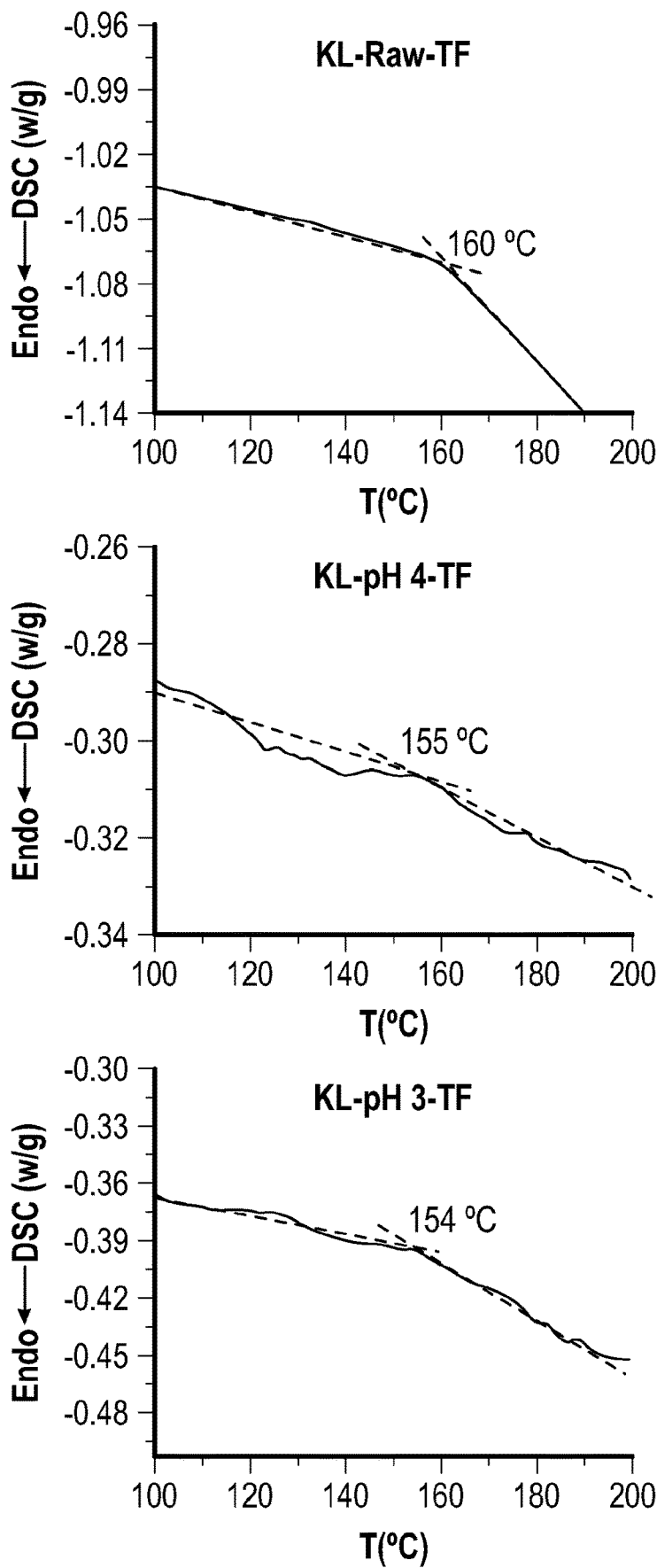
FIG. 52 shows the glass transition temperature ($T_g$) of thermostabilized fibers (TF) made from lignin and pure PAN: KL-Raw-TF, KL-pH 4-TF, KL-pH 3-TF, KL-pH 2-TF and KL-pH 1-TF represent thermostabilized fibers made from raw Kraft lignin, Kraft lignin precipitated under pH 4, Kraft lignin precipitated under pH 3, Kraft lignin precipitated under pH 2 and Kraft lignin precipitated under pH 1, respectively; pure PAN-TF represents thermostabilized fiber made from pure PAN.
Figures 2, 52:
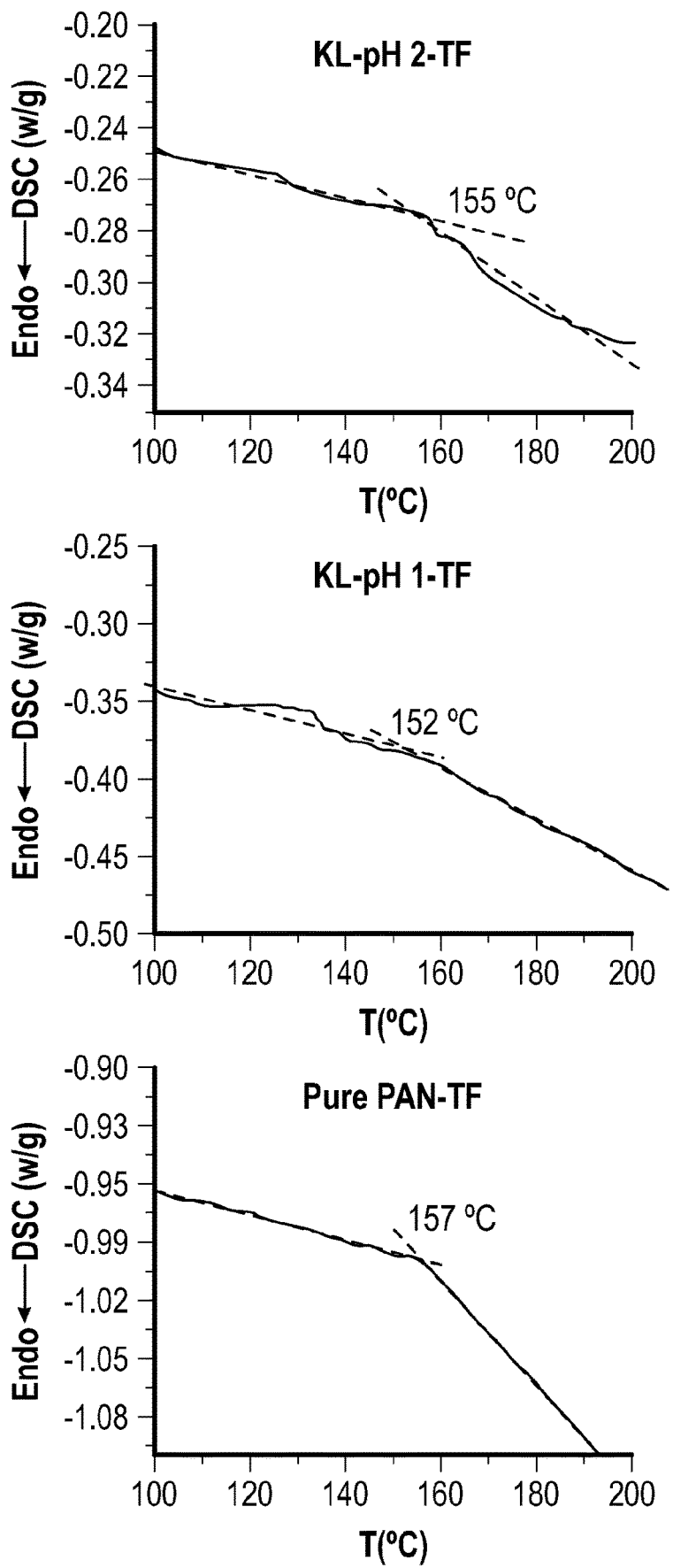

FIG. 52 shows the glass transition temperature ($T_g$) of thermostabilized fibers (TF) made from lignin and pure PAN: KL-Raw-TF, KL-pH 4-TF, KL-pH 3-TF, KL-pH 2-TF and KL-pH 1-TF represent thermostabilized fibers made from raw Kraft lignin, Kraft lignin precipitated under pH 4, Kraft lignin precipitated under pH 3, Kraft lignin precipitated under pH 2 and Kraft lignin precipitated under pH 1, respectively; pure PAN-TF represents thermostabilized fiber made from pure PAN.

FIG. 53 shows the glass transition temperature ($T_g$) of precursor fibers (PF) made from lignin and pure PAN: KL-Raw-PF, KL-pH 4-PF, KL-pH 3-PF, KL-pH 2-PF and KL-pH 1-PF represented precursor fibers made from raw Kraft lignin, Kraft lignin precipitated under pH 4, Kraft lignin precipitated under pH 3, Kraft lignin precipitated under pH 2 and Kraft lignin precipitated under pH 1, respectively; Pure PAN-PF represented precursor fiber made from pure PAN.

Raman Spectroscopy and XRD

Figures 1, 55:
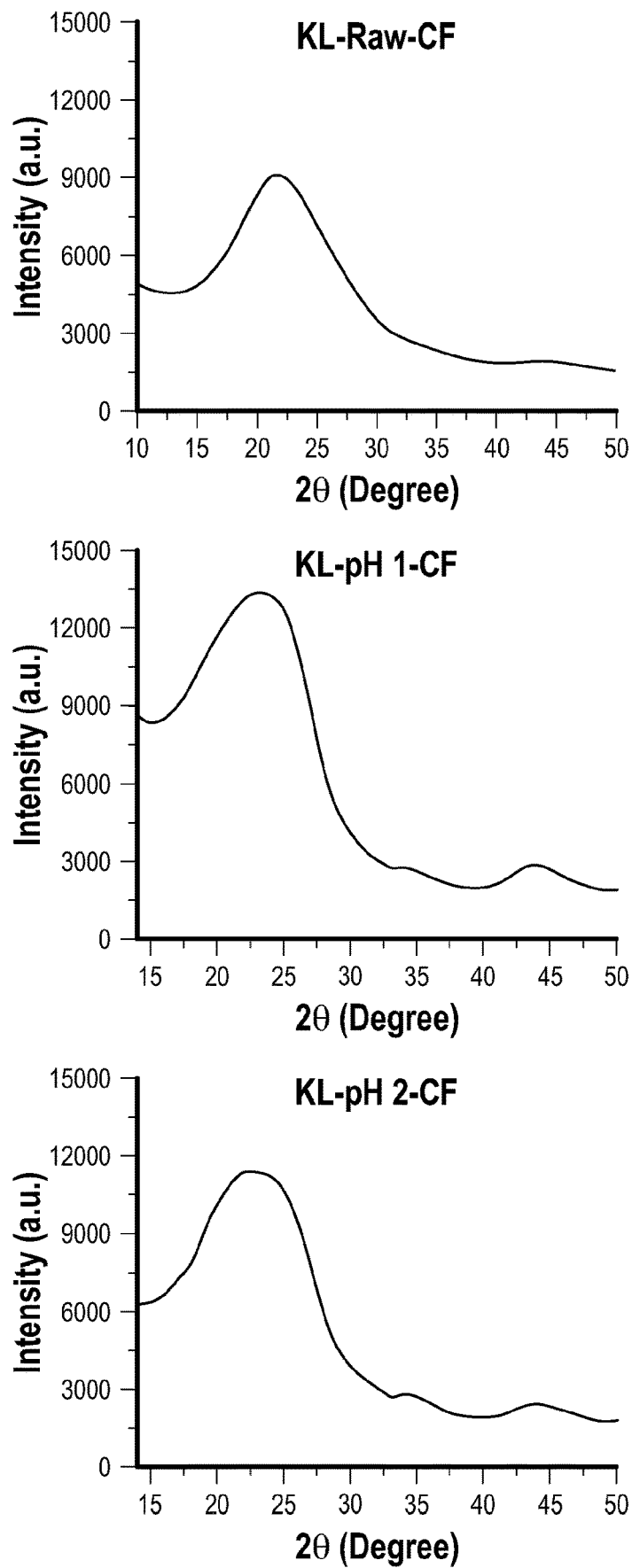
FIG. 55 shows XRD spectra of carbon fibers made from lignin and pure PAN in Example 3.
Figures 2, 55:
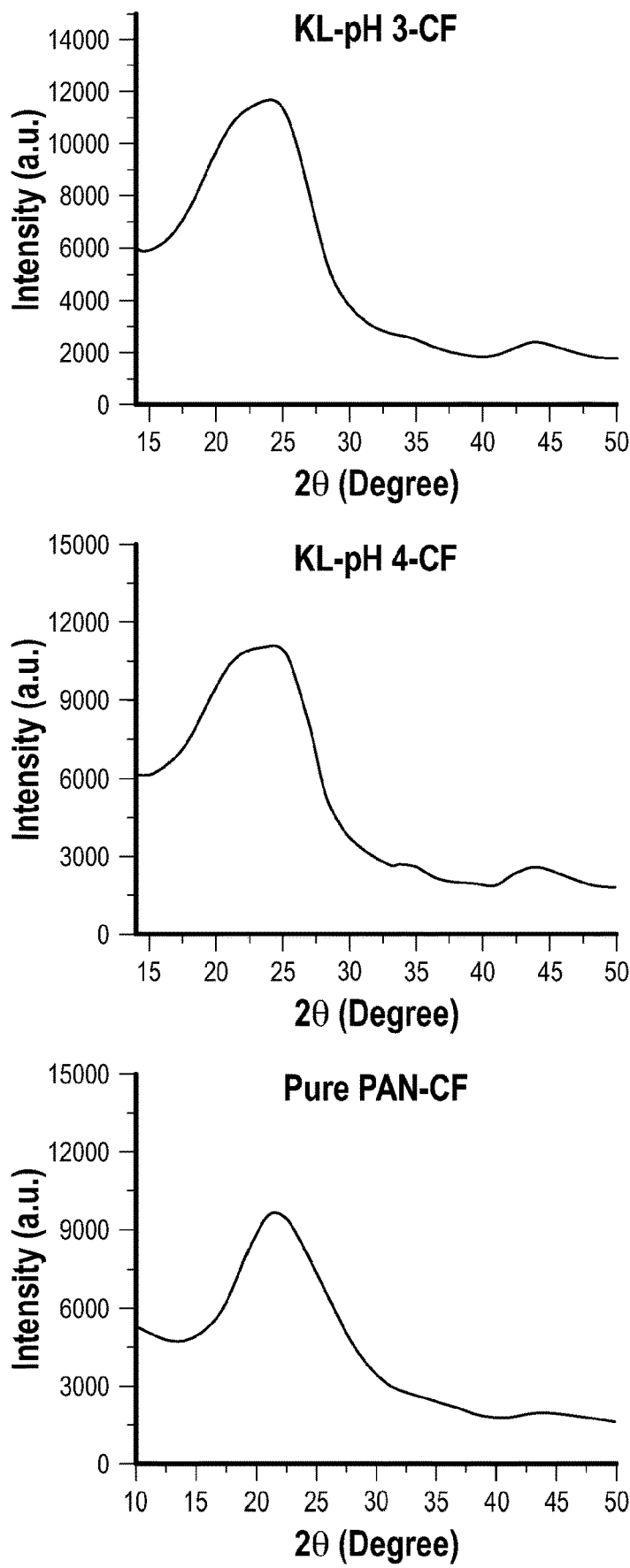

FIG. 54 shows the Raman microscopy spectra of carbon fibers (CF) of Example 3 made of lignin and pure PAN. FIG. 55 shows XRD spectra of carbon fibers made from lignin and pure PAN in this Example 3.

Comparison of Lignin Based Carbon Fibers with Other Carbon Fibers

Table 5 above shows a comparison of the reduced elastic modulus of the lignin based carbon fibers produced in this Example 3 with the published elastic modulus of commerical carbon fibers as measured by nanoindentation.

Example 4: Carbon Fiber Made from SWCNT and Lignin

Overview/Discussion

Experimental

Kraft lignin (KL, 250 mg) was dissolved in 2.5 mL of DMF. SWCNT (0.00%, 0.25%, 0.50%, 0.27%, 1.00%, w/w of lignin) were added into lignin solution and then sonicated for 1 h. PAN powder (250 mg) was dissolved in 2.5 mL of DMF. After sonication, the lignin/SWCNT mixture was added into PAN solution to generate a 15 wt % solution. The electrospinning was as described above.

Figure 56A:
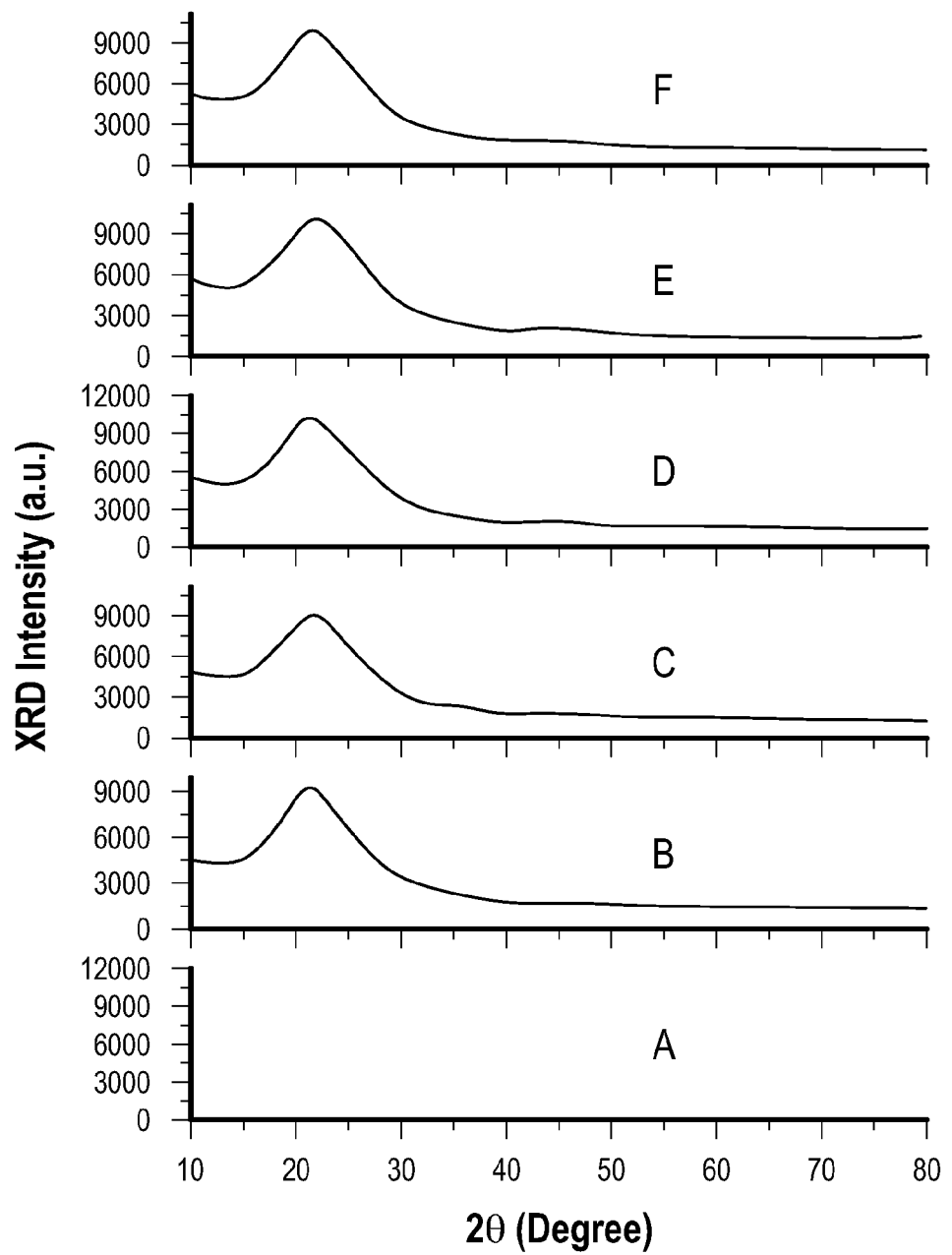
FIG. 56A shows XRD Spectra of the CNT reinforced carbon fibers of Example 4: panel (a) KL-Raw; panel (b) KL-Insol-0% SWCNT; panel (c) KL-Insol-0.25% SWCNT; panel (d) KL-Insol-0.50% SWCNT; panel (e) KL-Insol-0.75% SWCNT; panel (f) KLnsol-1.00% SWCNT.
Figure 56B:
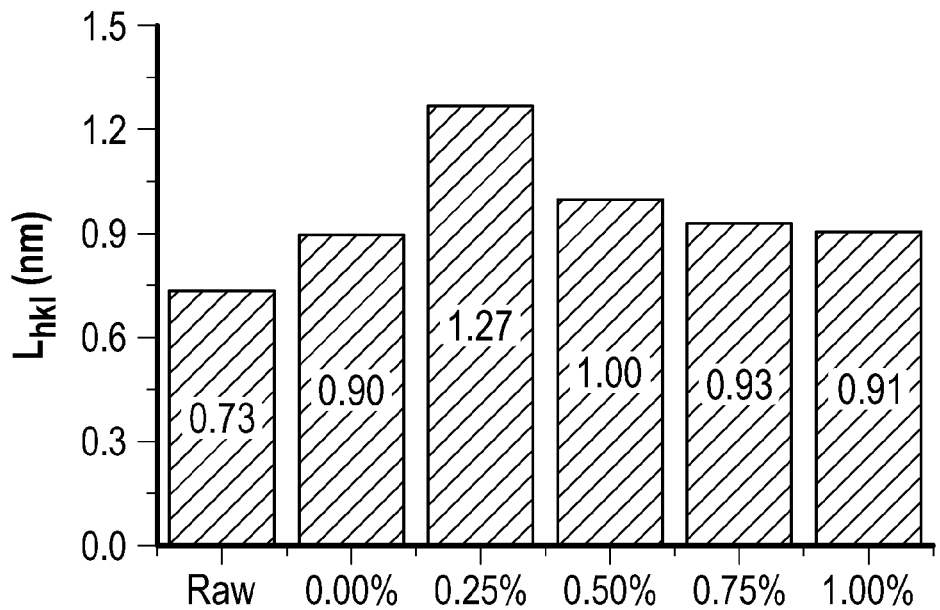
FIG. 56B shows the crystallite size ($L_{hkl}$) of the CNT reinforced carbon fibers of Example 4 calculated from XRD using Scherrer Equation (1)
Figure 56C:
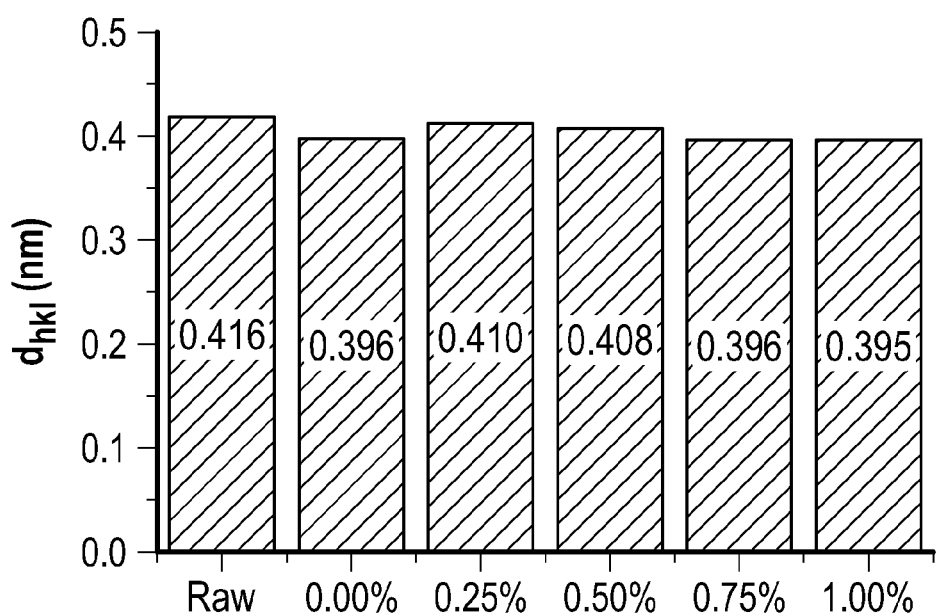
FIG. 56C shows the distance between two atomic layers in crystal structures ($d_{hkl}$) of the CNT reinforced carbon fibers of Example 4 calculated with Bragg law Equation (2)
Figure 57A:
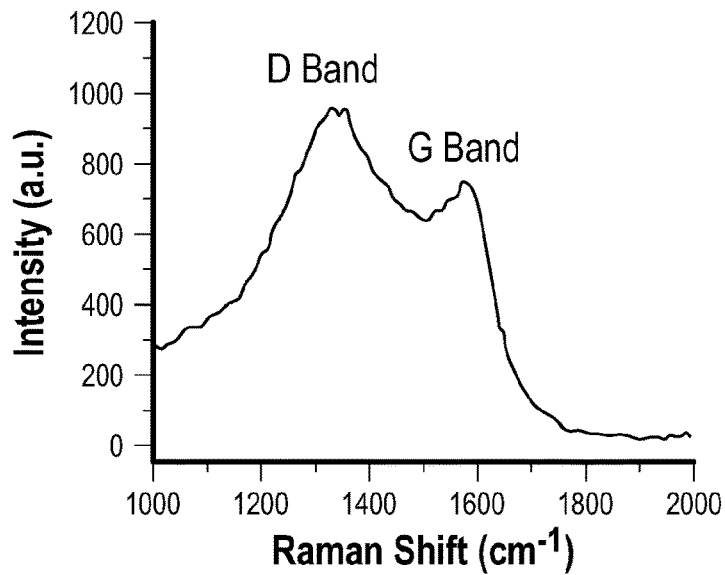
FIG. 57 shows Raman Spectra of the CNT reinforced carbon fibers of Example 4 and their G/D ratios: panel (a) KL-Insol-0% SWCNT; panel (b) KL-Insol-0.25% SWCNT.
Figure 57B:
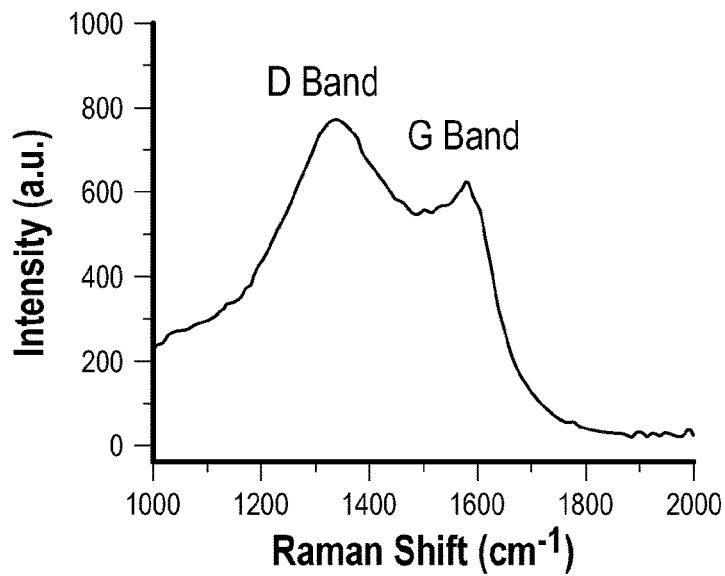
Figure 57C:
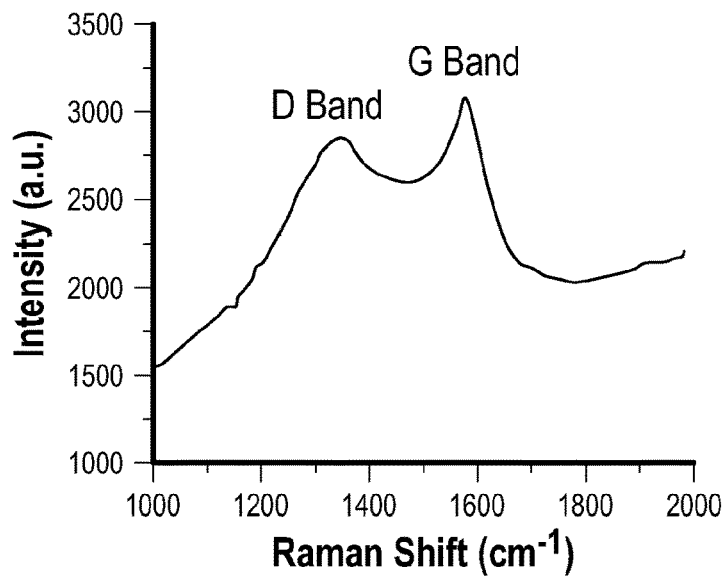
Figure 57D:
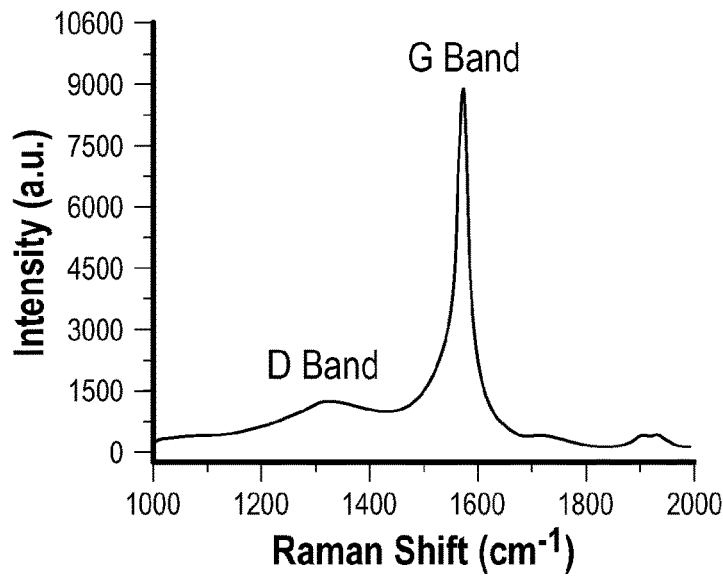
Figure 57E:
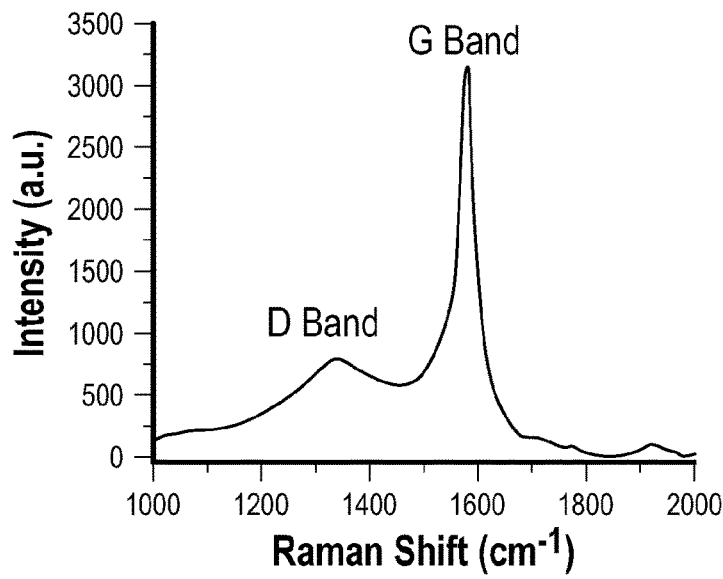
Figure 57F:
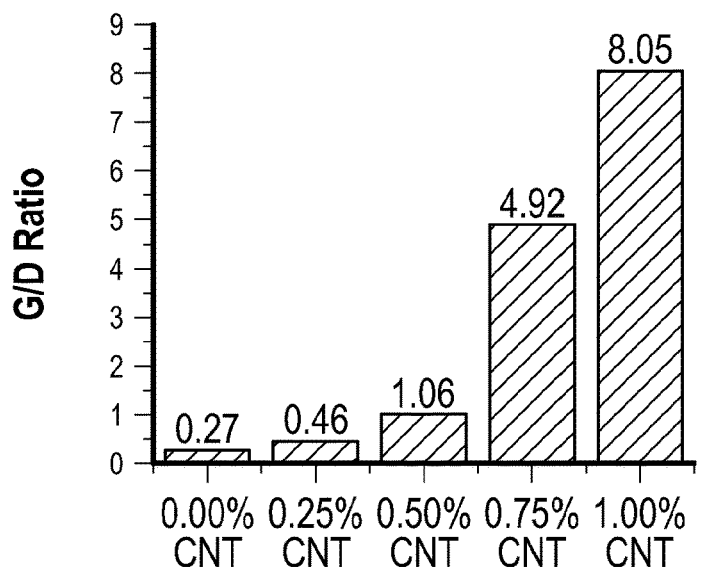

FIG. 56A, FIG. 56B, and FIG. 56C show XRD Spectra of the CNT reinforced carbon fibers, the crystallite size ($L_{hkl}$) thereof calculated from XRD using Scherrer Equation (1), and the distance between two atomic layers in crystal structures ($d_{hkl}$) as calculated with Bragg law Equation (2), respectively: panel (a) KL-Raw; panel (b) KL-Insol-0% SWCNT; panel (c) KL-Insol-0.25% SWCNT; panel (d) KL-Insol-0.50% SWCNT; panel (e) KL-Insol-0.75% SWCNT; panel (f) KLnsol-1.00% SWCNT.

FIG. 57 shows Raman Spectra of the CNT reinforced carbon fibers of this Example 4 and their G/D ratios: panel (a) KL-Insol-0% SWCNT; panel (b) KL-Insol-0.25% SWCNT; panel (c) KL-Insol-0.50% SWCNT; panel (d) KL-Insol-0.75% SWCNT; panel (e) KL-Insol-1.00% SWCNT; and panel (f) G/D ratio for the various CNT reinforced carbon fibers.

Figure 58:
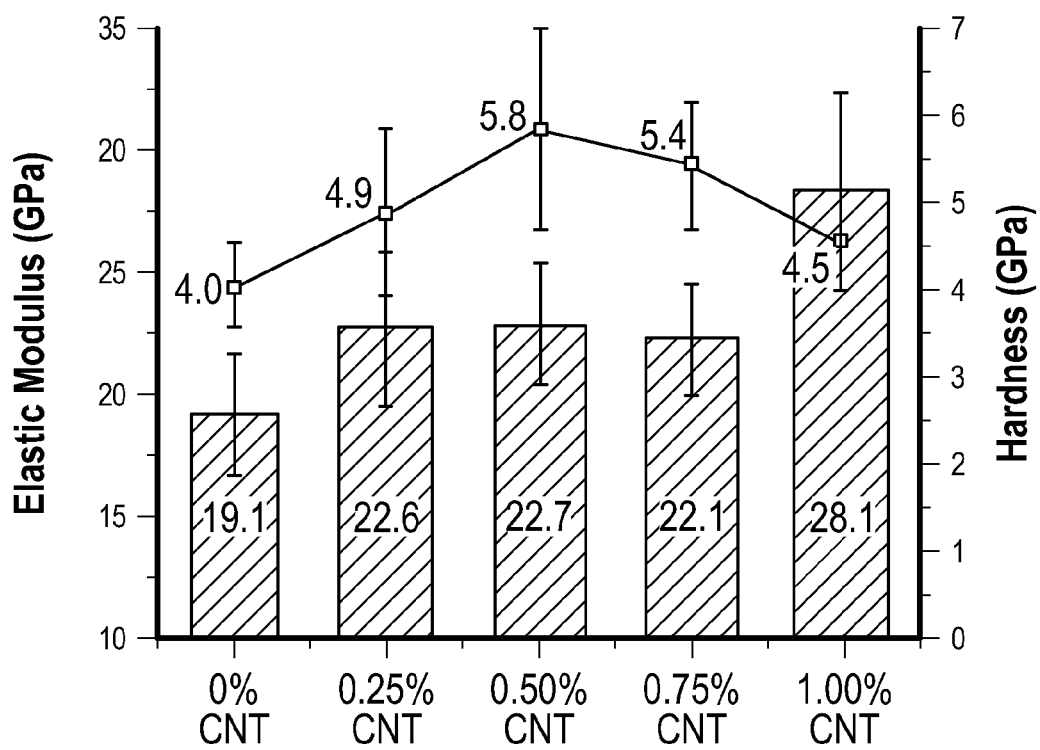
FIG. 58 shows the hardness and reduced elastic modulus of CNT-reinforced lignin carbon fiber of Example 4.

FIG. 58 shows the hardness and reduced elastic modulus of CNT-reinforced lignin carbon fiber of this Example 4.

For the purpose of any U.S. national stage filing from this application, all publications and patents mentioned in this disclosure are incorporated herein by reference in their entireties, for the purpose of describing and disclosing the constructs and methodologies described in those publications, which might be used in connection with the methods of this disclosure. Any publications and patents discussed herein are provided solely for their disclosure prior to the filing date of the present application. Nothing herein is to be construed as an admission that the inventors are not entitled to antedate such disclosure by virtue of prior invention.

In any application before the United States Patent and Trademark Office, the Abstract of this application is provided for the purpose of satisfying the requirements of 37 C.F.R. § 1.72 and the purpose stated in 37 C.F.R. § 1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that can be employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

The present disclosure is further illustrated by the following examples, which are not to be construed in any way as imposing limitations upon the scope thereof. On the contrary, it is to be clearly understood that resort can be had to various other aspects, embodiments, modifications, and equivalents thereof which, after reading the description herein, can be suggest to one of ordinary skill in the art without departing from the spirit of the present invention or the scope of the appended claims.

While various embodiments have been shown and described, modifications thereof can be made by one skilled in the art without departing from the spirit and teachings of the disclosure. The embodiments described herein are exemplary only, and are not intended to be limiting. Many variations and modifications of the subject matter disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k^*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

Additional Description

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Embodiments disclosed herein include:

A: A method of producing carbon fibers, the method comprising: (a) treating lignin to produce a precursor lignin having an increased uniformity defined by (i) an increased linear structure as evidenced by an increased percentage of linkages selected from uncondensed β-O-4' interunitery linkages and/or condensed β-5' linkages, (iii) a reduced polydispersity index (PDI), and/or (iii) an increased amount of multiple intermolecular hydrogen bonding relative to the lignin prior to treating; (b) forming precursor fibers from the precursor lignin; and (c) subjecting the precursor fibers to thermostabilization and/or carbonization to produce the carbon fibers.

B: Lignin based carbon fibers having: an average diameter of less than or equal to about 1300, 1200, 1100, 1000, 900, 800, 700, 600, 500, or 400 nm; an increased content of pre-graphitic turbostratic structure relative to carbon fibers made in the same manner but without treating the lignin and/or absent the lignin, as evidenced by a distance between interfacial crystallite layers, as measured by $d_{hkl}$ determined by XRD, that is less than or equal to about 0.390, 0.380, 0.370, 0.360, or 0.350 nm; a crystallite size, $L_k$i, as measured by XRD, that is at least 20, 30, 40, 50, or 60% greater than a crystallite size of carbon fibers made in the same manner but without treating the lignin and/or absent the lignin; an increased crystallite content, as evidenced by an integration ratio of G and D bands (G/D ratio), as measured by Raman spectroscopy, that is at least 20, 30, 40, or 45% greater than a G/D ratio of carbon fibers made in the same manner but without treating the lignin and/or absent the lignin; and/or a reduced elastic modulus, as measured by nanoindentation, that is at least 30, 40, or 45% greater than a reduced elastic modulus of carbon fibers made in the same manner but without treating the lignin and/or absent the lignin.

Each of embodiments A and B may have one or more of the following additional elements: Element 1: wherein (a) treating the lignin to produce the precursor lignin comprises fractionating the lignin to provide a water soluble fraction and a water insoluble fraction, and wherein the precursor lignin comprises at least a portion of the water soluble fraction or at least a portion of the water insoluble fraction. Element 2: wherein (a) treating the lignin to produce the precursor lignin further comprises utilizing size exclusion to produce, from the water soluble fraction or from the water insoluble fraction, a higher molecular weight portion and a lower molecular weight portion, wherein the higher molecular weight portion has a higher average molecular weight than the lower molecular weight portion, and wherein the precursor lignin comprises at least a portion of the higher molecular weight portion or at least a portion of the lower molecular weight portion. Element 3: wherein size exclusion comprises at least one selected from size exclusion chromatography, dialysis, enzyme-mediator, acidic precipitation, and combinations thereof. Element 4: wherein the higher molecular weight portion has an average molecular weight of greater than or equal to about 3,000, 10,000, 20,000, or 100,000 g/mol. Element 5: wherein fractionating the lignin to provide the water soluble fraction and the water insoluble fraction comprises subjecting the lignin to an enzyme-mediator system. Element 6: wherein the enzyme-mediator system comprises the enzyme laccase, and a mediator selected from the group consisting of 1-hydroxy benzotriazolehydrate (HBT), 2,2'-azino-bis(3-ethylbenzothiazoline-6-sulfonic acid) (ABTS), acetosyringone, phenol, and combinations thereof. Element 7: wherein the enzyme-mediator system comprises a laccase-HBT system. Element 8: wherein subjecting the lignin to the enzyme-mediator system further comprises producing a buffered solution of the lignin, adding an enzyme and a mediator to the buffered solution of the lignin, stirring for a time period, and separating the water insoluble fraction from the stirred solution. Element 9: further comprising precipitating the water soluble lignin from the stirred solution after separating the water insoluble fraction therefrom. Element 10: wherein (a) treating the lignin to produce the precursor lignin comprises utilizing size exclusion to produce a higher molecular weight portion and a lower molecular weight portion, wherein the higher molecular weight portion has a higher average molecular weight than the lower molecular weight portion, and wherein the precursor lignin comprises at least a portion of the higher molecular weight portion or at least a portion of the lower molecular weight portion. Element 11: wherein size exclusion comprises dialysis. Element 12: wherein utilizing size exclusion comprises dialyzing a solution of the lignin with dialysis apparatus having a molecular weight cutoff of greater or equal to about 3, 4, 5, 6, 7, 8, 9, 10, 11, or 12 K g/mol. Element 13: wherein the precursor lignin comprises at least a portion of the higher molecular weight portion. Element 14: wherein (a) treating lignin to produce the precursor lignin comprises subjecting the lignin to acidic precipitation whereby precursor lignin is precipitated from a basic solution of the lignin via contact of the basic solution of the lignin with acid, separating the precipitated lignin from the solution to provide a separated precipitated lignin, optionally washing the separated precipitated lignin, and lyophilizing to provide the precursor lignin. Element 15: wherein subjecting the lignin to acidic precipitation further comprises dissolving the lignin in an aqueous basic solution, optionally stirring for a time period, and contacting the aqueous basic solution in which the lignin is dissolved with an acidic solution having an acidic pH to provide a resulting solution, and adjusting the pH of the resulting solution to a precipitation pH, wherein the precipitation pH is less than or equal to about 6, 5, 4, 3, 2, or 1. Element 16: wherein the precursor lignin has: a weight average molecular weight in a range of from about 1 to about 20, from about 3 to about 20, from about 1 to about 10, or greater than, less than, or equal to about 20, 10, or 1 K g/mol; a polydispersity index (PDI), defined as the weight average molecular weight divided by the number average molecular weight, of less than or equal to 5, 4, 3, 2, or 1; a percentage of interunitery linkages selected from uncondensed β-O-4' interunitery linkages and condensed β-5' interunitery linkages that is greater than or equal to about 10%, 40%, or 55%; and/or an amount of multiple intermolecular hydrogen bonding that is increased relative to the lignin prior to treating at (a). Element 17: wherein the precursor lignin comprises at least 30, 40, 50, 60, 70, 80, or 85% of the lignin subjected to treating at (a). Element 18: wherein the precursor fibers at (b) have improved spinnability relative to precursor fibers formed in the same manner but without treating the lignin at (a) and/or absent the lignin, the improved spinnability evidenced by a narrower diameter distribution of the carbon fibers obtained at (c). Element 19: wherein forming precursor fibers from the precursor lignin comprises: combining the precursor lignin with a guest polymer and optionally single walled carbon nanotubes (SWCNT); and electrospinning to produce the precursor fibers. Element 20: wherein the guest polymer comprises polyacrylonitrile (PAN). Element 21: wherein (b) forming the precursor fibers from the precursor lignin further comprises lyophilizing the precursor lignin and/or grinding the precursor lignin prior to combining the precursor lignin with the guest polymer. Element 22: wherein the carbon fibers have: an average diameter of less than or equal to about 1300, 1200, 1100, 1000, 900, 800, 700, 600, 500, or 400 nm; an increased content of pre-graphitic turbostratic structure relative to carbon fibers made in the same manner but without treating the lignin and/or absent the lignin, as evidenced by a distance between interfacial crystallite layers, as measured by $d_{hkl}$ determined by X-ray diffraction (XRD), that is less than or equal to about 0.390, 0.380, 0.370, 0.360, or 0.350 nm; a crystallite size, $L_{hkl}$, as measured by XRD, that is at least 20, 30, 40, 50, or 60% greater than a crystallite size of carbon fibers made in the same manner but without treating the lignin and/or absent the lignin; an increased crystallite content, as evidenced by an integration ratio of G and D bands (G/D ratio), as measured by Raman spectroscopy, that is at least 20, 30, 40, or 45% greater than a G/D ratio of carbon fibers made in the same manner but without treating the lignin and/or absent the lignin; and/or a reduced elastic modulus, as measured by nanoindentation, that is at least 30, 40, or 45% greater than a reduced elastic modulus of carbon fibers made in the same manner but without treating the lignin and/or absent the lignin. Element 23: wherein (c) comprises subjecting the precursor fibers to thermostabilization to produced thermostabilized precursor fibers, wherein the thermostabilized precursor fibers have a glass transition temperature, $T_g$, that is lower than a glass transition temperature of thermostabilized fibers made in the same manner, but without treating the lignin.

While preferred embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A method of producing carbon fibers, the method comprising:
    (a) treating lignin to produce a precursor lignin having an increased uniformity defined by (i) an increased linear structure as evidenced by an increased percentage of linkages selected from uncondensed β-O-4' interunitary linkages, condensed β-5' linkages, or a combination thereof, and (ii) a reduced polydispersity index (PDI), wherein the PDI is defined as the weight average molecular weight divided by the number average molecular weight;
    (b) forming precursor fibers from the precursor lignin; and
    (c) subjecting the precursor fibers to thermostabilization, carbonization, or both to produce the carbon fibers, wherein (a) comprises:
        fractioning the lignin to provide a water soluble fraction and a water insoluble fraction, wherein fractionating the lignin to provide the water soluble fraction and the water insoluble fraction comprises:
        subjecting the lignin to an enzyme-mediator system, wherein the enzyme-mediator system comprises the enzyme laccase, and a mediator selected from the group consisting of 1-hydroxy benzotriazolehydrate (HBT), 2,2'-azino-bis(3-ethylbenzothiazoline-6-sulfonic acid (ABTS), acetosyringone, phenol, and combinations thereof; and
        reducing the polydispersity of the water insoluble fraction by utilizing dialysis to produce, from the water insoluble fraction, a higher molecular weight portion and a lower molecular weight portion, wherein the higher molecular weight portion has a higher average molecular weight than the lower molecular weight portion, and wherein the polydisperisty of the higher molecular weight portion is less than that of the water insoluble fraction, wherein the precursor lignin comprises at lest a portion of the higher molecular weight portion,
    wherein reducing the polydispersity of the water insoluble fraction comprising producing the higher molecular weight fraction having a polydispersity of from about 2-3.

2. The method of claim 1, wherein the enzyme-mediator system comprises the enzyme laccase, and the mediator comprises 1-hydroxy benzotriazolehydrate (HBT).

3. The method of claim 1, wherein subjecting the lignin to the enzyme-mediator system further comprises producing a buffered solution of the lignin, adding the enzyme and the mediator to the buffered solution of the lignin, stirring for a time period, and separating the water insoluble fraction from the stirred solution.

4. The method of claim 1, wherein the precursor lignin has:
    a weight average molecular weight in a range of from about 1 to about 20, from about 3 to about 20, from about 1 to about 10, or greater than, less than, or equal to about 20, 10, or 1 K g/mol;
    a polydispersity index (PDI), defined as the weight average molecular weight divided by the number average molecular weight, of less than or equal to 5, 4, 3, 2, or 1;
    a percentage of interunitary linkages selected from uncondensed β-O-4' interunitary linkages and condensed β-5' interunitary linkages that is greater than or equal to about 10%;
    an amount of multiple intermolecular hydrogen bonding that is increased relative to the lignin prior to treating at (a);
    or a combination thereof.

5. The method of claim 1, wherein the precursor fibers at (b) have improved spinnability relative to precursor fibers formed in the same manner but without treating the lignin at (a) or absent the lignin, the improved spinnability evidenced by a narrower diameter distribution of the carbon fibers obtained at (c).

6. The method of claim 1, wherein forming precursor fibers from the precursor lignin comprises:
    combining the precursor lignin with a guest polymer and optionally single walled carbon nanotubes (SWCNT); and
    electrospinning to produce the precursor fibers.

7. The method of claim 6, wherein the guest polymer comprises polyacrylonitrile (PAN).

8. The method of claim 7, wherein the carbon fibers have: a reduced elastic modulus, as measured by nanoindentation, that is greater than or about equal to same carbon fibers produced with pure PAN.

9. The method of claim 1, wherein the carbon fibers have:
    an average diameter of less than or equal to about 1300 nm;
    an increased content of pre-graphitic turbostratic structure relative to carbon fibers made in the same manner but without treating the lignin or absent the lignin, as evidenced by a distance between interfacial crystallite layers, as measured by $d_{hkl}$ determined by X-ray diffraction (XRD), that is less than or equal to about 0.390 nm;
    a crystallite size, UK as measured by XRD, that is at least 20% greater than a crystallite size of carbon fibers made in the same manner but without treating the lignin or absent the lignin;
    an increased crystallite content, as evidenced by an integration ratio of G and D bands (G/D ratio), as measured by Raman spectroscopy, that is at least 20% greater than a G/D ratio of carbon fibers made in the same manner but without treating the lignin or absent the lignin;
    a reduced elastic modulus, as measured by nanoindentation, that is at least 30% greater than a reduced elastic modulus of carbon fibers made in the same manner but without treating the lignin or absent the lignin; or
    a combination thereof.

10. The method of claim 1, wherein (c) comprises subjecting the precursor fibers to thermostabilization to produced thermostabilized precursor fibers, wherein the thermostabilized precursor fibers have a glass transition temperature, $T_g$, that is lower than a glass transition temperature of thermostabilized fibers made in the same manner, but without treating the lignin.

11. The method of claim 1, wherein the higher molecular weight portion has an average molecular weight ($M_n$) of greater than or equal to about 20,000 g/mol.

12. The method of claim 1, wherein utilizing dialysis comprises dialyzing a solution of the lignin comprising the water insoluble fraction with dialysis apparatus having a molecular weight cutoff of greater than or equal to about 6-8 K g/mol.

13. The method of claim 1, wherein (b) forming the precursor fibers from the precursor lignin further comprises lyophilizing the precursor lignin and/or grinding the precursor lignin prior to combining the precursor lignin with a guest polymer.

14. The method of claim 1, wherein the carbon fibers have an average diameter of less than or equal to about 350 nm.

15. A method of producing carbon fibers, the method comprising:
(a) treating lignin to produce a precursor lignin having an increased uniformity defined by (i) an increased linear structure as evidenced by an increased percentage of linkages selected from uncondensed β-O-4' interunitary linkages, condensed β-5' linkages, or a combination thereof, and (ii) a reduced polydispersity index (PDI), wherein the PDI is defined as the weight average molecular weight divided by the number average molecular weight;
(b) forming precursor fibers from the precursor lignin; and
(c) subjecting the precursor fibers to thermostabilization, carbonization, or both to produce the carbon fibers,
wherein (a) comprises:
fractioning the lignin to provide a water soluble fraction and a water insoluble fraction, wherein fractionating the lignin to provide the water soluble fraction and the water insoluble fraction comprises:
subjecting the lignin to an enzyme-mediator system, wherein the enzyme-mediator system comprises the enzyme laccase, and a mediator selected from the group consisting of 1-hydroxy benzotriazolehydrate (HBT), 2,2'-azino-bis(3-ethylbenzothiazoline-6-sulfonic acid) (ABTS), acetosyringone, phenol, and combinations thereof; and
reducing the polydispersity of the water insoluble fraction by utilizing dialysis to produce, from the insoluble fraction, a higher molecular weight portion and a lower molecular weight portion, wherein the higher molecular weight portion has a higher average molecular weight than the lower molecular weight portion, and wherein the polydisperisty of the higher molecular weight portion is less than that of the water insoluble fraction, wherein the precursor lignin comprises at lest a portion of the higher molecular weight portion, and
wherein reducing the polydispersity of the water insoluble fraction by utilizing dialysis further comprises:
dissolving the water insoluble fraction of the lignin in aqueous sodium hydroxide (NaOH) solution;
transferring the dissolved water insoluble fraction of the lignin dissolved in the NaOH solution into one or more dialysis tubes having a nominal molecule weight cutoff,
dialyzing against water for a time period;
precipitating, as a precipitant, the dialyzed lignin in the one or more dialysis tubes by the addition of hydrochloric acid solution;
separating the precipitant from the hydrochloric acid solution via centrifugation; and
lyophilizing the precipitant to provide the precursor lignin.

16. The method of claim 15, wherein the nominal molecule weight cutoff is about 12-14 K g/mol.

17. The method of claim 15, wherein reducing the polydispersity of the water insoluble fraction comprises producing the higher molecular weight fraction having a polydispersity of less than or equal to about 3.

18. Lignin based carbon fibers made via the method of claim 1, and having:
an average diameter of less than or equal to about 1300 nm;
an increased content of pre-graphitic turbostratic structure relative to carbon fibers made in the same manner but without treating the lignin or absent the lignin, as evidenced by a distance between interfacial crystallite layers, as measured by $d_{hkl}$ determined by XRD, that is less than or equal to about 0.390 nm;
a crystallite size, $L_{hkl}$, as measured by XRD, that is at least 20% greater than a crystallite size of carbon fibers made in the same manner but without treating the lignin or absent the lignin;
an increased crystallite content, as evidenced by an integration ratio of G and D bands (G/D ratio), as measured by Raman spectroscopy, that is at least 20% greater than a G/D ratio of carbon fibers made in the same manner but without treating the lignin or absent the lignin; and
a reduced elastic modulus, as measured by nanoindentation, that is at least 30% greater than a reduced elastic modulus of carbon fibers made in the same manner but without treating the lignin or absent the lignin.

19. The lignin based carbon fibers of claim 18 having an average diameter of less than or equal to about 350 nm.

* * * * *